United States Patent [19]

Stewart et al.

[11] 4,376,974
[45] Mar. 15, 1983

[54] ASSOCIATIVE MEMORY SYSTEM

[75] Inventors: John W. Stewart; Darrell W. Woelk; Marvin R. DeForest, all of Wichita, Kans.

[73] Assignee: NCR Corporation, Dayton, Ohio

[21] Appl. No.: 135,792

[22] Filed: Mar. 31, 1980

[51] Int. Cl.³ .............................................. G06F 13/00
[52] U.S. Cl. ................................................... 364/200
[58] Field of Search ... 364/200 MS File, 900 MS File; 365/49

[56] References Cited

U.S. PATENT DOCUMENTS

| | | | |
|---|---|---|---|
| 3,448,436 | 6/1969 | Machol, Jr. | 364/900 |
| 3,949,379 | 4/1976 | Ball | 364/200 |
| 4,044,338 | 8/1977 | Wolf | 364/900 |
| 4,068,305 | 1/1978 | Cutler | 364/200 |
| 4,069,473 | 1/1978 | Vitaliev et al. | 365/49 |
| 4,099,242 | 7/1978 | Houston et al. | 364/200 |
| 4,115,850 | 9/1978 | Houston et al. | 364/200 |
| 4,130,867 | 12/1978 | Bachman et al. | 364/200 |
| 4,144,564 | 3/1979 | Lamb | 364/200 |
| 4,145,737 | 3/1979 | Lamb et al. | 364/200 |
| 4,159,538 | 6/1979 | Motsch | 365/49 |
| 4,163,288 | 7/1979 | Vinot | 364/900 |

Primary Examiner—Raulfe B. Zache
Attorney, Agent, or Firm—J. T. Cavender; Albert L. Sessler, Jr.; Elmer Wargo

[57] ABSTRACT

An associative memory system including a plurality of associative data controllers (ADCs) which operate in parallel upon a mass storage including a storage array for each ADC. A primitive function processor (PFP) couples the ADCs to a control unit which provides user access to the system. Hardware instructions are issued by the PFP to the ADCs to enable them to operate in parallel. The ADCs have circuits for performing simultaneous read/write operations with their related storage arrays, and for performing tagging operations, minimum/maximum operations, and logical operations.

31 Claims, 165 Drawing Figures

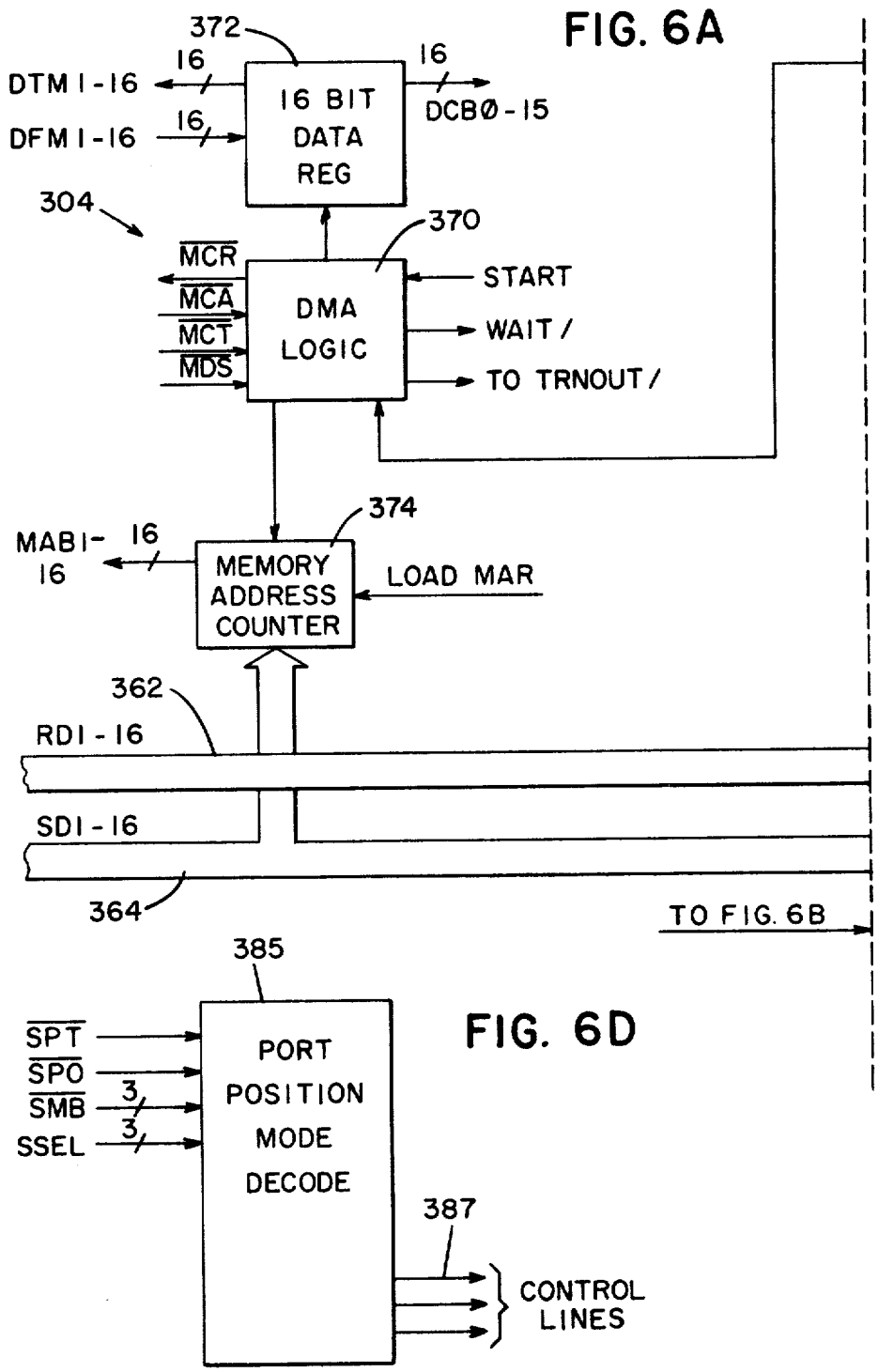

KEY 8

KEY 16

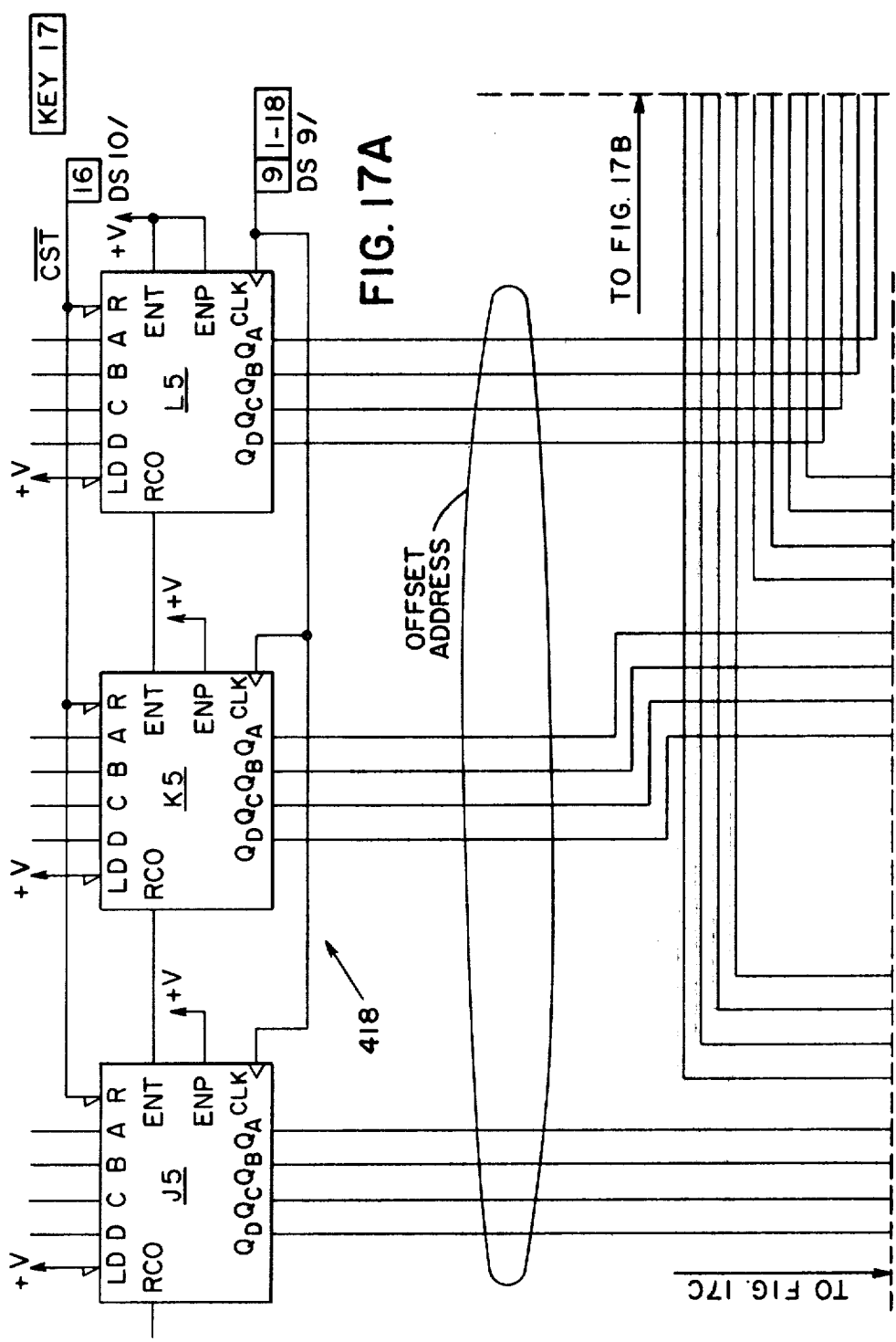

KEY 17

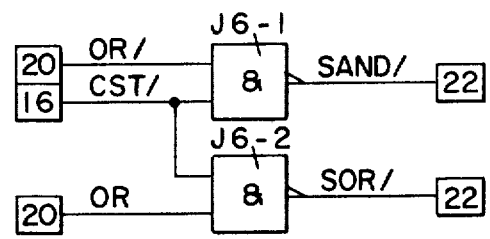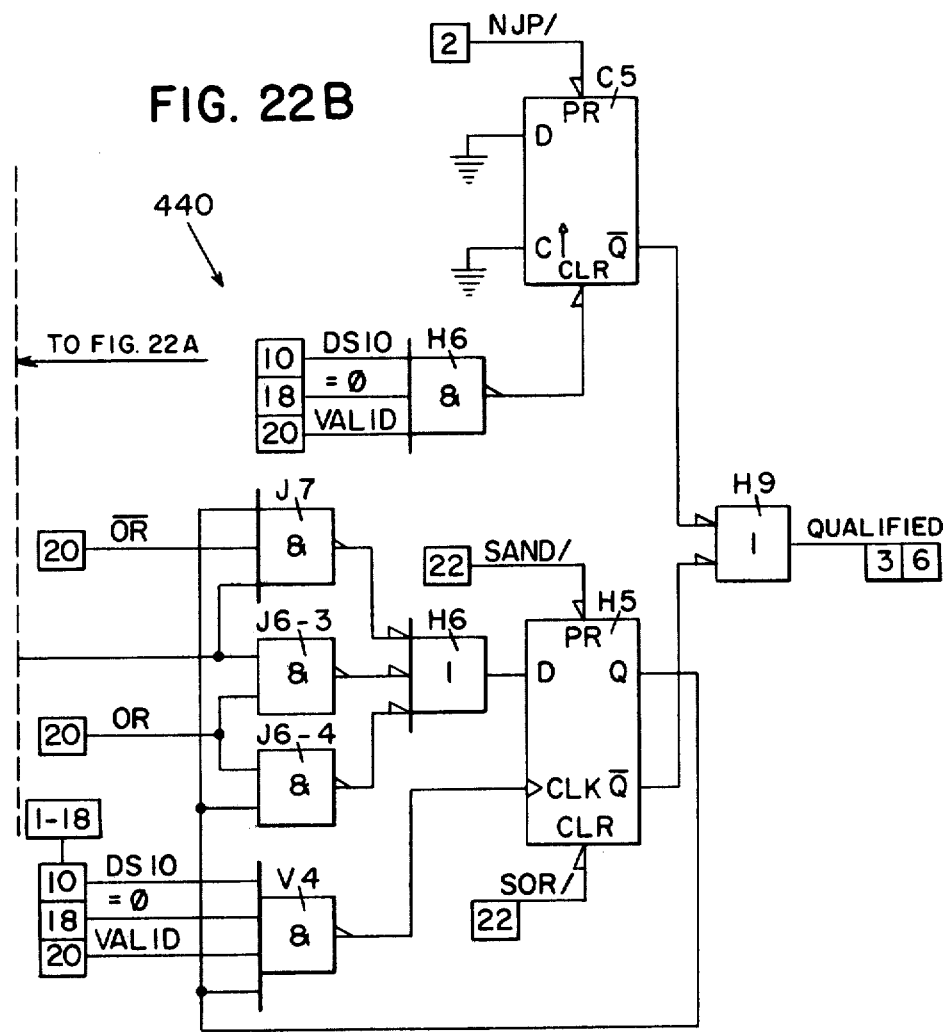

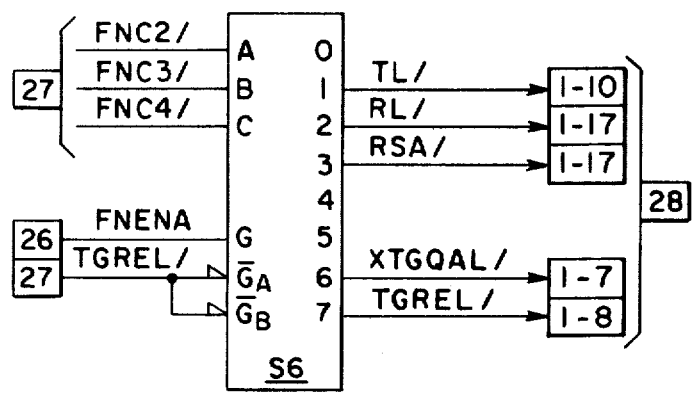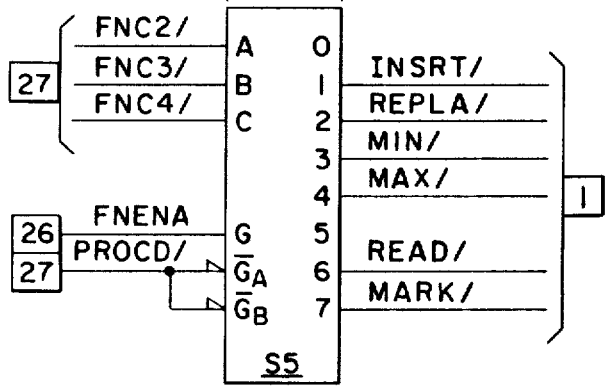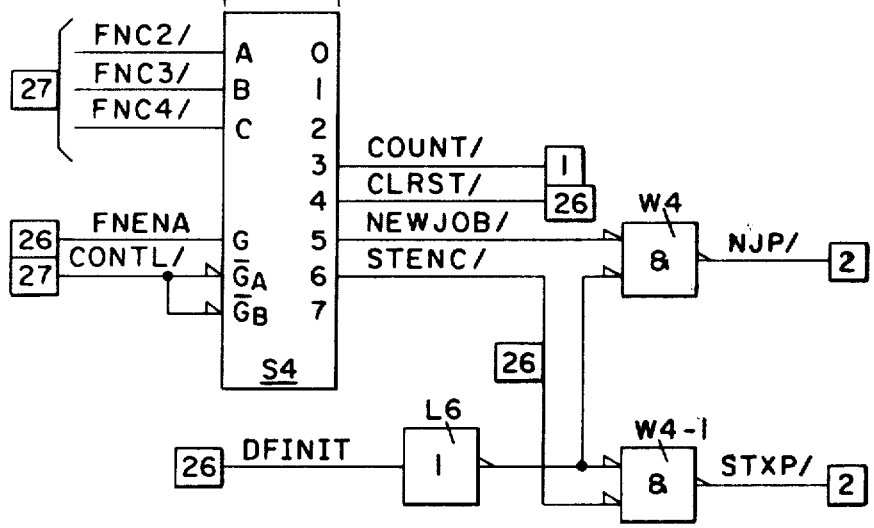
FIG. 27C

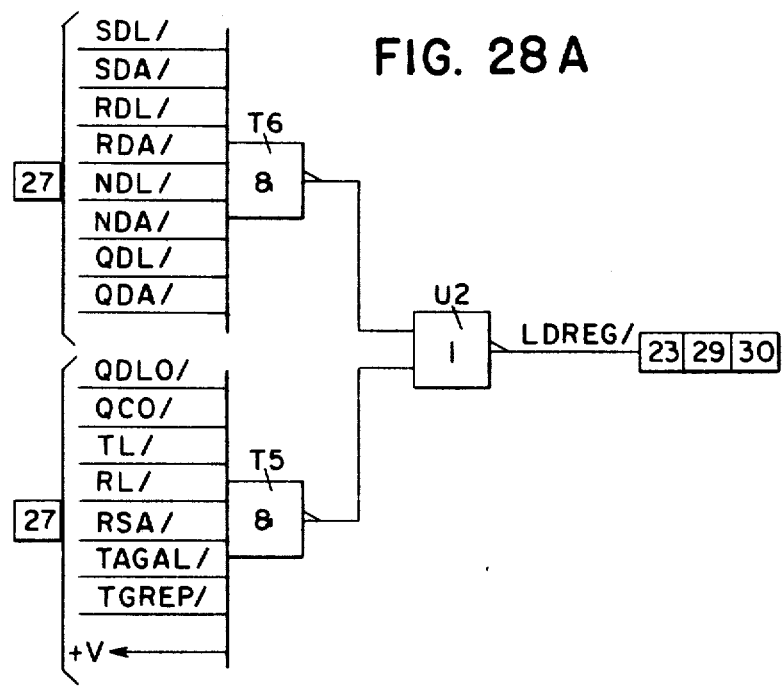
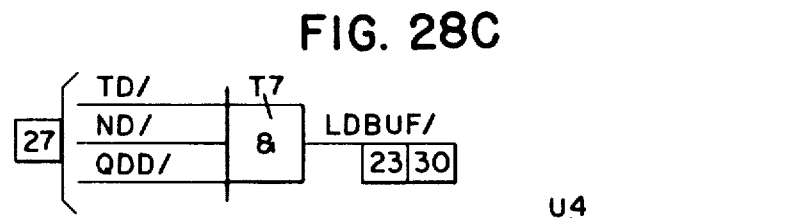
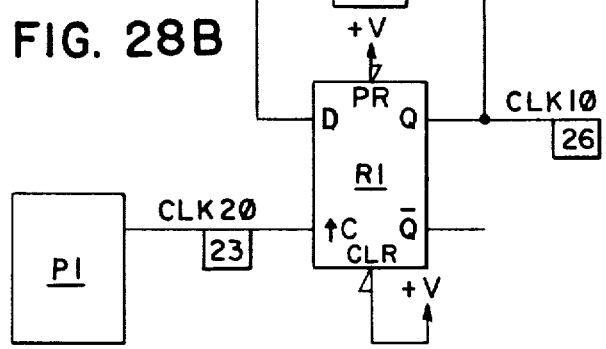

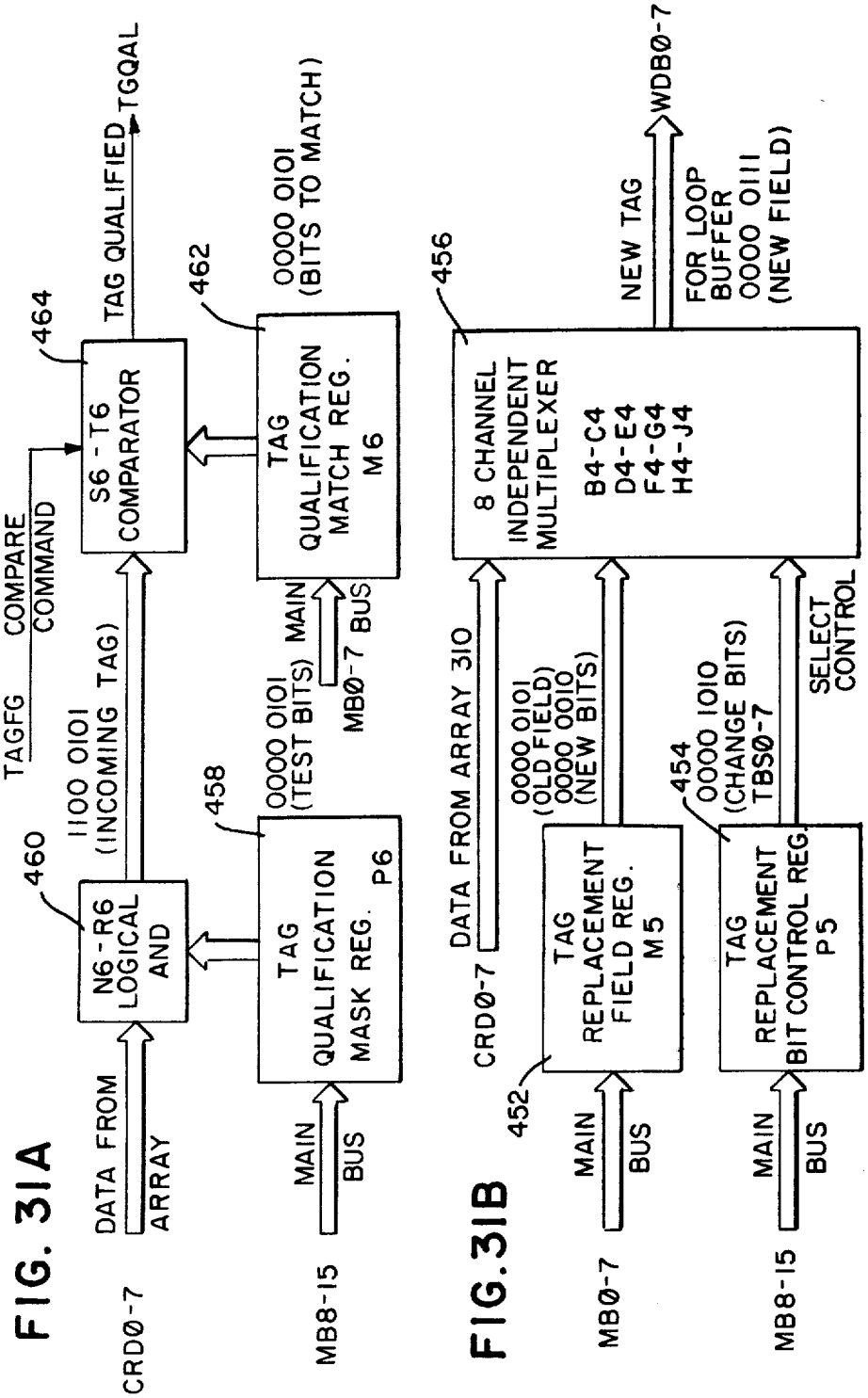

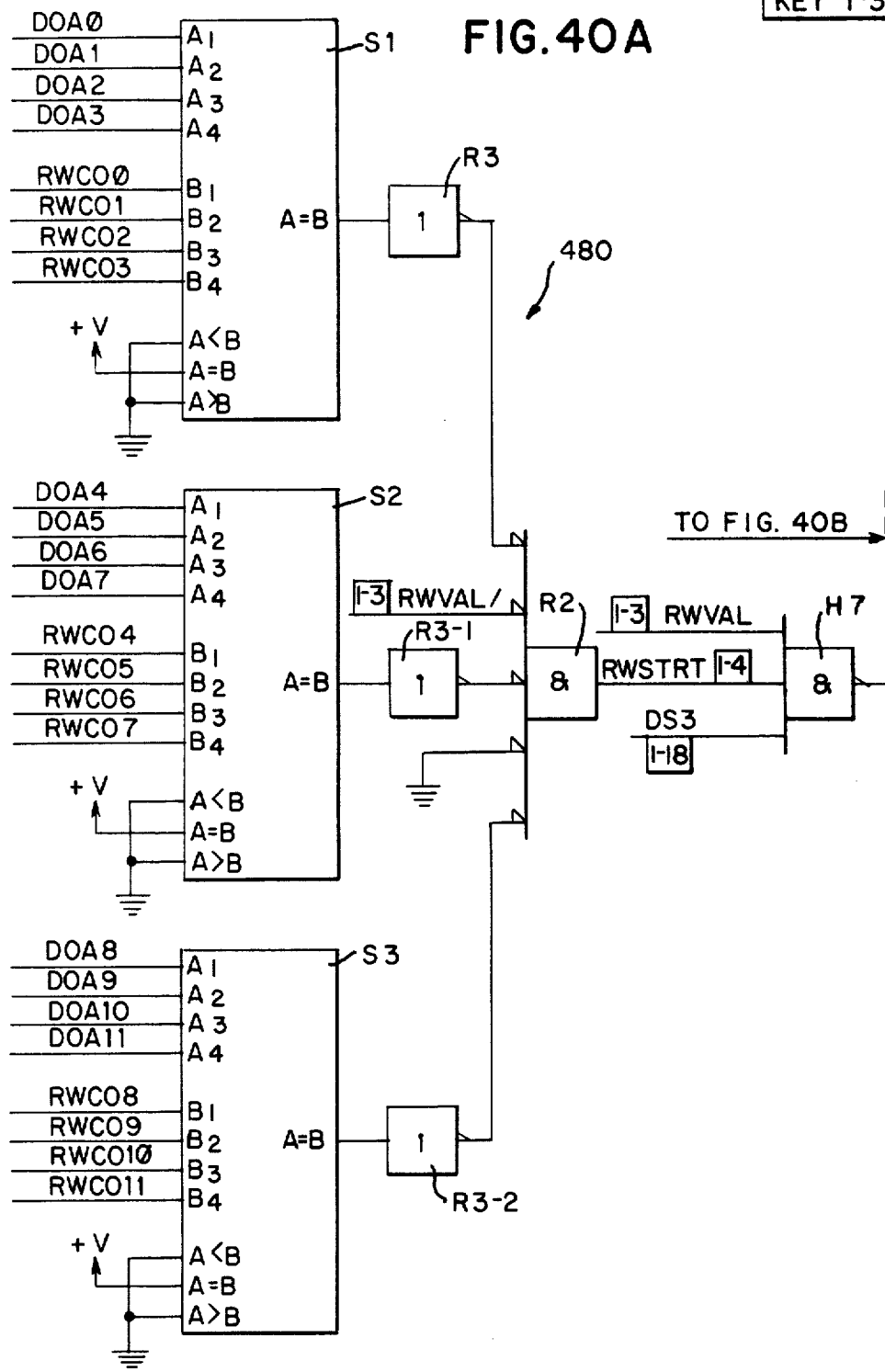

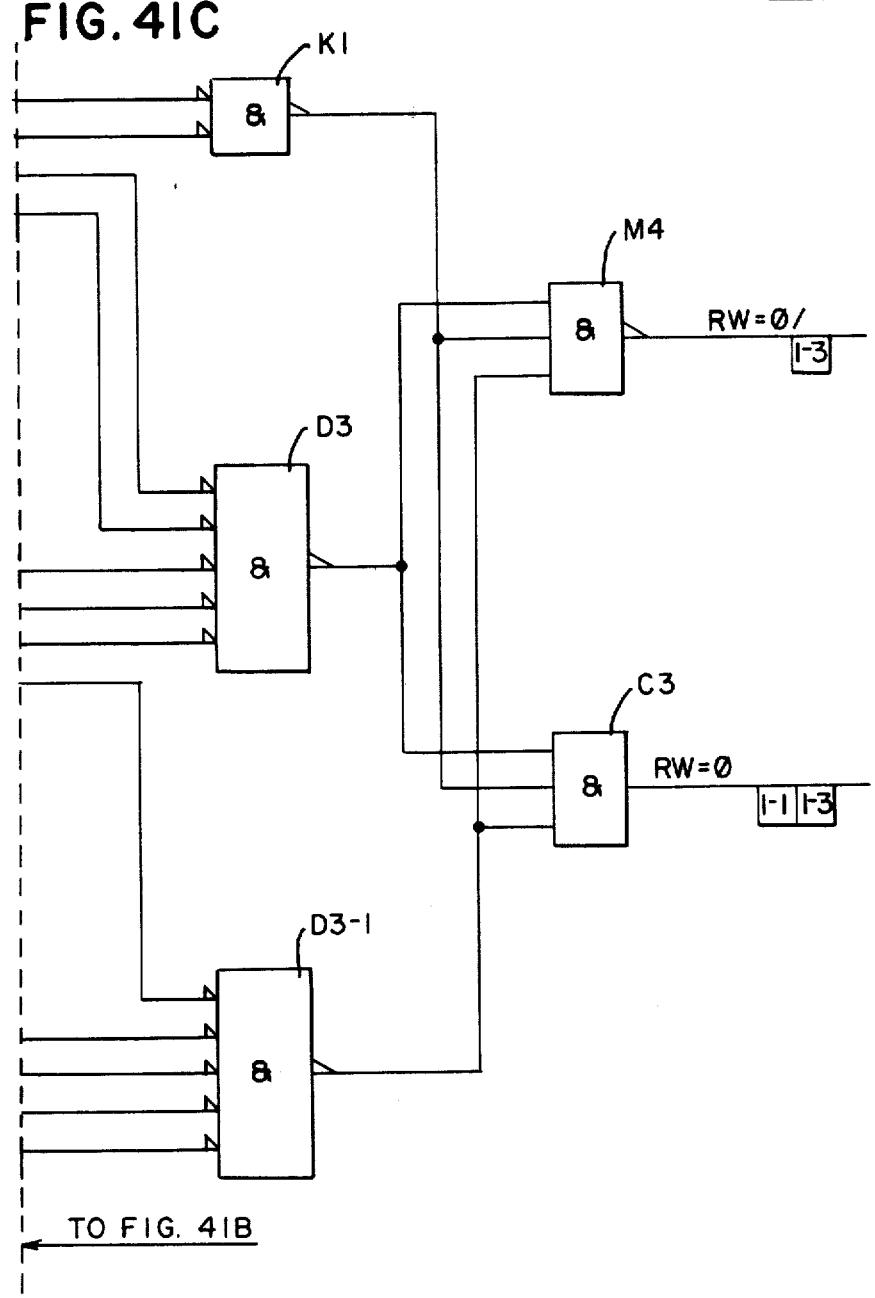

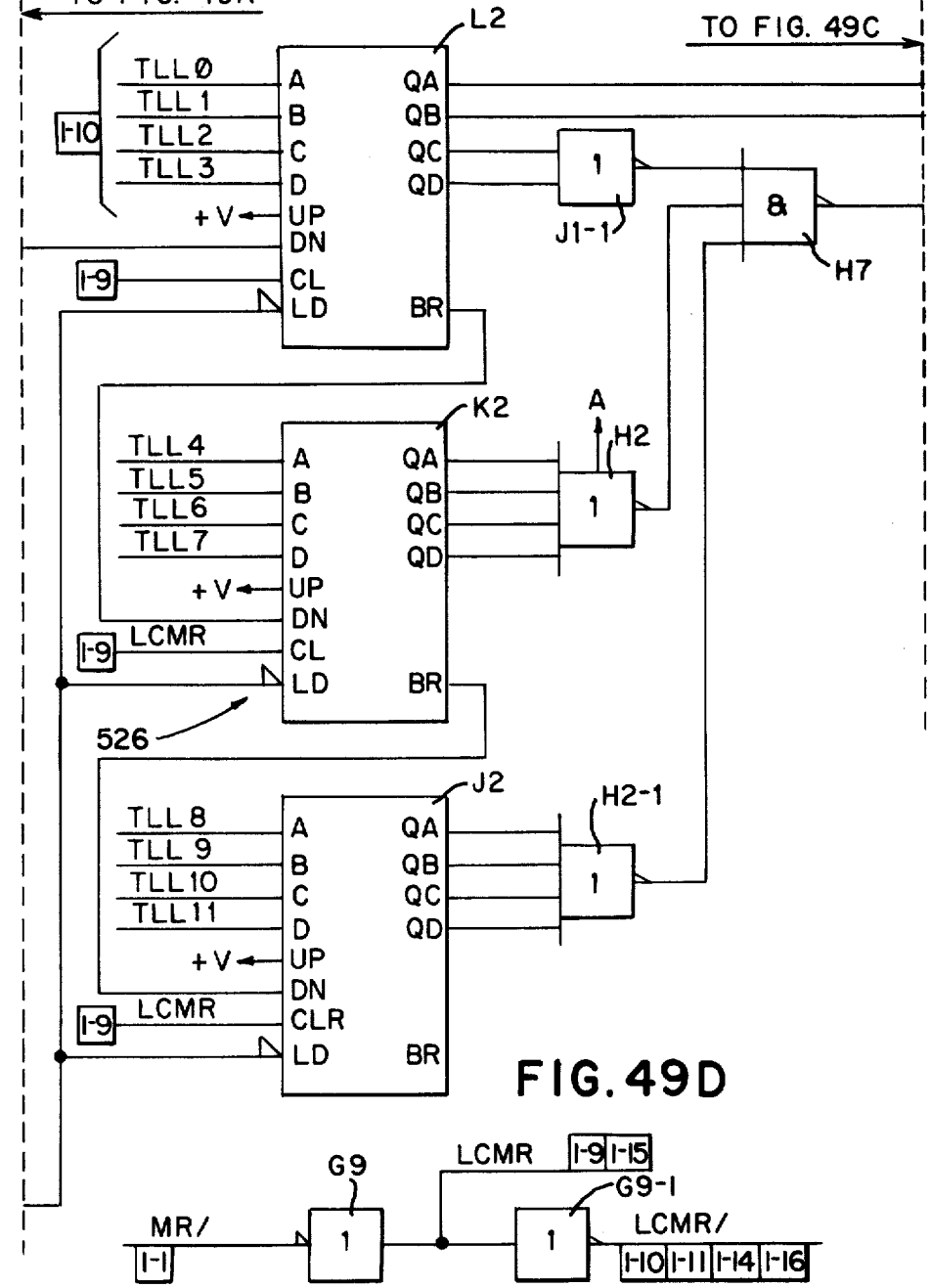

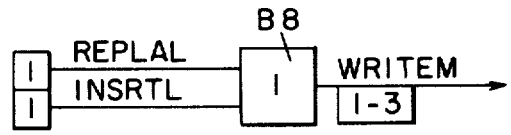
FIG. 57C
FIG. 57A
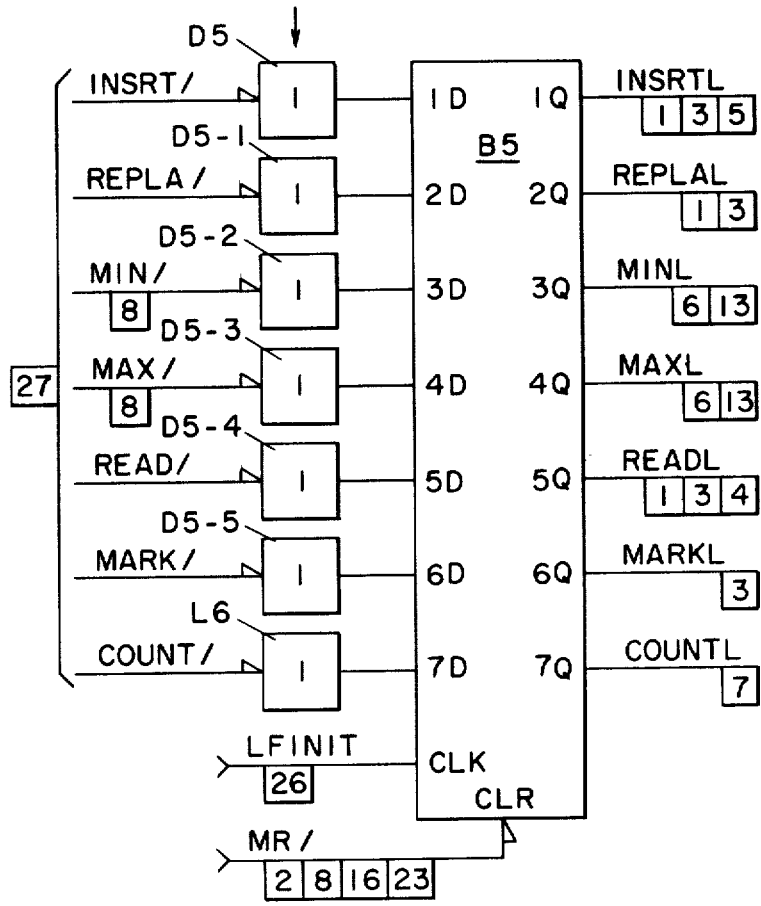

TO FIG. 66B

ASSOCIATIVE MEMORY SYSTEM

BACKGROUND OF THE INVENTION

This invention relates to an associative memory system and more particularly, it relates to a method and apparatus for handling data in an associative memory environment.

In recent years, there has been extensive work done towards developing more effective methods for creating data bases for use with computer systems and for accessing the data bases. One of the outgrowths of this work was to develop various data base management techniques for generating data bases which eliminated redundant data therefrom and which arranged a data base in a particular way so as to enhance its usage by more than one application program. A general discussion of data base management techniques may be found in the book, *Principles Of Data Base Management*, by James Martin, (Englewood Cliffs, N.J.: Prentice Hall, Inc. 1976).

Another feature of the improved data base was to access data therefrom by the data itself instead of using an abstract memory location number as a selection device for accessing the data. For example, a person's social security number itself might be used to provide a means for accessing the data about that person from memory instead of using an abstract or arbitrary location scheme; this provided an apparent associative memory capability.

There are two methods of implementing this apparent associative memory capability. Some systems utilize software in the form of inverted files etc., to provide an efficient path to the selected data. This creates software complexity and increases the amount of data storage required. Attempts to eliminate the complex software and to utilize traditional hardware as a second method for searching did not provide satisfactory performance.

SUMMARY OF THE INVENTION

This invention relates to an associative memory system, comprising: storing means having at least first and second units for storing data therein, wherein K bytes of data are obtained serially from the first unit followed by K bytes of data obtained serially from the second unit, wherein K is a whole number; first means and second means for simultaneously receiving the bytes of data as they are read serially from the storing means; the first means also including a loop buffer for receiving and storing serially K bytes of data from the storing means; the second means also having means for performing at least one operation on the bytes of data as they are obtained serially from the storing means; and the first means also having means for writing bytes of data from the loop buffer into the storage means simultaneously as the bytes of data are read therefrom whereby a write address for writing a byte of data into the storing means is obtained by subtracting K from a current address of a byte of data being read from the storage means.

The method of handling data according to this invention comprises the steps of:

(a) storing bytes of data in at least first and second storing units in a storage array, wherein K bytes of data are obtained serially from the first unit followed by K bytes of data obtained serially from the second unit, wherein K is a whole number;

(b) simultaneously receiving the bytes of data in first and second circuits as they are read from the storage array; the first circuit including a loop buffer for storing serially K bytes of data from the storage array;

(c) performing at least one operation on the bytes of data as they are received serially by the second circuit; and (d) writing bytes of data into said storage array via the loop buffer whereby a write address for writing a byte of data into the storage array is obtained by subtracting K from a current address of a byte of data being simultaneously read from the storage array.

An object of this invention is to produce a high speed data manipulator at a low cost.

Some of the advantages of this invention are:

1. It provides powerful hardware instructions.
2. It provides for variable length tuples and domains in different relations.
3. It provides continuous high speed operation which is independent of the number of qualified tuples found or the spaces between qualified tuples.
4. It provides simultaneous read/write capability to mass storage so that modifications can be made without stopping the search operation.
5. It provides associative data controllers which operate in parallel.
6. It can select or insert up to 16 domains (in the embodiment described) in one pass, consecutively or non-consecutively.
7. It provides for tagging operations.
8. It enables a user not to be concerned with the physical boundaries of the mass storage used or the details of correctly timing a write operation to mass storage.
9. It provides the ability to compare up to 16 arguments (in the embodiment described) with 16 domains for logical operations.

These advantages and others will be more readily understood in connection with the following description, claims and drawing.

BRIEF DESCRIPTION OF THE DRAWING

FIGS. 6A, 6B, 6C, and 6D taken together show more details of the primitive function processor shown in FIGS. 1 and 5;

FIGS. 16A, 16B, 16C, 16D, 17A, 17B, 17C, 17D, 17E, 18A, 18B, 18C, 18D, 19A, 19B, 20A, 20B, 20C, 21A, 21B, 22A, 22B and 22C show additional details of the qualify module shown in FIGS. 14A and 14B;

FIGS. 23A, 23B, 23C, 23D, 23E, 23F, 24A, 24B, 25A, 25B, 26A, 26B, 26C, 27A, 27B, 27C, 28A, 28B, 28C, 29A, 29B, 29C, 29D, 30A, 30B, and 30C show additional details of the data interchange module shown in FIG. 3 and FIGS. 15A, 15B, and 15C; FIG. 23F is located on the sheet containing FIG. 24B;

FIGS. 31A and 31B show more details of the tag module shown in FIG. 3;

FIG. 32 is located on the sheet containing FIG. 4;

FIG. 34C is located on the sheet containing FIG. 48B;

FIGS. 40A, 40B, 40C, and 40D show additional details of a portion of the read/write module shown in FIG. 35B;

FIGS. 41A, 41B, and 41C show additional details of a portion of the read/write module shown in FIG. 35B;

FIGS. 49A, 49B, 49C, 49D, and 49E show additional details of a portion of the loop control circuit shown in FIG. 42B;

FIG. 53B is shown on the sheet containing FIG. 46B;

FIGS. 57A, 57B, and 57C show more details of the logic shown in FIG. 54;

DETAILED DESCRIPTION OF THE INVENTION

Figure 1:
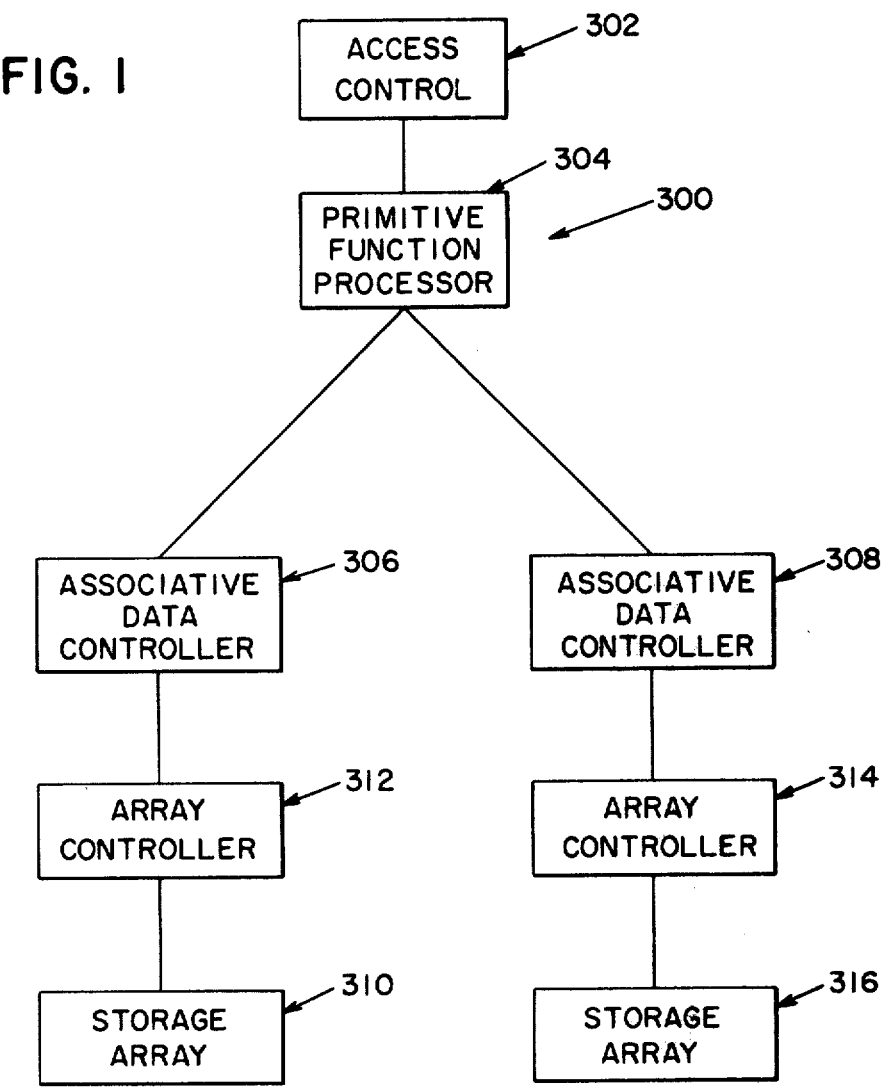
FIG. 1 is a general diagram in block form of a preferred embodiment of an associative memory system embodying the principles of this invention.

FIG. 1 is a general block diagram of an associative memory system 300 embodying the principles of this invention. The system 300 includes an access control unit 302 which includes a general purpose computer which can handle computer languages such as Pascal or other general purpose languages which are conventionally available. The basic function of the control unit 302 is to communicate with a primitive function processor 304 (hereinafter referred to as PFP). The PFP 304 provides an interface between the control unit 302 and a group of associative data controllers (hereinafter referred to as ADC) such as ADCs 306 and 308. The system 300 shown in FIG. 1 is expansible in that, for example, up to eight ADCs such as 306 can be accommodated therein. Each ADC such as ADC 306 is operatively coupled to a storage array such as 310, via an array controller 312. In one embodiment of this invention, the storage array 310 is comprised, for example, of charge coupled devices (CCDs) in a manner which facilitates simultaneous reading and writing of data out of and into the storage array. Array controller 314 and storage array 316 are identical to controller 312 and array 310, respectively.

In general, the functions of the PFP 304 (FIG. 1) are to:

(a) Translate primitives or function commands from the control unit 302 into a sequence of multicontroller functions (to be later described herein) wherein execution time may be critical due to iterative processes. As used herein, a primitive is the lowest level software command in the system.

(b) Control the synchronization of multiple ADCs 306, 308 during such functions as Read, Insert, for example, to be later described herein.

Before proceeding with a detailed discussion of the system 300, it appears useful to discuss in a general way, some of the attributes thereof.

The data in the storage arrays like 310, is stored therein according to the "relational model". The relational model may be defined as a mathematically derived methodology for data management which allows solutions to a user's request to be obtained solely through examining the value(s) of the data item(s) in question. A simple example would be to use a person's social security number itself (as a means of selection) to obtain personal data from memory about that person instead of using an abstract address to access the personal data. Some advantages of the relational model are as follows:

(a) It is a model of data which requires little more than the physical data itself for processing.

(b) The relational model depicts data in flat form; i.e., each separate file (relation) has fixed length records (tuples) with all fields (domains) in a defined order and of consistent type and specified value.

(c) The relational model describes data relations which have no tuple ordering specification; thus, tuples may be inserted, deleted, and moved in the network with no impact on future processing results.

In order to capitalize upon the simplicity of the relational model, the ADC 306 was designed to search through all the data under its control. The ADC 306 has the attributes of an associative memory; i.e., given one or more domain values and associated Boolean conditions as qualifiers, the ADC 306 locates all qualifying occurrences of those domain values in the tuples under its control and establishes as one of its functions a "marked" subset of the specified relation as the result. As an oversimplification, a relational model may be considered as a flat table, with the rows of the table being referred to as tuples and the columns thereof being referred to as domains. The ADCs such as 306 were also designed to facilitate the searching of large amounts of data in parallel. Searching in parallel facilitates attaining adequate performance levels when examining large quantities of data sequentially. In the embodiment described, the storage arrays like 310 contain CCDs, as previously stated; the arrays can be logically visualized as being a continuous, sequential string of bits with no limiting device characteristics.

Figure 2:
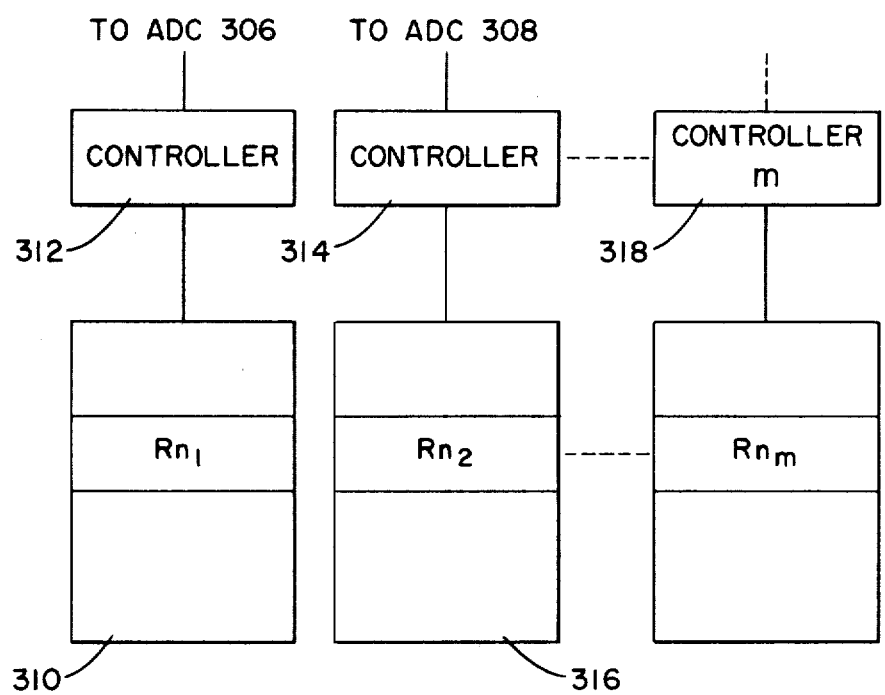
FIG. 2 is a general diagram in block form showing how data is stored as relations in the storage arrays shown in FIG. 1.

FIG. 2 is a general diagram, in block form, showing how data is stored as relations in the storage arrays (like 310) shown in FIG. 1. To simplify the controller logic needed to manage the data, a relation is divided or split into groups of tuple spaces (occupied and/or deleted) and evenly distributed under all the controllers such as 312, 314 and 318 (FIG. 2), with one group being assigned per controller. Each tuple group is allocated a space at the same relative location in the block of storage to which it is assigned. Thus a data searching function against a relation can be initiated in parallel by activating all controllers 306, 308 (FIG. 1) simultaneously, with a request to begin searching (at a particular address) the portion of the relation under their control. The ADCs 306 and 308 for example, and their associated controllers 312, 314, all complete the search in approximately the same time, thus minimizing idle time in the controllers. FIG. 2 illustrates a relation $R_n$ which is divided into m tuple groups of equal size, as $R_{n1}, R_{n2} \ldots R_{nm}$.

Another attribute of the system 300 (FIG. 1) is that there is a minimum of movement of data within the storage arrays like 310 and a minimum of data being moved from the ADC's like 306 "up" to the PFP 304; i.e., only "answers" are moved up from the ADCs. Another advantage is that a primitive (instruction) from the PFP 304 is processed to completion across all the ADCs instead of dividing the ADCs into subgroups to process multiple primitives against different relations, concurrently. The access control unit 302 is essentially a non-hardware, sequential processor of relational data subrequests. The control unit 302 works on a subrequest to completion before accepting a second subrequest. All the data required to complete a subrequest is known to be available in the storage arrays like 310. The appropriate sequence of hardware primitives is constructed in the control unit 302 and those primitives are sent to the PFP 304, one at a time, in order to be dispersed to the ADCs like 306 and 308 for execution. Only the "answers", if any, are returned to the control unit 302.

Figure 3:
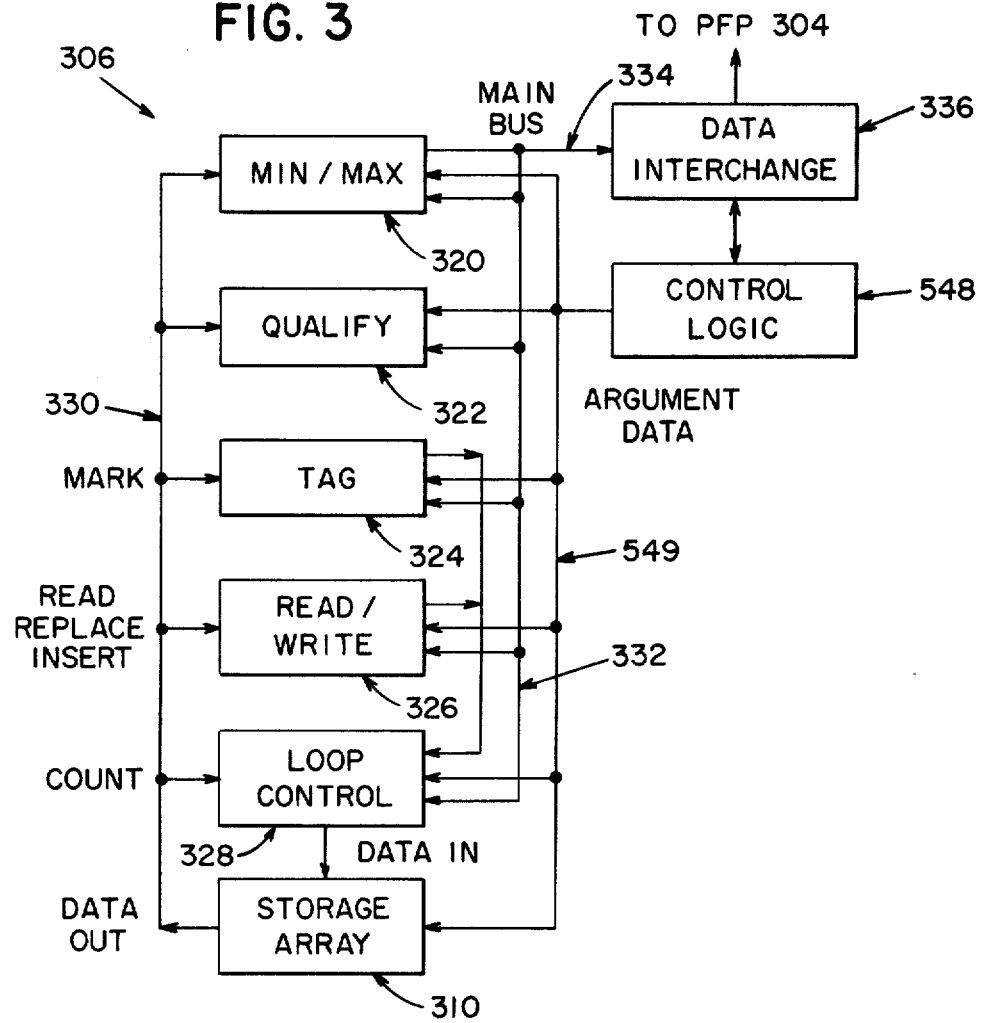
FIG. 3 is a general diagram in block form showing the separate modules which comprise an associative data controller (ADC) shown in FIG. 1.

Each ADC, such as 306 shown in FIG. 1, is comprised of the modules shown in FIG. 3; these separate modules are designed to process in parallel, the specified data retrieved from the associated storage array 310. ADC 306 includes a minimum/maximum (min/max) module 320, a qualify module 322, a tag module 324, read/write module 326, and loop control module 328; a first bus 330 connects each of these modules with the storage array 310, and a second bus 332 is used for presenting data to these modules from a main bus 334. The main bus 334 couples the ADC 306 to the PFP 304 via a data interchange unit 336. A control logic module 548 is connected to each of the modules in FIG. 3 by a bus 549.

The basic function of the min/max module 320 (FIG. 3) is to find the minimum or the maximum value of a domain within a single pass of a relation, i.e., in one cycle, the minimum or the maximum value of one domain in a qualified set of tuples will have been found.

The general function of the qualify module 322 (FIG. 3) is to compare domains from the storage array 310 with the argument data sent over the bus 334 to determine whether or not a current tuple is the one which is to be selected according to conditions set up for selection at the PFP 304.

The general function of the tag module 324 (FIG. 3) is to mark or tag certain data which is selected in one operation for use in a subsequent operation. When selecting data by content in the associative method of retrieval, there is no apparent way of maintaining a selected set of data for use at a subsequent operation, unless tagging is performed, without physically creating a copy of the selected tuples. In the embodiment being described, an eight bit byte in one of the domains for a tuple is used for tagging bits.

The general function of the read/write module 326 (FIG. 3) is to receive data from an ADC (like 306) and write it into the associated storage array (like 310) and to read data from the storage array (310). In the embodiment described, the module 326 can read, insert, or replace up to 16 domains per tuple. In the embodiment described, each domain contains a plurality of eight-bit bytes.

The general function of the loop control module 328 (FIG. 3) is to store a certain amount or "loop" of data from the storage array 310 while waiting for a decision as to whether or not individual tuples within the loop of data will be deleted, modified, or left unchanged in the storage array 310.

Earlier herein, it was stated that the function of the PFP 304 (FIG. 1) was to provide an interface between the access control unit 302 and the ADCs 306 and 308. The input of the PFP 304 is a primitive function (instruction) and the output therefrom is a multi-controller function. The output from the PFP 304 back to the control unit 302 is status information and, in some cases, answers.

The following Table 1 illustrates the general activity associated with each primitive function as it passes through the PFP 304.

TABLE 1

| PRIMITIVE FUNCTIONS | MULTI-CONTROLLER FUNCTIONS | ACTION TAKEN BY PFP 304 |
| --- | --- | --- |
| MARK | MARK | ISSUE PRIMITIVE |
| READ | READ | RESOLVE # OF TUPLES READ |
| MAX | MAX | RESOLVE OVERALL MAXIMUM |
| MIN | MIN | RESOLVE OVERALL MINIMUM |
| REPLACE | REPLACE | ISSUE PRIMITIVE |
| INSERT | INSERT | RESOLVE MULTIPLE INSERTS |
| COUNT | COUNT | SUMS INDIVIDUAL COUNTS |
| XMARK | READ,MARK ... | CREATES SERIES OF THESE FUNCTIONS |
| PROJECT | READ,MARK ... | CREATES SERIES OF THESE FUNCTIONS |
| CREATE | MARK | MANAGES TAGS |
| DELETE | MARK | MANAGES TAGS |
| LDELETE | MARK | MANAGES TAGS |
| RECOVER | MARK | MANAGES TAGS |
| DESTROY | MARK | MANAGES TAGS |

TABLE 2

| PRIMITIVE FUNCTION | | SEQUENCE OF MULTI-CONTROLLER COMMANDS FROM PFP 304 |
| --- | --- | --- |
| MARK | 1. | ISSUE MARK COMMAND TO ALL ADC'S (like 306). |
| READ | 1. | ISSUE READ COMMAND TO ALL ADC'S 306,308. |
| | 2. | TRANSFER THE SELECTED DOMAINS FROM ONE TUPLE FROM THE FIRST ADC TO RESPOND WITH REQUEST. |
| | 3. | REPEAT STEP 2 UNTIL THE REQUIRED NUMBER OF TUPLES IS TRANSFERRED TO THE CONTROL UNIT 302 OR UNTIL NO MORE QUALIFYING TUPLES ARE LEFT IN THE ADC'S. |
| | 4. | CANCEL ALL ADC JOBS. |
| REPLACE | 1. | ISSUE REPLACE COMMAND TO ADC'S. |
| INSERT | 1. | ISSUE INSERT COMMAND TO ALL ADC'S (ALONG WITH DATA TO INSERT). |
| | 2. | SEND ACK (acknowledge) TO THE FIRST ADC TO RESPOND WITH REQUEST. |
| | 3. | CANCEL ALL OTHER ADC JOBS. |
| DELETE | 1. | ISSUE MARK COMMAND TO ALL ADC'S TO TURN ON ACTUAL DELETE FLAG IN QUALIFYING TUPLES. |
| LDELETE | 1. | ISSUE MARK COMMAND TO ALL ADC'S TO TURN ON LOGICAL DELETE FLAG IN QUALIFYING TUPLES. |
| COUNT | 1. | ISSUE COUNT COMMAND TO ALL ADC'S. |
| | 2. | RETRIEVE THE COUNT VALUE FROM THE FIRST ADC TO RESPOND WITH A REQUEST. |
| | 3. | REPEAT STEP 2 UNTIL NO MORE REQUESTS ARE RECEIVED. |
| | 4. | CALCULATE SUM OF COUNTS. |
| XMARK | 1. | ISSUE READ COMMAND TO ALL ADC'S FOR THE SECONDARY RELATION. |
| | 2. | SEND ACK OR ACKNOWLEDGE TO THE FIRST ADC TO RESPOND WITH REQUEST AND CANCEL ALL OTHER ADC JOBS. |
| | 3. | TRANSFER THE SELECTED DOMAINS FROM ONE TUPLE TO THE PFP BUFFER. |
| | 4. | ISSUE MARK COMMAND TO ALL ADC'S USING THE SELECTED DOMAINS OF THE SECONDARY RELATION AS QUALIFIERS FOR MARKING THE PRIMARY RELATION. |
| | 5. | REPEAT STEPS 1-4 UNTIL NO MORE QUALIFYING TUPLES ARE LEFT IN THE PRIMARY RELATION. |
| CREATE | 1. | BUILD A RELATION DIRECTORY ENTRY IN MEMORY FOR THE NEW RELATION. |
| | 2. | ISSUE MARK COMMAND TO DELETE ALL TUPLES IN THE RELATION. |
| DESTROY | 1. | REMOVE THE RELATION DIRECTORY ENTRY IN MEMORY FOR THE RELATION. |
| RECOVER | 1. | ISSUE MARK COMMAND TO ALL ADC'S TO TURN OFF THE LOGICAL DELETE FLAG FOR THE SPECIFIED RELATION. |
| PROJECT | 1. | ISSUE READ COMMAND TO ALL ADC'S TO READ AND MARK WITH TAGS "A" AND "B" ALL TUPLES WITH TAG A NOT ON. |

TABLE 2-continued

| PRIMITIVE FUNCTION | SEQUENCE OF MULTI-CONTROLLER COMMANDS FROM PFP 304 |
|---|---|
| | 2. TRANSFER ALL SELECTED DOMAINS FROM ONE TUPLE FROM THE FIRST ADC TO RESPOND WITH REQUEST. |
| | 3. CANCEL ALL ADC JOBS. |
| | 4. ISSUE MARK COMMAND TO ALL ADC'S TO MARK WITH TAG "A" ALL TUPLES WITH DOMAIN VALUES WHICH ARE EQUAL TO THE DOMAIN VALUES READ IN STEP 2. |
| | 5. REPEAT STEPS 1-4 UNTIL NO MORE QUALIFYING TUPLES ARE LEFT. |
| | 6. ISSUE MARK TO TURN OFF TAG "A" LEAVING TAG "B" ON FOR UNIQUE TUPLES. |
| MAX | 1. ISSUE MAX COMMAND TO ALL ADC'S TO DETERMINE MAXIMUM VALUE OF D1, WHEREIN D1 IS A FIRST SELECTION CRITERIA OR DOMAIN AND D2 AND D3 ARE SECOND AND THIRD SELECTION CRITERIA, RESPECTIVELY. |
| | 2. TRANSFER THE MAXIMUM D1 VALUE FROM EVERY ADC (306) INTO THE RAM 356 OF THE PFP 304. THE PFP 304 DETERMINES THE ACTUAL MAXIMUM D1 VALUE AND MOVES IT TO MEMORY LOCATION V1 IN RAM 356 OF THE PFP 304. |
| | 3. REPEAT STEP 2 USING D2 AND V2 INSTEAD OF D1 AND V1 AND ALSO USING D1=V1 AS QUALIFICATIONS, WHEREIN V2 IS A MEMORY LOCATION. |
| | 4. REPEAT STEP 2 USING D3 and V3 INSTEAD OF D1 and V1 AND ALSO USING D1=V1 AND D2=V2 AS QUALIFICATIONS. |
| | 5. ISSUE READ TO ALL ADC'S WITH QUALIFICATION OF D1=V1, D2=V2, AND D3=V3. |
| | 6. TRANSFER SELECTED DOMAINS FROM ALL QUALIFYING TUPLES. |
| | 7. CANCEL ALL JOBS. |
| MIN | SIMILAR TO MAX EXCEPT MIN COMMAND IS USED INSTEAD OF MAX COMMAND. |

Figure 4:
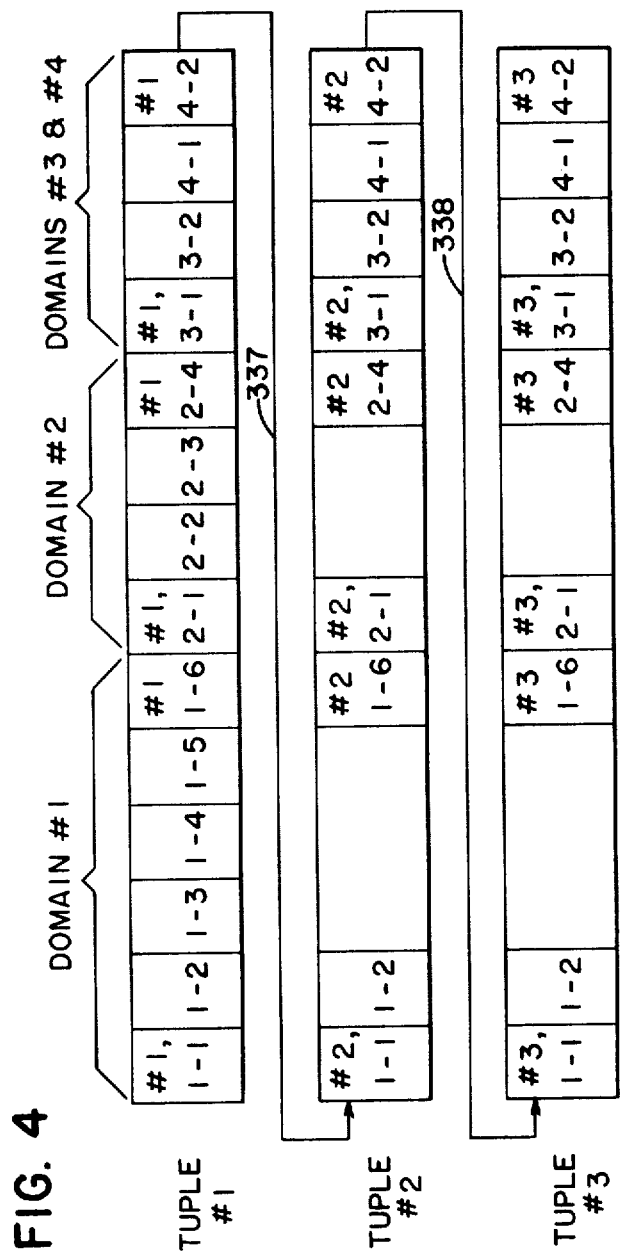
FIG. 4 is a general schematic diagram showing how data is stored as a relational model with regard to tuples and domains.

Before proceeding further with a discussion of the primitive functions shown in Table 2, it appears appropriate to discuss the relational model or format of data in the storage arrays like 310 and 316 (FIG. 1). FIG. 4 shows a very simplified relational model of data which may be stored in storage arrays like 310 and this model is used only to illustrate how the various tuples and domains may be arranged. In FIG. 4, there are three tuples shown, i.e., Tuples #1, #2, and #3, with each tuple having four domains, i.e., Domain #1, #2, #3, and #4. Domain #1 has 6 bytes (each byte being 8 bits long and ranging from 1-1 to 1-6), Domain #2 and 4 bytes (ranging from 2-1 to 2-4), Domain #3 has 2 bytes (ranging from 3-1 to 3-2) and Domain #4 has 2bytes (ranging from 4-1 to 4-2). Tuples #2 and #3 each have domains which are identical in layout to Domains #1, #2, #3, and #4 associated with Tuple #1. In the simplified example given in FIG. 4, a data stream coming from the relation therein would consist of Domains #1, #2, #3, and #4 of Tuple #1 followed by Domains #1, #2, #3, and #4 of Tuple #2 (as indicated by arrow 337) and Domains #1, #2, #3, and #4 of Tuple #3 would follow Tuple #2 (as indicated by arrow 338). As previously stated, the data coming from the storage array 310 (FIG. 3) comes out in a continuous stream although it is arranged in the format shown in simplified form in FIG. 4. In the embodiment described, the continuous stream relates to 4K bytes of data so that for example, as 4K bytes of data are read from the storage array 310 and fed in parallel to the modules 320, 322, 324, 326, and 328 in FIG. 3, the loop control module 328 has a 4K buffer memory (not shown) which when combined with a 4K address offset of memory provides a "4K delay" which enables simultaneous reading and writing to be effected in parallel. In other words, one can read and write effectively at the same time due to the fact that the read and write points differ by a 4K byte address offset; in other words, the current "write" address is obtained by subtracting 4K from the current "read" address to obtain the simultaneous read and write operations.

Before proceeding with a more detailed description of the PFP 304 shown in FIG. 1, it would appear useful to discuss certain control functions, at least in tabular form, as they relate to the ADCs such as 306 and 308. Certain operational codes (OPCODE) are given in hex form in Table 3. The operational codes which are listed in Table 3 are the actual hardware commands which are issued by the PFP 304 and sent to the ADCs like 306, 308. The control functions in Table 3 are used, basically, to start and stop the ADCs.

TABLE 3

| | | CONTROL FUNCTIONS | |
|---|---|---|---|
| FUNCTION | OPCODE HEX | DATA FIELD REQUIRED BY FUNCTION | DESCRIPTION |
| STEXC | 04 | NONE | START EXECUTION OF CURRENT FUNCTION |
| NEWJOB | 08 | NONE | NEW JOB RESETS ADC |
| CLRST | 0C | NONE | CLEAR ADC STATUS REGISTERS |

TABLE 3-continued

CONTROL FUNCTIONS

| FUNCTION | OPCODE HEX | DATA FIELD REQUIRED BY FUNCTION | DESCRIPTION |
|---|---|---|---|
| COUNT | 10 | 16 BIT COUNT | RETURN THE MOST RECENT COUNT OF QUALIFIED TUPLES LOCATED DURING THE LAST PROCEDURE FUNCTION |

Table 4 contains the actual hardware commands (listed under operational codes hex) which are issued by the PFP 304 to the ADCs like 306 and 308 for various procedure functions listed therein. All of the functions which are listed in Table 4 require additional information functions as indicated in Table 8; this aspect will be described in more detail hereinafter.

Figure 32:
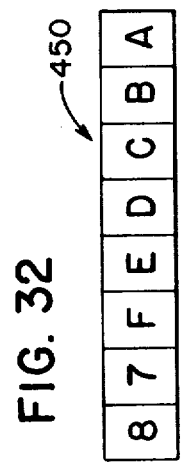
FIG. 32 shows a format for a tag byte.

450 is shown in FIG. 32 and it will be described in more detail hereinafter. In the embodiment described, there are two bytes of storage space provided for each tuple.

The data field format coming from the PFP 304 to the ADCs like 306 and 308 has the following format and relates to the column entitled "Data Field Required by Function" in Table 5.

TABLE 4

PROCEDURE FUNCTIONS

| FUNCTION | OPCODE HEX | DATA FIELD REQUIRED BY FUNCTION | DESCRIPTION |
|---|---|---|---|
| MARK | 20 | NONE | ALTER TAG FIELDS OF QUALIFIED TUPLES |
| READ | 24 | NONE | READ QUALIFIED DOMAIN(S) OF TUPLE AND MODIFY TAGS UNTIL END OF FUNCTION OR JOB CANCEL |
| MAX* | 2C | NONE | FIND AND RETURN THE MAXIMUM VALUE OF QUALIFIED TUPLES AND MODIFY THE TAGS |
| MIN* | 30 | NONE | FIND AND RETURN THE MINIMUM VALUE OF QUALIFIED TUPLES AND MODIFY THE TAGS |
| REPLA | 34 | NONE | REPLACE QUALIFIED DOMAINS OF A TUPLE AND MODIFY TAGS |
| INSRT | 38 | NONE | INSERT TUPLE IN A RELATION |

*DOMAIN IS ASSUMED TO BE A LEFT-JUSTIFIED POSITIVE INTEGER

TABLE 5

TAG FIELD FUNCTIONS

DATA FIELD FORMAT

| FUNCTION | OPCODE HEX | DATA FIELD REQUIRED BY FUNCTION | DESCRIPTION |
|---|---|---|---|
| TGREP | 40 | TAG REPLACEMENT MASK AND FIELD | IF TUPLE IS QUALIFIED ALTER TAG FIELD AS SPECIFIED |
| TGQAL | 44 | TAG QUALIFICATION MASK AND FIELD | USED TO QUALIFY A TUPLE FOR FURTHER OPERATIONS |

Table 5 contains the actual hardware commands as previously explained for functions which are required for use with the procedure functions shown in Table 4, i.e., for testing and setting tuple flags. For example, the functions TGREP (40) and TGQAL (44) listed in Table 5 are required functions for the MARK (20) function listed in Table 4; Table 8 shows that these TGREP and TGQAL functions are required for the MARK function. In the embodiment described, each tuple has one 8 bit tag byte. For example, in the simplified relational model shown in FIG. 4, the 8 bit byte which is marked 4-1 and located in Tuples #1, #2, and #3 may be used respectively, as the tag byte for each of the associated Tuples #1, #2, and #3. The actual layout of a tag byte The operational codes shown in Table 5 are those which are utilized by the tag module 324 (FIG. 3) to perform various tagging operations which will be described in detail hereinafter.

Table 6 shows certain relation information functions which are used to define a relation during the procedure functions listed in Table 4. The functions shown in Table 6 are utilized by the loop control module 328 (FIG. 3) as will be described hereinafter. All the functions shown in Table 6 are required by the procedure functions shown in Table 4 as indicated by Table 8, i.e., the letter "R" indicating "required" is listed for operational codes 50, 54, and 58 for all the procedure functions such as "Mark" and "Read" in Table 8.

TABLE 6

RELATION INFORMATION FUNCTIONS

| FUNCTION | OPCODE HEX | DATA FIELD REQUIRED BY FUNCTION | DESCRIPTION |
|---|---|---|---|
| RSA | 50 | 20 BIT ADDRESS | RELATION START ADDRESS |
| RL | 54 | 20 BIT LENGTH | RELATION LENGTH |
| TL | 58 | 11 BIT LENGTH | TUPLE LENGTH |

The functions shown in Table 7 are functions which are used to define a domain during a procedure function, which functions are shown in Table 4. There are four general uses for domain information; they are:

1. Qualifying a tuple,
2. Replacing a domain field,
3. Reading a domain field, and
4. Sorting on a domain field.

More than one domain may be used in some procedures. All functions (from Table 7) relating to domains reserve the least significant two bits of the operational code for identifying multiple domain information. For example operational code 60 in Table 7 relates to a first qualifier domain and operational code 61 relates to a second qualifier domain address.

TABLE 7

DOMAIN OR TUPLE INFORMATION FUNCTIONS

| FUNCTION | OPCODE HEX | DATA FIELD REQUIRED BY FUNCTION | DESCRIPTION |
|---|---|---|---|
| QDA | 60 | 20 BIT ADDRESS | FIRST QUALIFIER DOMAIN ADDRESS |
|  | 61 | 20 BIT ADDRESS | SECOND QUALIFIER DOMAIN ADDRESS |
| QDL | 64 | 11 BIT LENGTH | QUALIFIER DOMAIN LENGTH |
| QCO | 68 | 8 BIT FIELD | QUALIFIER CONDITION OPERATOR |
|  |  | 00 = | |
|  |  | 01 ≠ | |
|  |  | 02 > | |
|  |  | 03 < | |
| QDD | 6C | UP TO 2048 DATA BYTES | QUALIFIER DOMAIN DATA |
| QDLO (USED IF MORE THAN ONE QUALIFIER DOMAIN) | 70 | 8 BIT FIELD 00 01 V | QUALIFIER DOMAIN LOGICAL OPERATOR |
| NDA | 80 | 20 BIT ADDRESS | NEW DOMAIN ADDRESS |
| NDL | 84 | 11 BIT LENGTH | NEW DOMAIN LENGTH |
| ND | 88 | UP TO 2048 BYTES OF DATA | NEW DATA |
| RDA | 90 | 20 BIT ADDRESS | READ DOMAIN ADDRESS |
| RDL | 94 | 11 BIT LENGTH | READ DOMAIN LENGTH |
| SDA | A0 | 20 BIT ADDRESS | SORT DOMAIN ADDRESS |
| SDL | A4 | 11 BIT LENGTH | SORT DOMAIN LENGTH |
| TD | A8 | UP TO 2048 BYTES OF DATA | TUPLE DATA |
| RT | 98 | 20 BIT ADDRESS | READ TUPLE |

Table 8 shows various operational codes, some of which are required and others of which are optional, with regard to the various procedure functions (from Table 4) listed therein. As previously stated, for a Mark function (20) listed in Table 8, the op codes (40), (44), (50), (54), and (58) are required as indicated by the letter "R" under these codes, and the op codes (60), (64), (68), and (6C) are optional codes as indicated by the letter "O" under these codes, with op code (70) being listed as "O" but being required if more than one qualifier domain is used as indicated by the note preceded by an asterisk in Table 8.

TABLE 8

| PROCEDURE FUNCTIONS | (40) TGREP | (44) TGQAL | (50) RSA | (54) RL | (58) TL | (60) QDA | (64) QDL | (68) QCO | (6C) QDD | (70) QDLO | (80) NDA | (84) NDL | (88) ND | (90) RDA | (94) RDL | (A0) SDA | (A4) SDL | (A8) TD | (98) RT |
|---|---|---|---|---|---|---|---|---|---|---|---|---|---|---|---|---|---|---|---|
| MARK (20) | R | R | R | R | R | O | O | O | O | O* | | | | | | | | | |
| | | | | | | OPT. GROUP | | | | | | | | | | | | | |
| READ (24) | R | R | R | R | R | O | O | O | O | O* | | | | O | O | | | | O |
| | | | | | | OPT. GROUP | | | | | | | | GROUP | | | | | |
| MAX (2C) | R | R | R | R | R | O | O | O | O | O* | | | | | | R | R | | |
| | | | | | | OPT. GROUP | | | | | | | | | | | | | |
| MIN (30) | R | R | R | R | R | O | O | O | O | O* | | | | | | R | R | | |
| | | | | | | OPT. GROUP | | | | | | | | | | | | | |
| REPLA (34) | R | R | R | R | R | O | O | O | O | O* | R | R | R | | | | | | |
| | | | | | | OPT. GROUP | | | | | GROUP | | | | | | | | |
| INSRT | R | R | R | R | R | | | | | | | | | | | | | R | |

FOR THESE FUNCTIONS, MULTIPLE FUNCTION UNITS ARE POSSIBLE

*QDLO REQ. IF MORE THEN ONE QUALIFIER DOMAIN IS USED
R = REQUIRED
O = OPTIONAL

Figure 5:
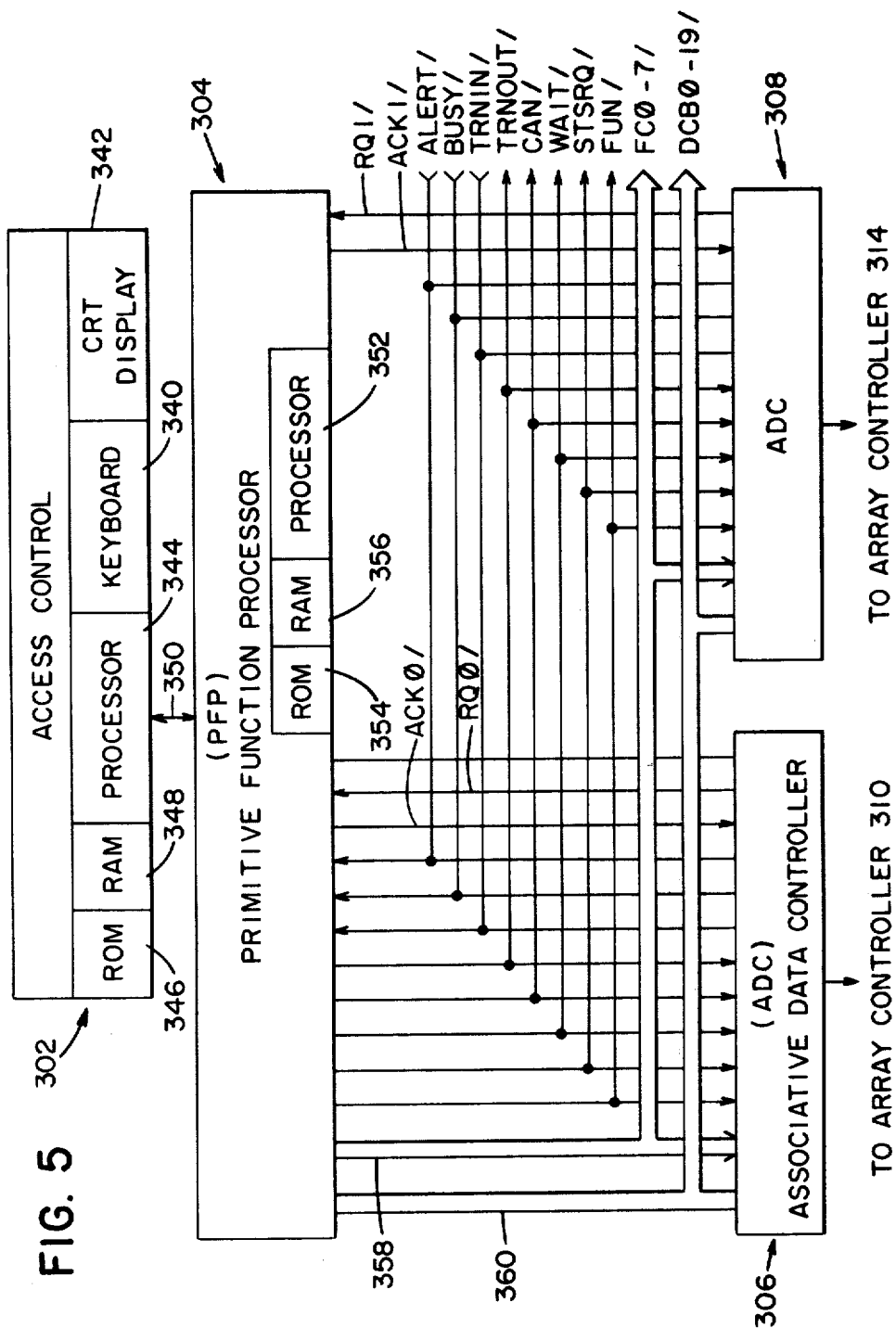
FIG. 5 is a general schematic diagram showing more details of the access control unit and the primitive function processor (PFP) shown in FIG. 1.

FIG. 5 shows more details of the access control unit 302 and the PFP 304 shown in FIG. 1. The control unit 302 includes an entry device such as a keyboard 340 for communicating with the control unit 302 and also includes a display 342 such as a cathode ray tube display for instructing the operator of the system 300 of various operating conditions within the system as is typically done. The control unit 302 also includes a processor 344, a read only memory (ROM) 346 for storing programs and the like, and a random access memory (RAM) 348 as is typically done. The control unit 302 communicates with the PFP 304 via a conventional communication line 350.

Requests of the system 300 are formulated by conventional software associated with the control unit 302 and forwarded to the PFP 304.

The PFP 304 (FIG. 5) includes a processor 352, a ROM 354 and a RAM 356 as shown. The processor 352 utilizes the ROM 354 to generate a sequence of operations to be performed by the ADCs like 306 and 308 and to transfer data thereto as required to perform the various functions listed earlier herein in Tables 1–7.

Explanations for the various data and control lines between the PFP 304 and the ADCs, like 306 and 308, (FIG. 5) are shown in List #1 to follow. A detailed description of the operation of the PFP 304 and the ADCs like 306 will be given later herein, however, it may be convenient to give a simple illustration of how the control lines in List #1 are utilized. When the operation of the ADC's is to begin, the operational code STEXC (04) from Table 3 is placed on the function code lines 358 (FIG. 5) and the function (FUN/) line from the PFP 304 is pulsed to forward the operational code (04) to all of the ADCs like 306 and 308. Thereafter, additional operational codes are placed on lines 358 and the function (FUN/) line is pulsed to transfer the codes to the ADCs to perform the functions desired. This aspect will be described in detail hereinafter.

LIST #1
CONTROL LINES BETWEEN PFP 304 & ADCs LIKE 306

1. FUNCTION (FUN/)
   The function signal is a low active signal from the PFP 304 indicating that function information is being sent to the ADCs such as 306, 308.
   The function code lines (FC 0-7/) and also designated 358 are valid when the function signal is true. Also, the function code may require additional information to be transferred on the Data and Control Bus (DCB01-DCB19/) also designated 360. If so, it will be sent with the leading edge of the transfer out line signal.
   The ADC Busy line must be false prior to the activation of the function line.
   All ADCs receive the function information simultaneously.

2. ADC BUSY (BUSY/)
   This is a low active signal indicating that at least one ADC has not completed its function. This signal may be received by any ADC or the PFP 304. It is a wired-OR signal line.

3. TRANSFER OUT (TRNOUT/)
   A negative transition of this signal indicates that valid data or control information is stable on the Data and Control Bus 360 and can be latched by an ADC.
   This signal is normally high and driven by the PFP 304.
   FUN/ must be true prior to the negative transition of TRNOUT/.

4. TRANSFER IN (TRNIN/)
   A negative transition of this signal indicates that valid data is stable on the Data and Control Bus 360 which can be latched by the PFP 304.
   This signal is normally high and driven by an ADC. Only an acknowledged ADC can pulse this signal line.
   This is a tri-state line.

5. STATUS REQUEST (STSRQ/)
   This is a low active line which requests status information from an ADC.
   Any ADC with a non-null status may answer by requesting use of the Data and Control Bus 360.
   Status data is transferred with the leading edge of the transfer in signal, after an ADC is acknowledged.
   Only bus requests for status transfers are allowed when the status request line is active. When inactive, these requests are not allowed. However, it does not clear the status information or release the status alert signal.

6. STATUS ALERT (ALERT/)
   This is a low active signal from any ADC indicating that an unusual status condition exists.
   Each ADC keeps this signal true until the status information is accepted by the PFP 304 or until a status cancel function is received.
   This is a wired-OR signal.

7. JOB CANCEL (CAN/)
   This is a low active signal driven by the PFP 304 which cancels tasks currently in progress in the ADC's. Any ADC which has a true acknowledge line will not honor the cancel signal.

8. REQUEST (RQ0/-R015/)
   These are active low signals driven by the ADC's. Each ADC has its own request line to request use of the Data and Control Bus 360.
   Request is held true until the communication is complete.

9. ACKNOWLEDGE (ACK0/-ACK15/)
   These are active low signals driven by the PFP 304 which uniquely select an ADC. The uses of this line are listed below.
   a. Grants permission to use the Data and Control Bus 360.
   b. Disables the cancel job function when true.

10. FUNCTION CODE LINES (FC0/-FC7/)
    The function code lines 358 are low active signals which transfer information to the ADC's.
    The function code lines 358 are valid when the function signal line is true.
    The function code definitions are listed in Tables 1–7.

11. DATA AND CONTROL BUS (DCB0/-DCB19/)
    The Data and Control Bus 360 is comprised of a group of 20 signal lines which bus transfers data and control between the PFP 304 and the ADC's.
    Address fields are 20 bits wide. Data fields are 16 bits wide, and the most significant 4 bits being unspecified.
    Information on this bus can be assumed valid during the negative transition of the transfer-out or transfer-in signal.
    This is a tri-state bus.

12. WAIT (WAIT/)

This is an active low signal from the PFP 304 which is used to delay the transfer of data from an ADC. This is accomplished by inhibiting TRNIN/ while WAIT/ is active.

Figure 6B:
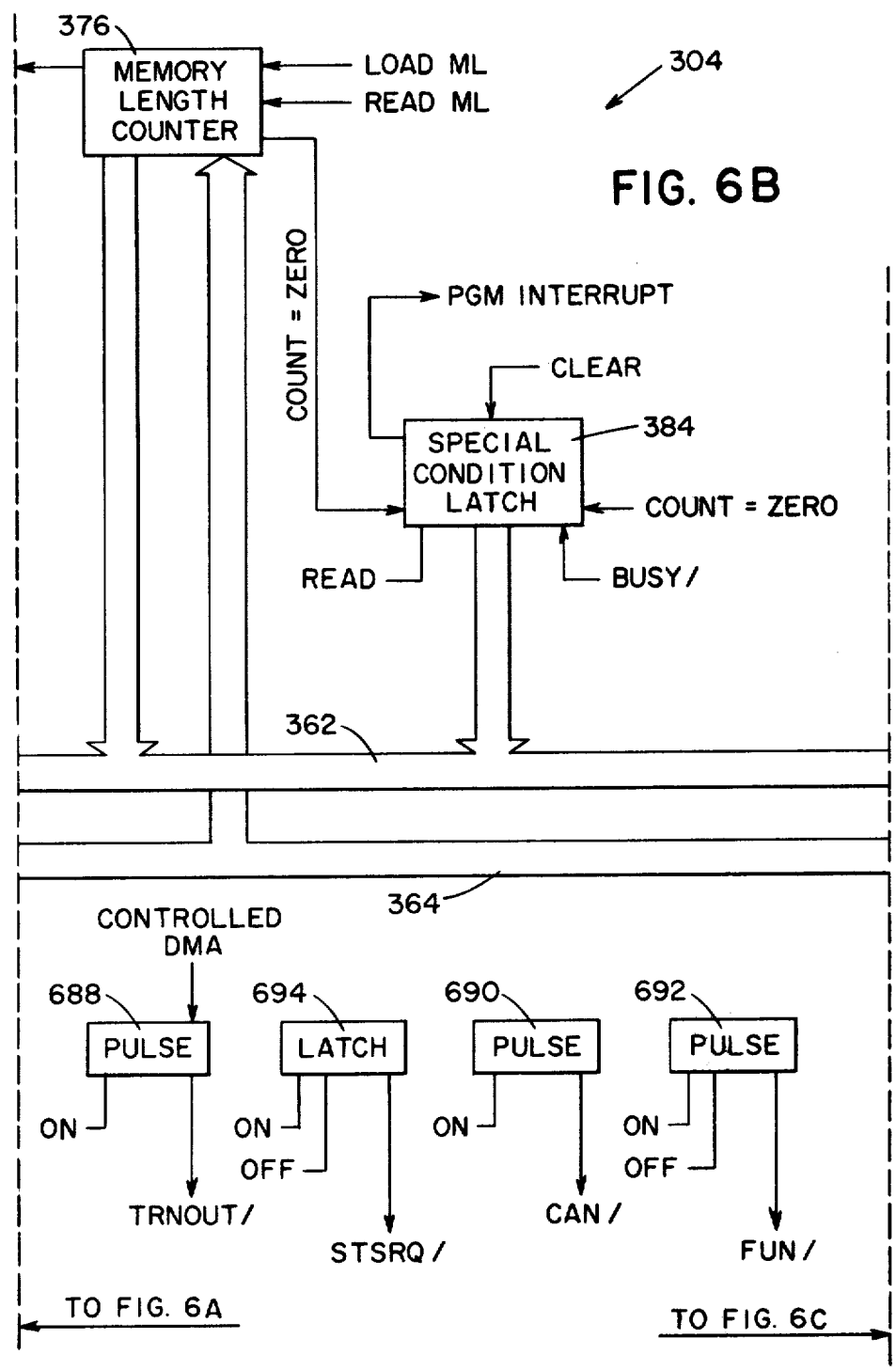
Figure 6C:
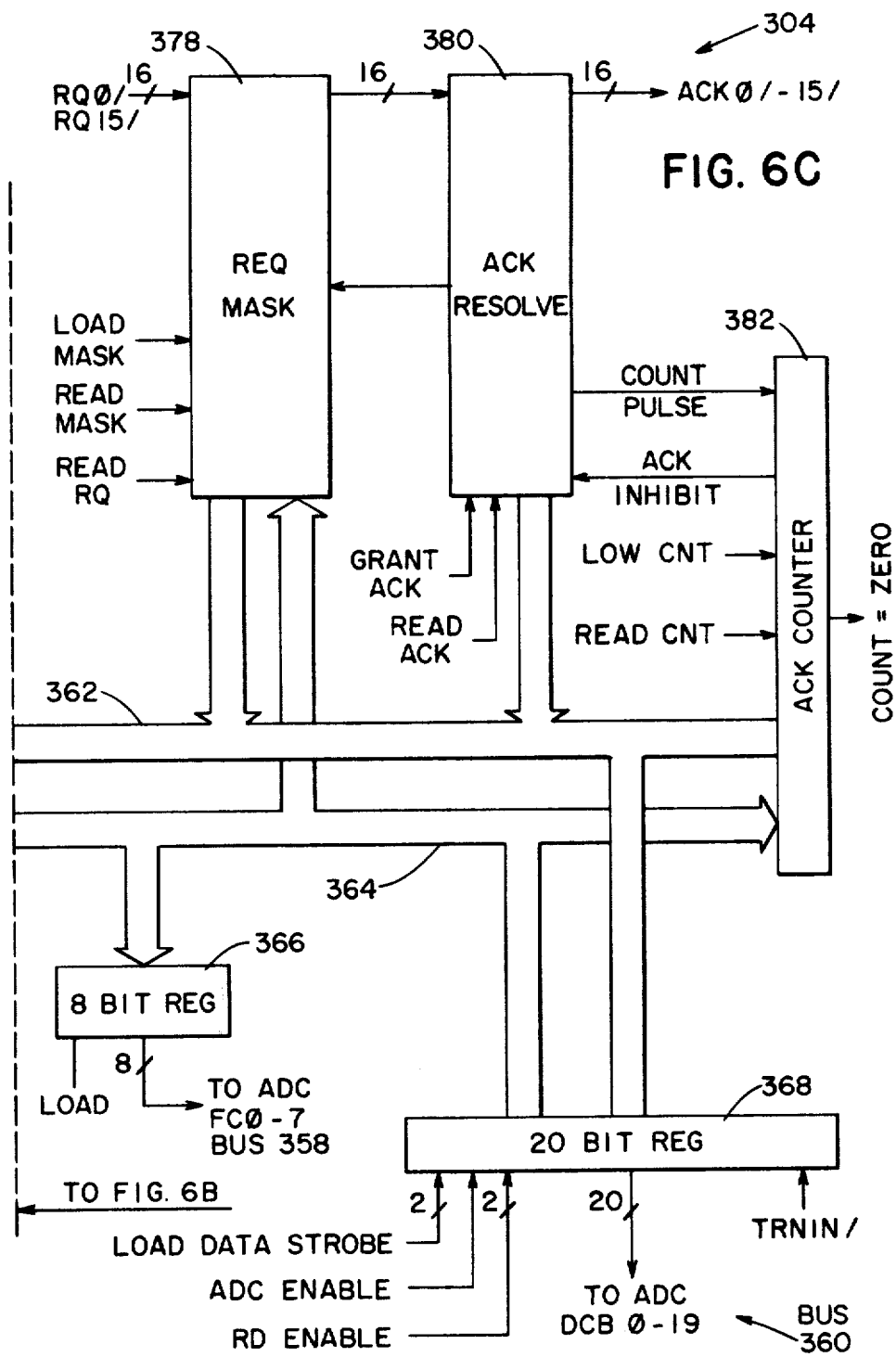

FIGS. 6A, 6B and 6C taken together show additional details of the PFP 304 shown in FIGS. 1 and 5. As earlier stated herein, a general function of the PFP 304 is to translate primitive function commands into a sequence of multi-controller functions and to transfer data to the associated ADCs and to receive data therefrom in a synchronized manner. With regard to FIGS. 6A, 6B, and 6C, a bus RD1-16, also marked 362, is the receive data line for data going to the processor 352 (FIG. 5) and a bus SD1-16 also marked 364 is the send data line for data being sent from the processor 352 to the remaining elements of the PFP 304.

If a read function were to be initiated, for example, the ADCs like 306 and 308 would receive the operational code 24 (Table 4). The op code 24 is a read code which is delivered over the bus 364 to an 8 bit register 366 (FIG. 6C) and the code is pulsed to all the ADCs via the FUN/ pulse (List 1) and the bus 358 (FIG. 5) comprised of the FC∅-7/ lines.

Following with the example of the read function, the RSA op code 24 (Table 6) is similarly placed into the register 366 and a relation address is fed into a register 368 (FIG. 6C), and the FUN/ pulse is again pulsed to transfer the address over the bus 360 via the DCB∅-19/ lines to the ADCs 306, 308. At this point it should be stated that the storage arrays 310 and 316 (FIG. 1) contain a plurality of relations similar to the simplified form shown in FIG. 4. One relation or separate file may contain, for example, social security numbers and a second relation or separate file may contain part numbers. At this point, the address which is in the register 368 is used to select the particular relation (in the storage arrays 310) which is desired; thereafter, the particular data to be read from a selected relation is obtained by making an associative search using, for example, a social security number or a name as an argument. This value or argument is sent to the ADCs using a conventional direct memory access logic (DMA logic 370 shown in FIG. 6A). DMA logic enables a faster transferring of data without requiring processor intervention itself than other methods. A register 372 (FIG. 6A) is used to store the data read from the processor memory (356 in FIG. 5) and sent to the ADCs via the DCB∅-15 lines of the DCB∅-19 lines in bus 360. Conventional software associated with the ROM 354 and processor 352 (FIG. 5) of the PFP 304 and software associated with the ROM 346 and the processor 344 in the control unit 342 are used for the software functions mentioned. In the example being discussed, the name Smith, for example, is sent to the ADCs over the DCB∅-19 lines (FIG. 6C) by pulsing the transfer out or TRNOUT/ pulse; the ADCs have been conditioned to recognize this data as the argument for the associative search for the read operation due to the previous FUN/ pulse. For the moment, it is sufficient to state that this argument data is routed to each of the modules 320, 322, 324, 326, and 328 (FIG. 3) of each of the ADCs like 306 and 308. The memory address counter 374 (FIG. 6A) and the memory length counter 376 (FIG. 6B) are conventionally used to extract the argument data (like the name Smith) from memory 356 of the PFP 304; the counter 376 is decremented to zero when the entire argument data is transferred from memory. The DMA logic 370, the register 372, the counter 374 and the memory length counter 376 (FIG. 6A) are all used for transferring data to the memory 356; in this case, the data going to memory would appear on the DTM1-16 lines leaving the register 372.

Continuing with the example given, the argument data, i.e., the name Smith is sent to each of the ADCs like 306 and 308 to begin the associative search. Because each of the ADCs can execute asynchronously, or complete a search separately from one another, it is necessary that some control be exerted over the bus 360 (FIG. 5) for data returning to the PFP 304. In this regard, it is possible for more than one ADC to find an associative match which it wishes to transfer back to the PFP 304. The control which is exerted over data returning to the PFP 304 is effected by a request mask module 378 (FIG. 6C), an acknowledge resolve module 380, and an acknowledge counter module 382. The purpose of the modules 378, 380, and 382 is to receive requests from each of the ADCs and send out an acknowledge (ACK/) line as shown in FIGS. 6C and 5. The request mask module 378 is conventional, and it enables the processor 352 of PFP 304 to dynamically eliminate a particular ADC from responding by not allowing its request to be acknowledged at all. The acknowledge counter module 382 is decremented each time an acknowledge (ACK) is sent out to one of the ADCs. For example, if the associative search request required that only three entries named Smith be accessed from a possible 100 entries in a relation in the storage array, like 310, then a count of three would be placed in the counter module 382 which is decremented for each acknowledge sent out by the module 380. When a count equal to zero occurs in the counter module 382, an ACK inhibit signal is sent to the module 380 to inhibit the issuance of any further acknowledges, and the count=zero signal from the counter module 382 is fed into a special condition latch 384 (FIG. 6B) which informs the processor 352 of this condition and the software associated therewith would issue a cancel (CAN/) pulse to each of the ADCs. The CAN/ pulse causes the ADCs to stop what they are doing and resets certain registers in the ADCs to enable them to accept a new function; this activity is handled by the ADCs and does not need any additional intervention by the processor 352.

The special condition latch 384 (FIG. 6B) is essentially a conventional latch which latches up when various conditions occur during some of the functions mentioned earlier herein. For example, when the count equals zero in counter module 382, (FIG. 6C) an interrupt (PGM Interrupt) leaving the latch 384 causes an interrupt in the processor 352 of the PFP 304 which then reads the latch 384 to ascertain why the interrupt occurred. In this illustration, because the "count equal zero" from counter module 382 has occurred, the software associated with the processor 352 would issue the cancel CAN/ pulse mentioned. The various control lines shown in FIGS. 6A, 6B, and 6C, such lines as function (Fun/); ADC busy (Busy/); transfer out (TRNOUT/); transfer in (TRNIN/); status request (STSRQ/); status alert (ALERT/) (FIG. 5); job cancel (CAN/); request (RQ∅/ through R∅15/); acknowledge (ACK∅/ through ACK15/); function code lines (FC∅1-FC7); data and control bus (DCB∅/-DCB19/); and wait (WAIT/) are defined in List #1 included earlier herein. The module 385 in FIG. 6D is a conventional decode module which takes commands like $\overline{\text{SPT}}$, SPO SMB and SSEL which are generated by the software associated with PFP 304 and translates those commands into appropriate signals on the various control lines just mentioned with regard to the other modules shown in FIGS. 6A, 6B, and 6C. For example, one of the control lines 387 coming from the module 385 is to load memory length (LOAD ML) into the counter 376 (FIG. 6B). From FIG. 5 it can be seen that certain control lines (such as FC$\emptyset$-7/ and FUN/) are common to all ADCs such as 306 and 308, and certain other control lines (such as ACK$\emptyset$/, ACK1/) are peculiar to each ADC such as 306 and 308. The data which is read from the storage arrays like 310 is transferred along the DCB$\emptyset$-19/ lines or bus 360 (FIG. 5) to the register 368 (FIG. 6C) by the transfer in pulse (TRNIN/) and then from the PFP 304 to the host system or the access control unit 302 (FIG. 5) via the communication line 350; this aspect will be covered in more detail hereinafter.

After having described the general relationship between the PFP 304 and the ADCs such as 306 and 308 (FIG. 5) it seems appropriate to discuss in more detail, the general functioning of the ADC's.

FIG. 3 shows the various modules such as the min/-max module 320, for example, which are included in each of the ADCs such as 310 and 316.

Figure 7A:
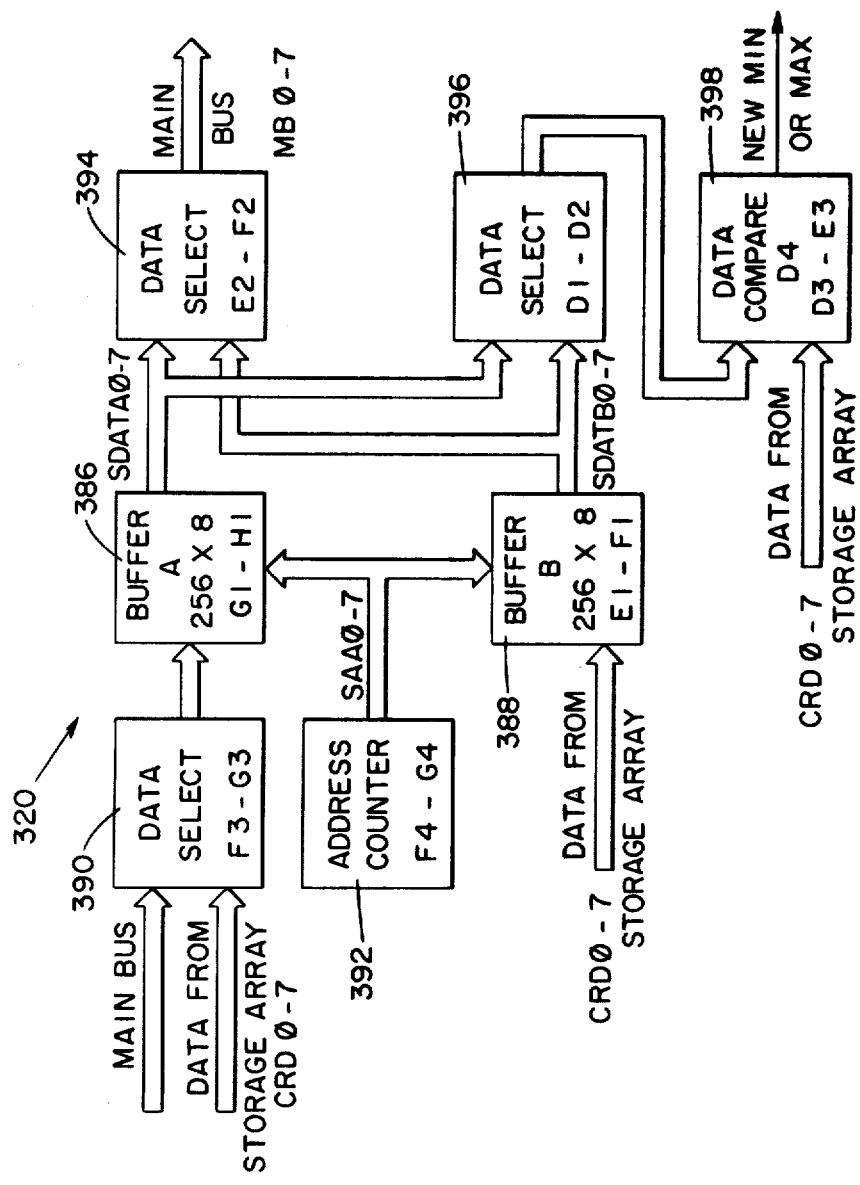
FIGS. 7A and 7B show more details of the min/max module shown in FIG. 3.
Figure 7B:
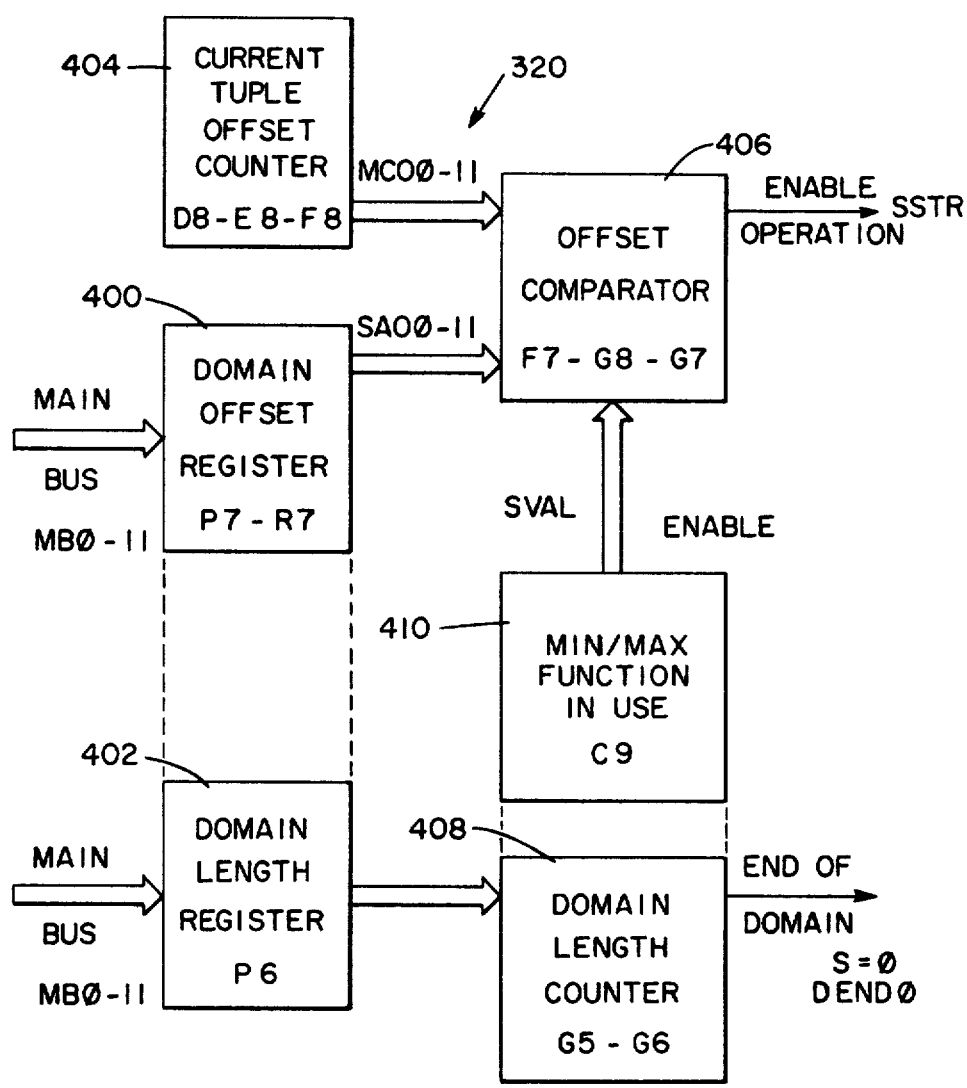

The min/max module 320 included in an ADC, like 306, is shown in more detail in FIGS. 7A and 7B. The general function of module 320 is to find the minimum or maximum value of a domain of any qualified tuples in a single pass through a relation. After an associative search of the data in the storage arrays like 310, the answer or selected data is returned to the PFP 304 (FIG. 1) for comparison with data from other ADCs.

FIGS. 7A and 7B show more details of the min/max module 320; however, it is difficult to completely explain the operation of this module without having to explain some of the functioning of the other modules such as the qualify module 322 or the loop control module 328 included within an ADC such as 306. Accordingly, each of the modules such as 320, 322 within an ADC such as 306 will be explained separately, and the cooperation among the various modules will be explained later herein where convenient.

The min/max module 320 shown in FIGS. 7A and 7B includes a buffer A shown as block 386 and a buffer B shown as block 388. The buffer A initially holds the comparison argument, and the buffer B is used to hold the domain currently being read. Because a decision with regard to the domain being read cannot be made until the entire tuple has been read, the buffer B will be loaded once during each tuple read. In searching for a minimum, for example, if a value like V$_1$ is found in buffer B which value is lower than the value initially entered into buffer A, then the buffers A and B switch functions and buffer B becomes the buffer in which the new argument (value V$_1$) is stored and buffer A becomes the buffer in which the data from the storage array is entered to repeat the process. In effect, one of the buffers, A or B becomes the reference buffer and the other one is continually updated; this process of shifting functions continues until a final minimum, for example, is found. Each one of the buffers A or B has an indicator associated therewith to indicate which one of the buffers has the final minimum value therein. This final minimum is then routed to the PFP 304.

The data select block 390 (FIG. 7A) is used to receive data which represents an initial argument for comparison in the min/max module 320. For example, data to be selected may be a value which is less than 5. This data select is initiated on the keyboard 340 (FIG. 5) associated with the access control unit 302 and routed over the main bus lines MB$\emptyset$-7 to the data select block 390. The address counter block 392 is used to supply an address to both buffer A and buffer B regardless of which function they are performing. There are two data select blocks 394 and 396 (FIG. 7A) which pick out whether it was buffer A or buffer B which contained the minimum value to be fed out the main bus MB$\emptyset$-7 to the PFP 304. The data compare block 398 is what is used to find the new minimum (or maximum) by comparing data from the storage array (like 310) coming over bus lines CRD$\emptyset$-7.

FIG. 7B shows in very general form, the logic which is used to find domains within a tuple; essentially this is found by a byte offset count and a length. For example, the relational model shown in FIG. 4 is organized with domain #2 starting at an offset of 6 bytes, i.e., the first byte of domain #2 begins after byte 1-6, and the length of domain #2 is 4 bytes long, extending from byte 2-1 through byte 2-4. Proceeding with the example given, if the minimum functions were being searched, and the data being searched were located in domain #2, the offset of 6 bytes would be placed in the domain offset register 400 via the main bus, and the domain length of 4 bytes would be placed in the domain length register 402. As each new tuple (like tuple #1, tuple #2, etc. in FIG. 4) is searched, a current tuple offset counter 404 is reset to 1, in the illustration in FIG. 4, and is incremented as each byte is searched; consequently, when the count in the counter 404 reaches six (in the illustration given), the domain offset register 400 and the counter 404 would have the same count (7), indicating that this next byte (2-1) is the start of domain #2. The output of the counter 404 (FIG. 7B) is fed over bus MCO$\emptyset$-11 to the offset comparator 406 and the output of the dmain offset register 400 is fed over the bus SAO$\emptyset$-11 to the offset comparator 406 which issues an enable signal SSTR (indicating the start of domain #2 in the example being discussed) when the count from the counter 404 equals the offset in the register 400. The length of the domain which is in the domain length register 402 is loaded or preset upon the domain length counter 408, and the searching for the minimum or maximum function of the min/max module 320 is enabled in the function in use block 410 to start the searching operation. Every byte that is scanned within the desired domain will decrement the counter 408 by one. When the counter 408 reaches zero, or S=$\emptyset$, an end of domain signal (DEND$\emptyset$) is outputted therefrom. In other words, the min/max module 320 can pick out a domain within a tuple by testing for an equal on a "compare" of the domain offset, and the min/max module 320 functions until the domain length counter 408 goes to zero, thereby indicating the end of the interested domain. The entire sequence is then started again for each succeeding tuple within the particular relation.

FIGS. 7A and 7B show generally the various elements which are included in the min/max module 320. Each of the blocks shown in these figures has a listing of letters and numbers therein which represents a listing of components included within that particular block. For example, the data select block 390 in FIG. 7A contains the elements "F3" and "G3" which are shown in more detail in FIG. 12A. The block designated F3 is a conventional quadruple 2 line to 1 line data selector or multiplexer such as the integrated circuit (IC)

Figure 12A:
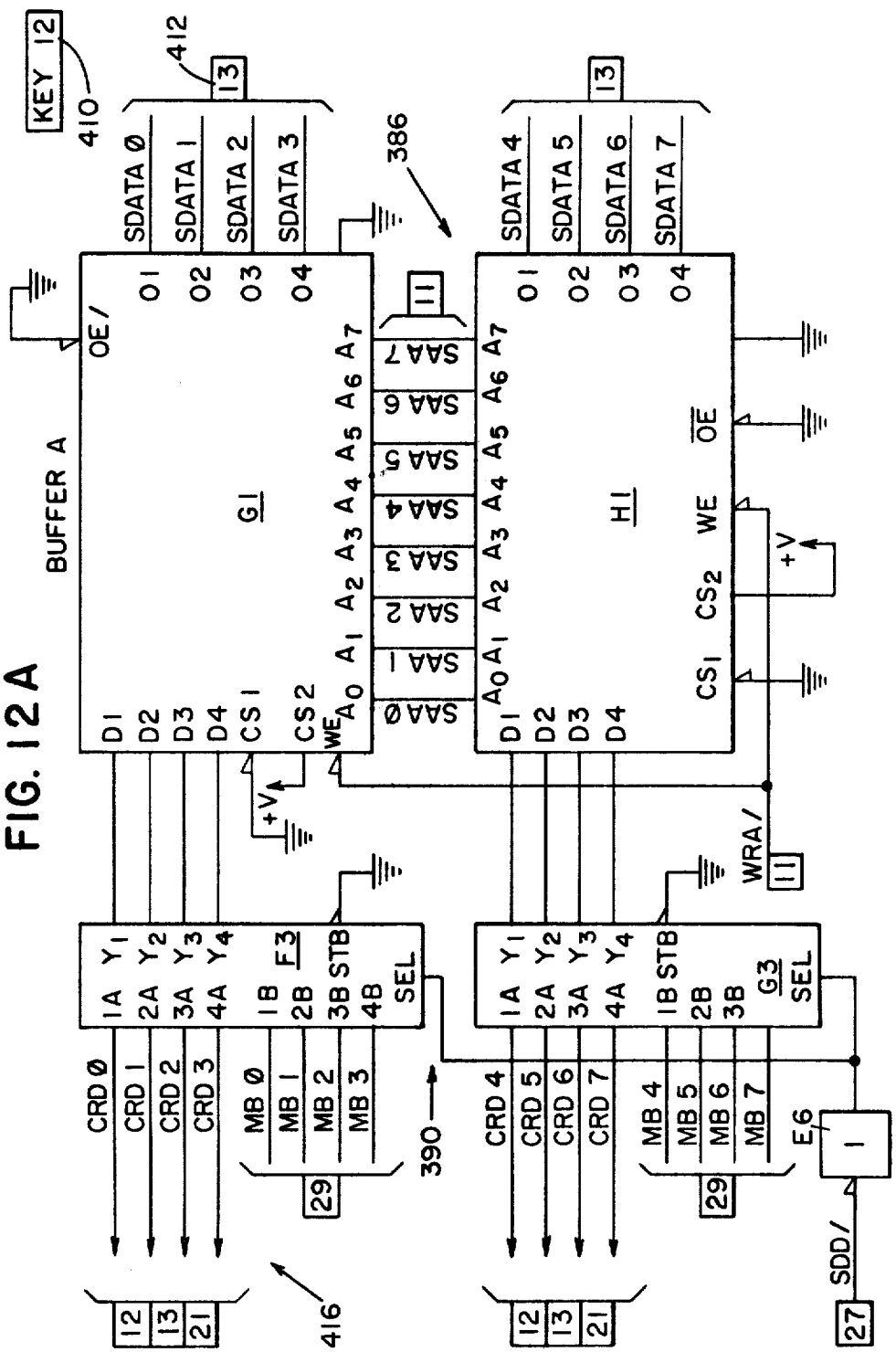
Figure 12B:
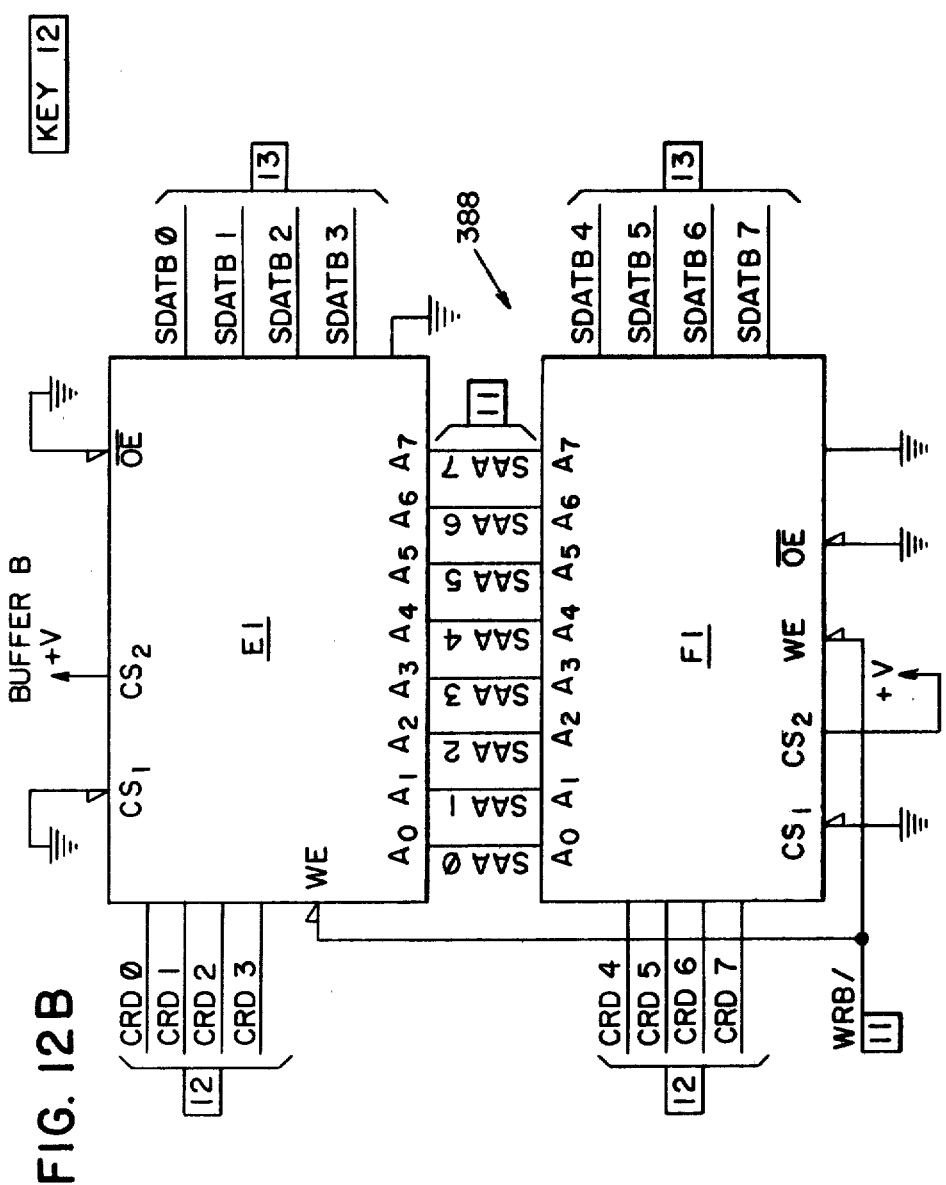

74LS157 which is manufactured by Texas Instruments, Inc.; block G3 is identical to block F3. As seen in FIG. 12A, the multiplexer F3 receives the CRD∅-3 bus lines from the storage array 310 and also receives the main bus lines MB∅-3, and correspondingly, the multiplexer G3 receives the CRD4-7 lines and the MB4-7 lines. The SDD/ input shown in FIG. 12A is used for selecting the source of data for Buffer A. The MB∅-3 bus lines are used for a set-up or initial value, and the CRD∅-3 bus lines are used to supply a new min/max value from the storage array 310. The WRA/ input (FIG. 12A) and the WRB/ input (FIG. 12B) enable the buffer A and buffer B, respectively, for the purpose of writing data into the associated buffers A and B. The outputs of the multiplexers F3 and G3 are fed into the buffers G1 and H1, respectively in FIG. 12A. Buffer B shown in FIG. 7A is comprised of buffers E1 and F1 as shown in FIG. 12B. Buffers A and B are supplid an address by the SAA∅-7 lines appearing between the buffers G1 and H1 and the same lines appearing between the buffers E1 and F1. The outputs SDAT∅-7 of the buffer A are fed into the multiplexers E2 and F2 of FIG. 13A which comprise the data select 394 (FIG. 7A). Similarly, the outputs SDATB∅-7 of buffer B in FIG. 12B are fed into the multiplexers D2 and D1 of FIG. 13B which comprise the data select 396 shown in FIG. 7A. Each of the buffers G1 and H1 (FIG. 12A) and the buffers E1 and F1 (FIG. 12B) is an IC module #93422 which is a static RAM which is manufactured by Fairchild.

NOTATIONS ON DRAWING SHEETS

Figure 67:
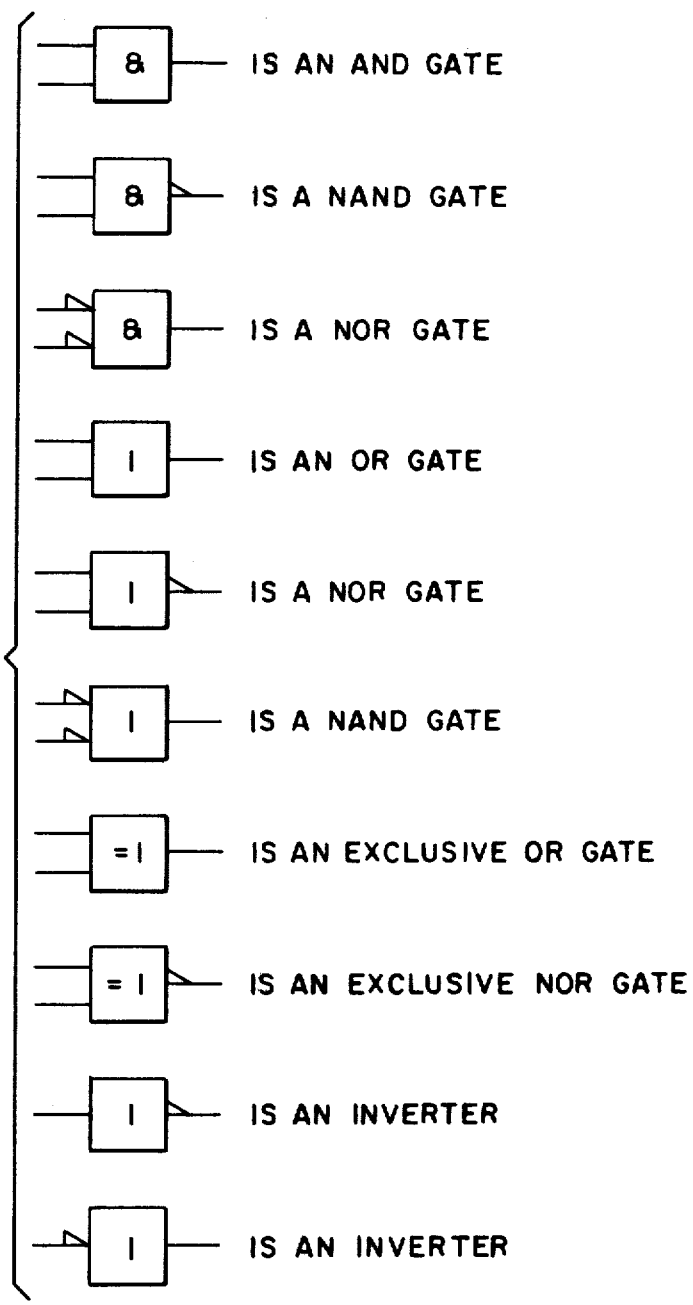
FIG. 67 contains a glossary of the various logic symbols used herein along with their meanings.

Before proceeding further with a discussion of the min/max module 320 included in the system 300 (FIG. 1), it appears convenient to discuss how several of the sheets of the drawing are interrelated so as to provide interconnections for the system 300. When integrated circuit modules are used, such as the multiplexers or selectors F3 and G3 shown in FIG. 12A; they are assumed to be conventionally wired unless indicated otherwise; the letters and numerals used with the modules provide a key to their functional hook-up. FIG. 67 contains a glossary of the various AND, OR, NAND, etc., gates used herein, and because the functions of the gates are standard, they will not be explained in any further detail herein. Certain of the sheets of the drawing have a "key" or a numerical designation enclosed within a rectangle which is isolated on the sheet, as for example, the key number 12 (FIG. 12A) within the rectangle and referenced with numeral 410; this key number 12, for example, provides a correlation for the connections to be made. For example, the outputs SDATA∅-3 coming from the buffer G1 in FIG. 12A have a 13 enclosed in a rectangle (as referenced by numeral 412); this means that these outputs are to be connected to elements found on a sheet having a basic key 13 designation. Where possible, the "key number" on a sheet of the drawing corresponds to its basic Figure designation; however, this is not true for all the sheets included herein, as some of the key numbers are different from the associated basic configuration. If there is only one sheet for a figure, like FIG. 5, there is just a FIG. 5 designation. If there is more than one sheet to a particular figure, the sheets carry "A", "B" and "C" designations such as FIGS. 13A, 13B, and 13C. A full listing of each of the sheets of the drawing is made under the section entitled, "Brief Description Of The Drawing", found earlier herein. Accordingly, the SDATA∅-3 outputs referenced by the number 13 enclosed in a rectangle and the reference numeral 412 can be traced to a sheet having the KEY 13 thereon, or in this example, it would be FIGS. 13A, 13B, and 13C. In this particular instance, the SDATA∅-3 lines coming from FIG. 12A are located only on FIG. 13A, where they are marked with a rectangle containing the number 12 therein and being referenced by numeral 414. In other words, the adjoining figures are cross-referenced to one another, with each sheet showing where the outputs thereon go and also showing where the inputs thereon come from. The references to other figures as to FIG. 13, for example, which are enclosed in the rectangles will be given only for the basic figure and will not include the letter designations, i.e., 13A, 13B etc. List #44, included at the end of the description of the invention shows a correlation between the key numbers and the associated Figures.

Continuing with a discussion of the min/max module 320 shown in FIGS. 7A and 7B, the multiplexers E2, F2 (394 in FIG. 13A) and D1 and D2 (396 in FIG. 13B) are conventional ICs such as #74LS157 previously described. The RDSEL (FIG. 13A) input to the multiplexers E2 and F2 selects the buffers (A,B) to be read by the PFP 304 as the min/max value. The ICs G2 and H2 (FIG. 13A) are conventional buffers to pass data to the MB∅-7 lines when a drive signal marked DRVB∅/ is true. The select signal marked CMPSEL in FIG. 13B is used to enable the correct multiplexer D1, D2 for the comparison. The ICs D3 and E3 (FIG. 13B) are conventional comparators such as #7485 which are manufactured by Signetics, and comprise the data compare block 398 shown in FIG. 7A. The IC which is marked D4 in FIG. 13B is also a part of the data compare block 398 shown in FIG. 7A. The block D4 is comprised of a plurality of flip-flops such as an IC #74LS175 which is manufactured by Texas Instruments, Inc., and the block D4 has associated therewith the inverter E6 and the gates G9 and F9; the flip-flops give an indication as to whether buffer A or buffer B contains the new minimum (or maximum) as explained in the general discussion with regard to FIGS. 7A and 7B. The gates marked E4, E4-1, and E4-2 in FIG. 13C perform the function of selecting a min or a max signal from the data compare block D4 (FIG. 13B) based on the latched signals MINL, MAXL.

Figure 11A:
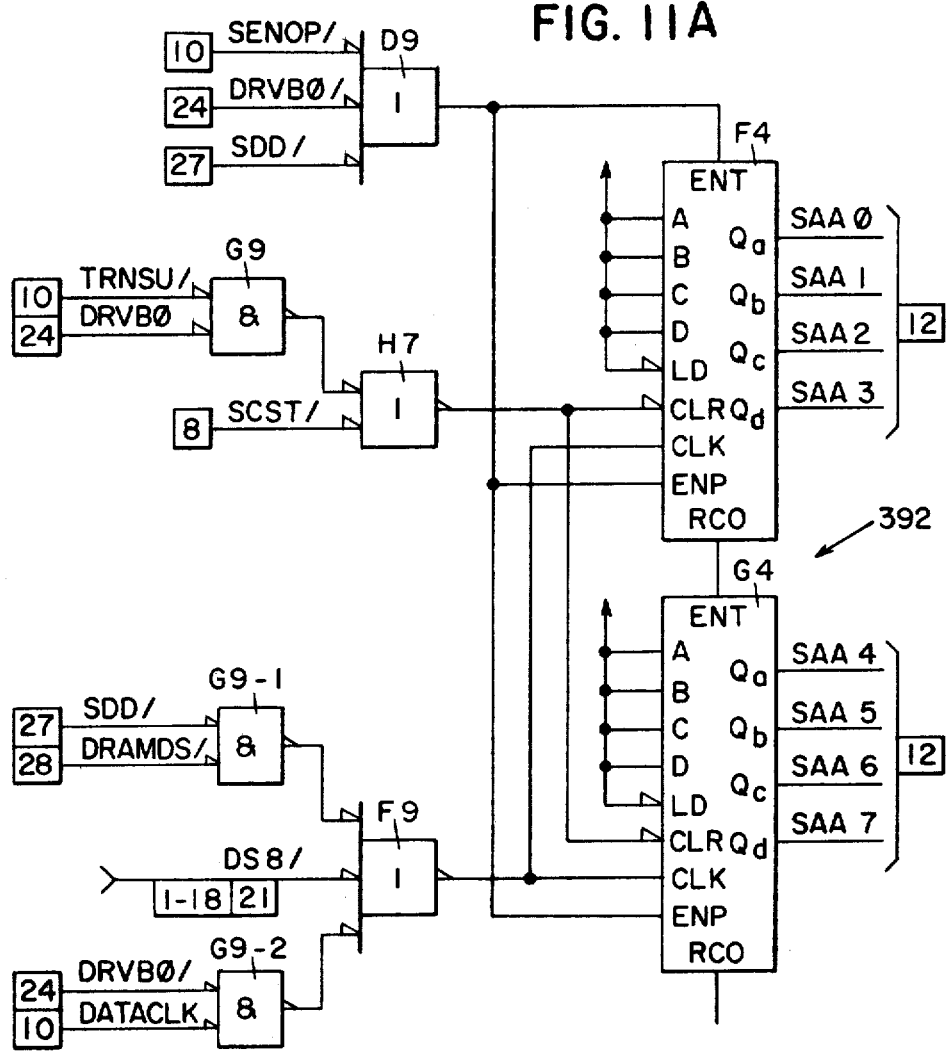

The address counter 392 shown in FIG. 7A is shown in more detail in FIG. 11A. The counter 392 is comprised of two synchronous 4 bit counters F4 and G4 which are conventionally wired as shown to generate an eight bit count or address which is outputted on the SAA∅-SAA7 lines.

The following List #2 shows the various inputs (and their descriptions) associated with the address counter 392 which is comprised of the counters F4 and G4 shown in FIG. 11A. The various logic gates D9, G9, H7, G9-1, G9-2, and F9 are connected as shown to handle the inputs shown in FIG. 11A and described in List #2.

LIST #2

| Input | Description |
|---|---|
| SENOP/ | (Sort Enable Operation) Allows operation of the min/max module 320. |
| TRNSU/ | (Transfer Set Up) Prepare to send min-max value to PFP 304. |
| DRVB∅/ | (Drive Main Bus) Read out new min-max value from buffer A or B. |
| SCST/ | (Sort Clear & Set Up) Set up logic |

LIST #2-continued

| Input | Description |
| --- | --- |
| | in min/max module 320 for the start of a new tuple. |
| SDD/ | (Sort Domain Data) Load initial comparison value in Buffer A. |
| DRAMDS/ | (Delayed RAM Data Strobe) Used to change buffer address during the load of Sort Domain Data. |
| DATACLK | (Data Clock) Used to change buffer address when answer is read to PFP 304. |

Figure 11B:
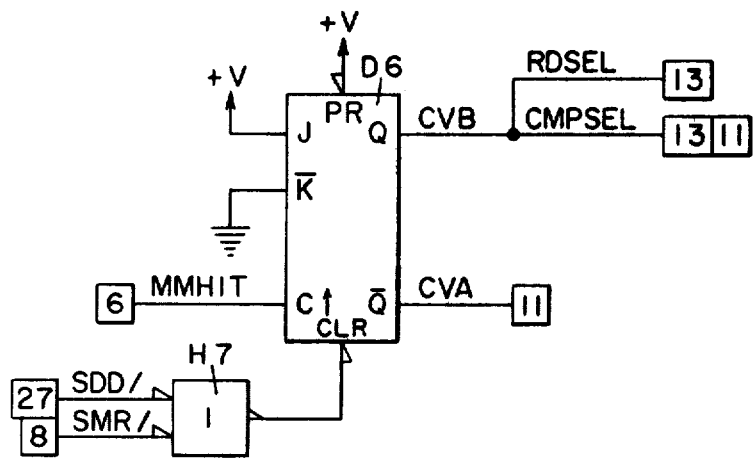
Figure 11C:
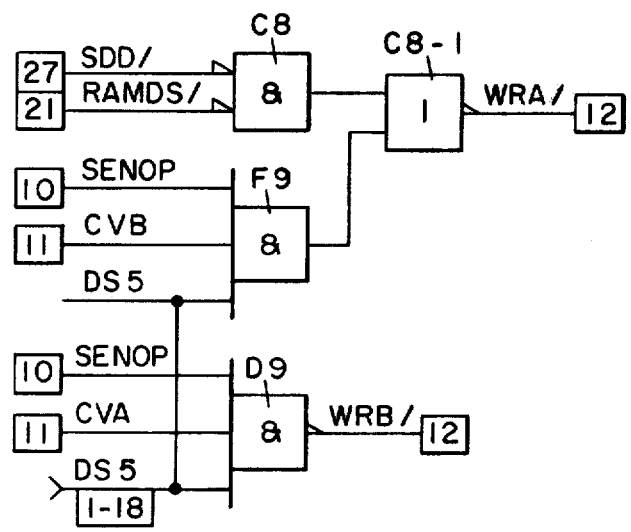

FIGS. 11B and 11C contain some gating circuitry including flip-flop D6, gates H7, C8, F9, D9 and C8-1 which is used to produce certain outputs which are used in the ADC 306 and min/max module 320.

The following List #3 shows the various inputs and outputs and their descriptions for the gating circuitry shown in FIGS. 11B and 11C.

LIST #3

| | Description |
| --- | --- |
| Input | |
| MMHIT | (Min Max Hit) Changes current buffer pointer CVB/A when new min-max value is found. |
| SDD/ | See List #2. |
| SMR/ | (Sort module master reset). |
| RAMDS/ | (RAM Data Strobe) Used to write data into Buffer A during set up. |
| SENOP | See List #2. |
| CVB | (Current value for min-max is in Buffer B.) |
| CVA | (Current value for min-max is in Buffer A.) |
| DS5 | (Data Strobe #5) Timing signal. |
| Output | |
| RDSEL | Selects correct Buffer (A or B) out of which data is read. |
| CMPSEL | (Comparison Select) Determines whether Buffer A or Buffer B is compared to data from storage array 310. |
| WRA/ | (Write Enable) for Buffer A. |
| WRB/ | (Write Enable) for Buffer B. |

The current tuple offset counter 404 (FIG. 7B) is comprised of the IC modules D8, E8, and F8 (FIG. 9A), each of which is a 4 bit synchronous counter such as #74LS161 which is manufactured by Texas Instruments Inc. The domain offset register 400 (FIG. 7B) is comprised of the IC modules P7 and R7 shown in FIG. 9A. Module P7 is an eight bit register such as IC module LS374 which is manufactured by Texas Instruments, Inc. and R7 is a four bit register such as IC module LS175 which is manufactured by Texas Instruments, Inc. The offset comparator 406 (FIG. 7B) is comprised of IC modules F7, G7 and G8 (FIG. 9B), each of which is a conventional comparator such as the IC modules #7845 which are manufactured, for example, by Texas Instruments, Inc. The input signal DS9/ (FIG. 9A) provides a clock pulse to the modules D8, E8, and F8, and the SCST/ signal clears them. The A=B outputs of the comparators F7, G7, and G8 (FIG. 9B) are fed into the AND gate F6 to produce the SSTR output signal shown in FIGS. 9B and 7B.

Figure 8A:
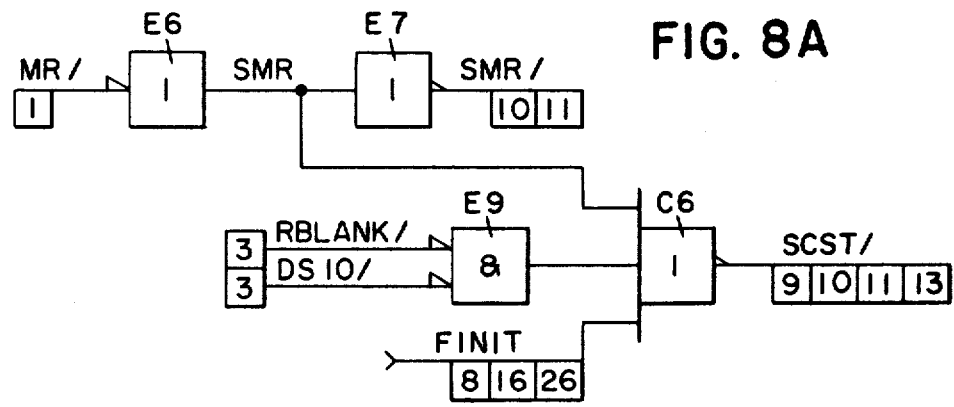
FIGS. 8A, 8B, 9A, 9B, 10A, 10B, 11A, 11B, 11C, 12A, 12B, 13A, 13B, and 13C show additional details of the min/max shown in FIGS. 7A and 7B.
Figure 8B:
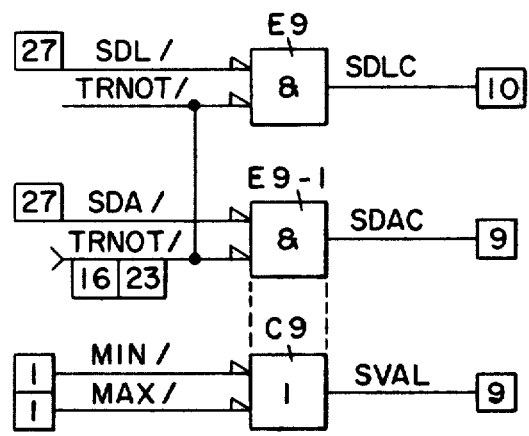

FIG. 8A discloses some additional gating circuitry including inverters E6, E7, and gates E9 and C6 which is used to develop certain signals used in the ADC 306 and the min/max module 320. FIG. 8B discloses some additional logic circuitry including gates E9, E9-1, and C9 which are also used in the min/max module 320. The following list contains the inputs and outputs shown in FIGS. 8A and 8B.

LIST #4

Figure 9A:
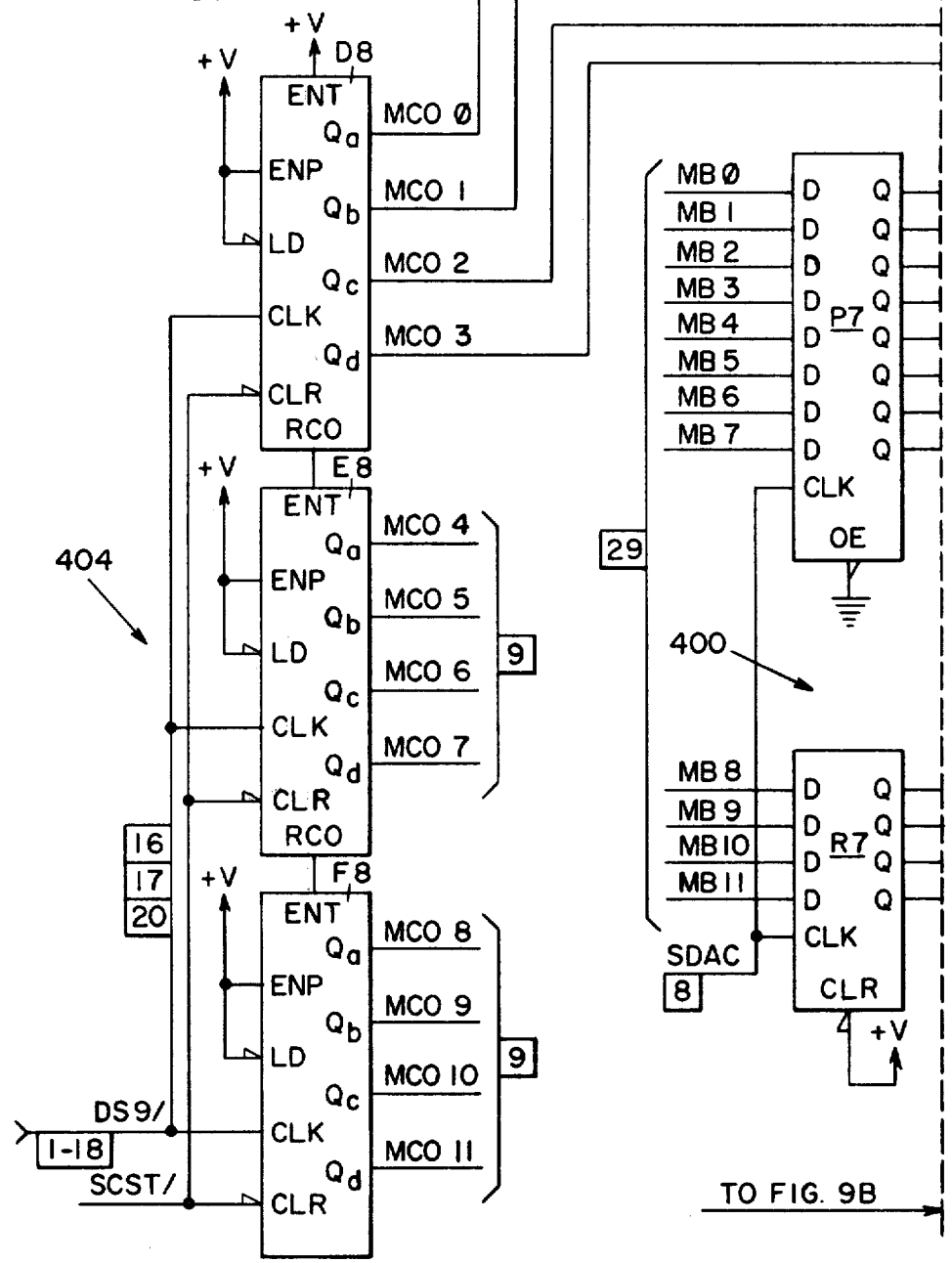
Figure 10A:
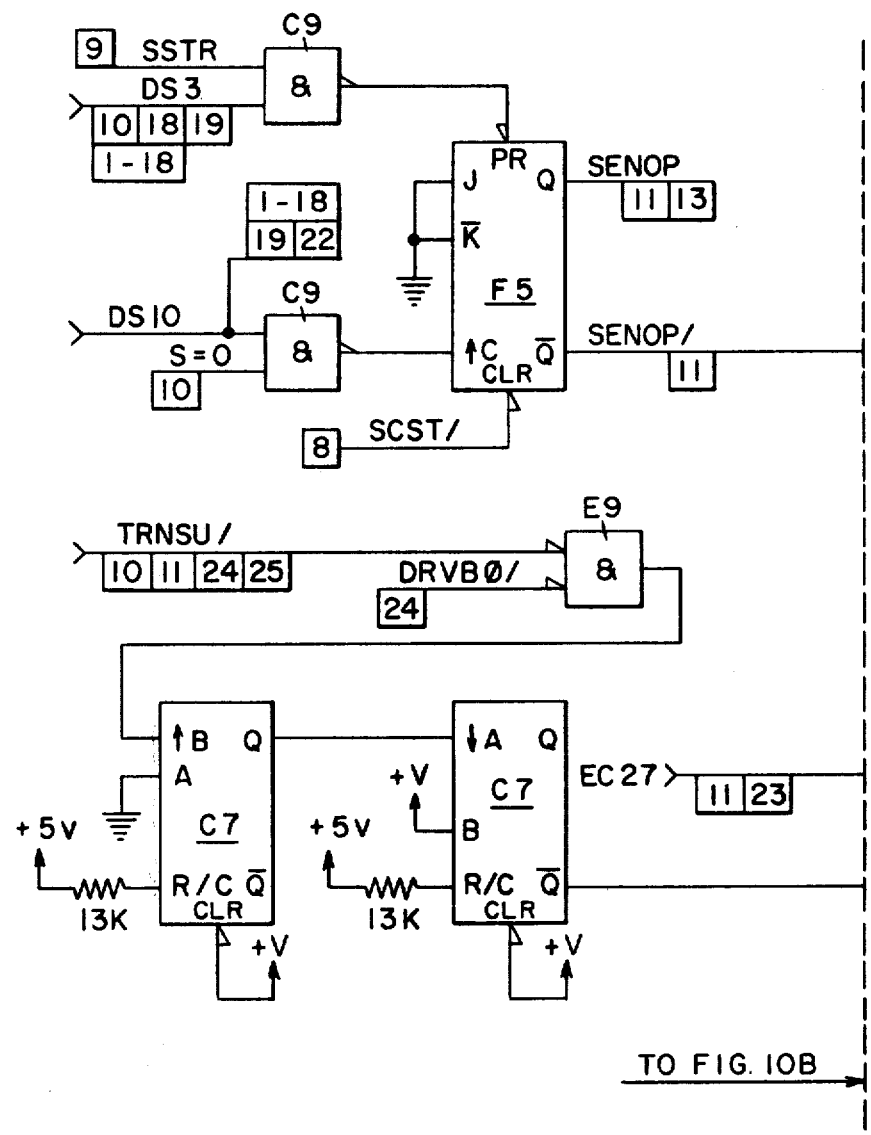

| | Description |
| --- | --- |
| Input | |
| MR/ | (Master Reset) |
| RBLANK/ | (Read Blank) This is true when the byte following the tag byte is being transferred from the storage array 310. |
| DSIO/ | (Data Strobe #10) Indicates data is being read from storage array 310. |
| FINIT | (Function Initialize) Indicates receipt of function code from PFP 304. |
| SDL/ | (Sort Domain Length) This signal is true whenever the domain length for the sort field is received from the PFP 304. |
| TRNOT/ | (Transfer Out) This signal is true whenever the ADCs are being loaded by the PFP 304. |
| SDA/ | (Sort Domain Address) This signal is true when the offset address for the sort domain is received from the PFP 304. |
| MIN/ | (Minimum) Indicates a minimum function is being performed by the ADCs (306). |
| MAX/ | (Maximum) Indicates a maximum function is being performed by the ADCs (306). |
| Outputs | |
| SCST/ | (Sort Clear & Set Up) See List #2. |
| SDLC | (Sort Domain Length Clock) Causes length of domain from PFP 304 to be stored in register P6 in FIG. 10A. |
| SDAC | (Sort Domain Address Clock) Causes the address of the domain from the PFP 304 to be stored in registers P7 and R7 in FIG. 9A. |
| SVAL | (Sort Valid) Active if either Min/ or Max/ is active. |

Figure 14A:
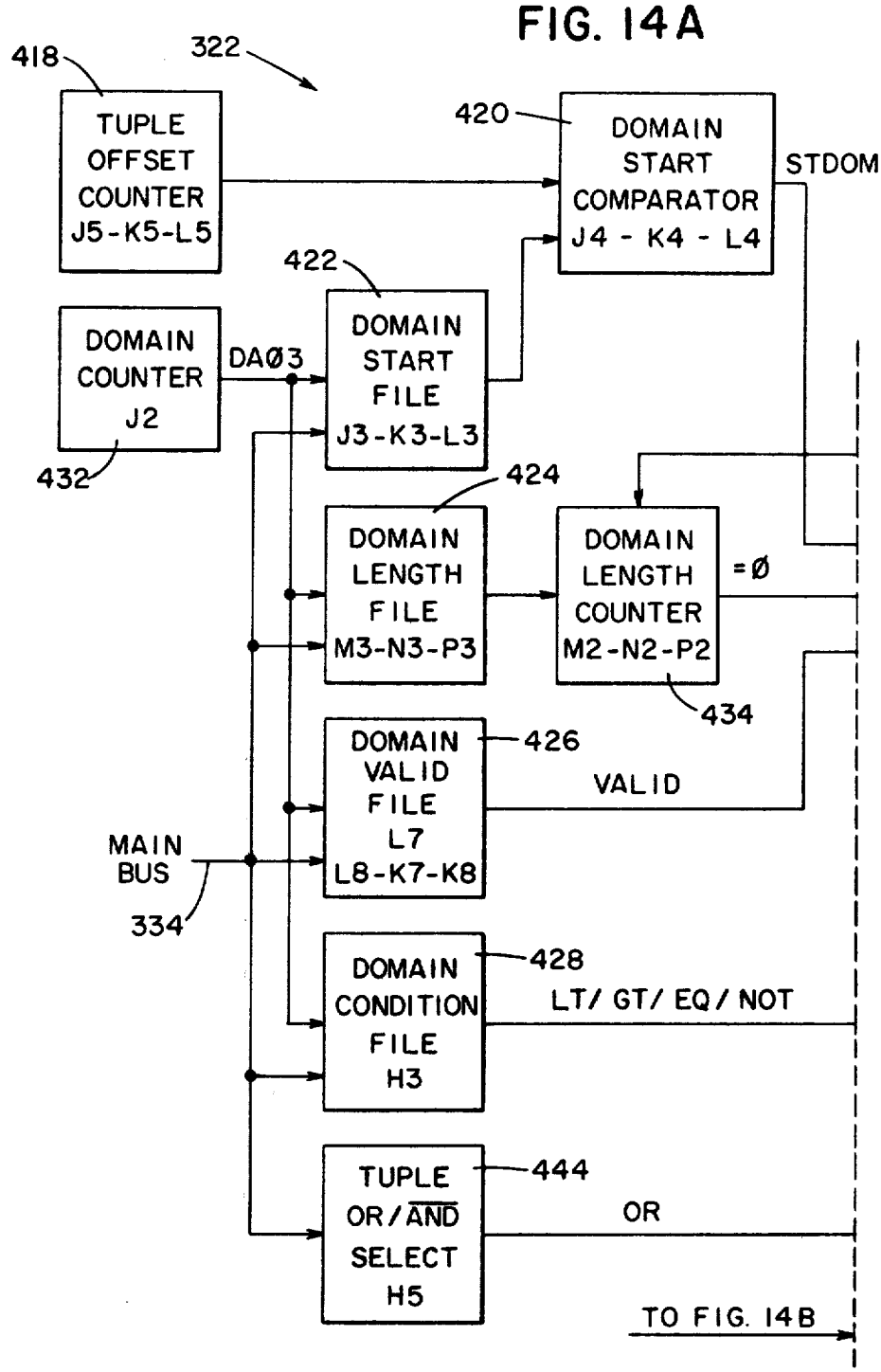
FIGS. 14A and 14B taken together show additional details of the qualify module shown in FIG. 3.
Figure 14B:
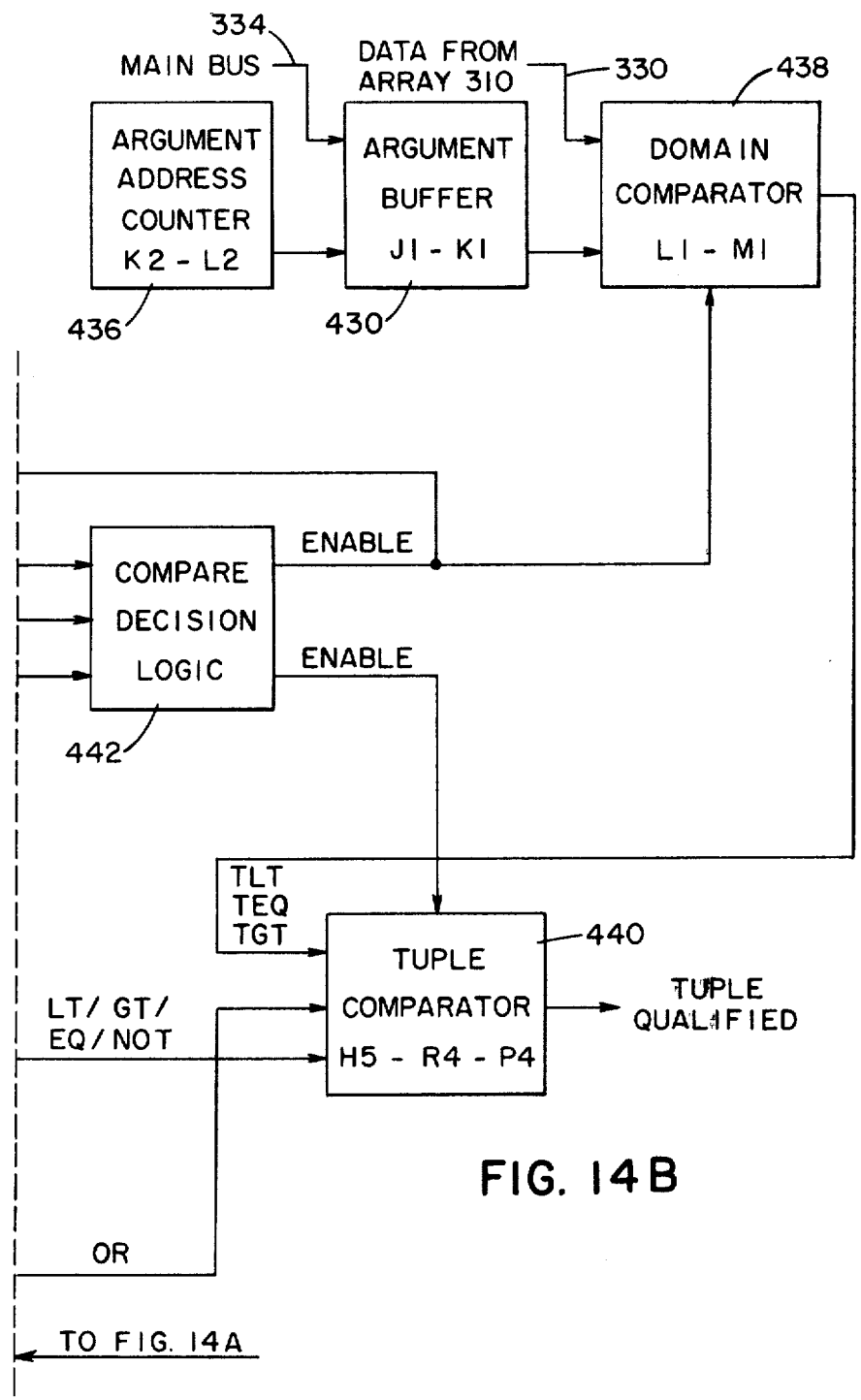

FIGS. 14A and 14B show more details of the qualify module 322 which is part of an ADC 306 shown in FIG. 3. In general, the qualify module 322 determines whether or not a particular tuple from a storage array 310 matches the tuple select criteria issued to this module 322. In the embodiment being described, up to 16 domain fields within each tuple may be used as a basis for selection. Each domain within the tuple may be compared to a separate argument, using the following operations: = (equal to); ≠ (not equal to); > (greater than); < (less than ); ≧ (greater than or equal to); and ≦ (less than or equal to). Also, it is possible to select a tuple based upon all of the domain qualifications being satisfied, or any one of them being satisfied. In order to do this, the qualify module 322 needs to know where the domain starts and how long it is.

The qualify module 322 (FIGS. 14A and 14B) includes a tuple offset counter 418 (which is similar to the tuple offset counter 404 in FIG. 7B) and a domain start comparator 420 which is similar to the offset comparator 406 included in the min/max module 320 shown in FIG. 7B. The module 322 (FIG. 14A) also includes a domain start file 422, a domain length file 424, a domain valid file 426 and a domain condition file 428, with each one of these files containing 16 values, one for each domain in use within a tuple. The domain start file 422 contains the byte offset at the start of the domain selected, the domain length file 424 contains the number of bytes in the domain, the domain valid file 426 contains a bit representing that the above information is currently in use, and the domain condition file 428 contains a four bit field which selects the correct relational operator.

The qualify module 322 (FIGS. 14A, 14B) also includes an argument buffer 430 (FIG. 14B) which contains the reference values for the valid domains as a string of bytes with the most significant bit (MSB) of the first domain being first, the MSB of the second domain following the least significant bit (LSB) of the first domain and so on as previously described in relation to FIG. 4. In the embodiment described, the argument buffer 430 holds a maximum of 256 bytes. A byte as used herein is comprised of 8 bits.

The qualify module 322 (FIGS. 14A, 14B) also includes a domain counter 432, a domain length counter 434, an argument address counter 436, a domain comparator 438, a tuple comparator 440, compare decision logic 442 and a tuple OR/AND select unit 444.

The general functioning of the qualify module 322 shown in FIGS. 14A and 14B is as follows. At the start of a tuple, the tuple offset counter 418, the domain counter 432 and the argument address counter 436 are cleared or reset to zero. The tuple offset counter 418 is incremented each time a byte is read from the storage array 310. When the output of the domain start file 422 is equal to the output of the tuple offset counter 418 and the output of the domain valid file 426 is a "one" (indicating that a qualify test is desired) the domain length counter 434 is loaded with the output of the domain length file 424 and the domain comparator 438 is enabled. Each time a byte is read from the storage array 310, the domain length counter 434 is decremented by one, the argument address counter 436 is incremented by one, and the output of the domain comparator 438 is updated until the output of the domain length counter 434 is equal to zero; then the domain counter 432 is incremented and the output of the tuple comparator 442 is updated. At the end of a tuple, the output of the tuple comparator 440 indicates whether or not the tuple qualified. The domain start comparator 420 compares the current tuple offset (which is a byte count) with the desired offset that the qualify module 322 is looking for; if they are equal, then the start domain sequence signal (STDOM) is ouputted from the comparator 420 and it indicates to the compare decision logic 442 to start comparing because the data from the storage array 310 is presently at the domain being searched. The comparison continues at the domain comparator 438 until the domain length counter 434 goes to zero which indicates that all of the bytes of the domain of interest have been compared with the argument data. Because there are 16 addresses or offsets and 16 lengths in the domain start file 422 and the domain length file 424, respectively, there are also 16 bits in the domain valid file 426 which correspond to each of the 16 addresses or offsets. A VALID signal is outputted from the domain valid file 426 to the compare decision logic 442. There are also 16 comparison operators in the domain condition file 428 to instruct the hardware to compare for equal, for less than, for greater than, and their complements; the appropriate one of these operators is fed into the tuple comparator 440 to enable it to make the correct logic decision as to the particular domain being compared. In effect, there are 16 arguments as such in each of the files 422, 424, 426, and 428. The actual comparison is done by the domain comparator 438; one of the inputs to the comparator 438 handles the data from the storage array 310 and the other input for the comparison comes from the argument buffer 430. As the comparison is in progress, the address for the argument buffer 430 is supplied by the argument address counter 436. For example, if one wanted to access data associated with a Social Security No. 511 50 1444, then this number would be placed in the argument buffer 430, and when the domain having that Social Security No. was available from the storage array 310, the comparison would take place on a byte level for a match. In the embodiment described, there can be up to 16 arguments in the argument buffer 430 which match or equal the 16 possible domains to compare in the qualify module 322. The module 322 also includes a tuple OR/AND select module 444 (FIG. 14A). The module 444 is used, for example, in a qualify-type statement such as, "If A is true, or B is true, select this tuple". The module 444 has AND and OR logic included therein.

FIGS. 16A, 16B, 16C, 16D, 17A, 17B, 17C, 17D, 17E, 18A, 18B, 18C, 18D, 19A, 19B, 20A, 20B, 20C, 21A, 21B, 22A, 22B and 22C contain additional details of the qualify module 322 shown in FIGS. 14A and 14B. The tuple offset counter 418 is comprised of conventional counters J5, K5 and L5 shown in FIG. 17A, and the domain counter 432 is comprised of a conventional counter J2 shown in FIG. 17B. The domain start file 422 (FIG. 17B) is comprised of the read/write memory modules J3, K3, and L3 which are type SN7489 ICs which are manufactured by Texas Instruments Inc., for example. The outputs from the J3, K3, and L3 modules (FIG. 17B) are fed into the domain start comparator 420 which is comprised of the comparators J4, K4, (FIG. 17C) and L4 (FIG. 17D) which are conventional comparators such as the SN74S85 ICs which are manufactured by Texas Instruments, Inc. The A=B output from each of these comparators J4, K4 and L4 is utilized in the gate N4 to produce the start domain compare signal STDOM which is fed into the compare decision logic 422 (FIG. 14B) to indicate that the comparison should begin. The following is a list of the various input and output signals shown in FIGS. 17A, 17B, 17C, 17D and 17E.

LIST #5

Figure 17B:
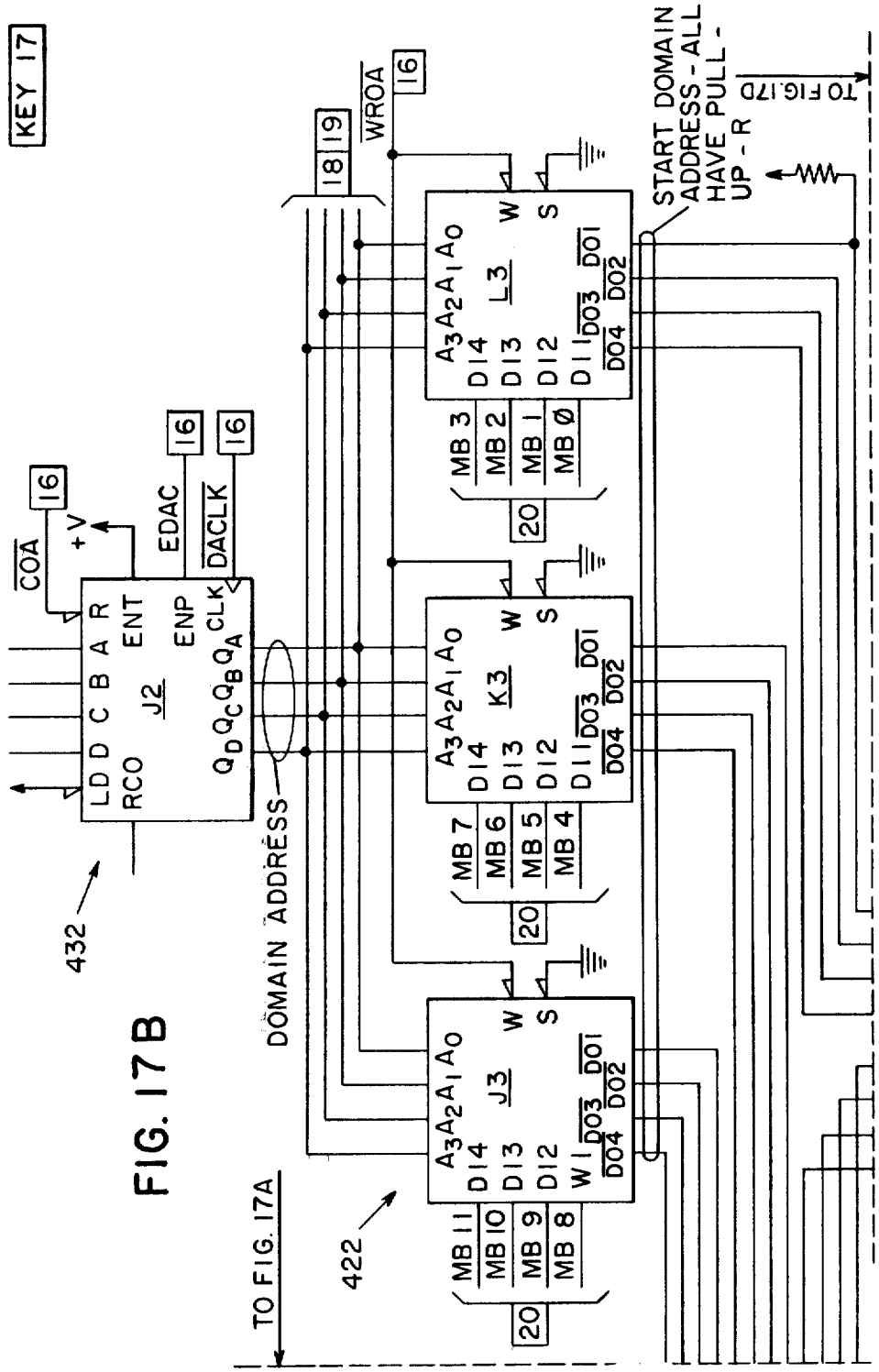

| Inputs | Description |
| --- | --- |
| CST/ | (Clear for Start) Clears offset counter 418 (FIG. 14A) |
| DS9/ | (Data Strobe 9) Indicates ADCs (306) are reading data from storage array 310. |
| CDA/ | (Clear Domain Address) Clears counter J2 in FIG. 17B so that the qualify operation begins with the first element in the domain start file 422 (FIG. 14A). |
| DACLK/ | (Domain Address Clock) Used to clock the domain counter J2 (FIG. 17B) if the EDAC signal is true. |
| WRDA/ | (Write Domain Address) Enables the loading of data into the domain start file 422 (FIG. 14A). |
| VALID/ | See List #7 hereinafter. |
| EDAC | (Enable Domain Address Count) Enables updating of domain counter 432 (FIG. 14A). |

Figure 17C:
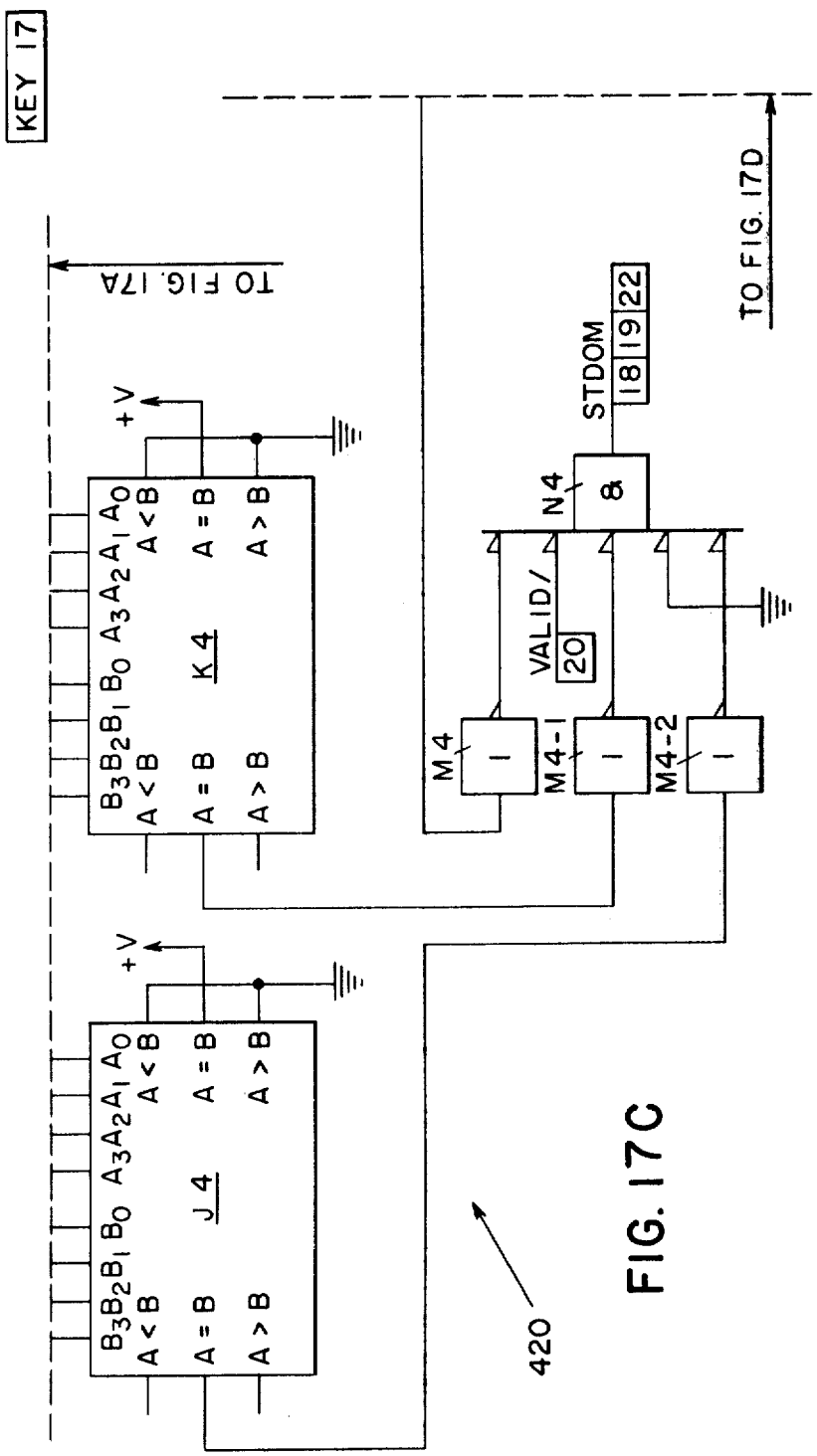
Figure 17D:
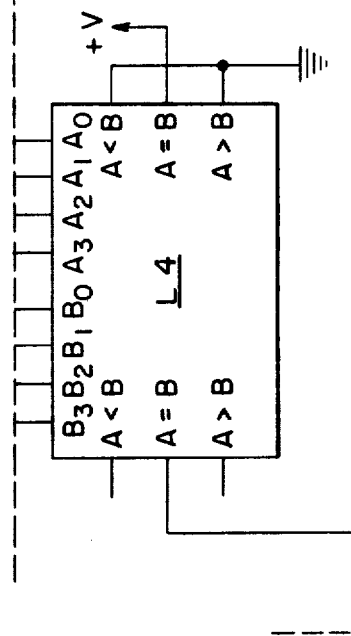
Figure 17E:
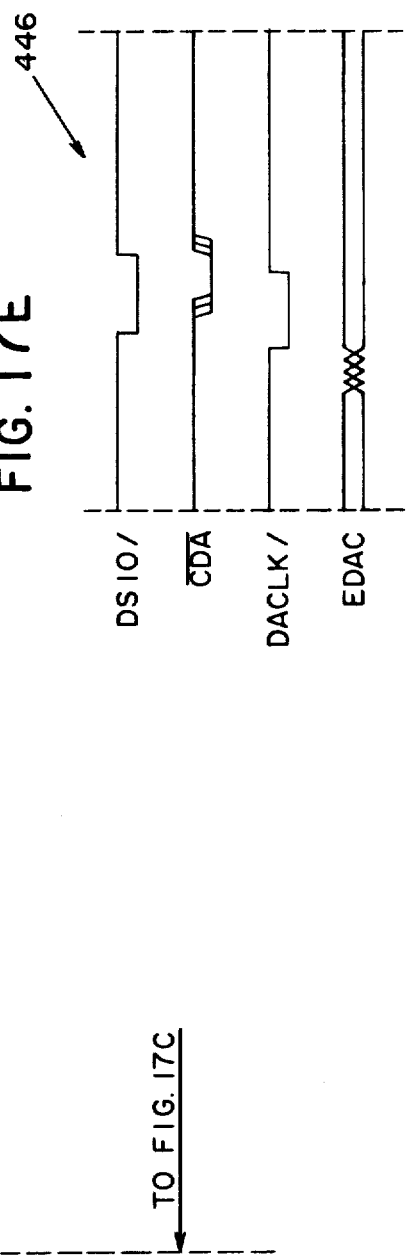

The timing chart designated generally as 446 in FIG. 17E shows the relationship among the various signals shown therein.

Figure 18A:
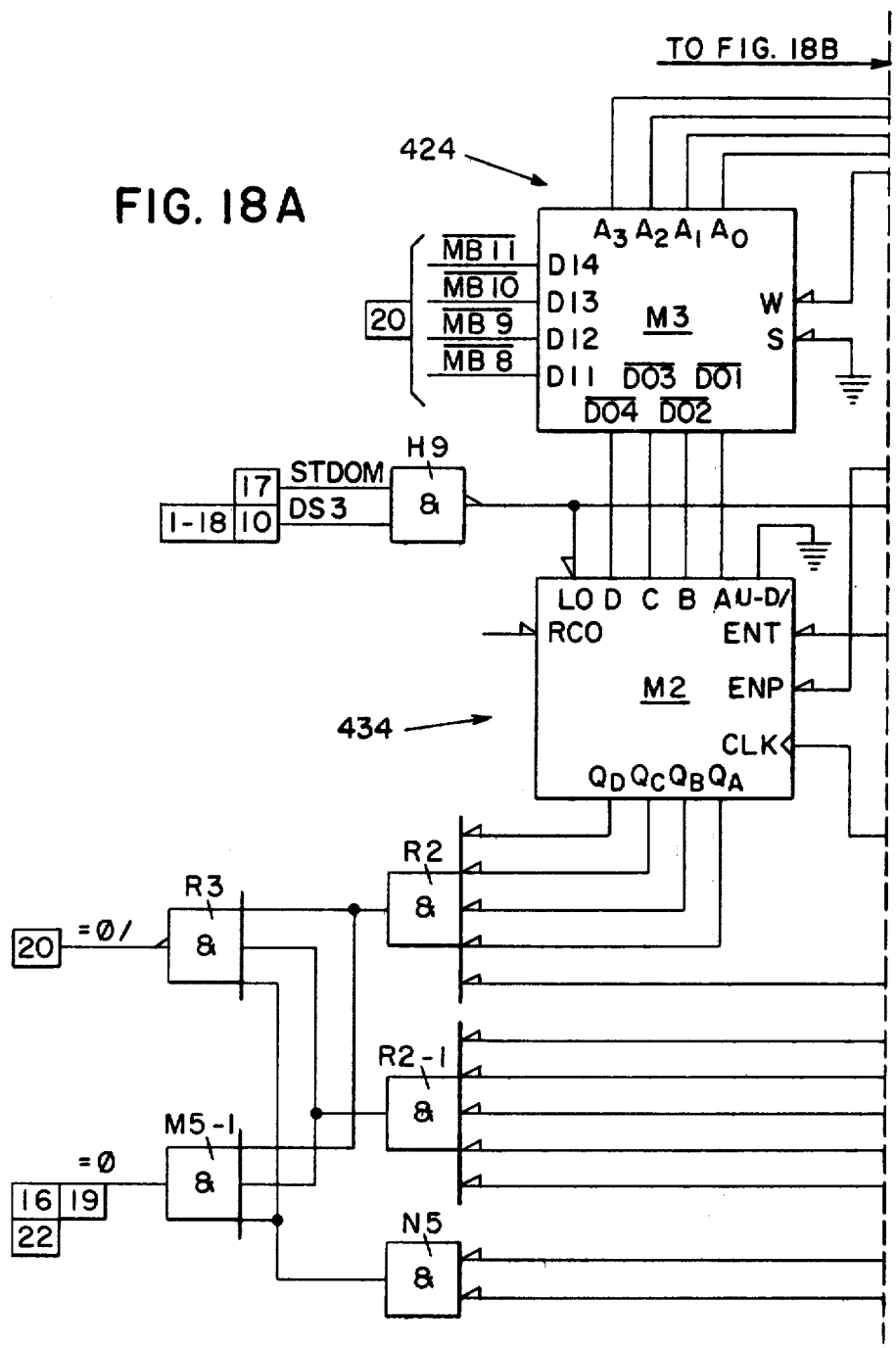
Figure 18B:
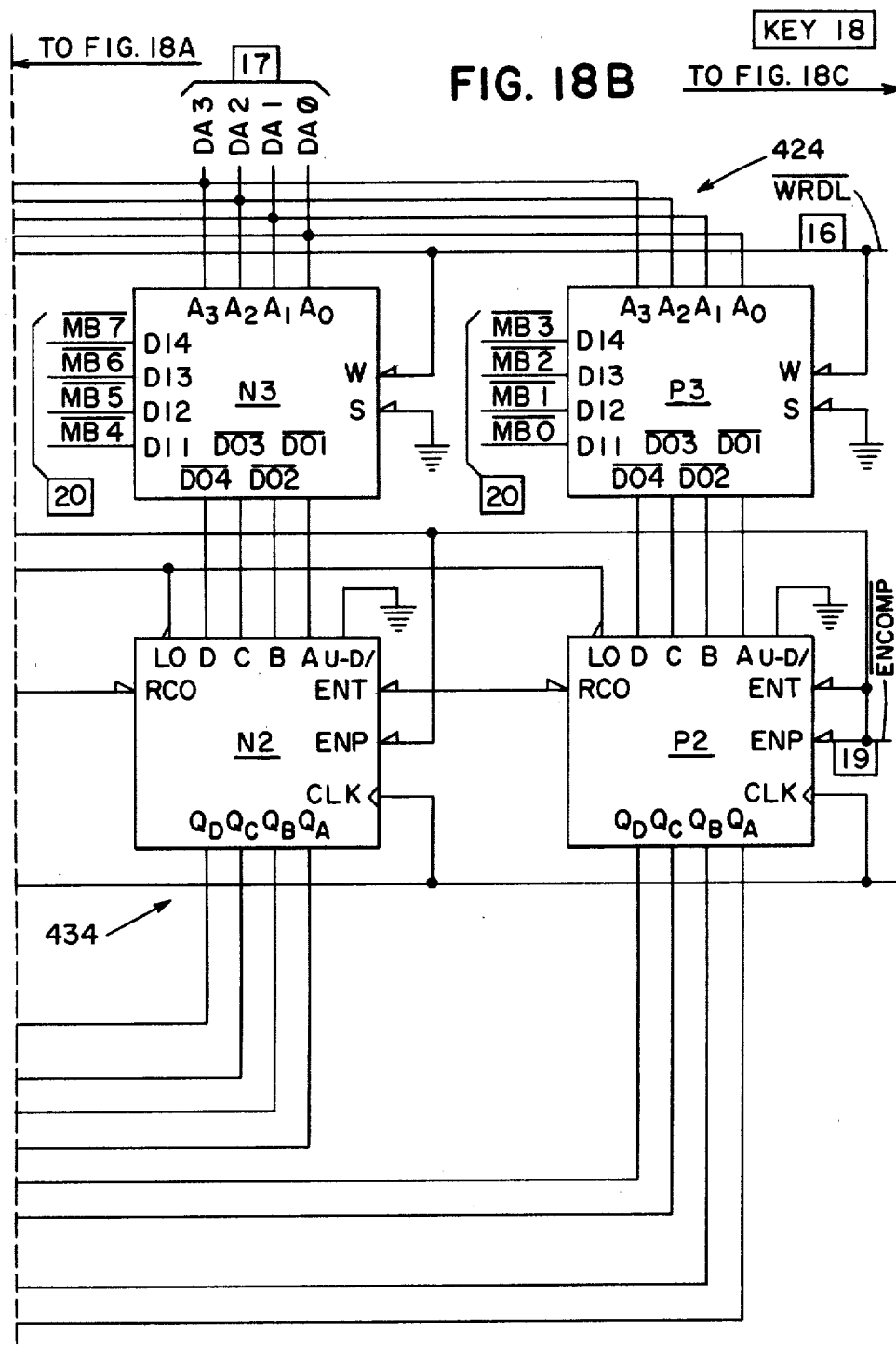

The domain length file 424 (FIG. 14A) is comprised of the RAM units M3, N3, and P3 (FIGS. 18A and 18B); each of these units is a conventional IC chip such as 74S189 which is manufactured by Texas Instruments Inc. The file 424 is connected to the main bus 334 which is also lettered MB∅-MB12 and this file is also connected to the bus marked DA∅-DA3 in FIGS. 14A and 18B. The domain length counter 434 (FIG. 14A) is comprised of the counters M2, N2, and P2 shown in FIGS. 18A and 18B; these counters are conventional 4 bit counters such as IC chips #LS169 which are manufactured by Texas Instruments, Ins. The outputs of the counters M2, N2, and P2 are conventionally wired to produce the outputs =∅/, and =∅ shown in FIG. 18A. The various logic gates M5 and J9 shown in FIG. 18C and the logic gates R2, R2-1, N5, R3 and M5-1 shown in FIG. 18A are used to develop the =∅1 and =∅ signals shown. The following List #6 is a list of the inputs and outputs which appear in FIGS. 18A–18D along with a description thereof.

LIST #6

| | Description |
|---|---|
| Inputs | |
| STDOM | (Start of Domain) This signal enables the value in the domain length file 424 (FIG. 14A) to be transferred to the domain length counter 434. |
| DS3 | (Data Strobe 3) Clocks the data for the above. |
| WRDL | (Write Domain Length) Enables loading of data into the domain length file 424 (FIG. 14A). |
| ENCOMP/ | (Enable Signal Compare) Enables the domain length counter 434 (FIG. 14A) to start counting. |
| DS4 | (Data Strobe 4) Causes the domain length counter 434 to be incremented at the proper time. |
| DS7 | (Data Strobe 7) Same as above. |
| Output | |
| =∅ | Output from domain length counter 434 which indicates that the end of the domain has been reached. |
| =∅/ | Complement of above. |

Figure 18D:
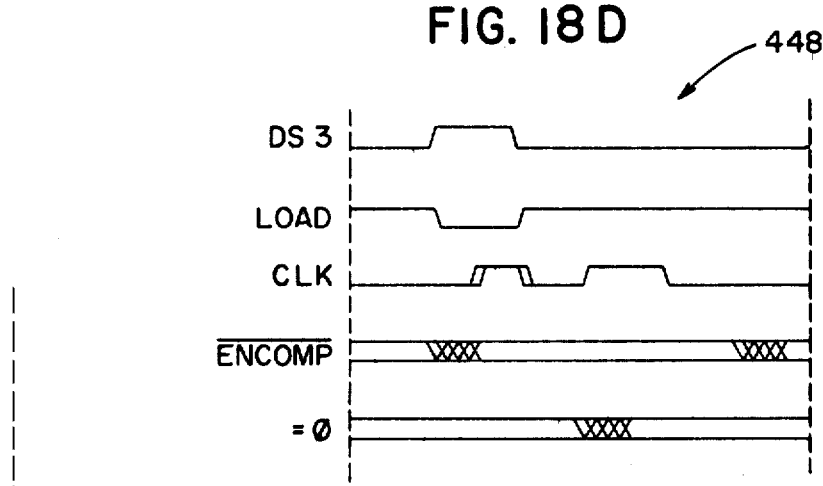
Figure 18C:
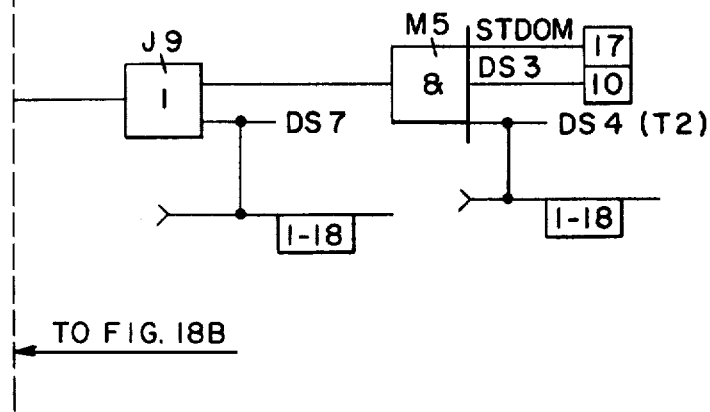

The timing chart designated generally as 448 in FIG. 18D shows the relationship among the various signals shown therein.

The domain valid file 426 (FIG. 14A) is comprised of conventional shift registers L8 and L7 (FIG. 20A) such as ICs LS164 and conventional shift registers K8 and K7 such as ICs LS165 which are manufactured by Texas Instruments, Inc.; and it also includes a conventional JK-type flip-flop J8 for producing the VALID and VALID/ outputs shown. A plurality of inverters N6 (FIG. 20C) is shown for inverting the main bus lines MB∅-MB11 to their inverted counterparts as shown. The function of the flip-flop H5 (FIG. 20B) is to store the logical condition (OR or AND) which is to be used for the qualify operations.

Figure 20A:
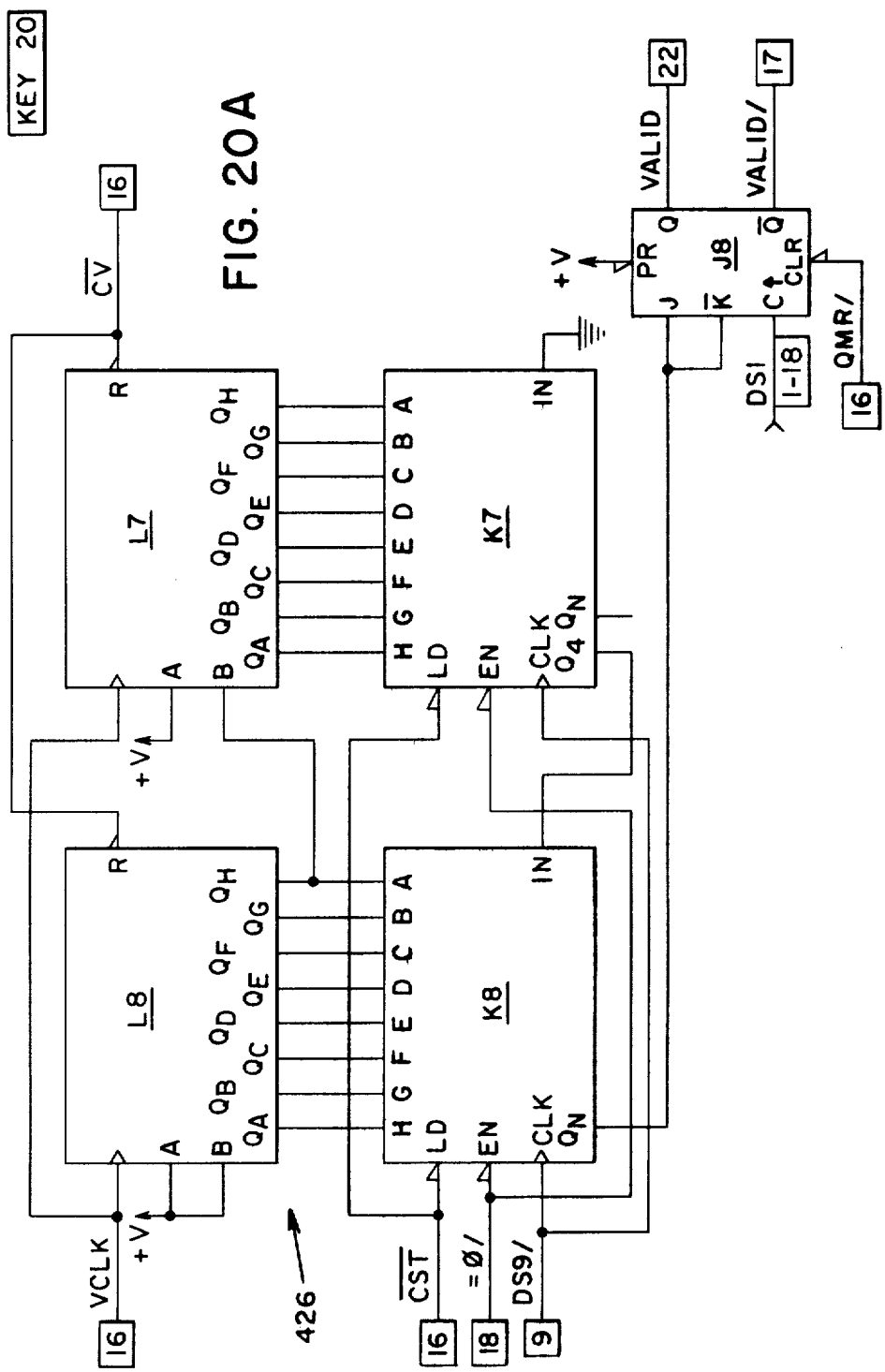
Figure 20B:
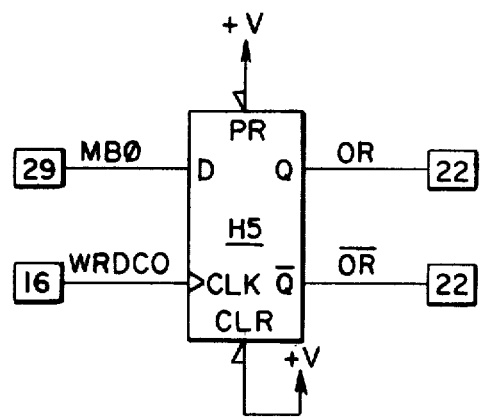
Figure 20C:
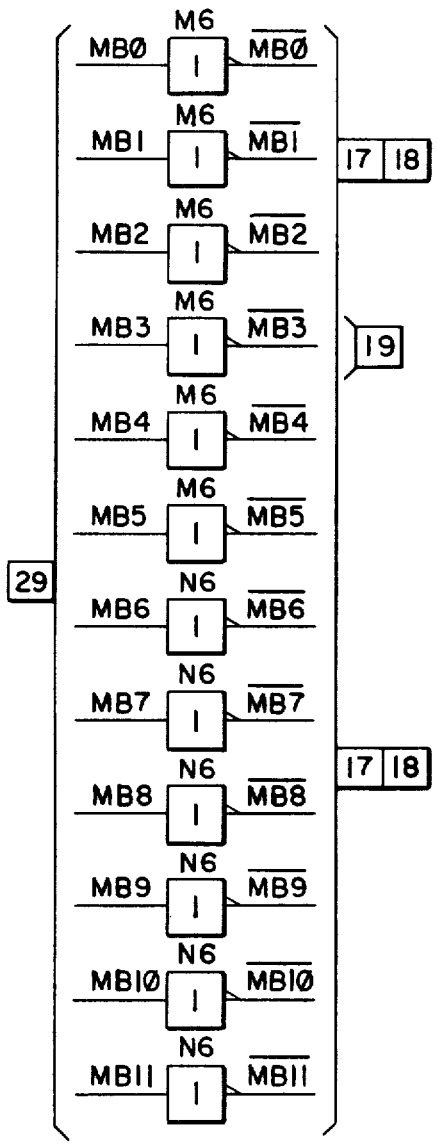

The following is a list of the inputs and outputs (and their descriptions) associated with the domain valid file 426 shown in FIGS. 20A–20C.

LIST #7

| | Description |
|---|---|
| Input | |
| VCLK | (Valid clock) |
| CST/ | (Clear for Start of Tuple) This causes the bits stored in reg- isters L78L8 (FIG. 20A) to be loaded into the registers K7 and K8. |
| DS9/ | (Data Strobe #9) Used to load data into above registers K7 & K8. |
| DS1 | (Data Strobe #1) used to generate VALID or VALID/ signals. |
| QMR/ | (Qualify Master Reset) for qualify module 322. |
| MB∅ | (Main Bus Line #∅)-Least significant bit line. |
| WRDCO | (Write Domain Conditional Operator) Is used to indicate that the current domain is to be used for qualifying. |
| Output | |
| VALID | Result of decision made by bits in registers K7 and K8 in FIG. 20A. |
| VALID/ | Complement of above. |
| OR | Means that results of qualification of more than one domain are to be ORed. |
| OR/ | Same as above except results are to be ANDed. |

Figure 19A:
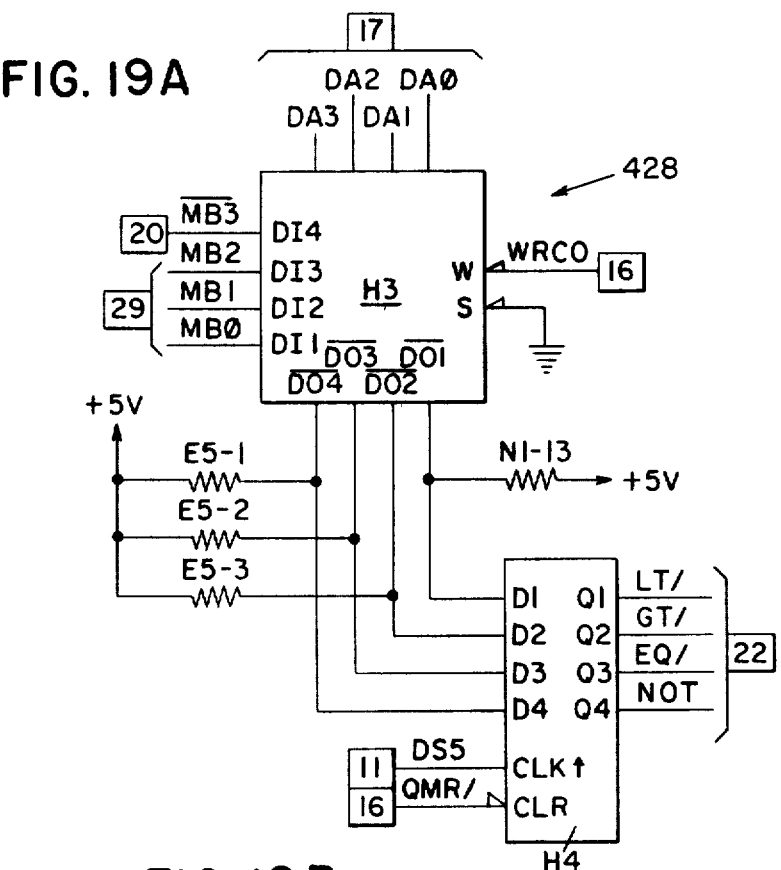

The domain condition file 428 (FIG. 14A) is shown in more detail in FIG. 19A and includes the register H3 and the flip-flop H4. It should be recalled that the comparison operators are stored in the register H3 and are outputted from the flip-flop H4. The function of the gates H9, H9-1 and flip-flop J8 (FIG. 19B) is to produce the ENCOMP and ENCOMP/ outputs shown.

The following is a list of the inputs and outputs (and their descriptions) associated with the domain condition file 428.

LIST #8

Figure 19B:
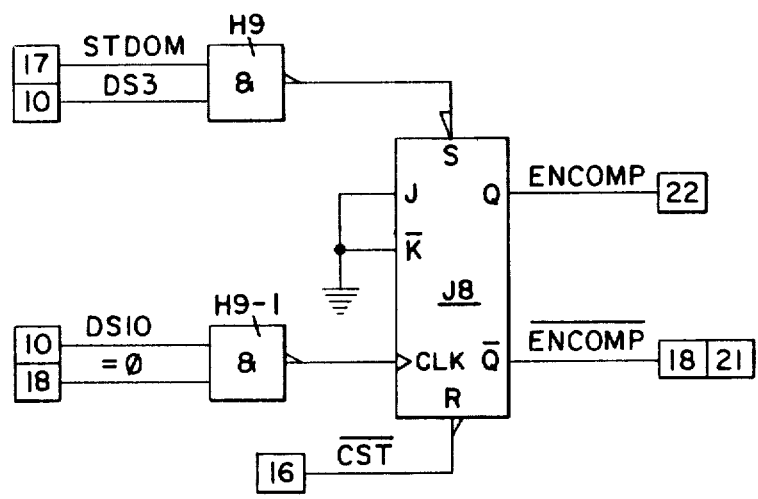

| | Description |
|---|---|
| Input | |
| WRCO/ | (Write Conditional Operator) This signal is the write enable term for register H3 in FIG. 19A. |
| DS5 | (Data Strobe #5) Latches data in flip-flop H4 (FIG. 19A). |
| QMR/ | See List #4. |
| STDOM | (Start of Domain) Used to enable the relevant comparison. |
| DS3 | (Data Strobe #3) Clock to clock in signal STDOM. |
| DS10 | (Data Strobe #10) Used to reset the latch J8 in FIG. 19B if =∅ signal is true. |
| =∅ | See List #6. |
| CST/ | See List #7. |
| Outputs | |
| LT/ | Less than |
| GT/ | Greater than |
| EQ/ | Equal to |
| NOT | Not equal to |
| ENCOMP | (Enable Comparison) Used to enable Register R4 (FIG. 22A). |
| ENCOMP/ | Complement of above. |

Figure 21A:
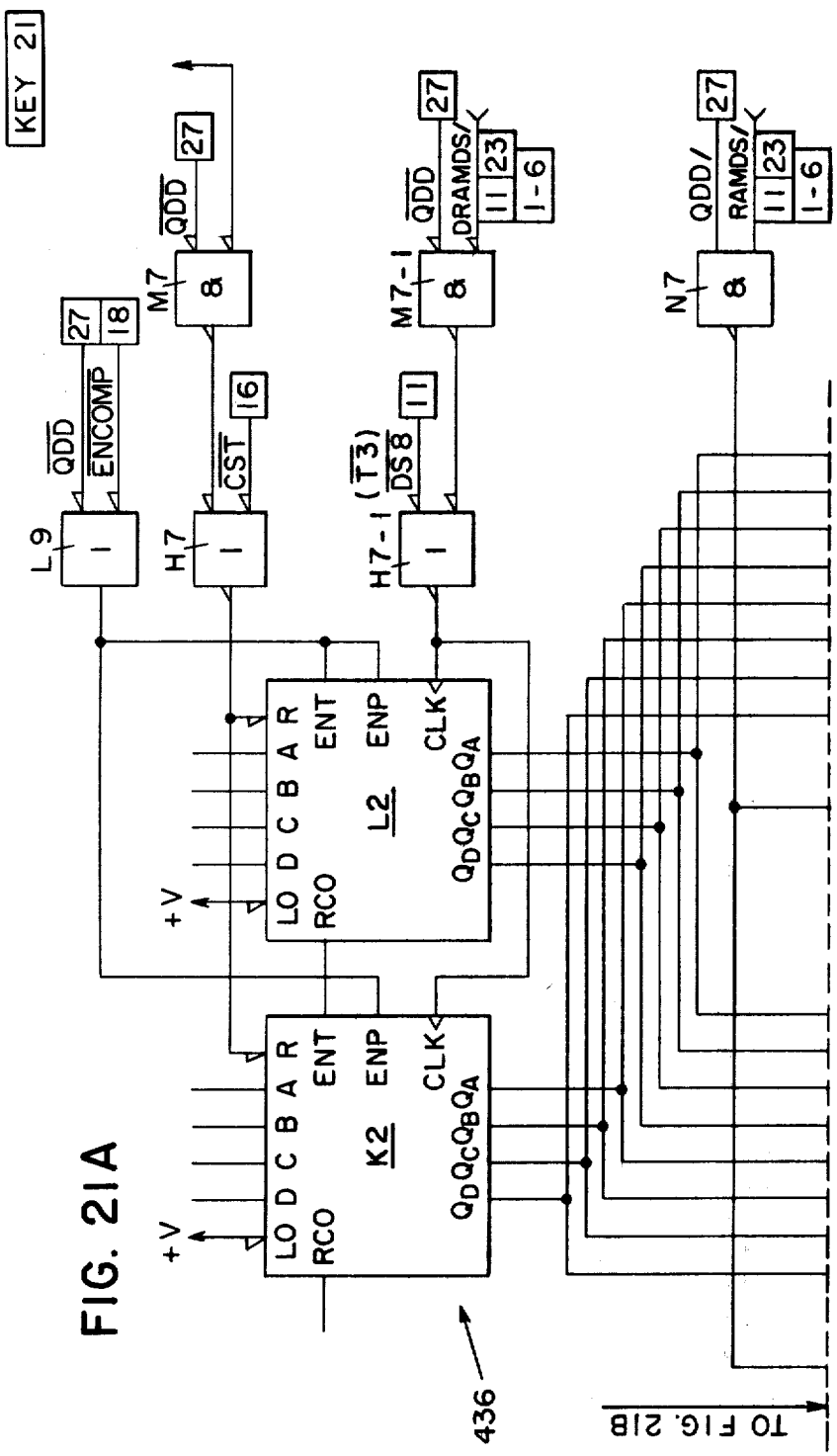

The argument address counter 436 (FIG. 14B) is comprised of the counters K2 and L2 (LS161 counters previously mentioned) shown in FIG. 21A. The function of the logic circuitry comprising gates M7, M7-1, H7, H7-1 and L9 (FIG. 21A) is to provide count pulses to L2 and K2, the argument address counter. The various inputs to this logic circuitry (including the NAND gate N7) are shown in FIG. 21A and are coded as previously discussed to indicate from where the signals are derived. The following is a list of the inputs associated with the argument address counter 436.

LIST #9

| Input | Description |
|---|---|
| DRAMDS/ | (Delayed Ram Data Strobe) It is a count pulse for address counter for J1, K1 (FIG. 21A). |
| QDD/ | (Qualify Domain Data) Level which indicates domain data is being loaded. |
| DS8 | (Data Strobe #8)-It is a count pulse for argument counter L2, K2 in FIG. 21A. |
| CST/ | (Clear for Start of Tuple) Initialization. |
| ENCOMP | (Enable Compare) See List #8. |

Figure 21B:
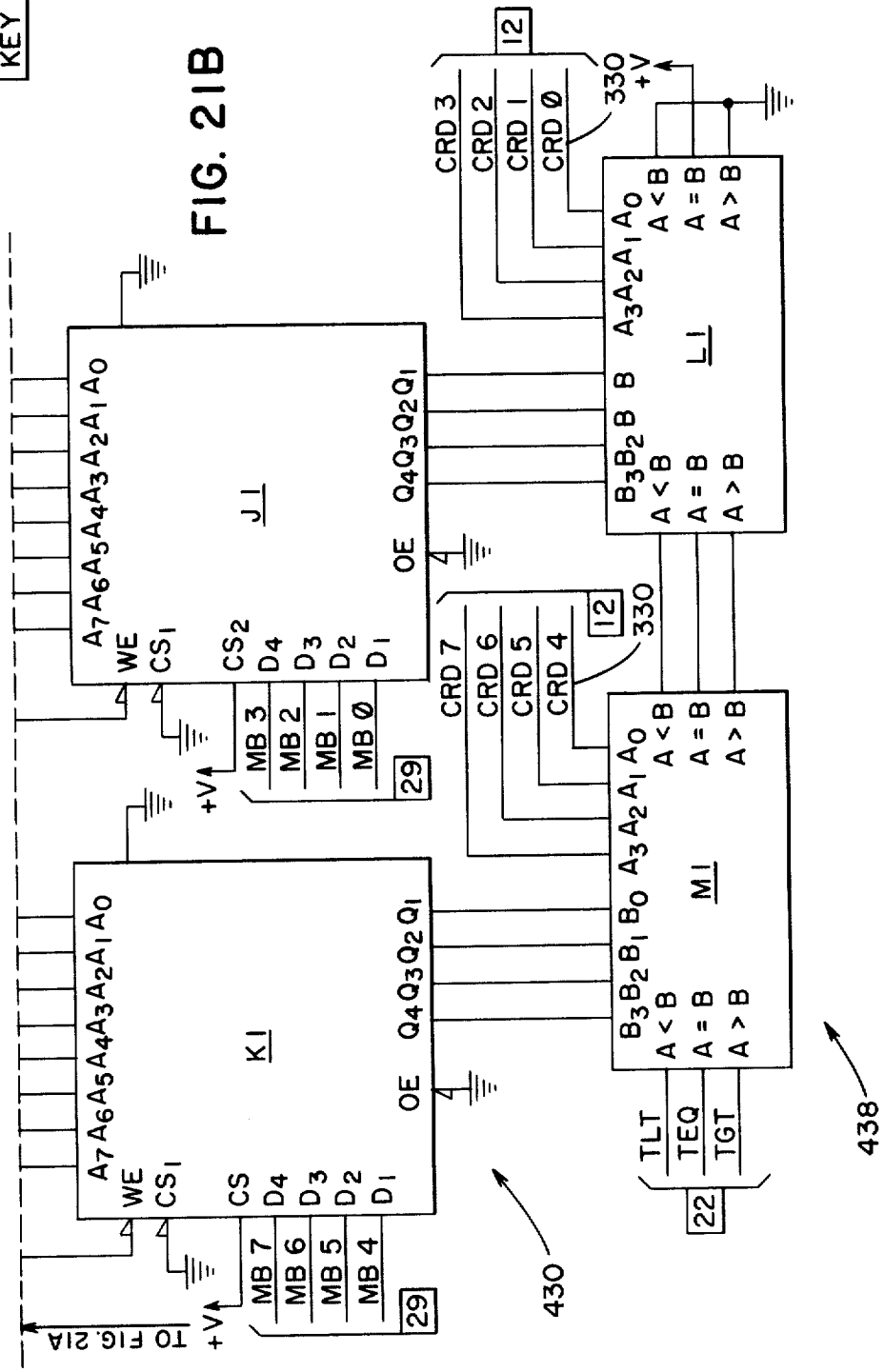

The argument buffer 430 (FIG. 14B) is comprised of the registers K1 and J1 shown in FIG. 21B. The registers K1 and J1 are conventional static RAMs such as IC chips #93422, manufactured by Fairchild. The MB∅-MB7 lines from the main bus 334 are connected to the registers K1 and J1 as shown in FIG. 21B to supply the argument for the data being sought. The purpose of the gate N7 in FIG. 21A is to drive write enable on the argument buffer J1, K1 (FIG. 21B). The QDD/ input to gate N7 is a "level" input and the RAMDS/ input is a pulse that indicates that the current byte on the MB∅-MB7 data lines should be put into the argument buffer J1, K1 in FIG. 21B.

The domain comparator 438 (FIG. 14B) is comprised of the comparators M1 and L1 shown in FIG. 21B. The comparators M1 and L1 are conventional comparators such as IC chips #LS85 which are manufactured by Texas Instruments Inc., for example. Data from the storage array 310 comes into these comparators over the CRD∅-CRD7 lines comprising the bus 330 (FIGS. 3 and 14B) and the argument from the argument buffer K1 and J1 is also fed into these comparators M1 and L1. Based upon the decisions of the comparators M1 and L1, the output thereof will be "tuple less than" (TLT), "tuple equal to" (TEQ), and "tuple greater than" (TGT); the various outputs are fed into the tuple comparator 440 (FIG. 14B).

Figure 22A:
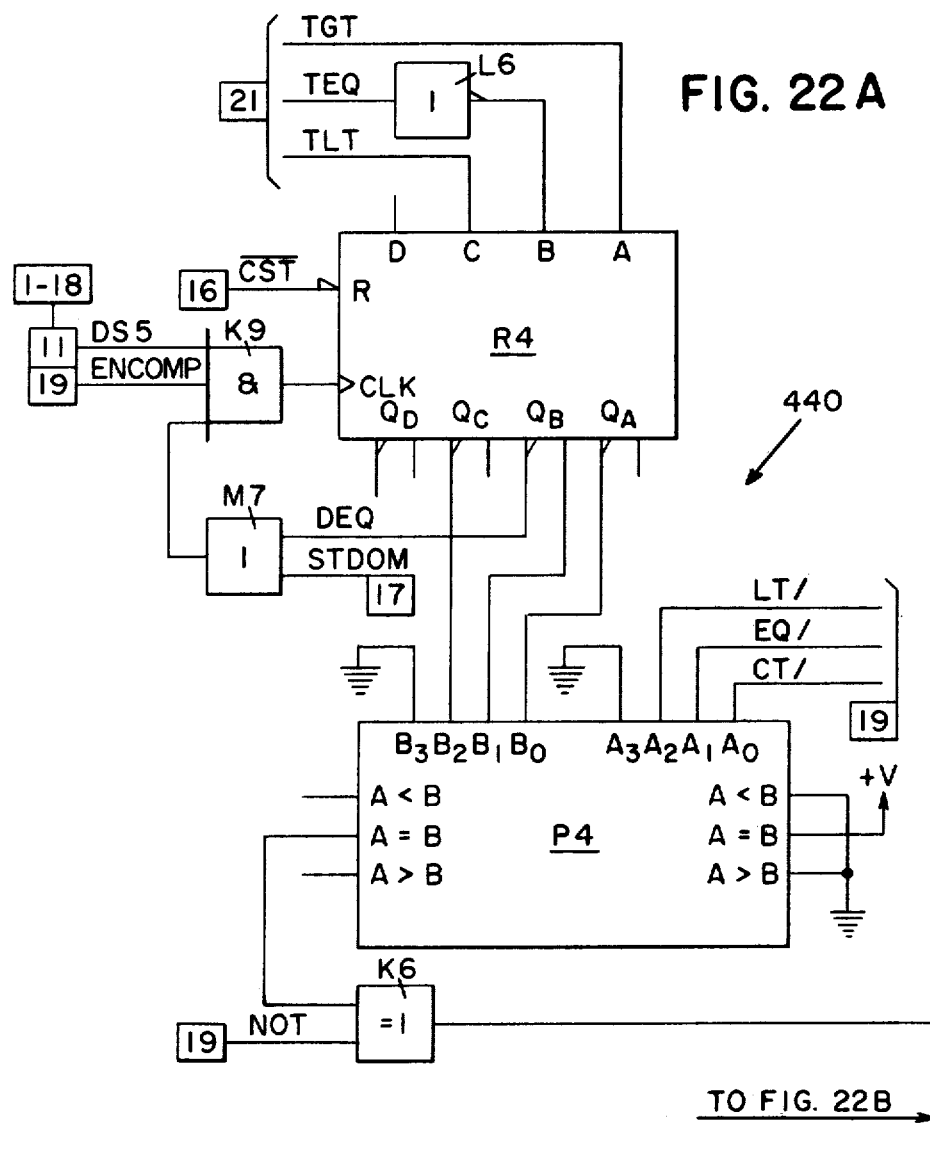

The tuple comparator 440 is basically comprised of the flip-flop module R4, the comparator P4, the flip-flop H5, and associated gate logic circuitry as shown in FIGS. 22A and 22B. The module R4 is a quadruple D-type flip-flop such as IC module LS175 which is manufactured by Texas Instruments, Inc., and the comparator P4 is an IC module #LS85 which is also manufactured by the named company.

The general function of the logic gates K9 and M7 shown in FIG. 22A is to conditionally clock a new value into latch R4. The function of the NAND gates J6-1 and J6-2 (FIG. 22C) is to initialize the flip-flop H5 in FIG. 22B. The function of the NAND gate H6 (FIG. 22B) is to maintain the output "qualified" false until a legitimate domain compare has taken place. The function of the gates like NAND gates J7, J6-3, J6-4, V4 and the associated flip-flop H5 in FIG. 22B and the gates J6-1 and J6-2 in FIG. 22C is to manage multiple domain comparisons within a tuple. When the output of flip-flop C5 is $\overline{Q}$ and the output of flip-flop H5 is also $\overline{Q}$, a qualified tuple signal results from NAND gate H9 in FIG. 22B; the "QUALIFIED" signal is used by control logic to be later described herein. The following is a list of the inputs and outputs associated with the tuple comparator 440 shown in FIGS. 22A, 22B and 22C and their associated descriptions.

LIST #10

| | Description |
|---|---|
| Inputs | |
| DS5 | (Data Strobe #5) |
| ENCOMP | (Enable Compare) See List #6 |
| STDOM | (Start of Domain) See List #6 |
| OR/ | See List #7 |
| CST/ | (Clear for Start of Tuple) See List #7 |
| OR | See List #7 |
| NOT | (Complements meaning of comparison operator) |
| DS10 | (Data Strobe #10) |
| =∅ | See List #6 |
| VALID | See List #7 |
| NJP | (New Job Pulse) Indicates start of a new job from PFP 304. |
| SAND/ | (Set up AND condition) in flip-flop H5 (FIG. 22B). |
| SOR/ | (Set up OR condition) in flip-flop H5 (FIG. 22B). |
| Outputs | |
| SAND/ | See above. |
| SOR/ | See above. |
| QUALIFIED | Output of qualify module 322. |

Figure 16A:
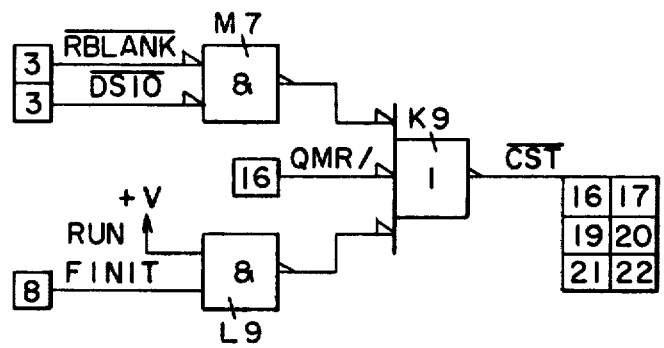
Figure 16B:
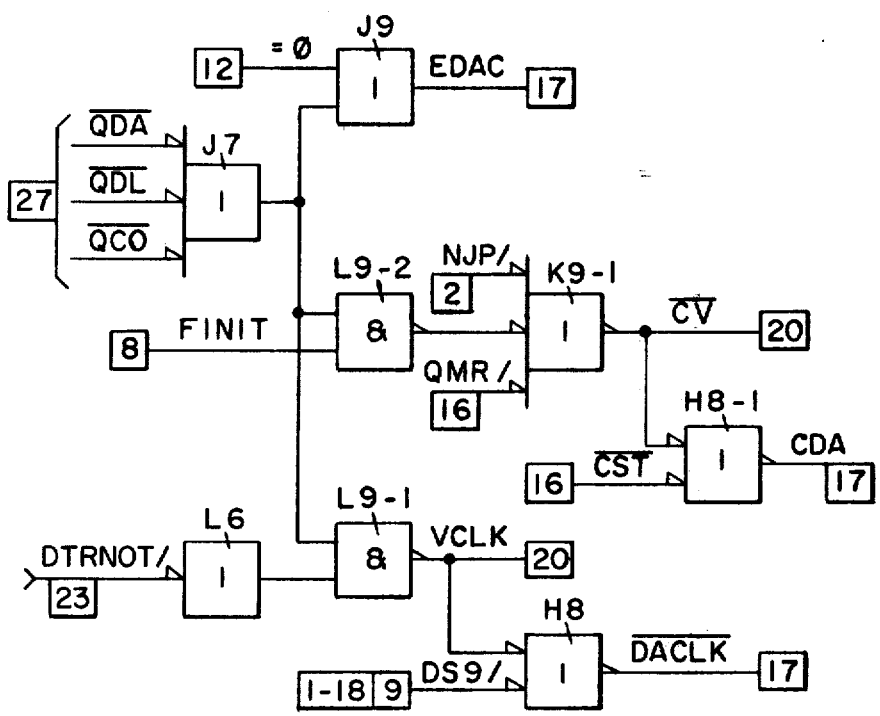
Figure 16C:
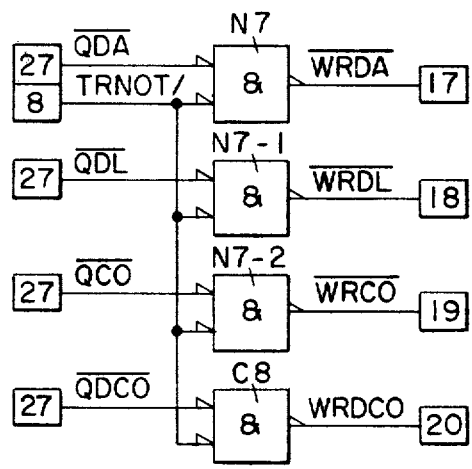
Figure 16D:
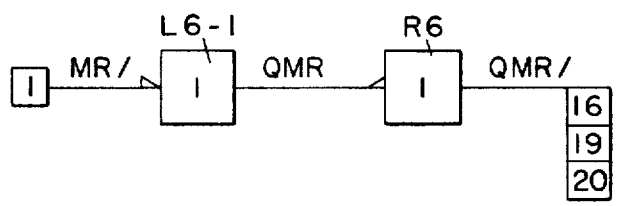

FIGS. 16A, 16B, 16C, and 16D contain various logic circuitry used for generating a plurality of signals associated with the qualify module 322. The circuitry in FIGS. 16A-16D appears to be self-explanatory; however, a listing of the various inputs and outputs along with their descriptions will prove helpful. The various gates M7 and L9 shown in FIG. 16C, gates J7, L6, J9, J9-1, J9-2, K9-1, H8, and H8-1 shown in FIG. 16B, gates N7, N7-1, N7-2 and C8 shown in FIG. 16C, and inverters L6-1 and R6 shown in FIG. 16D are identified in FIG. 67.

LIST #11

| Inputs | Description |
|---|---|
| RBLANK/ | (Reblank) It means the current byte on the CRD∅-7 is the last byte of the associated tuple. |
| DS10 | (Data Strobe #10) |
| MR/ | (Master Reset) |
| FINIT | (Function Initialize) Indicates a new function code has been sent from the PFP 304. |
| QDA | (Qualify Domain Address) |
| QDL | (Qualify Domain Length) |
| QCO | (Qualify Condition Operator) |
| =∅ | (End of Domain) |
| NJP/ | (New Job Pulse) See List #10. |
| QMR/ | (Qualify Module Master Reset) |
| $\overline{CST}$ | (Clear Start of Tuple) |
| DTRNOT/ | (Delayed Transfer Out) |
| DS9/ | (Data Strobe) |
| TRNOT/ | (Transfer Out) |
| QDL/ | (Qualify Domain Length) |
| QDCO/ | (Qualify Domain Condition Operator) |
| QDLO | (Qualify Domain Logical Operator) |

The last three above named inputs are levels which indicate that the named quantity is being loaded into the ADC's.

| Outputs | |
|---|---|
| CST/ | (Clear Start of Tuple) See List #7. |
| EDAC | (Enable Domain Address Counter) Prepares qualify module 322 for multiple domain references. |
| CV/ | (Clear Valid Register) Register L7. |
| CDA/ | (Clear Domain Counter) |
| VCLK | (Valid Clock) for Registers L2, L7 (FIG. 20A) |
| DACLK | (Domain Address Clock) |
| QMR/ | (Qualify Module Master Reset) |
| WRDA/ | (Write Domain Address) See List #5 |
| WRDL/ | (Write Domain Length) See List #6 |
| WRCO | (Write Condition Operator) It is write enable input for the condition register H3 in FIG. 19A. |
| WRDCO | (Write Domain Conditional Operator) See List #7. |

FIGS. 31A and 31B show more details of the tag module 324 (FIG. 3) which is part of the ADC 306. The basic functions of the module 324 are to:

1. Determine whether or not a tuple is a candidate for being qualified.
2. Selectively alter the tag byte.

In a relation having the general tuple and domain organization shown in FIG. 4, there is provided one 8 bit byte or domain which is used for tagging functions. As an example, the 8 bit byte may be organized as shown in FIG. 32, with bits A-F used for certain tagging functions and bits 7 and 8 being used for certain functions to be later described herein. While the tag byte designated generally as 450 in FIG. 32 is not shown in the relation shown in FIG. 4, the tag byte may be considered as being in domain #4 (not shown) for each of the tuples shown in FIG. 4; that is, the 8 bit tag byte 450 would be located in byte 4-1 for each of the tuples shown, with byte 4-2 for each of the tuples being vacant.

In certain situations, it is desirable to identify a certain tuple in a relation so that it can be used at a later operation. For example, in associative type accessing, a request to the system may be; "Provide a list of all the people who live in Wichita". Once the list is prepared, the data is returned to the storage array 310. If at a later time, this same request is required, the same associative match must be made again. If this request for people who live in Wichita is made frequently enough, one of the tag bits A-F in FIG. 32 may be used to indicate the fact that the tuple contains data for a person living in Wichita. The tagging provides a method of selecting data in one operation for use in an operation at a subsequent time.

With regard to the tag module 324, FIG. 31A shows the circuitry used for tag comparison, and FIG. 31B shows the circuitry used for tag modification. It appears appropriate to discuss tag modification first.

Bits 7 and 8 in the tag byte 450 (FIG. 32) are used for physical and logical deletion, respectively, of records within the storage array 310; i.e. these bits are used in a "transaction-backout"-type situation in which an individual has started a transaction which actually deletes data and later realizes that this was in error. For example, when bit 8 is a binary "0" it indicates that the associated tuple is in the data base and contains valid information or data. When bit 8 is a binary "1", it indicates that the tuple does not contain useful data and accordingly, the space occupied by this tuple may be used for adding new data therein. When bit 7 is a binary "0", it indicates that the associated tuple contains valid data and is included in the data base, and when bit 7 is a binary "1", it means that the data for the associated tuple has been logically excluded from the data base. A difference between the physical and logical delete tag bits (bits 8 and 7) is that a tuple may be logically deleted by a binary "1" in bit 7, but the tuple could not be written over; however, with the physical delete tag bit, a binary "1" in bit 8 would mean that the associated tuple does not contain valid data and accordingly can be "written over". Changing the logical delete bit 7 from a binary "1" to a binary "0" causes the associated tuple to appear in the data base without any of the physical data being lost.

FIG. 31B shows the circuitry for changing the tag bits in the tag byte for selected tuples. For example, the tag byte for a tuple from the storage array 310 may have the "old field" designation shown (FIG. 31B) with the bits #1 through #8 being numbered from right to left. Suppose it is desired to change the second and fourth bits to a binary "1" and binary "0", respectively; these "new bits" would be loaded in the tag replacement field register 452. In order to pick out the bits to be changed, a binary "1" would be placed in the second position and the fourth position bits of the tag replacement bit control register 454 as shown by the "change bits". In other words, the "old field" from the array 310 will have the bits #2 and #4 (from the "change bits") changed to the values shown in "new bits" for these positions to produce the "new field" which is outputted from the 8 channel independent multiplexer 456. Because a binary "0" already existed in the 4th position of the old field, no change is made in the "new field". Because a binary "0" existed in the 2nd position of the "old field", and the "new bits" indicate a binary "1" should be in this position (according to the "change bits", a binary "1" in the second position is the net change in the "new field" compared to the "old field"). A binary "0" in the "change bits" leaves the corresponding bit position in the "old field" unchanged. The tag replacement data as to "new bits" and "change bits" is loaded in the registers 452 and 454, respectively, just as the argument data is placed into the qualify module 322 (FIG. 3); a user access program associated with the access control unit 302 and keyboard 340 (FIG. 5) is also used for this purpose.

FIG. 31A shows how the various tuples are tested in order to provide a selection of the data using the tagging technique discussed in relation to FIG. 31B. A typical request to the ADC 306 may be, "Provide the tuples in which the name equals "Smith" and tags #1 and #3 or tags "A" and "C" (FIG. 32) are "on". The circuitry shown in FIG. 31A operates similarly to that associated with the qualify module 322 in that a test is made on each affected tuple to indicate whether or not a match was made. In the example given, the "test bits" having the pattern given in FIG. 31A would be placed in a tag qualification mask register 458 and logically ANDED via the block 460 with the "incoming tag" from the associated tuples from the storage array 310. The "bits to match" in the example are stored in the tag qualification match register 462. From FIG. 31A, it can be seen that bits #1 and #3 are to be matched, the remaining bits being "don't care" bits; this means the tags

1 and #3 should be binary "1's" to have the associated tuple selected or qualified. The outputs from the logical AND block 460 and the register 462 are fed into a comparator 464 which produces a tag qualified signal (TGQAL) when a match is made. The qualified tuple is then routed back to the access control unit 302 in FIG. 5 (via the PFP 304) as previously explained. The bits 2 and 4-8 in the incoming tage are not involved in the comparison in comparator 464 because they were not part of the "test bits" forming the basis for comparison which test bits are entered into the register 458.

Figure 33A:
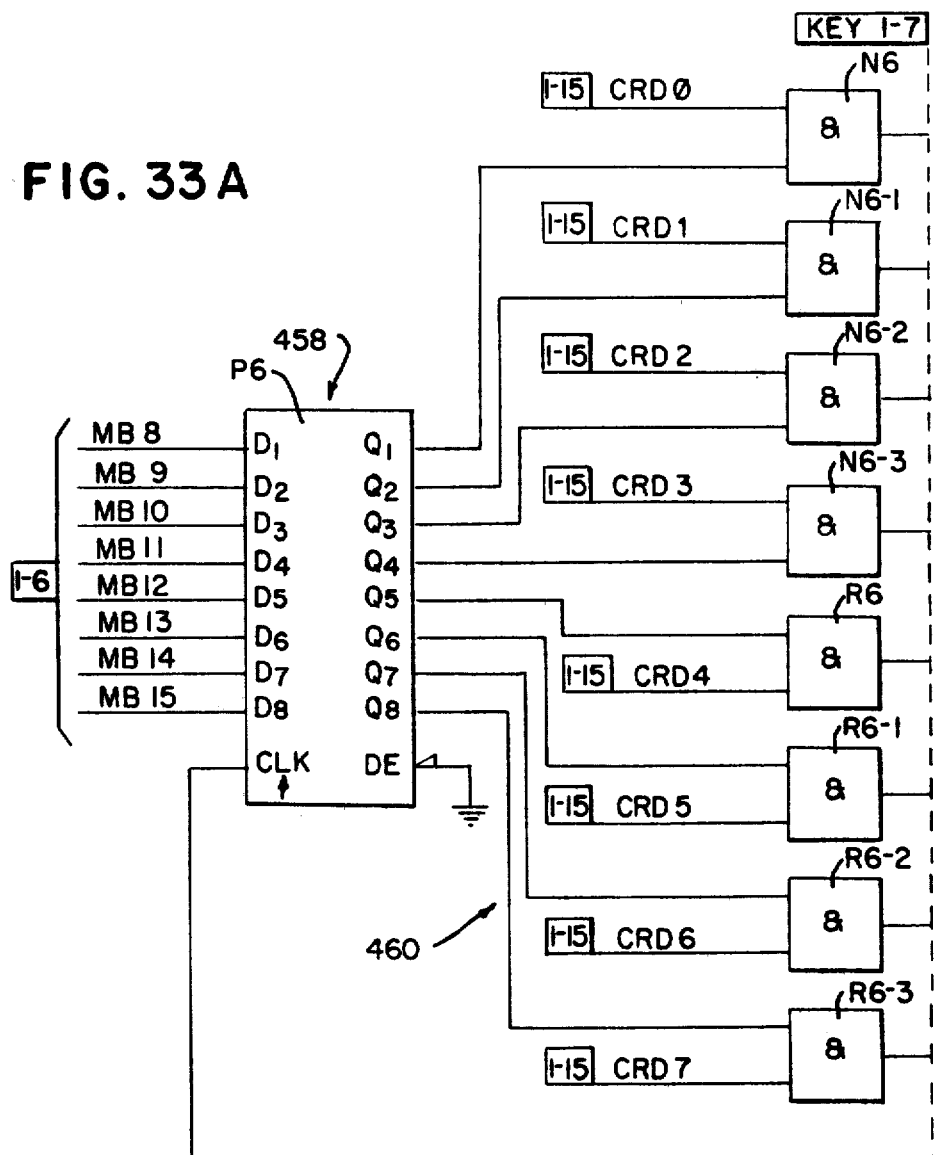
FIGS. 33A, 33B, and 33C show more details of a portion of the tag module shown in FIG. 31A.
Figure 33B:
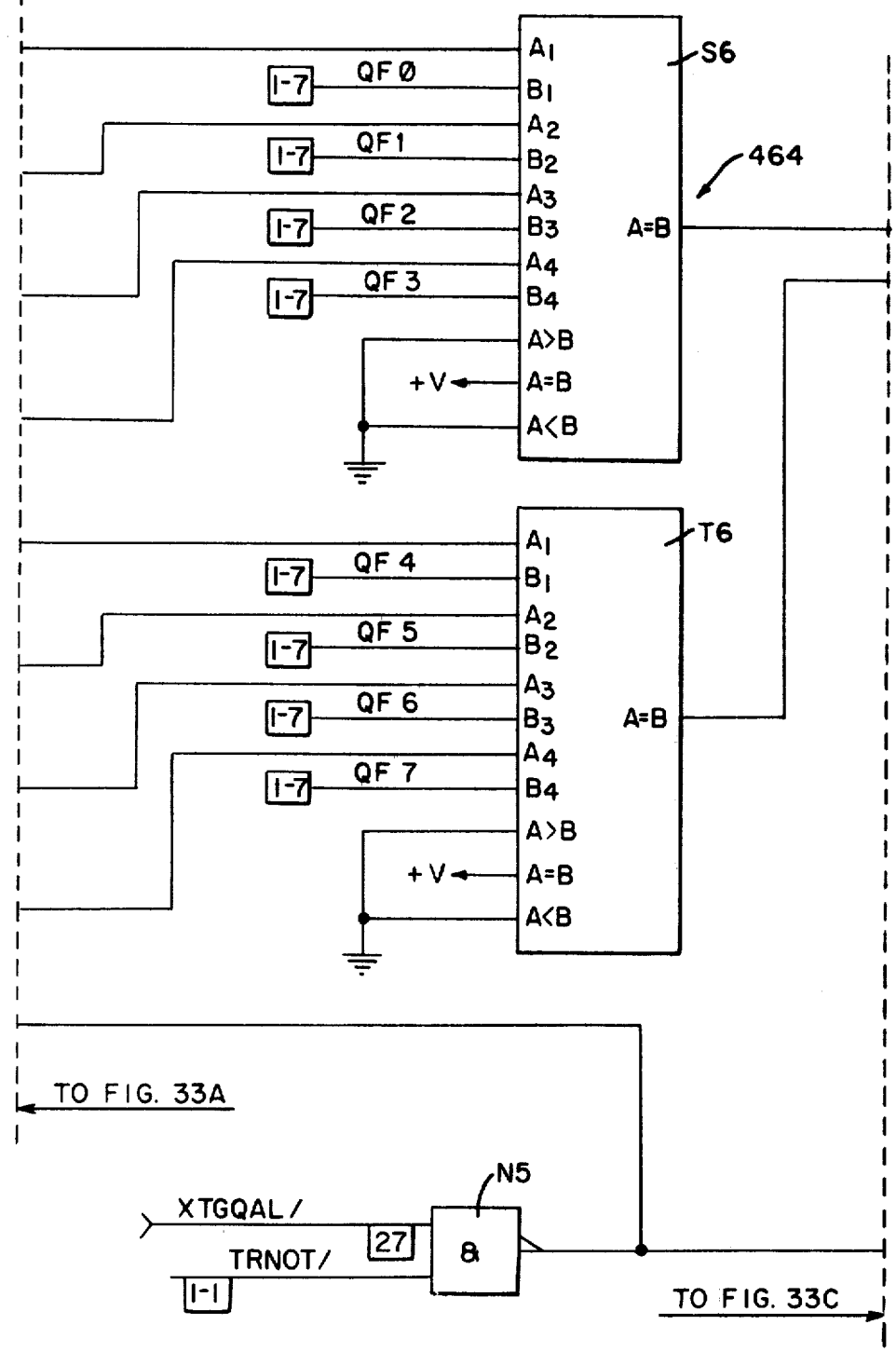
Figure 33C:
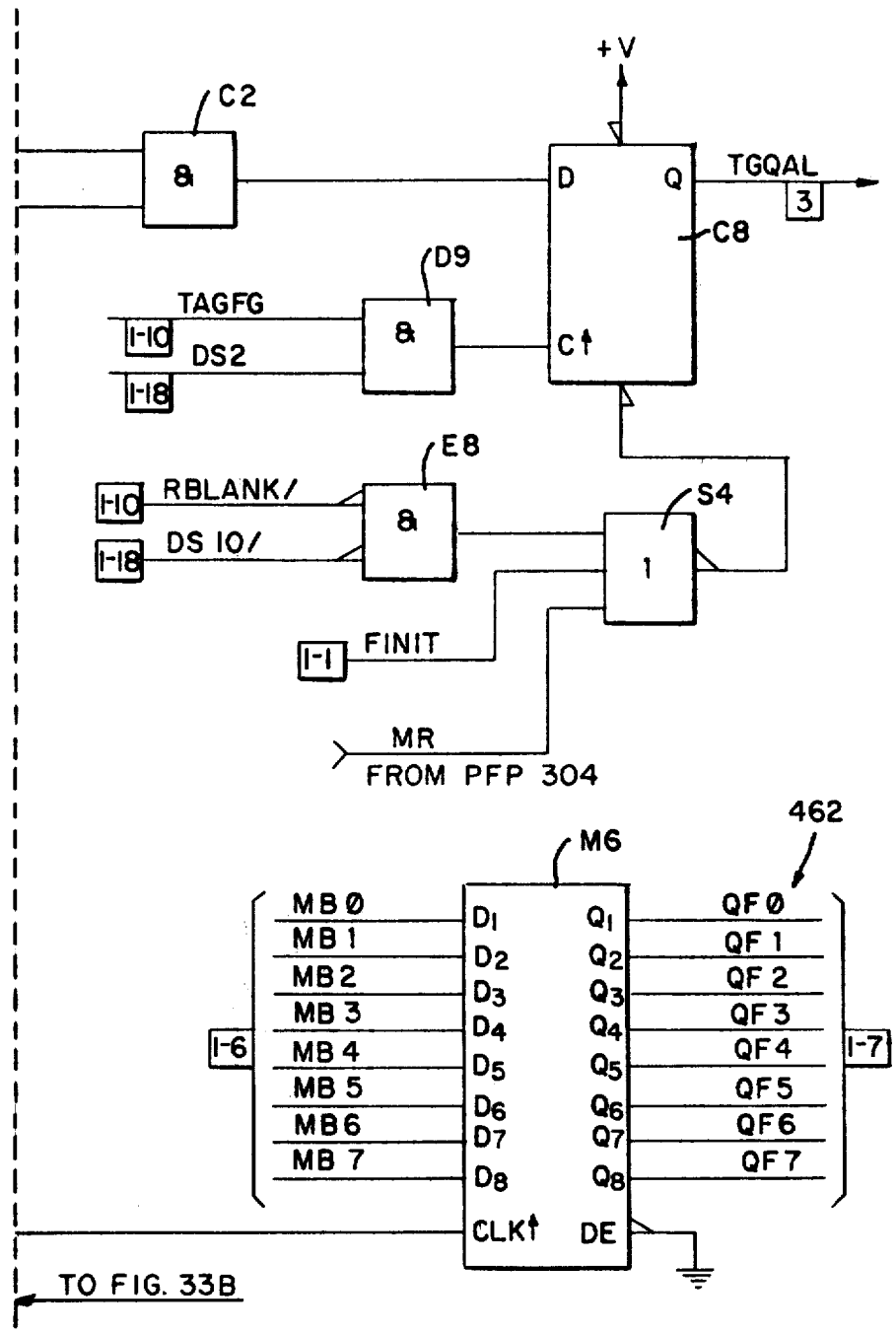

FIGS. 33A, 33B, and 33C show more details of the portion of the tag module 324 shown in FIG. 31A. The logical AND block 460 is comprised of the AND gates N6, N6-1, N6-2, N6-3 and R6, R6-1, R6-2, and R6-3 (FIG. 33A), and the tag qualification mask register 458 is comprised of the register P6 (FIG. 33A). Register P6 is a conventional register such as IC #LS374 which is manufactured by Texas Instruments, Inc. The tag qualification match register 462 is comprised of register M6 (FIG. 33C) which is also a conventional register such as IC #LS374. The comparator 464 is comprised of conventional comparators S6 and T6 (FIG. 33B) such as ICs #74S85 which are also manufactured by Texas Instruments, Inc. The main bus data lines MB8-15 are fed into the registers P6 (FIG. 33A) and M6 (FIG. 33C), and the data from the storage array 310 is fed into the 8 AND gates identified for example as N6 and R6 (also as 460) in FIG. 33A. The "bits to match" lettered QF0-QF7 coming from the register M6 are fed into the comparators S6 and T6. The various gates N5, (FIG. 33B) C2, D9, E8 and S4 and the flip-flop C8 (FIG. 33C) are utilized as shown in FIGS. 33B and 33C. The various inputs (and their descriptions) to the circuitry shown in FIGS. 33A, 33B, and 33C are as follows:

| LIST #12 | |
|---|---|
| Input | Description |
| MB0-15 | Main bus lines |
| XTGQAL/ | (Load Tag Qualification Information) |
| TRNOT/ | (Transfer Out Pulse) |
| CRD0-7 | Current data from storage array 310 |
| TAGFG | (Current Byte on CRD lines is the tag byte) |
| DS2 | (Data Strobe #2) |
| MR | (Master Reset) |
| RBLANK/ | (Read Blank) See List #11 |
| DS10/ | (Data Strobe #10) |
| FINIT | (Function Initialize) See List #11 |

The TGQAL output from the flip-flop C8 in FIG. 33B indicates that the tag qualifies.

Figure 34A:
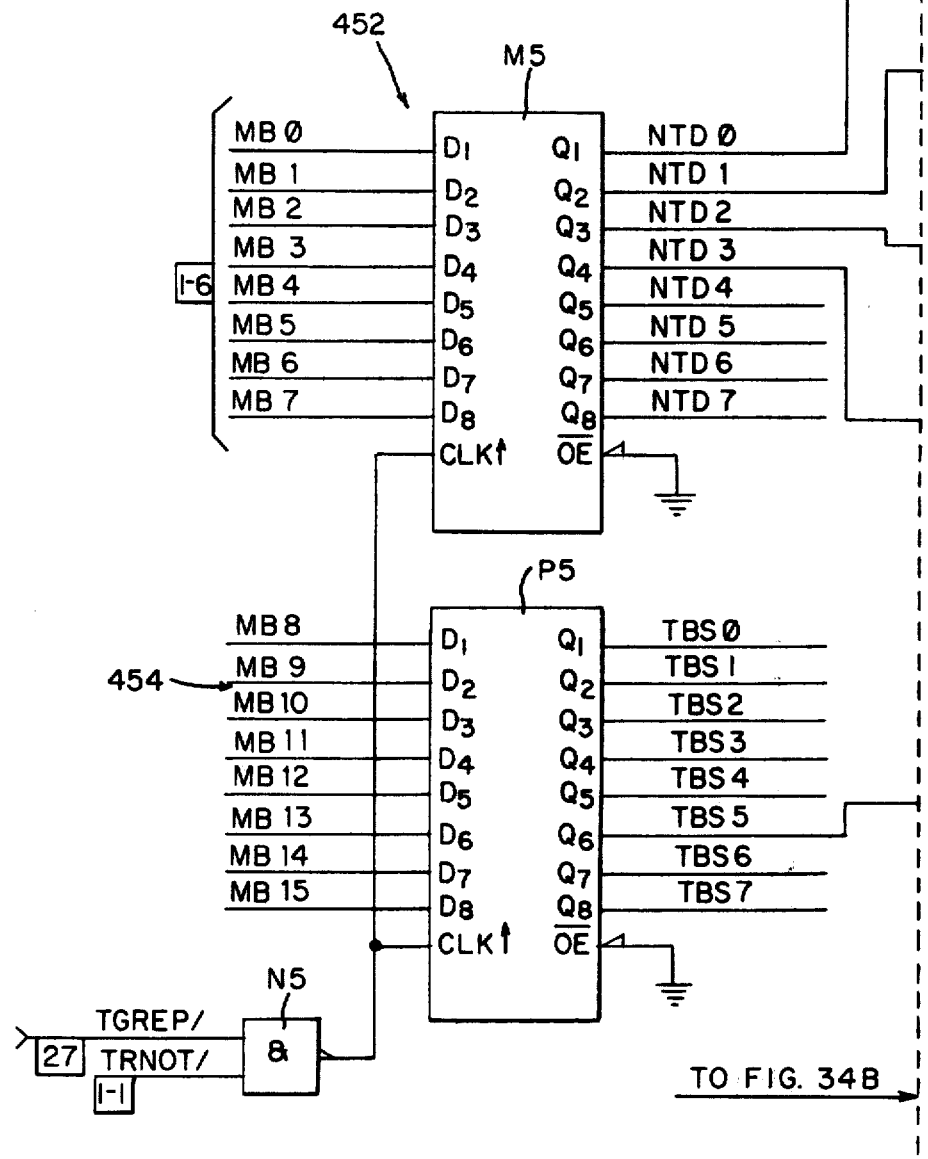
FIGS. 34A, 34B, and 34C show more details of a portion of the tag module shown in FIG. 31B.
Figure 34B:
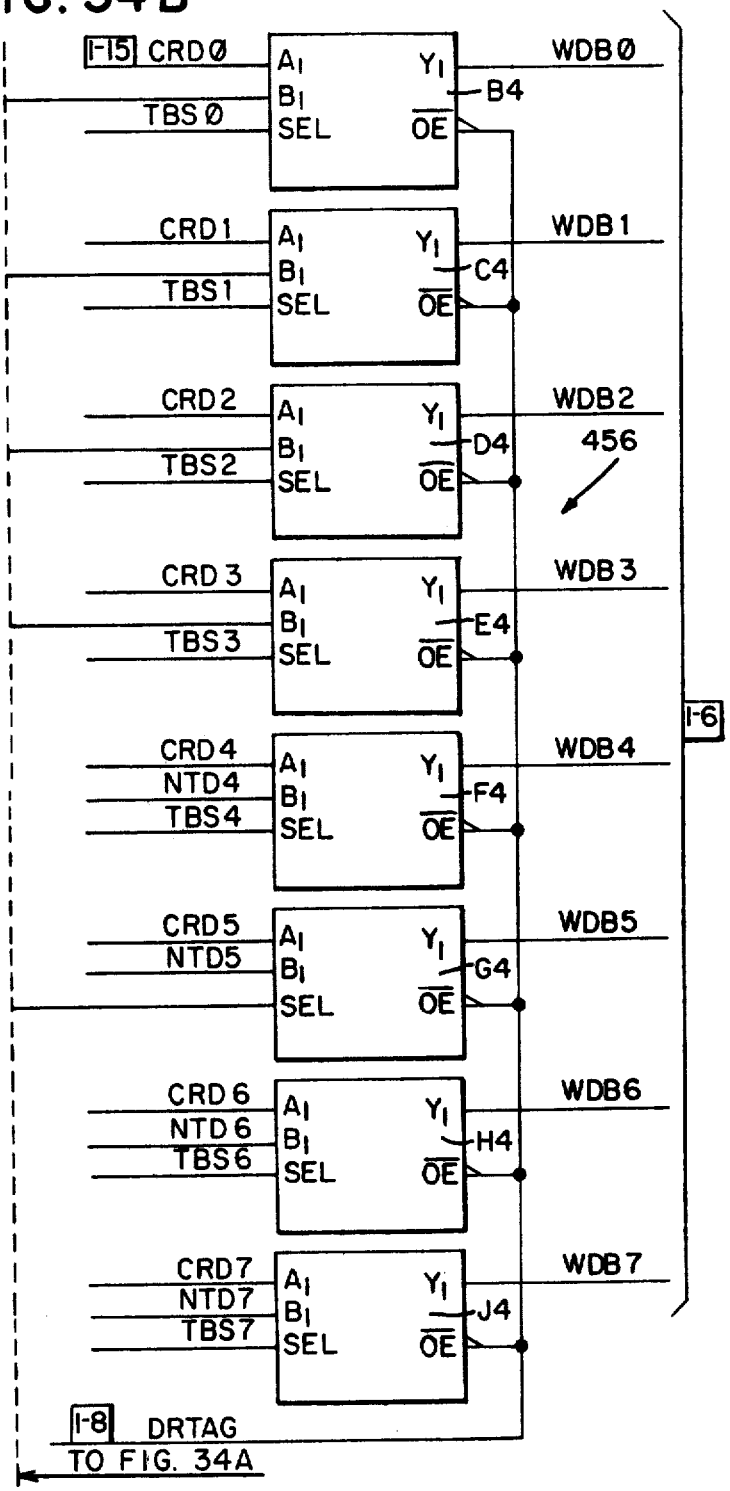
Figure 34C:
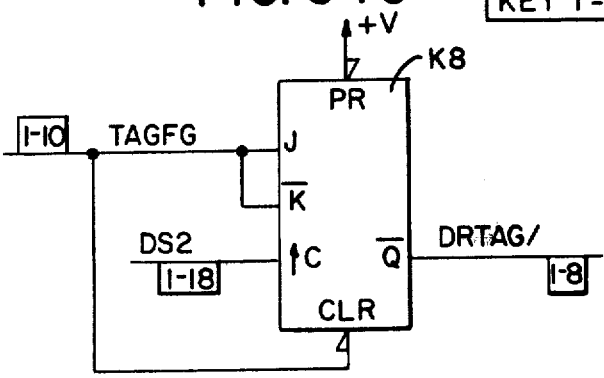

FIGS. 34A and 34B show additional details of the portion of the tag module 324 shown in FIG. 31B. The tag replacement field register 452 is comprised of a conventional latch or register M5 such as the IC #74LS374, and the tag replacement bit control register 454 (FIG. 31B) is comprised of a conventional latch register P5 (FIG. 34A) such as the IC #74LS374 just mentioned. The multiplexer 456 is comprised of 8 multiplexers B4, C4, D4, E4, F4, G4, H4 and J4 (IC #74LS257A) as shown in FIG. 34B. The "old field" data from the storage array (on lines CRD0- 7) is replaced with the "new bits" from the register M5 whenever the change bits from register P5 are binary "1"s by the multiplexers in FIG. 34B. The purpose of the flip flop K8 in FIG. 34C (which is located next to FIG. 48B) is to enable the new tag data on to the WDB0-7 lines. The inputs (and their descriptions) to the portion of the tag module 324 shown in FIGS. 34A, 34B, and 34C are included in the following list.

| LIST #13 | |
|---|---|
| | Description |
| Input | |
| TGREP/ | (Tag Replacement Field) Loads Register M5 (FIG. 34A) |
| TRNOT/ | (Transfer Out) Pulse for loading the above. |
| TAGFG | (Tag Flag) See List #12 |
| DS2 | (Data Strobe #2) |
| Output | |
| DRTAG/ | (Drive Tag) Enables data on to the WDB0-7 lines |
| WDB0-7 | Write data bus. |

Figure 35A:
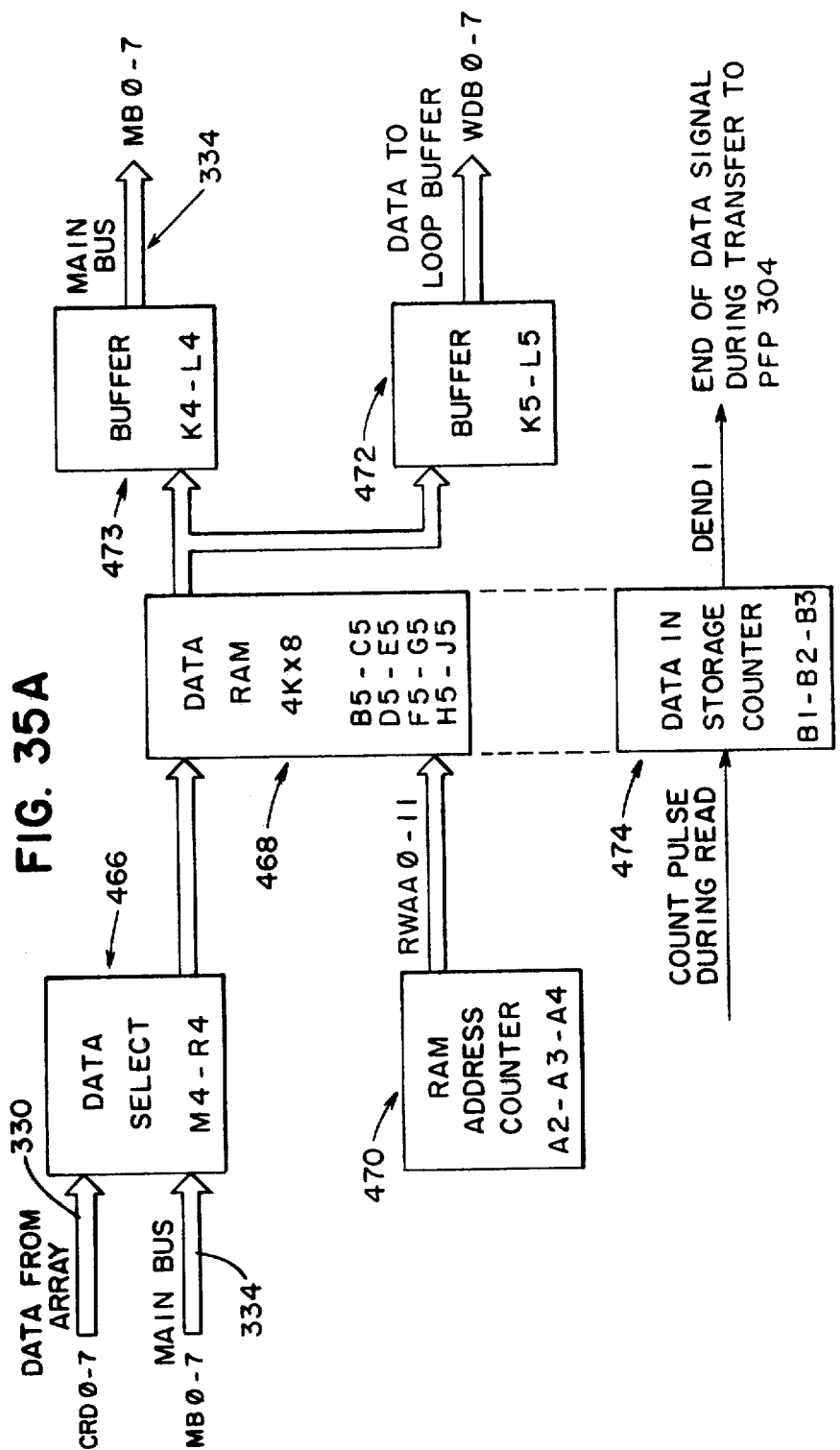
FIGS. 35A and 35B show more details of the read/write module shown in FIG. 3.
Figure 35B:
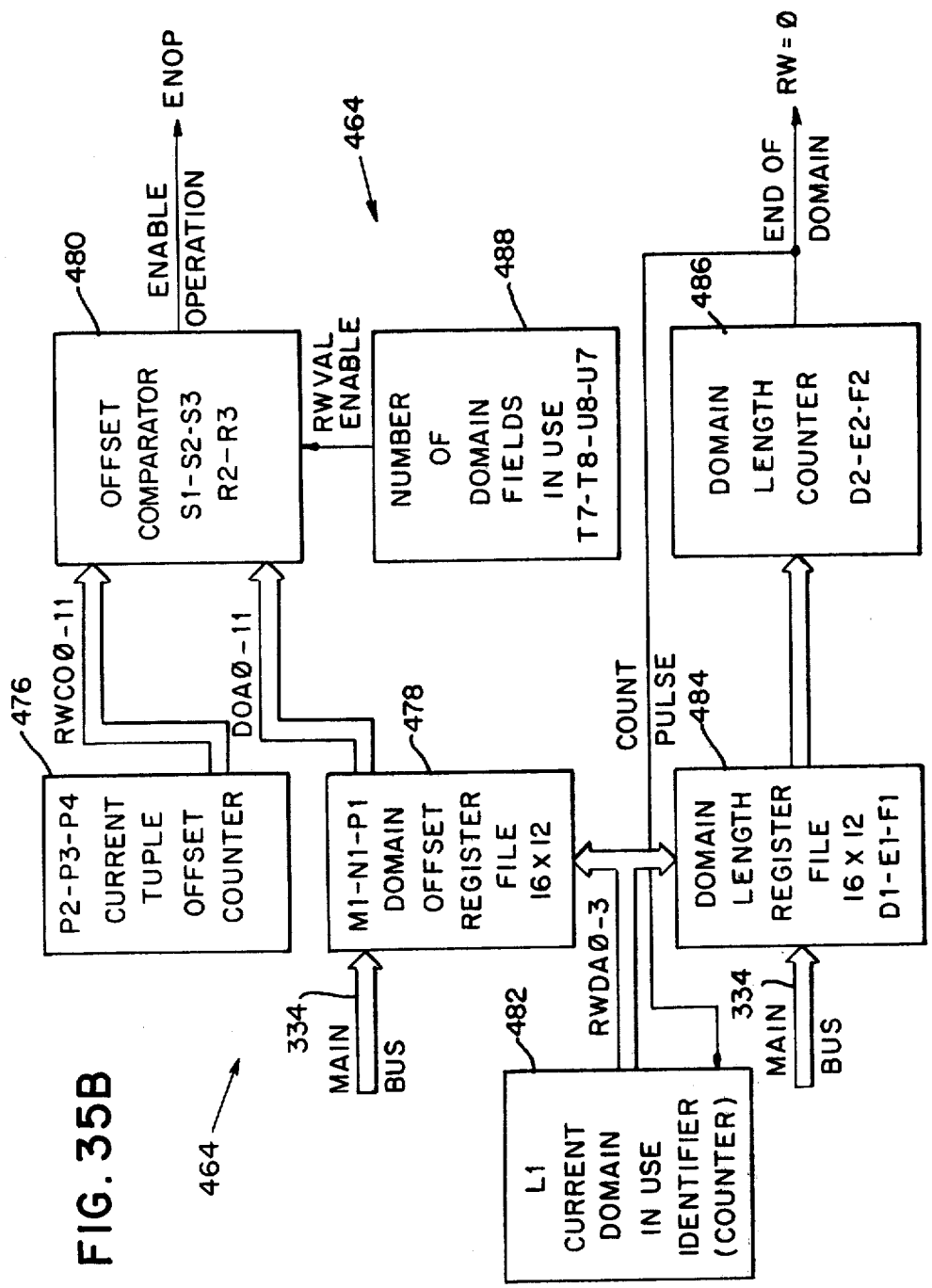

The read/write module 326 (FIG. 3) included in the ADC 306 is shown in more detail in FIGS. 35A and 35B. The general purpose of module 326 is to temporarily hold all data as it is put into and retrieved from the storage array 310. Some of the other features of this module 326 are:

(1) It allows the external data transfer rate to the PFP 304 to be different from the access rate from the storage array 310.

(2) It selects only the domains of interest in a read operation.

(3) It writes into selected domains of interest in a write operation.

(4) It maintains a count of the number of bytes of data placed at the data RAM during a read operation; this information is used to terminate a data transfer to the PFP 304.

The read/write module 326 has the ability to locate up to 16 individual domains within a tuple, and the location logic is similar to that employed for the same function associated with the qualify module 322. In general, the current tuple offset is compared to the desired tuple offset to determine the start of a domain as previously explained. The length of the domain is known and is kept track of by loading and thereafter decrementing a count. A register also contains the number of domains in use so that invalid offsets and lengths are not used.

The read/write module 326 (FIG. 3) is shown in more detail in FIGS. 35A and 35B. The domain location circuitry 464 shown in FIG. 35B is similar to the domain location circuitry already described in relation to the qualify module 322 shown in FIGS. 14A and 14B. The function performed by the domain location circuitry 464 is common to the read/write module 326, the qualify module 322, and the min/max module 320 already described; this function is not needed in the tag module 324 because the tag byte is located in the last domain in a tuple as already discussed in relation to FIG. 32.

As started earlier herein, the basic function of the read/write module 326 is to take data via an ADC like 306 (FIG. 1) and place it in the storage array 310, and also, to take data from the array 310 and pass it through the ADC like 306 and return it to a user of the system 300. For example, if data is to be retrieved from the storage array 310, a data select circuit 466 (FIG. 35A) provides the selection of the desired domains via the main bus 334, and the data from the storage array 310 passes therethrough via the bus 330. If several domains are to be retrieved, they would be stored in a data RAM 468 and transferred on the main bus 334 to the user of the system 300. The data is temporarily stored in the RAM 468 because of the fact that data is available to the ADC like 306 in a sequential manner. In other words, the data that one wanted to read out may be available before one is aware of the fact that the tuple being read contains the data desired to be read; it is possible that the qualifying is done on a last domain within a tuple and the desired domain to be read is actually the first domain within the tuple. A cursory look at the general arrangement of the domains within the tuples shown in FIG. 4 should make this more readily understandable. A RAM address counter 470 (FIG. 35A) provides addresses for the data RAM 468 during write and read operations.

When data is to be written into the storage array 310, the data comes from the main bus 334 (FIG. 35A) and passes through the data select 466 to the data RAM 468. During a scan (as will be later described herein in connection with the loop module 328 (in FIG. 3) when the correct tuple is found for the data insertion, the data to be written is transferred from the data RAM 468 through a buffer 472 to a loop buffer (associated with the loop control module 328) to the storage binary 310. Data which is read from the storage array 310 passes through the data RAM 468 and through the buffer 473 to the main bus 334. A data in storage counter 474 is used to simply keep track of the amount of data in the data RAM 468. In the embodiment described, the capacity of the RAM 468 is 4K bytes; consequently, during a read operation, the counter 474 keeps track of how many bytes of information have been transferred thereto and how many are to be transferred to the PFP 304 (FIG. 1).

There may be some question as to where the read/write module 326 writes into the storage array 310. It should be recalled from the discussion made earlier herein with regard to the tag module 324 that some of the tuples within a relation will have valid data in them and some will be marked deleted. An insert of data by the read/write module 326 can occur only in a deleted tuple space. Also, deleted tuples can occur anywhere in the storage array 310 within the pertinent relation. While it doesn't matter which deleted tuple gets filled with data to be written in, it is important that this data have the same format or organization of the domains within a tuple. For example, if a name field or domain within a tuple (see FIG. 4) is four bytes long, the name to be inserted would also have to be arranged in this same format. During a write operation there are three operations which occur simultaneously, namely:

(1) The tag module 324 would be used to select a tuple (with a deleted tag bit) which is to receive the data to be written.

(2) The new data to be inserted would be present in the read/write module 326.

(3) The tag module 324 would be used to modify the deleted bit to a true bit for a tuple to indicate that true data is inserted therein.

FIG. 35B contains the domain location circuitry 464 alluded to earlier herein; this circuitry is similar in function to that already discussed in relation to the qualify module 322. The domain location circuitry 464 includes a current tuple offset counter 476, a domain offset register file 478 which receives data from the main bus 334 and bus 332, an offset comparator 480, a current domain in use identifier counter 482, a domain length register file 484 which receives data from the main bus 334 and bus 332, a domain length counter 486, and a number of domain fields in use counter 488.

The general operation of the domain location circuitry 464 shown in FIG. 35B is as follows. The basic function of the domain location circuitry 464 (FIG. 35B) is to enable and disable the operation of the read/write module 326 based on whenever the domain one is interested in is currently available on the data bus. It has a domain level off-on switch. The "on" condition is signified by ENOP Enable Operation; this is the signal which starts the read/write module 326 when the first byte of the domain is found. $RW = \emptyset$ is the ending signal; this means that the last byte of the domain has been read. There may be more than one domain per tuple which is of interest. This is the function of the current domain in use identifier counter 482. The offsets and the lengths of the domains that one is going to look at are stored in the domain offset register file 478 and the domain length register file 484, respectively. The count or number in the current domain in use counter 482 provides an address to select a pair of these values sequentially so that one can look at many domains within a tuple. Initially, to start the location operation, there must be a match between the delay offset register file 478 and the current tuple offset counter 476. As data bytes come into the ADCs like 306 from the storage array 310, the tuple offset counter 476 increments for each byte which comes in. Eventually, one should get a match between the domain offset register file 478 and the tuple offset counter 476. This match is found by the offset comparator 480, and the ENOP signal is made true at this time when the match occurs if there is a signal RWVAL (Read Write Valid Enable) coming from block 488. This indicates that the number which got an address match in the domain offset register file 478 was actually a valid offset address and not just a number which was left around in this register file 478 from the last time the ADC was used. From the time that the ENOP signal goes true, the read/write module 326 is enabled, and the length of the domain is loaded from the domain length register file 484 into the domain length counter 486. As each additional byte comes into the ADC's, the associated domain length counter 486 is incremented along with the tuple offset counter 476 and eventually, this domain length count will go to zero which is the condition which generates the end of domain signal RW=0.

Figure 36A:
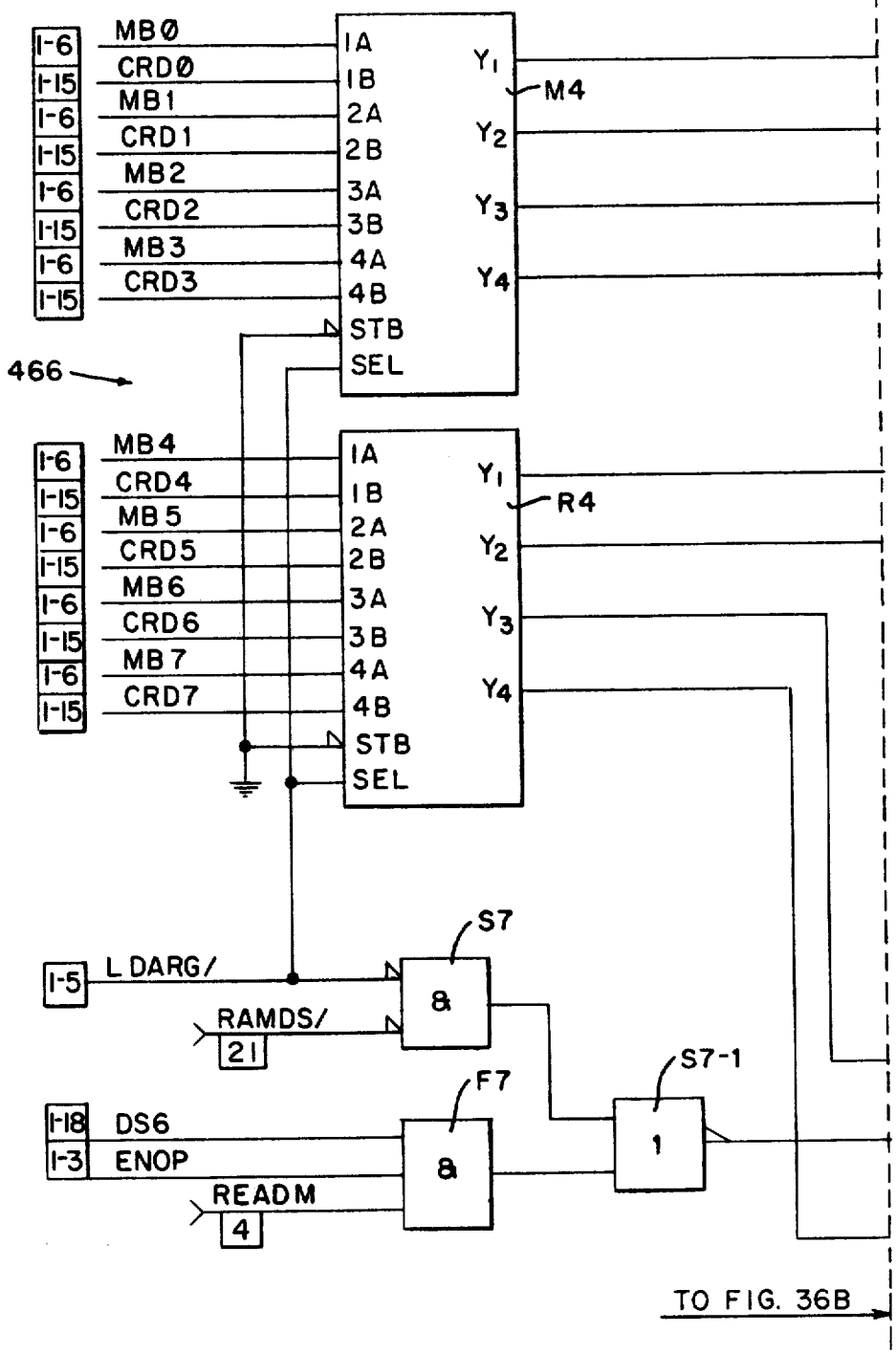
FIGS. 36A, 36B, 36C, 37A, 37B, and 37C show more details of a portion of the read/write module shown in FIG. 35A.
Figure 36B:
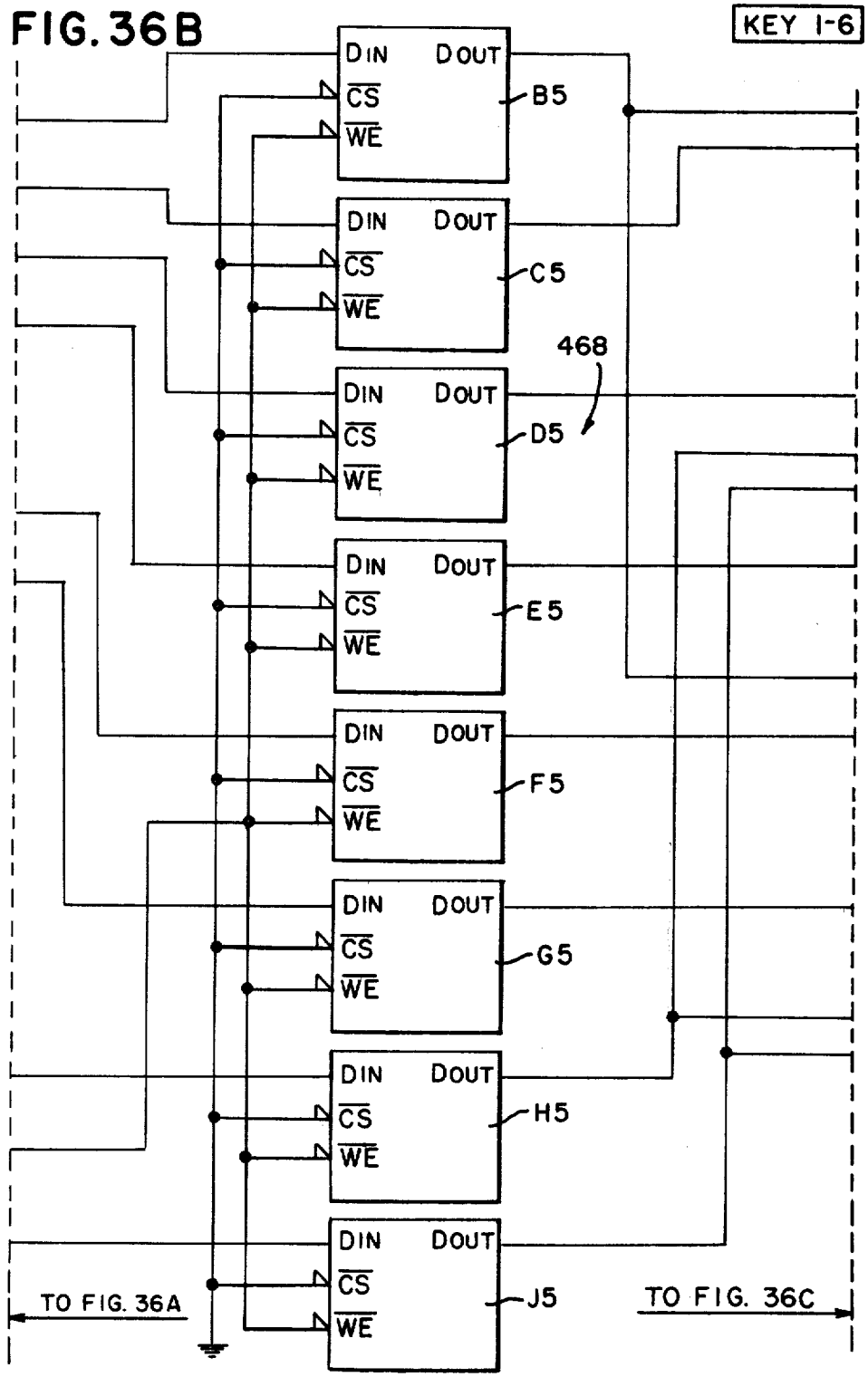

FIGS. 36A, 36B, 36C, 37A, 37B, and 37C show more details of the portion of the read/write module 326 which is shown in block form in FIGS. 35A and 35B. The data select 466 (FIG. 35A) includes the multiplexers M4 and R4 shown in FIG. 36A. The multiplexers M4 and R4 are conventional IC circuits such as #LS157 which are manufactured by Texas Instruments, for example, and their outputs are fed into a conventional data RAM 468 which is comprised of conventional memory units B5, C5, D5, E5, F5, G5, H5 and J5 which are shown in FIG. 36B. Each one of these units like B5, is a conventional IC chip such as #2147 which is manufactured by Intel. As shown, the RAM 468 is wired to provide 4K of 8 bit bytes of memory space. The eight bits of each byte of output from the data RAM 468 are routed to the buffers 472 and 473. Buffer 472 is comprised of conventional buffer chips K5 and L5 (FIG. 36C) such as #74LS367 which are manufactured by Texas Instruments. Buffer 473 is comprised of buffer chips K4 and L4 (FIG. 36C) and is identical to buffer 472. During a read operation, a DRVB1/ signal to the buffer 473 is used to transfer the data read to the main bus lines MB0-MB7, and during a write operation, a DF1/ signal is used to transfer data from the buffer 472 to a loop buffer associated with loop control module 328 (FIG. 3) via the WDB0-7 data lines. The following List #14 contains the inputs and outputs (and a description thereof) associated with the portion of the read/write module 326 shown in FIGS. 36A, 36B, and 36C.

LIST #14
Description

| Input | |
|---|---|
| RWAA0-11 | (Read/Write Address Lines) for R/W buffer 468. |
| RAMDS/ | (RAM Data Strobe) Indicates data is being loaded into R/W buffer 468. |
| LDARG/ | (Load Argument) Selects Main Bus as a data source for R/W buffer 468. |
| DS6 | (Data Strobe #6) |
| ENOP | (Enable Operation) for Read/Write module 326. |
| MB0-7 | (Main bus) |
| CRD0-7 | (Current Read Data) Bus from storage array 310 |
| DRVB1/ | (Drive Bus #1) Read out of buffer 468 to PFP 304. |
| DFI/ | (Data For Insert) Read out of buffer 468 to the loop buffer 490. |
| READM | (Read array mode) Level indicating a Read is taking place. |
| Outputs | |
| MB0-7 | (Main Bus) |
| WDB0-7 | (Write Data Bus) Bus to loop control module 328 |

Figure 37A:
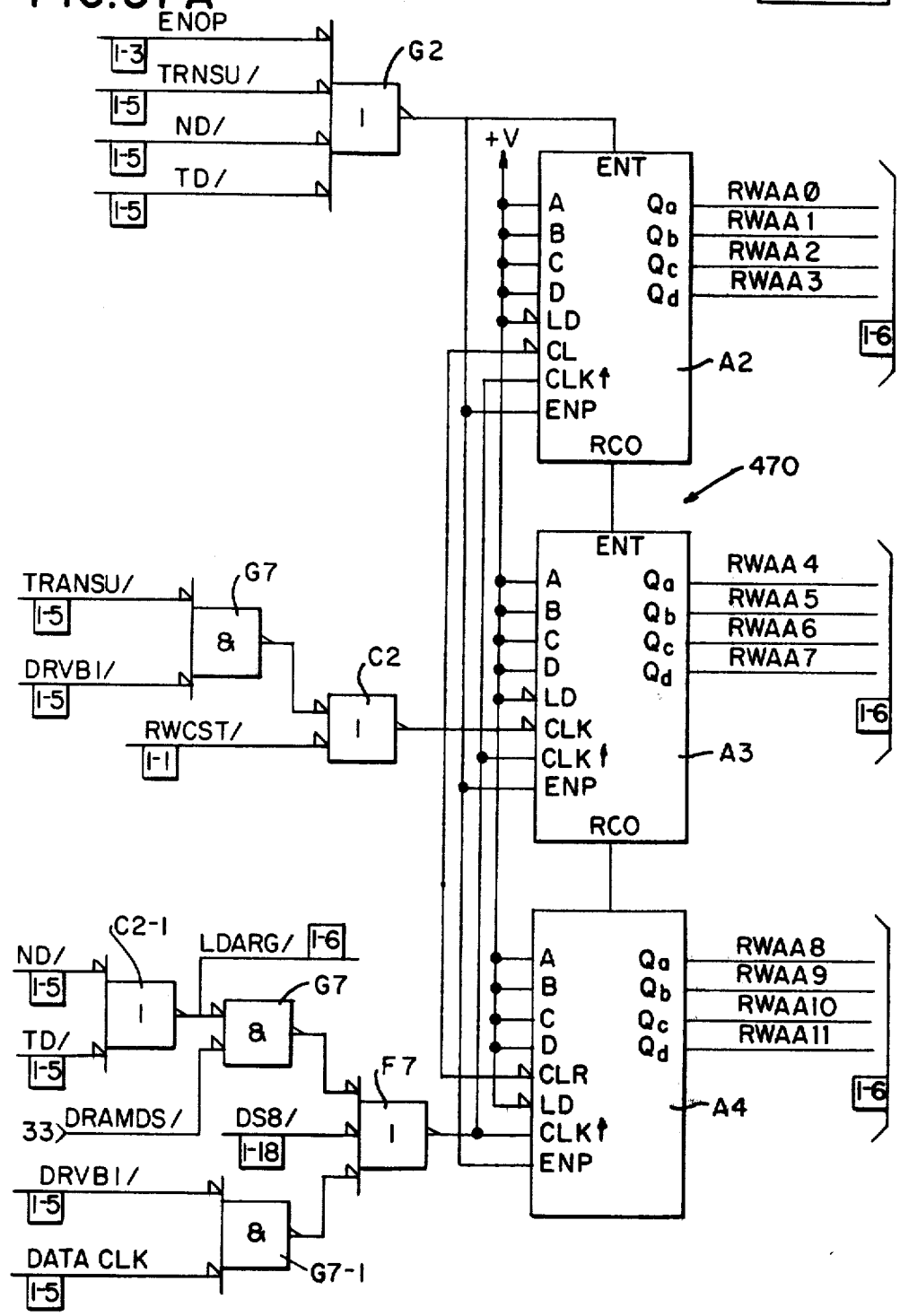
Figure 37B:
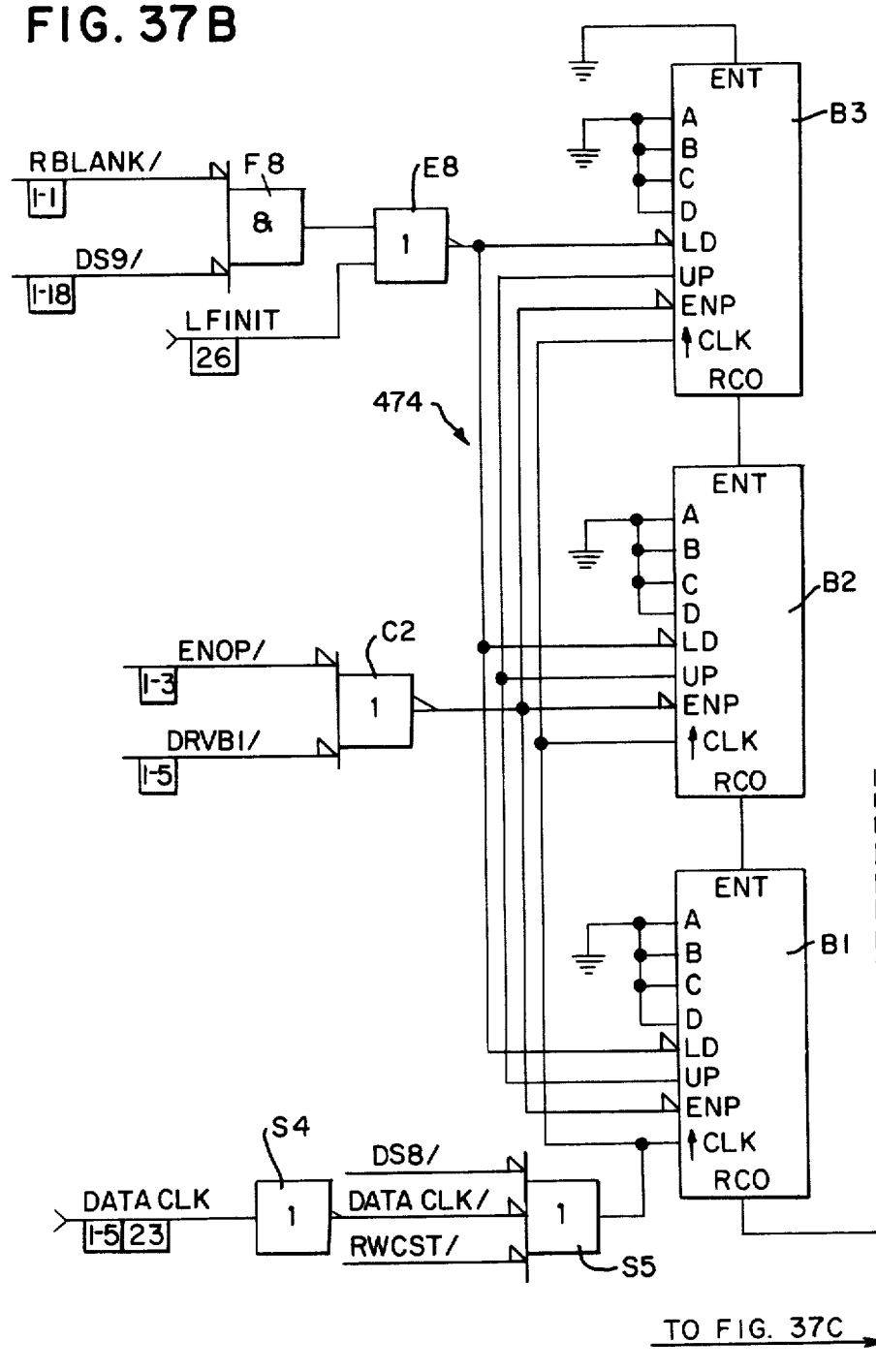
Figure 37D:
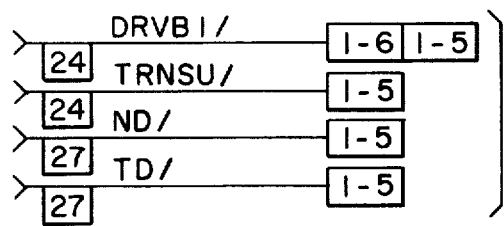
Figure 37C:
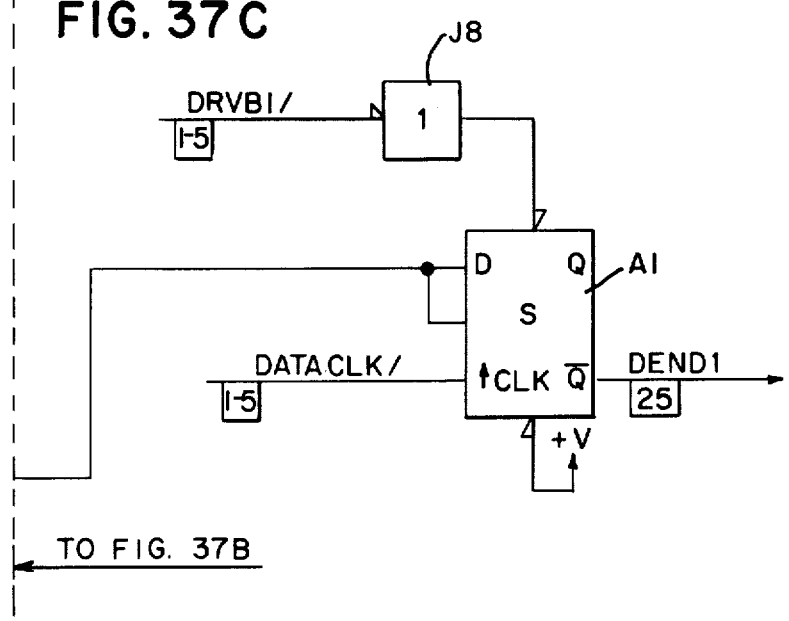
Figure 38A:
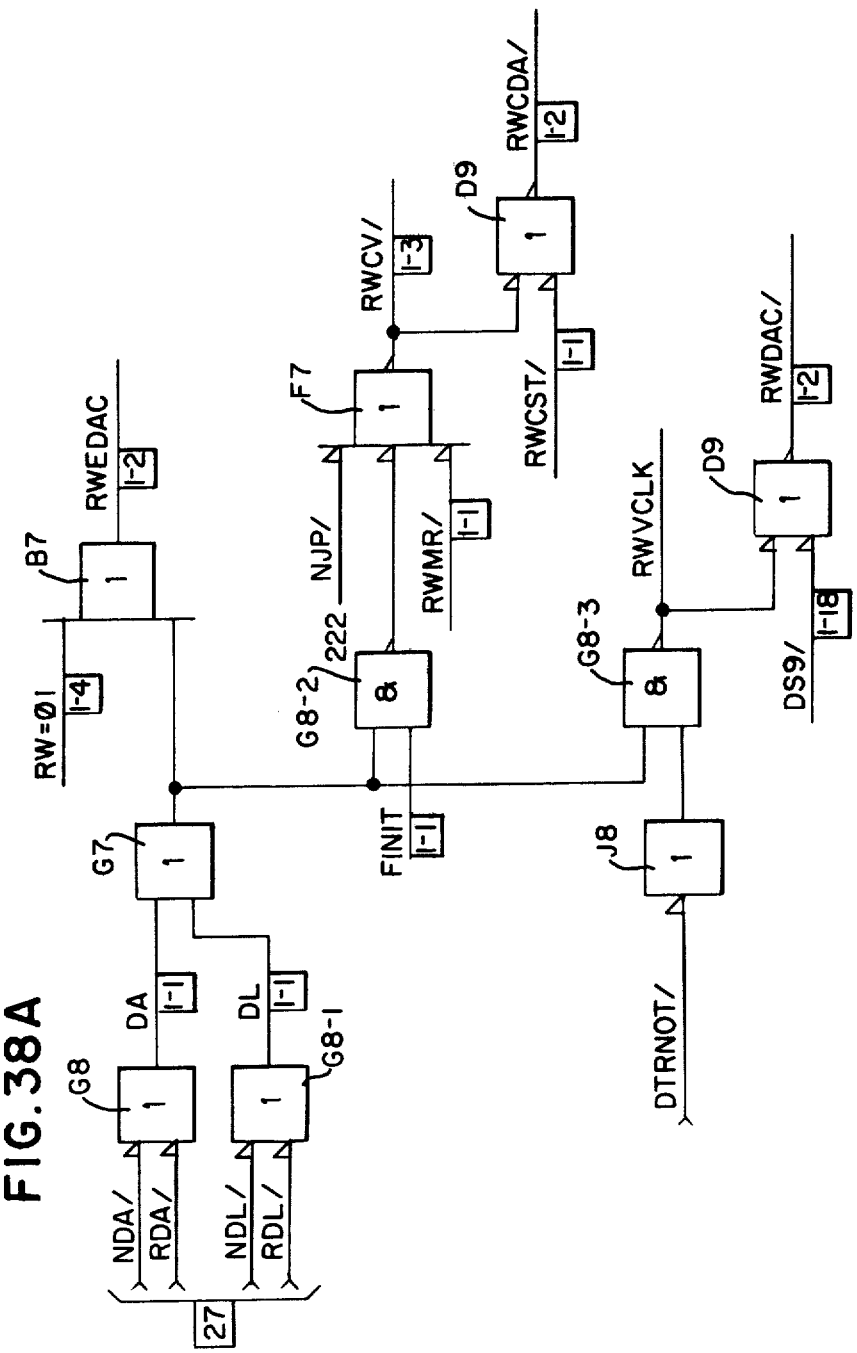
FIGS. 38A, 38B, 38C, 38D, and 38E show additional details of a portion of the read/write module shown only generally in FIG. 3.
Figure 38B:
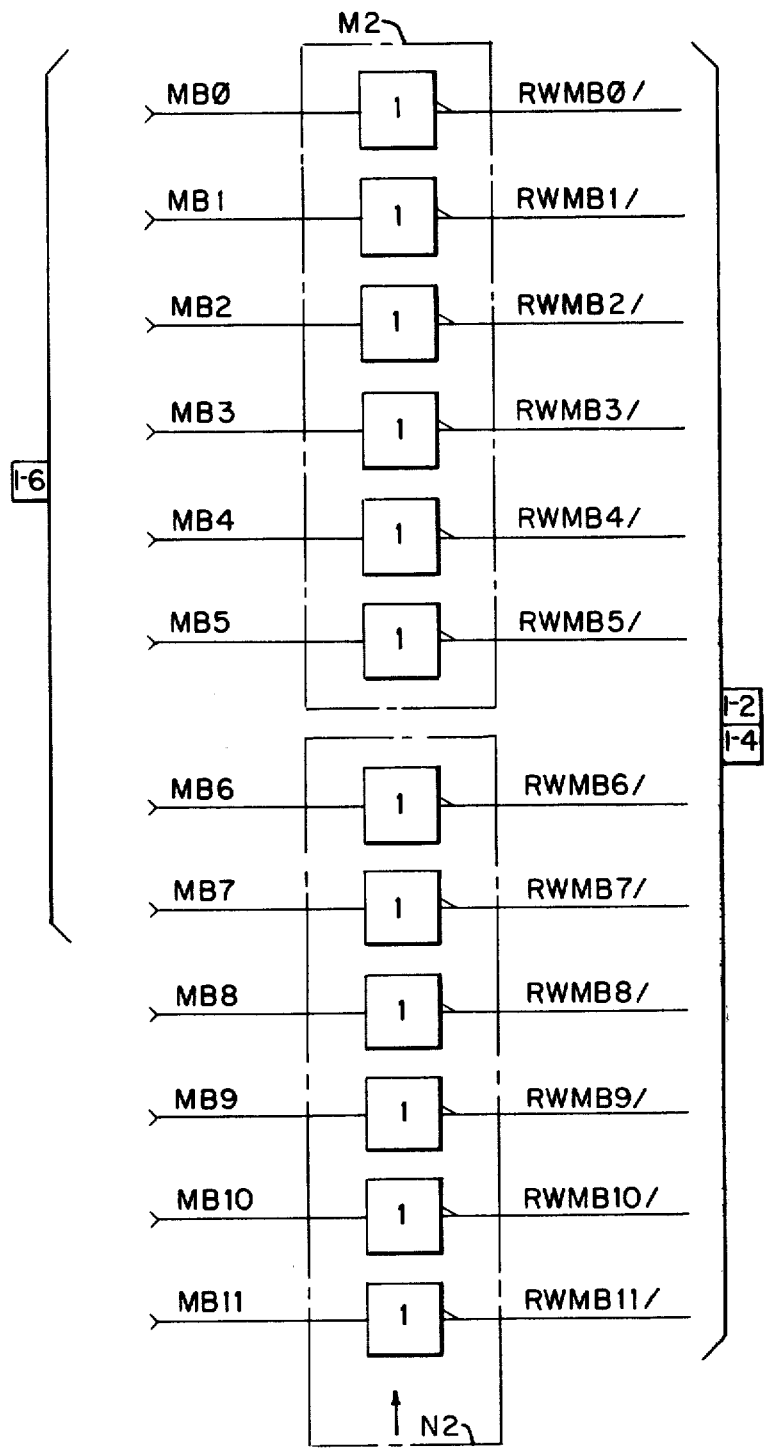
Figure 38C:
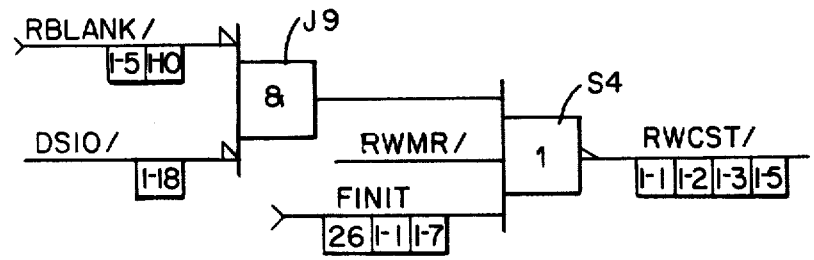
Figure 38E:
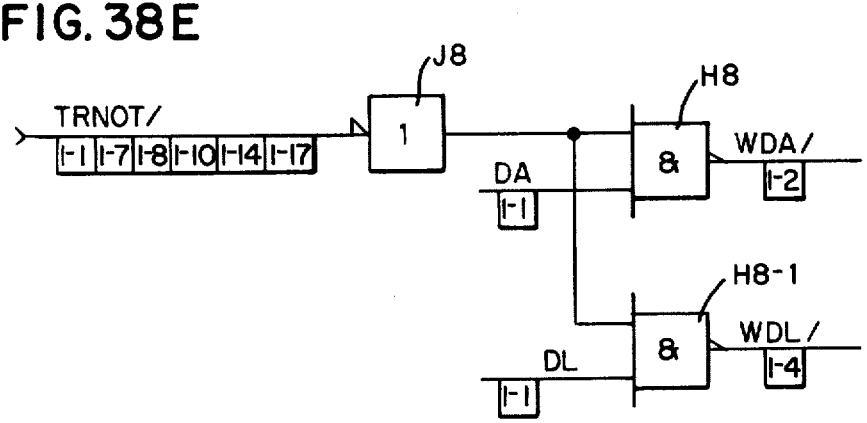
Figure 38D:
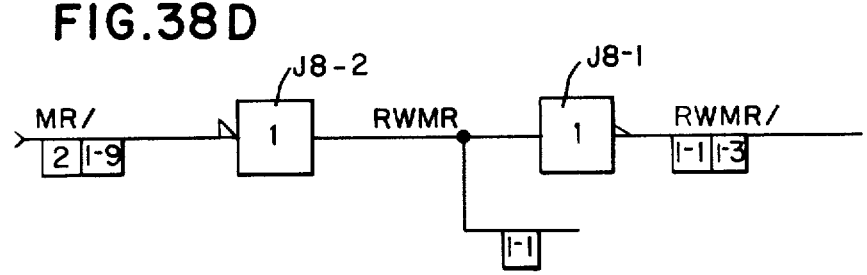

The data in storage counter 474 (FIG. 35A) is shown in more detail in FIG. 37B, and is comprised of counters B1, B2, and B3, each of which is a conventional counter such as #74LS169 which is manufactured by Texas Instruments. The counter B1 (FIG. 37B) has associated therewith the inverter J8 and the flip flop A1 (FIG. 37C) which are interconnected as shown to produce the end of data signal (DEND1) which is transferred to the PFP 304 (FIG. 1). The RAM address counter 470 (FIG. 35A) is comprised of conventional counter units A2, A3, and A4 which are interconnected as shown in FIG. 37A. Each of the counter units, like A2, is a conventional IC chip such as #74LS161 which is manufactured by Texas Instruments. The various conventional gates such as G2, G7, C2, C2-1, G7, G7-1 and F7 shown in FIG. 37A and the gates F8, E8, C2 and the inverter S4 (FIG. 37B) are interconnected as shown. The various inputs and outputs (and their descriptions) to the portion of the read/write module 326 shown in FIGS. 37A, 37B, and 37C are shown in the following List #15.

LIST #15

| Input | Description |
|---|---|
| ENOP/ | (Enable Operation) |
| DRVB1/ | (Drive main bus 334) |

LIST #15 (continued)

| Input | Description |
|---|---|
| ND/ | (New Data Load) |
| TD/ | (Tuple Data Load) |
| DFI/ | (Data for Insert) |
| TRNSU/ | (Transfer Set Up Pulse) |
| RAMDS/ | (RAM Data Strobe) to RAM 468. |
| DS8/ | (Data Strobe #8) |
| DATACLK | (Data Clock) It is a count pulse for the data in storage. |
| RBLANK | (Read Blank) See List #11. |
| DS9/ | (Data Strobe #9) |
| LFINIT | (Leading Function Initialize) Clears data in storage counter 474. |
| DRAMDS/ | (Delayed RAMDS/) |
| RWCST/ | (Read/Write Module Clear For Start of Tuple) Similar in function to CST/ except it is for the read/write module 326. |
| RWAA0-11 | (Read/Write Address Lines) |
| LDARG/ | (Load Argument) |
| DEND1 | (End of Data) in R/W buffer 468. |

FIGS. 38A, 38B, 38C, 38D, and 38E show logic circuitry which is used to develop certain input and output signals associated with the read/write module 326. The circuitry includes conventional gates such as J9 and S4 shown in FIG. 38C, gates G8, G8-1, G7, G8-2, J8, G8-3, B7, F7, and D9 shown in FIG. 38A, gates J8, H8, and H8-1 shown in FIG. 38E, and inverters J8-1 and J8-2 shown in FIG. 38D which are interconnected as shown to produce the outputs shown. Conventional inverter units shown collectively as M2 and N2 (FIG. 38B) are used to invert the signals on the main data bus MB0-11 to the RWMB0/-RWMB11/ shown therein. The following List #16 contains a list of the input and output signals shown in FIGS. 38A through 38E along with descriptions thereof.

LIST #16
Description

| Inputs | |
|---|---|
| RBLANK | (Read Blank) See List #11 |
| DS10/ | (Data Strobe #10) |
| MR/ | (Master Reset) |
| FINIT | (Function Initialize) See List #11 |
| NDA/ | (New Domain Address) Indicates new domain offset addresses are being loaded. |
| RDL/ | (Read Domain Length) Similar to above except for domain length. |
| DTRNOT/ | (Delayed Transfer Out) See List #4 for TRNOT/ |
| RW=0 | (Read/Write=0) Means the end of a domain in the read/write module 326. |
| DS9/ | (Data Strobe #9) |
| TRNOT/ | (See Above) and List #4. |
| MB0-11 | (Main Bus Lines) |
| NJP/ | (New Job Pulse) See List #10 |
| Outputs | |
| RWCST/ | (Read/Write Module Clear for Start of Tuple) See List #15 |
| RWEDAC | (Read/Write Module Enable Domain Address Counter) Similar to EDAC in List #10. |
| RWCV/ | (Read/Write Module Clear Valid Register) |
| RWVCLK | (Read/Write Valid Clock) for registers T8 and T7. |
| RWDAC/ | (Read/Write Domain Address Counter) Increments logic to |

-continued

| | LIST #16 |
|---|---|
| | Description |
| | next domain to read. |
| WDA/ | (Write Domain Address) |
| WDL/ | (Write Domain Length) |
| RWMB∅-11/ | (Read/Write Main Bus) |
| RWMR | (Read/Write Master Reset) for module 326. |
| RWMR/ | Complement for above. |

Figure 39A:
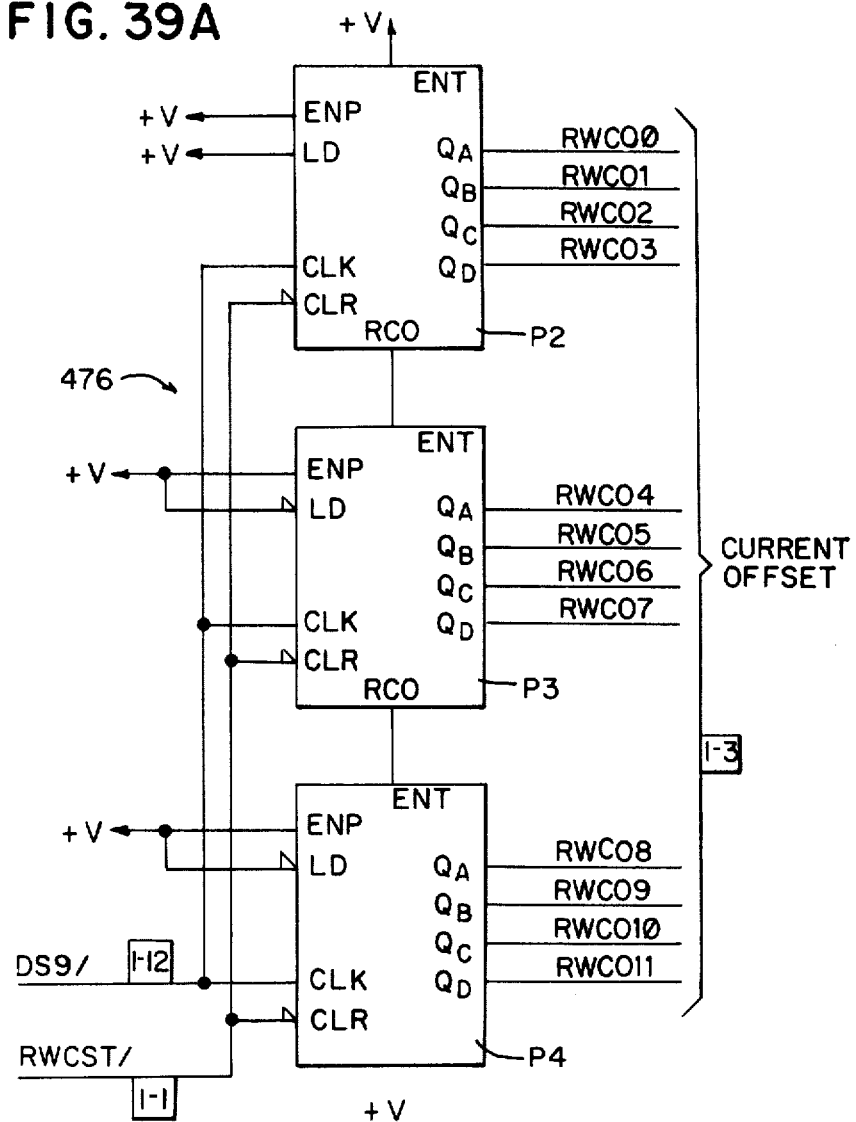
FIGS. 39A, 39B, and 39C show additional details of a portion of the read/write module shown in FIG. 35B.
Figure 39C:
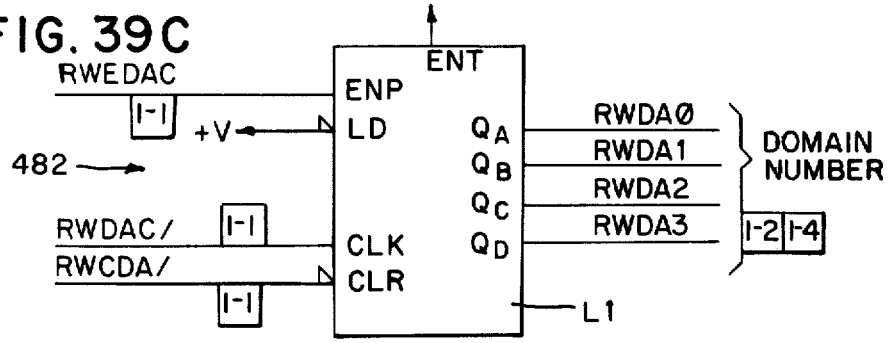
Figure 39B:
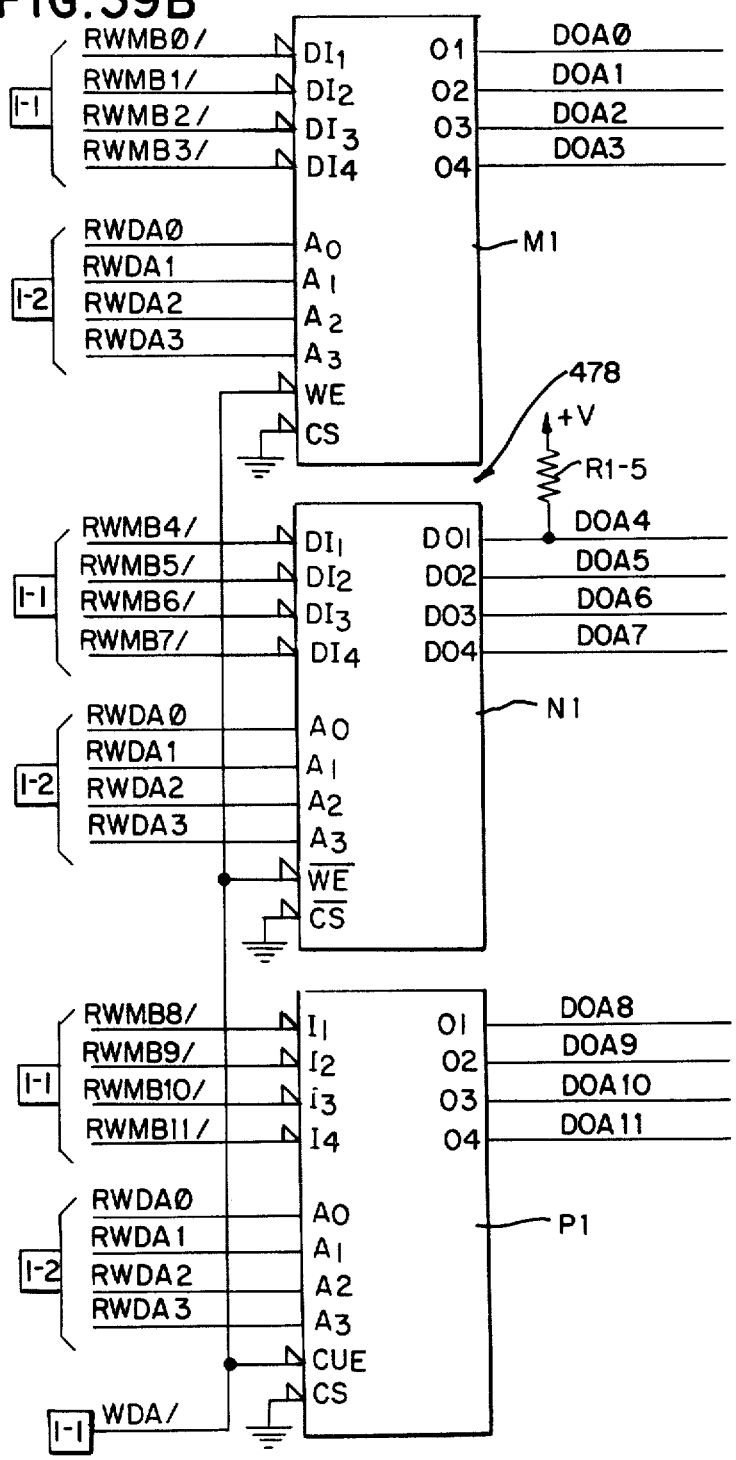

Continuing with a description of the read/write module 326, the current tuple offset counter 476 (FIG. 35B) is shown in more detail in FIG. 39A and includes conventional counter units P2, P3, and P4, each of which is a conventional counter such as #74LS161 which is manufactured by Texas Instruments, Inc. The current domain in use counter 482 (FIG. 35B) is also comprised of a counter L1 (FIG. 39C) which is identical to counter P4, for example. The domain offset register file 478 (FIG. 35B) is comprised of the R/W memories M1, N1, and P1 shown in FIG. 39B, with each one of these R/W memories being a conventional unit such as IC #7489 which is manufactured by Texas Instruments, Inc. The DOA∅-DOA11 outputs have pull-up resistors such as R1-5 associated therewith, and the outputs from the R/W memories M1, N1, and P1 are utilized by the offset comparator 480 (FIG. 35B). The descriptions of the various inputs and outputs shown in FIGS. 39A 39B and 39C are shown in the following list #17.

| | LIST #17 |
|---|---|
| | Description |
| Inputs | |
| DS9/ | (Data Strobe #9) |
| RWCST/ | (See List #15) |
| RWDAC/ | (See List #16) |
| RWCDA/ | (Read/Write Clear Domain Address) in counter L1. |
| WDA/ | (Write Domain Address) See List #16 |
| RWMB∅-11/ | (Read Write Main Bus) |
| Outputs | |
| RWC∅-11 | (Read/Write Current Offset) |
| DOA∅-11 | (Desired Offset Address) Indicates start domain address for desired data |
| RWDA∅-3 | (Read/Write Domain Address) |

Figure 40D:
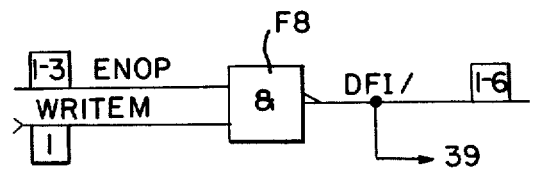
Figure 40B:
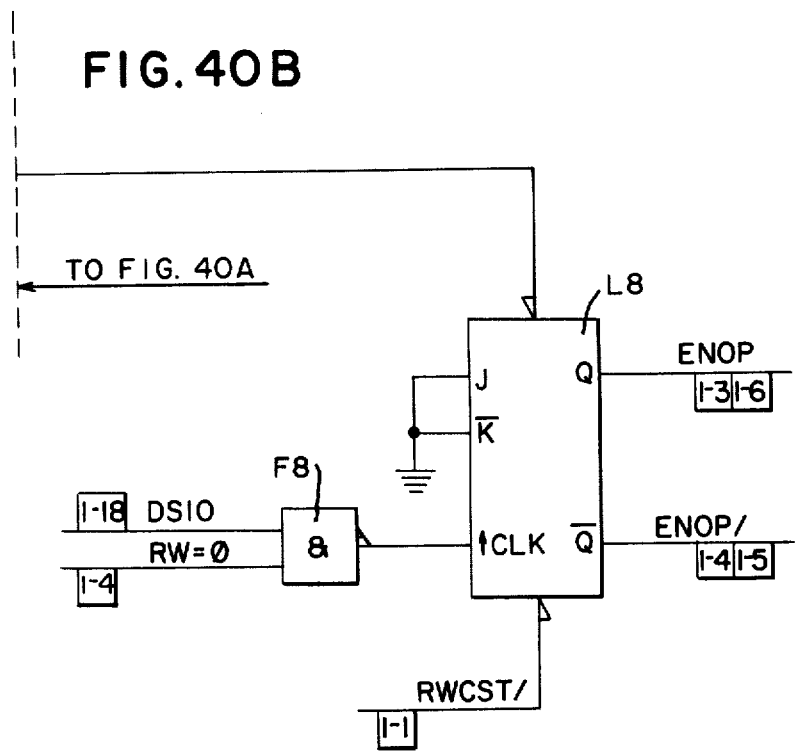
Figure 40C:
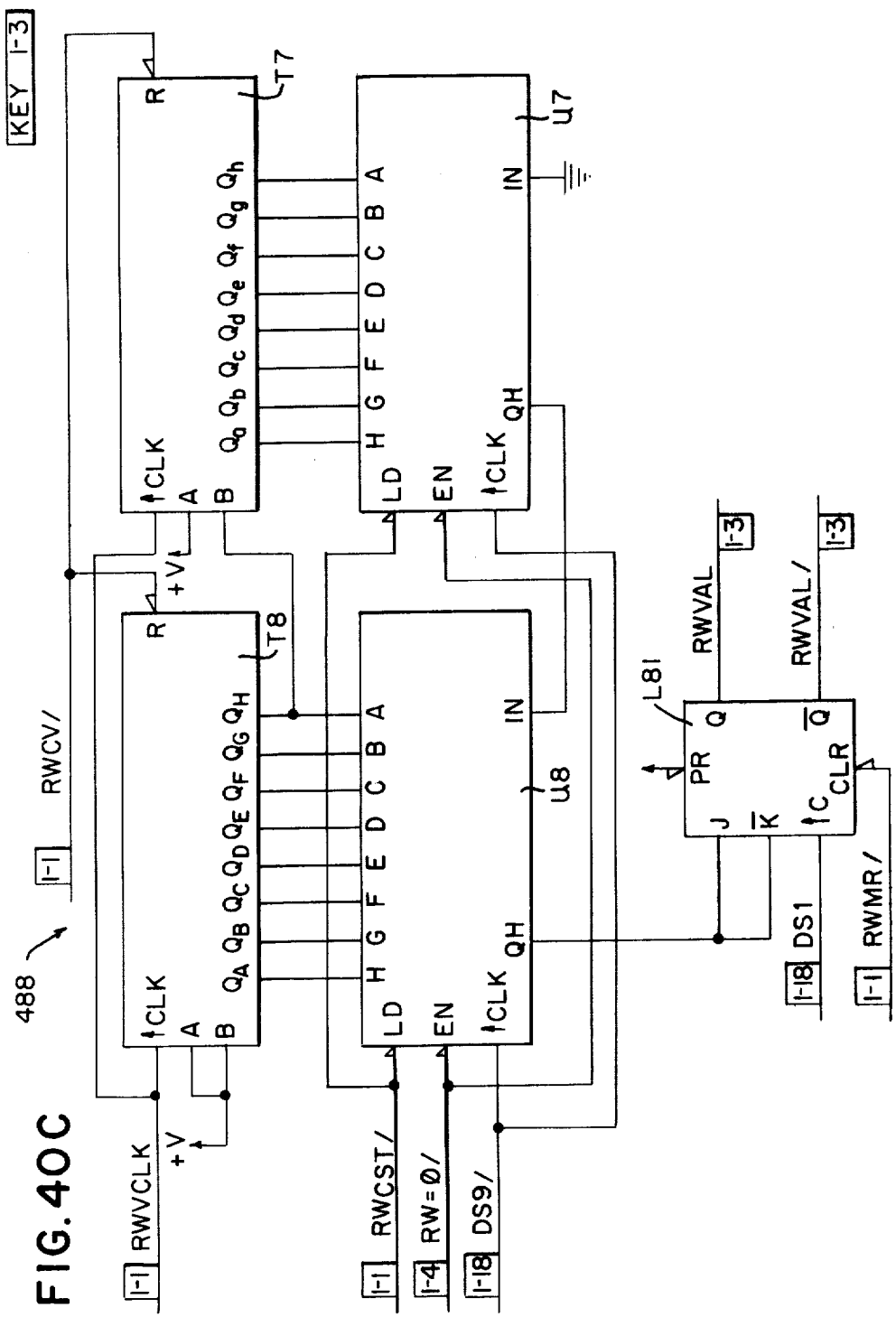

The offset comparator 480 (FIG. 35B) is comprised of the comparators S1, S2, and S3 shown in FIG. 40A; these comparators are conventional, such as IC chips #74S85 which are manufactured by Texas Instruments, Inc., for example. The outputs of the comparators S1, S2, and S3 (FIG. 40A) are fed through inverters R3, R3-1 and R3-2 to a 5 input NAND gate R2 to produce the RWSTRT output when the data on the RWC∅-11 lines equals the data on the DOA∅-11 lines. The output of the NAND gate R2 (FIG. 40A) is utilized to produce the EN∅P and ENOP/ signals coming from the outputs of a conventional flip flop L8 (FIG. 40B).

The number of domain fields in use 488 (FIG. 35B) is comprised of shift registers T7 and T8 (FIG. 40C) such as conventional shift registers #LS164 and shift registers U7 and U8 such as conventional shift registers #LS165, which both named registers are manufactured by Texas Instruments, Inc. The QH output from register U8 (FIG. 40C) is connected to the J and $\overline{K}$ inputs of a conventional flip flop L81 shown in FIG. 40C to produce the RWVAL output shown therein and in FIG. 35B. Descriptions of the various inputs and outputs shown in FIGS. 40A through 40D are shown in the following List #18.

| | LIST #18 |
|---|---|
| | Description |
| Inputs | |
| DOA∅-11 | (Desired Offset Address) See List #17 |
| RWCO∅-11 | See List #17 |
| DS3 | (Data Strobe #3) |
| DS10 | (Data Strobe #10) |
| RW=∅ | See List #16 |
| RWCST | See List #15 |
| WRITEM | (Write Mode) Indicates a write function from PFP 304 to storage array 310. |
| DSI | (Data Strobe #1) |
| RWMR/ | (Read/Write Master Reset) |
| RWCV/ | See List #16 |
| RWVCLK | See List #16 |
| RW=∅/ | (Read/Write=∅) It indicates the end of a domain. |
| DS9/ | (Data Strobe #9) |
| Outputs | |
| ENOP | See List #14 |
| ENOP/ | Complement of above. |
| DFI/ | See List #14 |
| RWVAL | (Read/Write Valid) It indicates the current domain offsets and lengths are usable. |
| RWSTRT | (Read/Write Start) It indicates that the current offset and the desired offset match. |

Figure 41A:
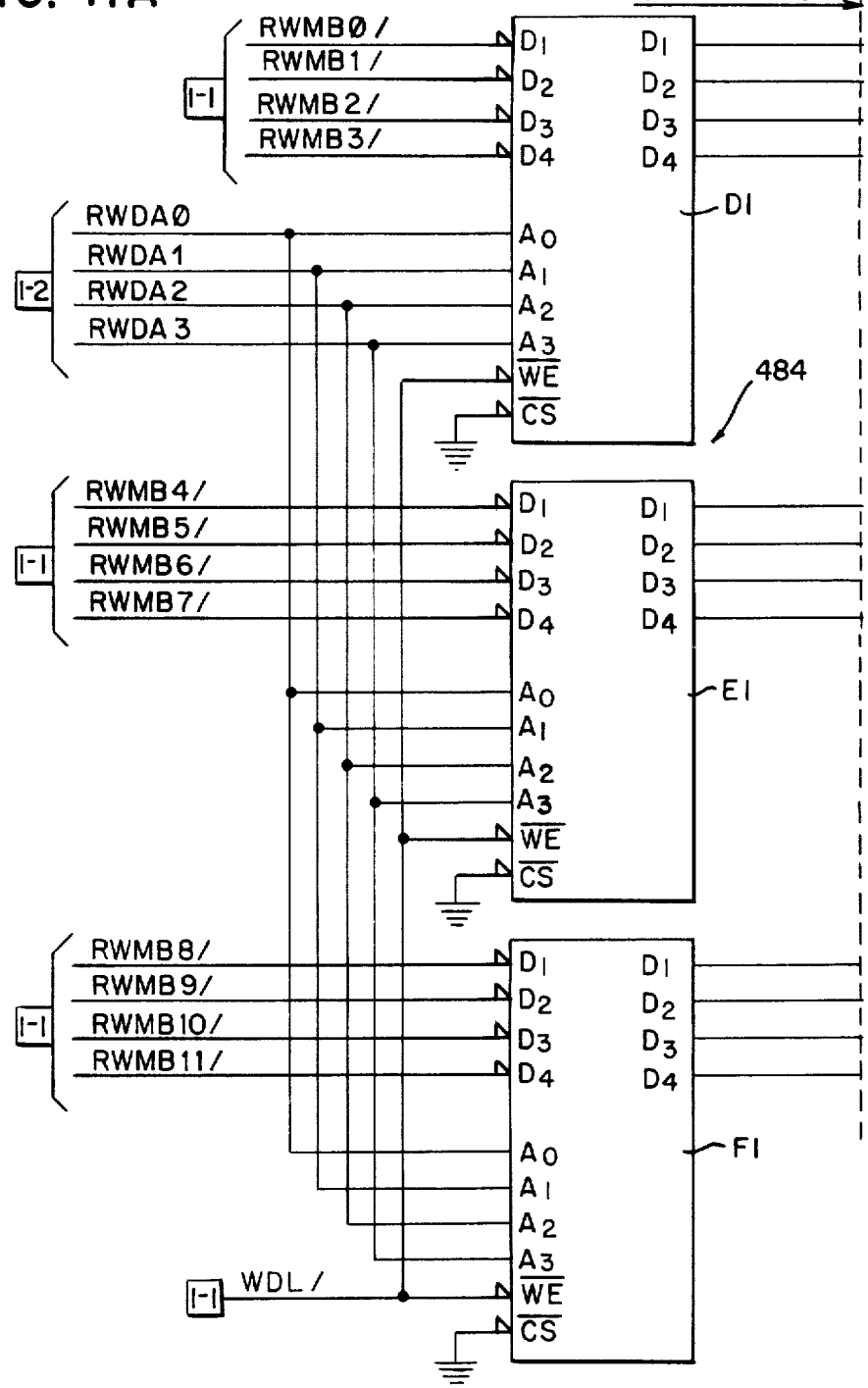
Figure 41B:
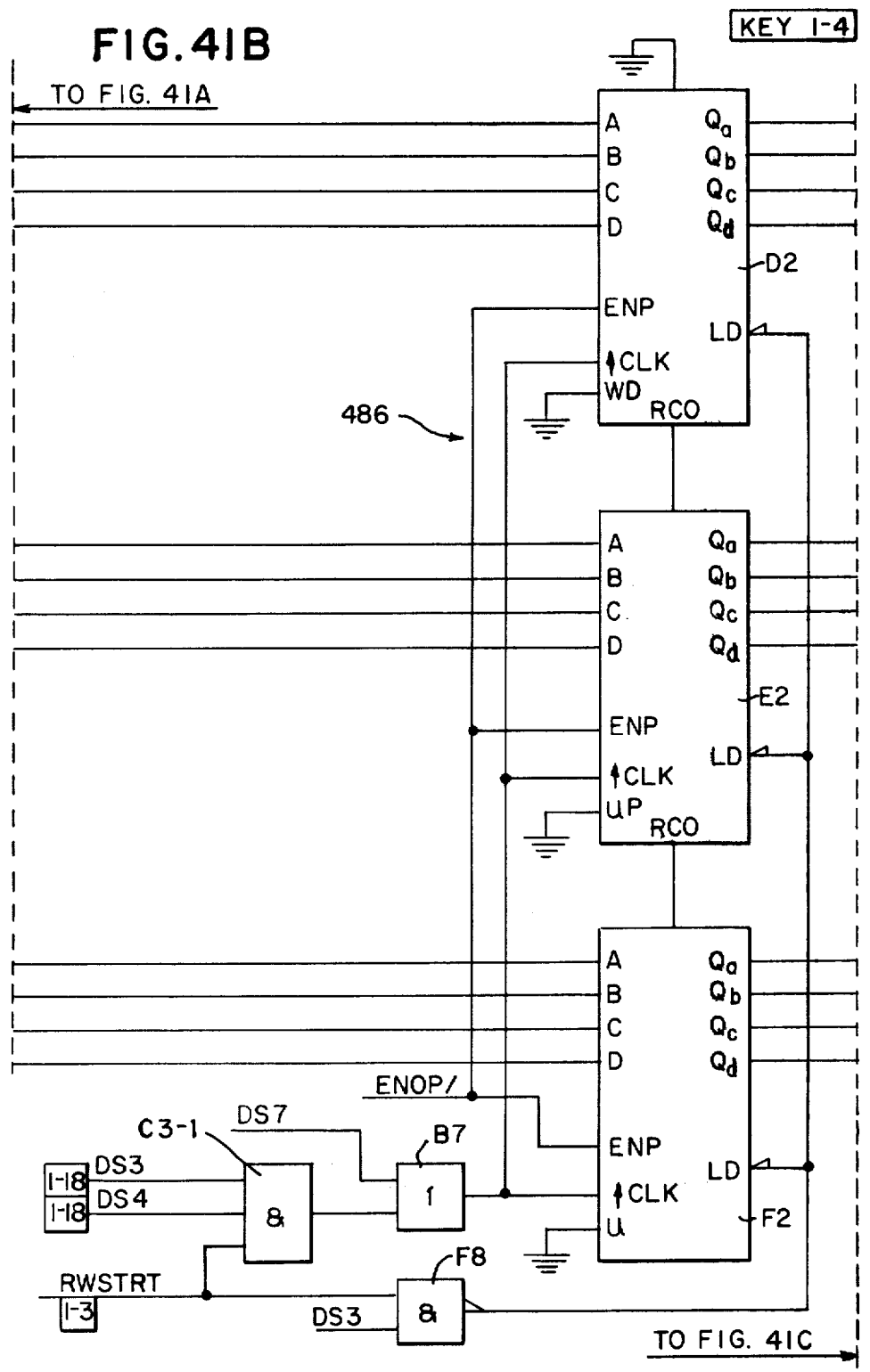

FIGS. 41A, 41B, and 41C show additional details of the domain length register file 484 and the domain length counter 486 shown in FIG. 35B. The file 484 is comprised of R/W memory units D1, E1, and F1 shown in FIG. 41A. The units such as D1, are conventional R/W memory units such as IC #7489 which are manufactured by Texas Instruments, Inc. and are connected to the main bus 334 as shown. The domain length counter 486 (FIG. 35B) is comprised of the counters D2, E2, and F2 shown in FIG. 41B; these counters are conventional, such as IC chips #LS169 which are also manufactured by Texas Instruments, Inc. The outputs of the counters D2, E2, and F2 are connected to the gates K1, D3, D3-1, M4 and C3 (FIG. 41C) to produce the end of domain signal RW=0 and the RW=0/ signal shown. Other logic circuitry in FIG. 41B includes the gates C3-1, B7, and F8 which receive the outputs shown and are connected to the counter 486 as shown. The descriptions of the various inputs and outputs shown in FIGS. 41A, 41B, and 41C are included in the following List #19.

| | LIST #19 |
|---|---|
| | Description |
| Inputs | |
| RWMBO-11 | (Read Write Main Bus) |
| RWDA∅-3 | (Read/Write Domain Address) |
| WDL/ | (Write Domain Length) Write into Read/Write module 326. |
| DS3 | (Data Strobe #3) |
| DS4 | (Data Strobe #4) |
| RWSTRT | (Read/Write Start) See List #18 |
| DS7 | (Data Strobe #7) |
| ENOP/ | (Enable Operation) See List #14 |
| Outputs | |
| RW=∅ | See List #16 |

-continued

LIST #19

| | Description |
|---|---|
| RW=0/ | See List #16 |

Figure 42A:
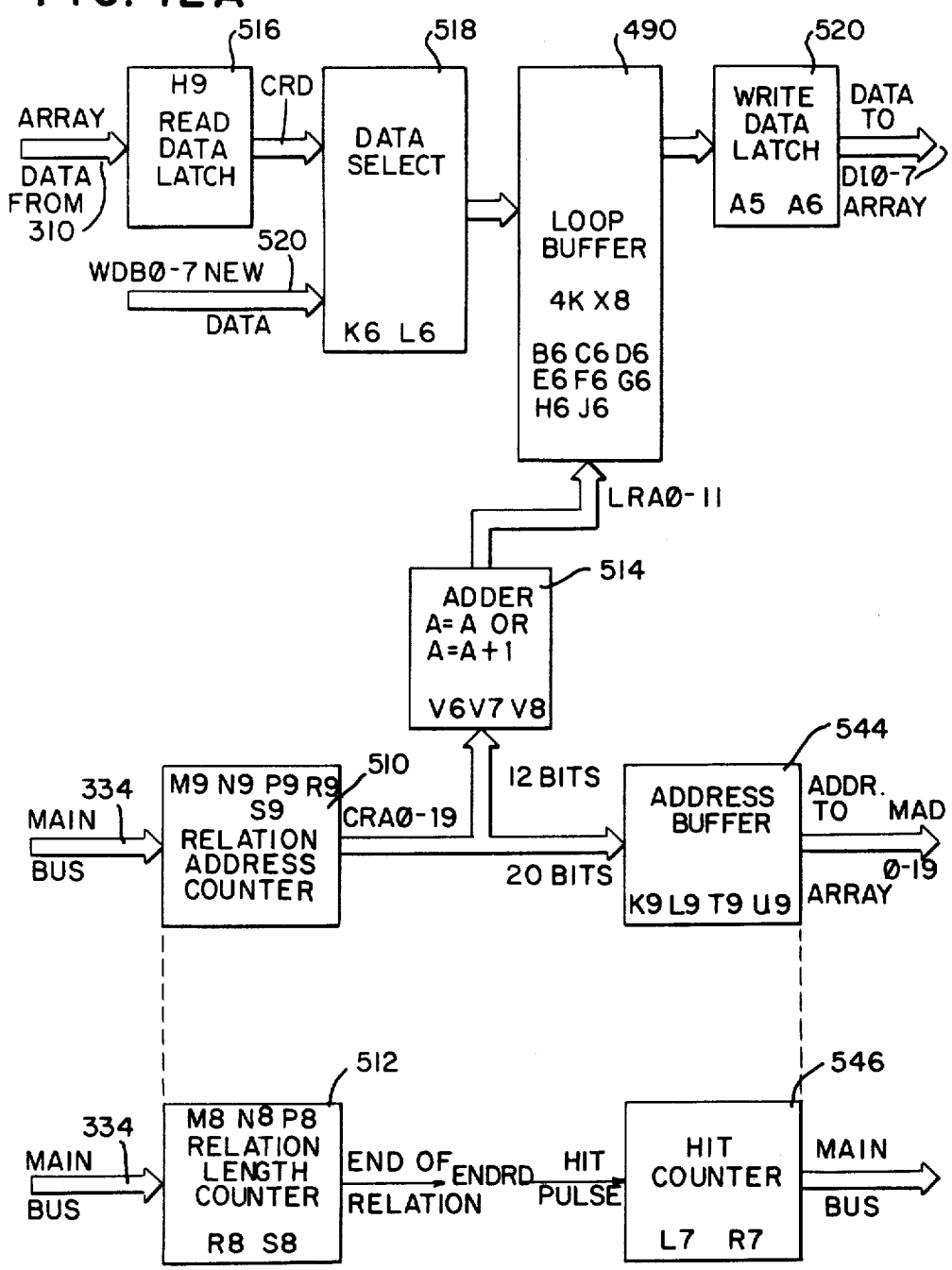
FIGS. 42A and 42B show more details of the loop control module shown in FIG. 3.
Figure 42B:
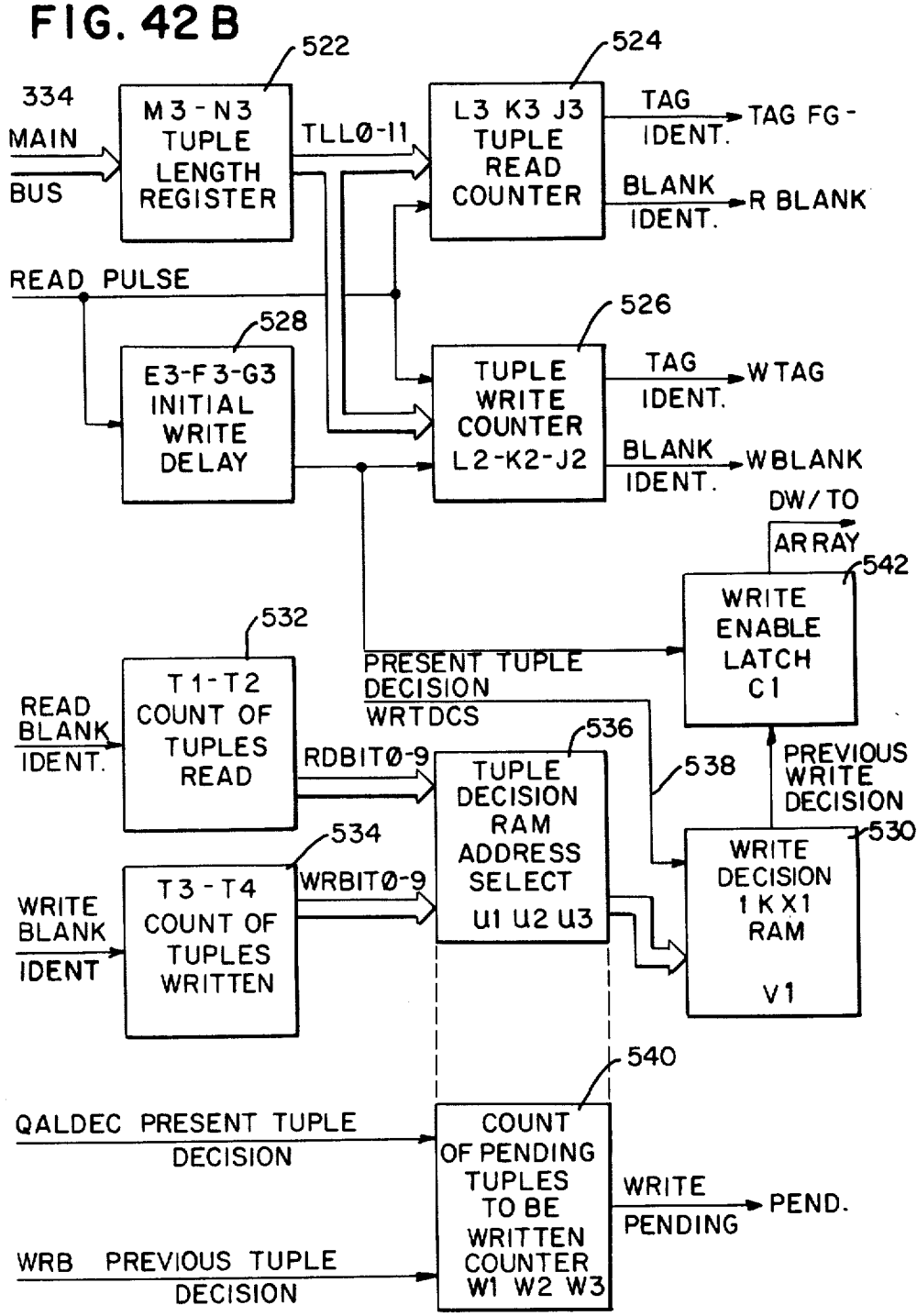

The loop control module 328 (FIG. 3) is shown in more detail in FIGS. 42A and 42B. Before discussing the details of the module 328, it appears appropriate to discuss the general functioning thereof. The min/max module 320 (FIG. 3), the qualify module 322, the tag module 324 and the read/write module 326 all receive data from the storage array 310 over the bus 330 at the same time; each one of the modules mentioned makes a decision as to whether or not it wants to do anything with the data. The loop control module 328 has a loop buffer 490 (FIG. 42A) included therein, and in the embodiment being described, it is a 4K byte buffer. There are two general reasons for having the loop buffer 490. The first is that the storage arrays 310 (to be later described herein) include charge coupled devices (CCDs) laid out with 4K bytes of data in one circular path. The other reason is that data is available to all the modules 330, 322, 324, and 326 at the same time, and due to the sequential nature of the operation, one may have to modify or change, for example, a first domain within a tuple but the qualifying is done on the last domain within the tuple. In other words, the domain which is to be modified is presented first, and it is gone by the time one realizes that it is the one to be modified. Therefore, the loop control module 328 makes a temporary modification to the data and stores it in the loop buffer 490 in the modified state. So as data is coming in serially, the changes are made on the assumption that the data will be qualified. Accordingly, the loop control buffer 490 has a number of tuples that have been modified and are stored there awaiting a decision as to whether or not they should be put back or re-written into the storage array 310. If a particular tuple is qualified and a change was made in it, then that tuple is replaced and the revised tuple is placed back in the storage array 310.

The loop buffer 490 (FIG. 42A) is a "rollover" or "endless" type buffer in that there appears to be no end to it. The loop buffer 490 is of the dual ported storage type in that data can be read from the storage array 310 and written into the storage array 310 at the same time; however, in the embodiment described there is a lag of 4K bytes. In other words, one can read and write effectively at the same time if the read and write points differ by 4K bytes (in the embodiment being described) or a 4K byte address offset. This allows the ADC's such as ADC 306 to read and write simultaneously in parallel.

Figure 43:
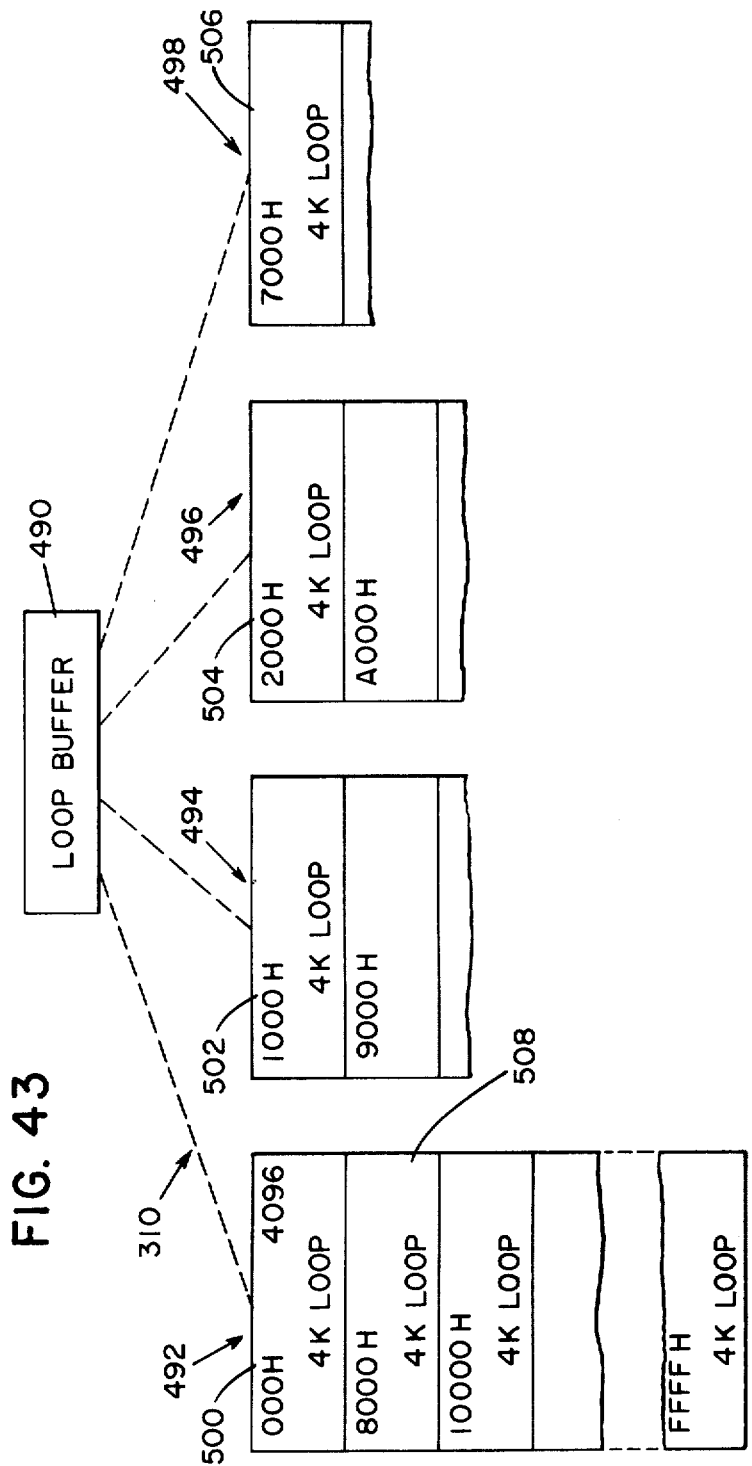
FIG. 43 shows one organization of a portion of the storage array shown in FIG. 3.

FIG. 43 shows one embodiment of how the storage array 310 is organized. The storage array 310 is composed of blocks 492, 494, 496, . . . 498, with each block such as 492 being comprised of 64K bytes of storage or 8 chips of CCDs with 64K bits of storage. Each of the blocks like 492 is composed of 4K loops such as loop 500. When 4K bytes of data are read from loop 500 of the block 492, they are temporarily stored in the loop buffer 490 as previously discussed. The next data to be read comes from loop 502 from block 494, and because this 4K bytes of data must also be stored in the loop buffer 490, the data which is presently in the loop buffer 490 will be written into the loop 500 of block 492. In other words, as the first byte of data from loop 502 is read into the loop buffer 490, the first byte of data from loop 500 is written back into the first loop 500 of block 492. So, as data is written back into the array 310, it does not change its location or address within the array. Similarly, when the 4K loop 504 from block 496 is read into the loop buffer 490, the 4K loop 502 which is stored in the loop buffer 490 is written back into the loop 502 in block 494. In other words, the transfer from one block of storage from loop 502 to loop 504 or from loop 506 to loop 508 is transparent; no special action is required for the transferrence or sequencing. In order to determine a write address, 4K (actually 4096) is simply subtracted from the current read address.

When a scan or read operation is initiated by an ADC such as 306, the relation address is set up in the relation address counter 510 (FIG. 42A) to indicate the start or location of the area of the storage array 310 to be scanned. During operation, each time the counter 510 is incremented, it supplies an address for a new byte of data in the storage array 310. The relation length counter 512 is also supplied with a count (via the main bus 334) which represents the length of the associated relation in bytes of data. Each byte of data which is read from the storage array 310 decrements the relation length counter 512, and when the count therein is equal to zero, it indicates the end of the scan. The relation address counter 510 also provides addressing for the loop buffer 490 via the adder 514. The purpose of the adder 514 is to provide a read look ahead on the storage array 310 in order to manage the loop buffer 490.

During a scan or read operation from the storage array 310, data is forwarded from the array to a read data latch 516 (FIG. 42A). The output from the latch 516 is sent over the currently read data (CRD) bus (also marked as bus 330 in FIG. 3) to each of the modules 320, 322, 324, and 326 shown in FIG. 3 for operating on the data. This data is also selected by the data select block 518 (FIG. 42A) to be read into the loop buffer 490; this is in the case of no modification to the data being read or scanned. If there is to be a change in the data, for example, if domains or tags are to be modified, then instead of taking data from the read data latch 516, the data select block 518 will take the new or modified data from the WDB0-7 bus designated as 520 and the modified data will be written into the loop buffer 490. In other words, data which is not being modified comes from the array (via latch 516) and data which is being modified comes over the bus 520. When data is to be written back into the storage array 310 from the loop buffer 490, it passes through the write data latch 520.

The loop control module 328 also performs certain bookkeeping functions associated with the ADC 306; most of these functions can be described in relation to the circuitry shown in FIG. 42B. During a set up for a read operation, for example, in addition to providing the relation address on counter 510 (FIG. 42A), the length of the desired tuple is fed to the register 522 (FIG. 42B) via the main bus 334; this allows the loop control module 328 to keep track of tuple boundaries. The loop control module 328 modifies or changes data in the storage array 310 by tuple, not by domain. It is possible to have tuples extend across loops such as 502 and 504 in FIG. 43; however, no special hardware is required because the addressing of the storage array 310 is laid out sequentially, as previously described. Basically, there are four logic signals which are utilized by the circuitry in FIG. 42B to identify the fact that a tuple has been completed and its time to make a decision with regard to it. These four logic signals are the tag flag (TAGFG) and the read blank (RBLANK) coming from a tuple read counter 524 and the write tag (WTAG) and the write blank (WBLANK) coming from a write counter 526. If the TAGFG signal is true, it means that the current byte which is being read from the storage array 310 is the bag byte and should be treated as such. If the WTAG signal from the tuple write counter 526 is true, it means that the current byte being written into the storage array 310 is a tag byte. The signals RBLANK and WBLANK have similar meanings except that they mean it is the end of a tuple.

An initial write delay block 528 (FIG. 42B) is utilized for providing an initial 4K byte delay to enable 4K bytes of data to be written into the loop buffer 490 (FIG. 42A) before any writing occurs. The ADC 306 keeps track of modifications to the storage array 310 on a tuple basis, by a write decision RAM 530. The RAM 530, in the embodiment described, is a 1K×1 RAM which contains $\emptyset$'s or 1's depending upon whether the associated tuples are not to be modified or are to be modified, respectively. In other words, once it is decided that a tuple is to be modified, a "1" is placed in the RAM 530 in a location which corresponds to the associated tuple. When the associated tuple is to be placed back into the storage array 10, the associated bit in the RAM 530 would be a binary "1".

In order to keep track of the bits in the RAM 530 (FIG. 42B), a count of tuples read counter 532, a count of tuples written counter 534, and a tuple decision RAM address select block 536 are used. As each tuple is evaluated during qualification, the associated binary "0" or "1" discussed earlier herein is written into the RAM 530 via the present tuple decision (WRTDCS) signal on line 538. In the embodiment described, the RAM 530 is 1K by 1 bits long and since the loop buffer 490 (FIG. 42A) is 4K bytes long, it means that each tuple will have at least 4 bytes of data therein, although the size of the RAM 530 and the organization of data in the storage array 310 can be changed to suit particular applications. With regard to the count of tuples read counter 532, the least significant bits of the count indicated therein are used as an address to write the associated qualifying bit into the RAM 530, and similarly, the count which appears on the counter 534 is used as an address into the RAM 530 to pick out the associated qualifying bit which was written therein at an address dictated by the counter 532.

Another feature of the system 300 is that it is not necessary to go through the process stated in the previous paragraph if there are no more tuples to be written back into the storage array 310 for a particular relation. In order to effect this feature or short cut, a count of pending tuples to be written is maintained in a counter 540 (FIG. 42B). The counter 540 is incremented whenever a tuple needs to be written back into the storage array 310 and it is decremented each time a tuple is written therein. Therefore, if the count on the counter 540 is a zero, it means that all the changes for tuples (within a relation) which need to be made are already made, and therefore, there are no more modifications in the loop buffer 490 which need to be made; consequently, the writing back into the storage array can be stopped. A conventional latch 542 is used to latch the output from the RAM 530 for the qualifying bits coming therefrom. The various signals shown in FIGS. 42B and 42A will be discussed in detail hereinafter. An address buffer 544 (FIG. 42A) is used to provide the addresses to the storage array 310. A hit counter 546 is used to count the number of tuples which have met various selection criteria, as for example, "the number of people who live in Wichita" as earlier discussed herein. Such a count is sent along the main bus 334 to the PFP (FIG. 1) where similar counts from other ADCs, like 308, can be added together to obtain a composite count for the system 300.

Having discussed the general functioning of the loop control module 328, shown generally in FIGS. 42A and 42B, an explanation of the associated control signals and the detailed circuitry used therein will now be discussed.

The read data latch 516 (FIG. 42A) is comprised of a conventional latch H9 (FIG. 44A) such as IC #LS374 which is manufactured by Texas Instruments, Inc. which will be hereinafter referred to as T.I. Conventional inverters shown generally as blocks F9 and G9 are used between the DO$\emptyset$/-DO7/ lines (coming from the storage array 310) and the inputs to the latch H9. The outputs (CD$\emptyset$-CD7) from the data read latch H9 are fed into the data select block 518 (FIG. 42A).

Figure 45A:
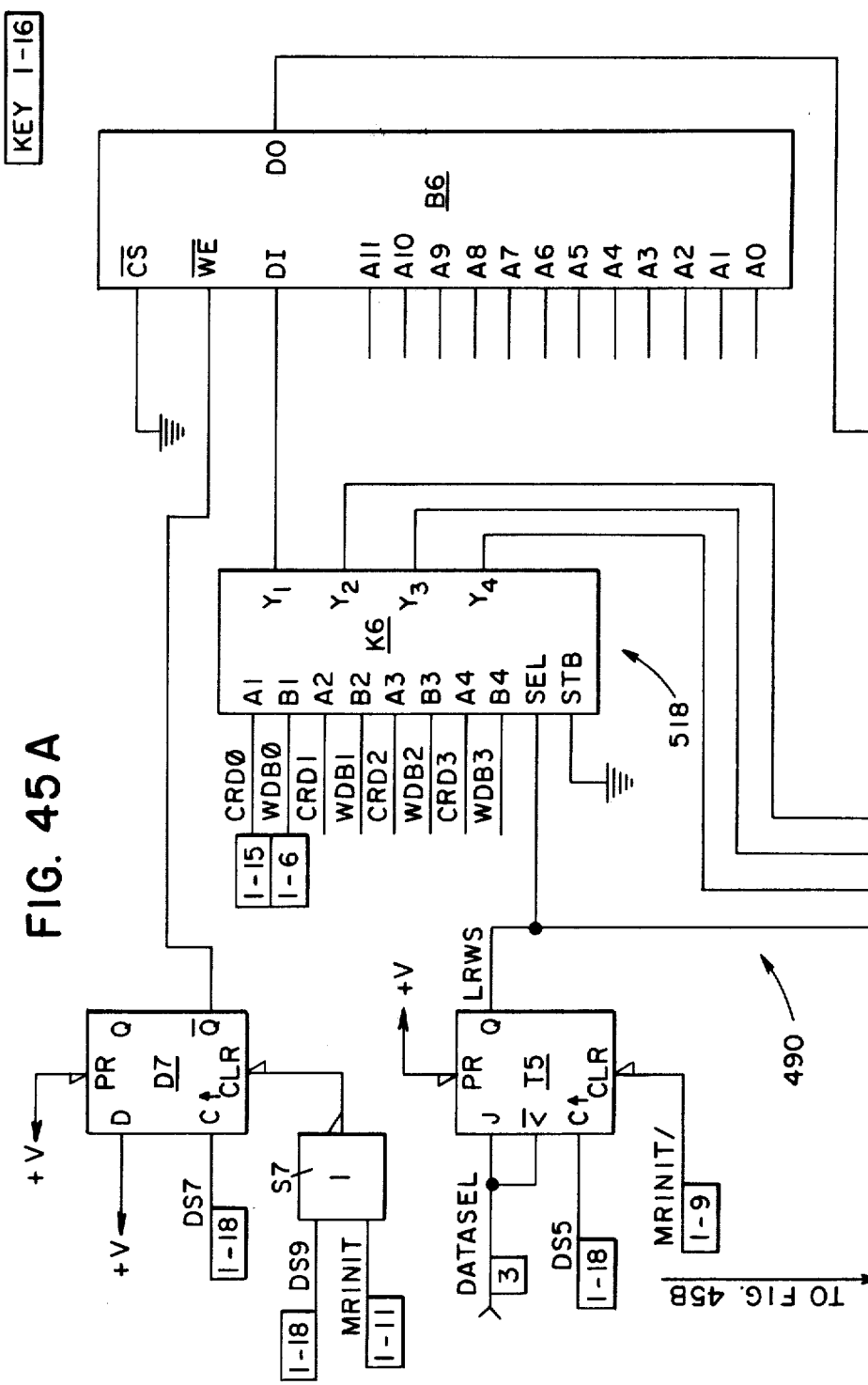
FIGS. 45A and 45B show more details of the data select block and the loop buffer shown in FIG. 42A.
Figure 45B:
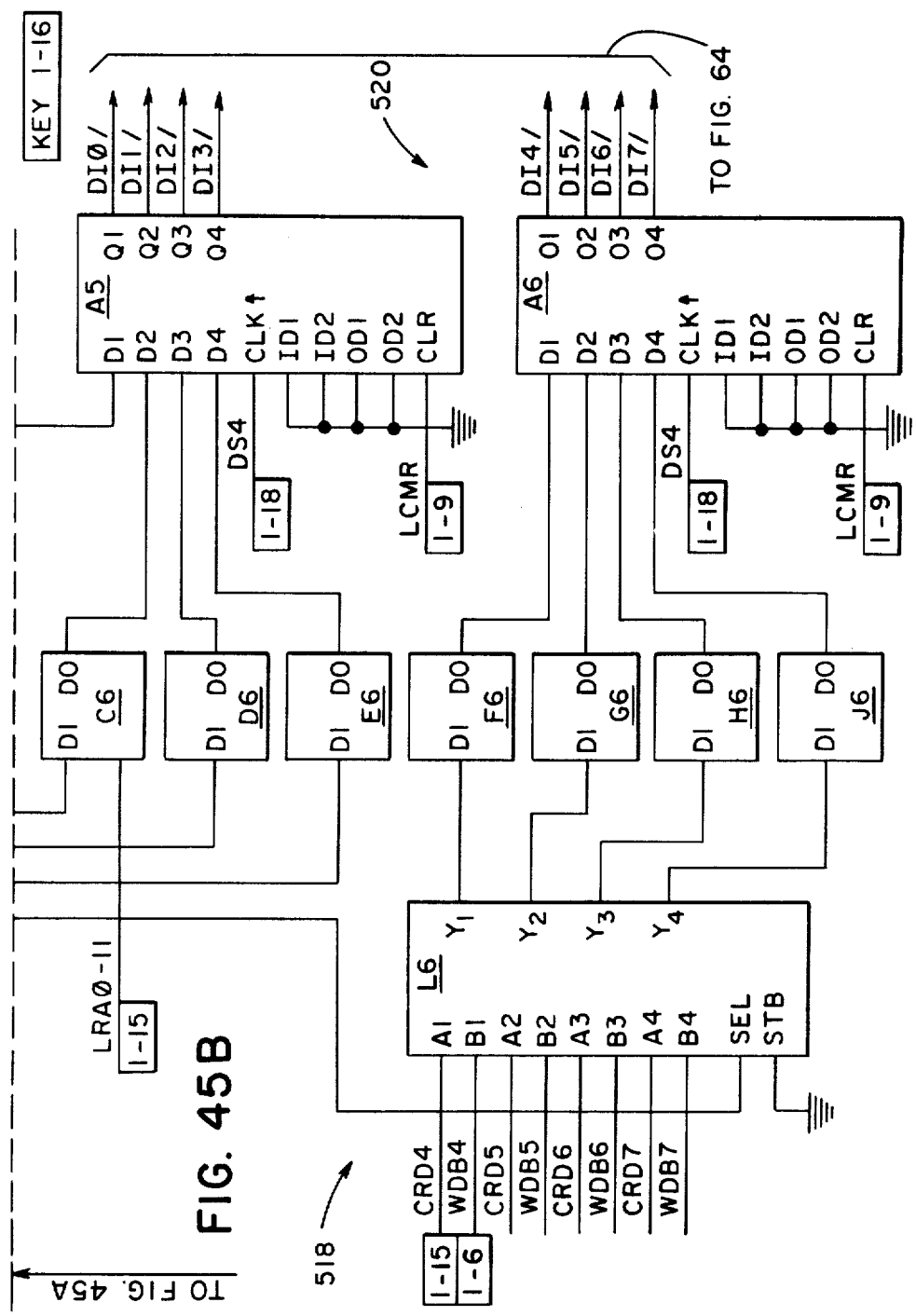

The data select block 518 (FIG. 42A) is shown in more detail in FIGS. 45A and 45B and it includes the multiplexers K6 and K7 which are conventional IC chips chips such as #LS157 which are manufactured by T.I. for example. The CRD$\emptyset$-CRD3 lines and the new data lines WDB$\emptyset$ through WDB3 lines are handled by the multiplexer K6 (FIG. 45A) and the remaining lines are handled by the multiplexer L6 as shown in FIG. 45B. The conventional flip flops D7 and T5 (FIG. 45A) and the gate S7 are used in the development of the control signals used to select the data either from the storage array 310 or the new data to be written therein as previously explained. The loop buffer 490 (FIG. 42A) is a conventional loop buffer such as IC chip #93471 which is manufactured by Fairchild, and is comprised of the select block and the memory units B6, (FIG. 45A) C6, D6, E6, F6, G6, H6, and J6 shown in FIG. 45B, whose outputs are connected to the conventional latches A5 and A6 (FIG. 45B) which comprise the write data latch 520 shown in FIG. 42A. The following List #20 is a list of the inputs and outputs (and the descriptions thereof) associated with the loop control module 328 and shown in FIGS. 45A and 45B.

LIST #20

| | Description |
|---|---|
| Inputs | |
| DS4 | (Data Strobe #4) |
| DS5 | (Data Strobe #5) |
| DS7 | (Data Strobe #7) |
| DS9 | (Data Strobe #9) |
| LRA$\emptyset$-11 | (Loop Ram Address) From adder 514. |
| CRD$\emptyset$-7 | (Current Read Data) |
| WDB$\emptyset$-7 | (Write Data Bus) |
| DATASEL | (Select Data Source) For the loop buffer 490. |
| MRINIT | (Master Reset Initialize) |
| MRINIT/ | Complement of above. |
| Outputs | |
| DI$\emptyset$-7 | (Data to Array 310.) |

Figure 46A:
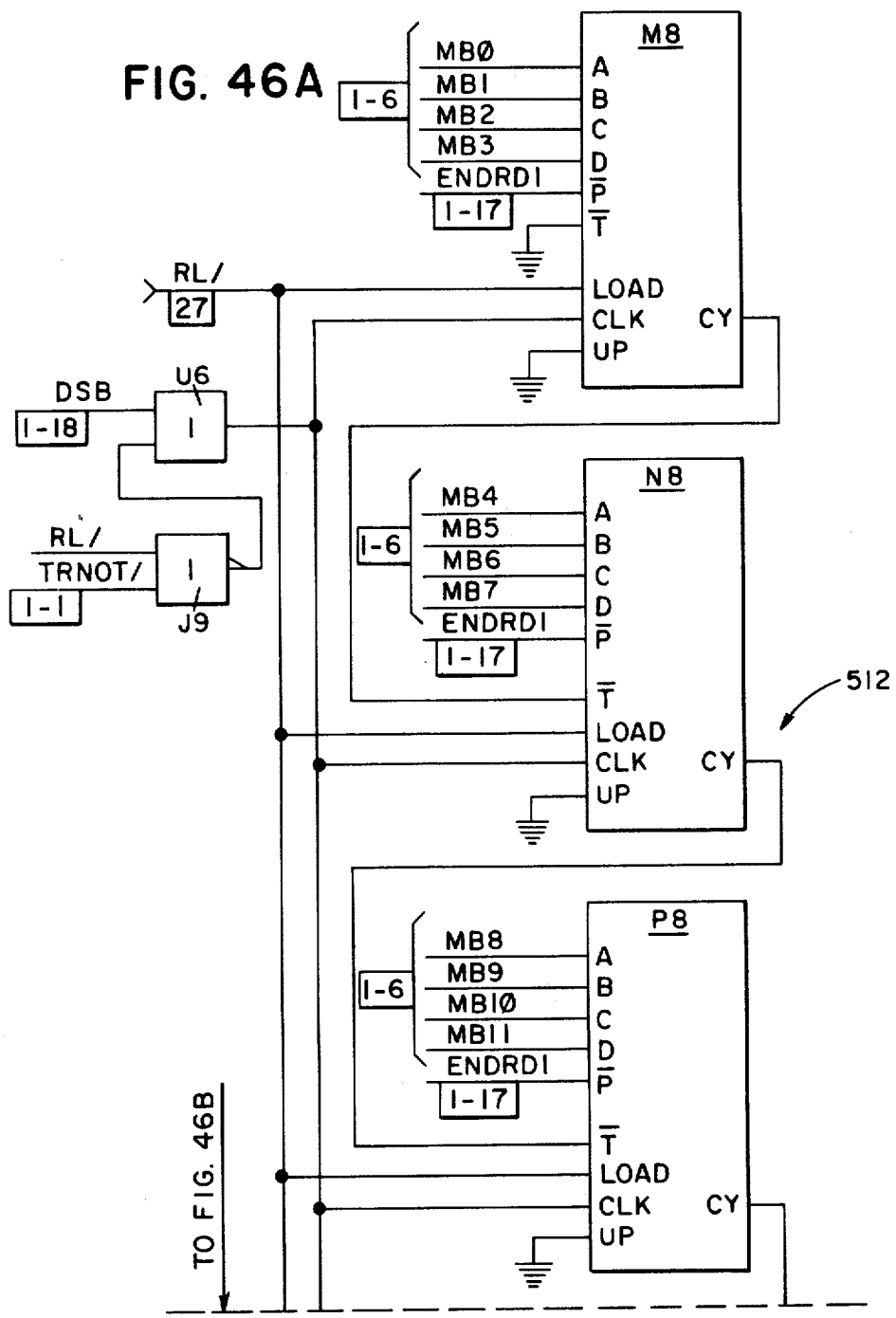
FIGS. 46A, 46B, 46C, 46D, and 46E show more details of a portion of the loop control module shown in FIG. 42A.
Figure 46B:
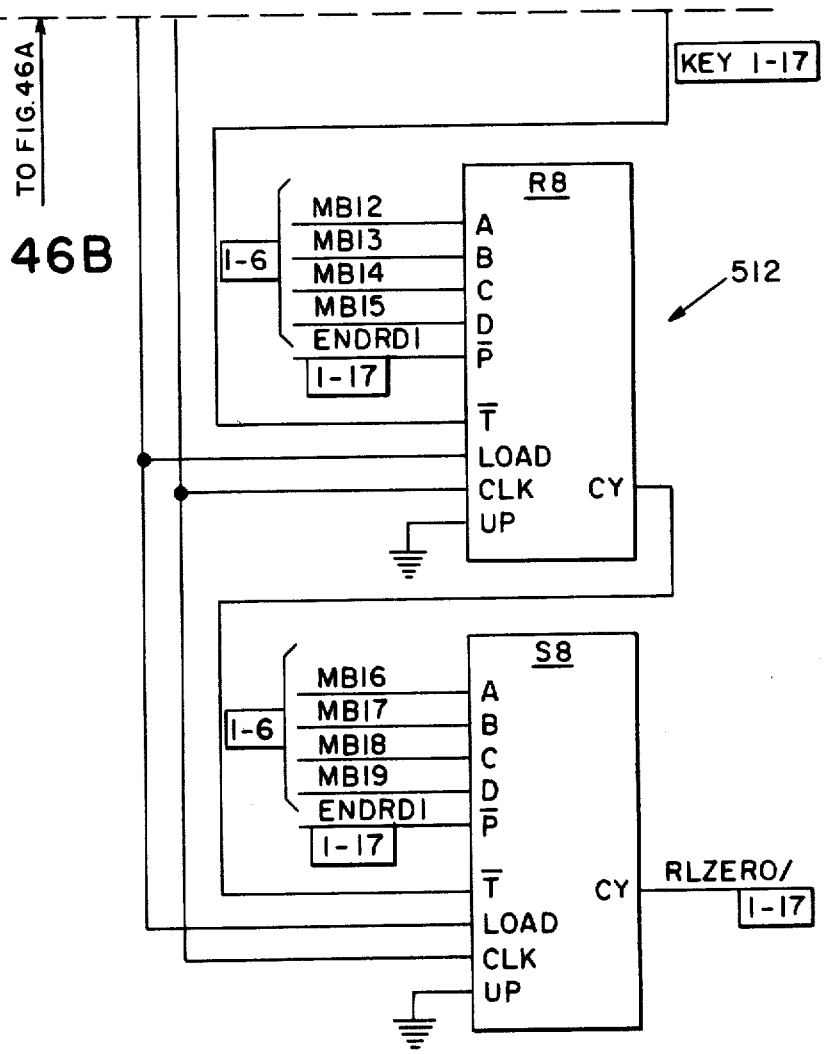

The relation length counter 512 (FIG. 42A) is comprised of the counters M8, N8, P8 shown in FIG. 46A, and counters R8 and S8 shown in FIG. 46B; these counters are conventional counters which are wired as shown to receive the relation length via the main bus lines MB$\emptyset$-19. The output (RLZERO) from counter S8 occurs when the relational length counter 512 goes to zero.

Figure 46C:
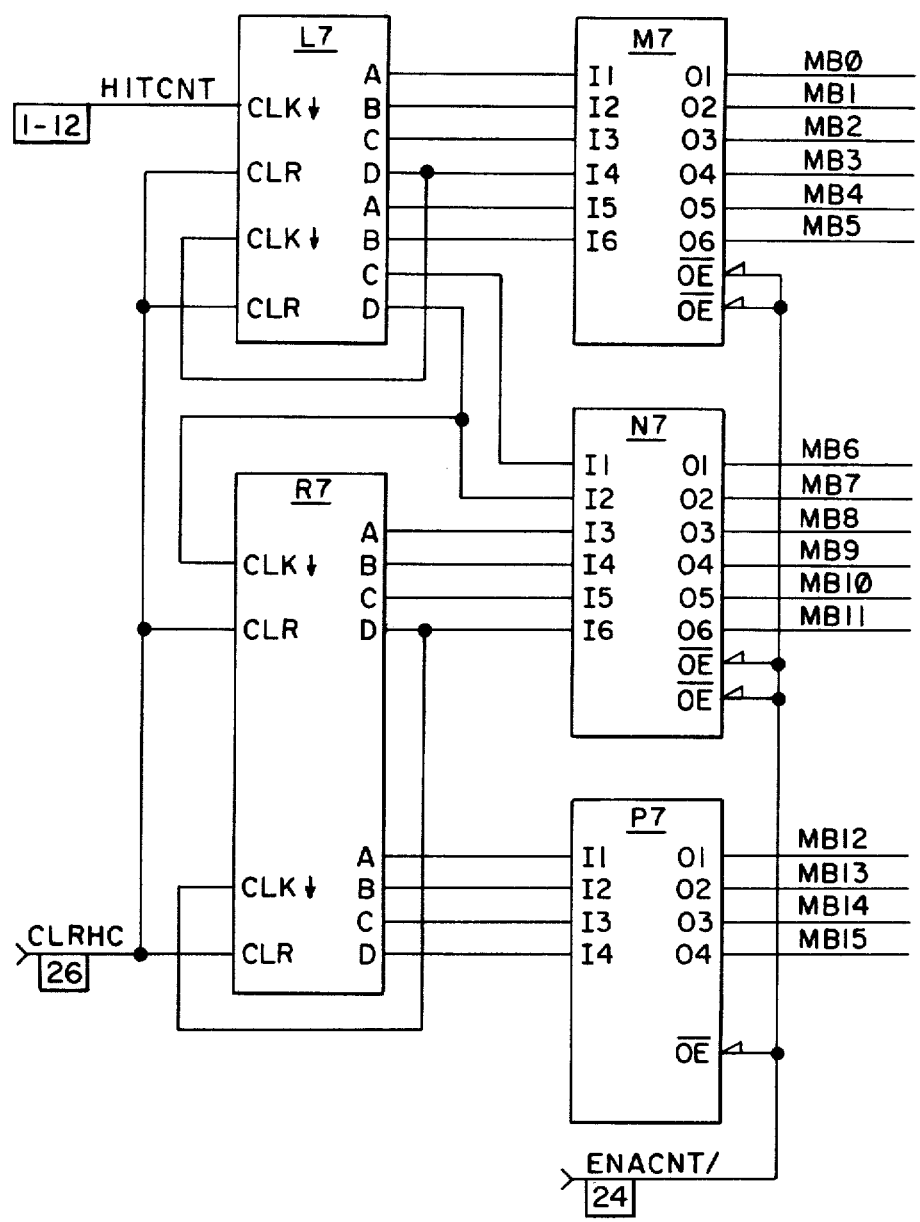
Figure 46D:
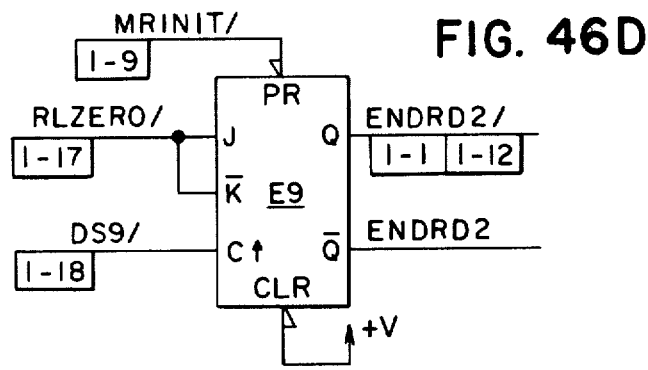
Figure 46E:
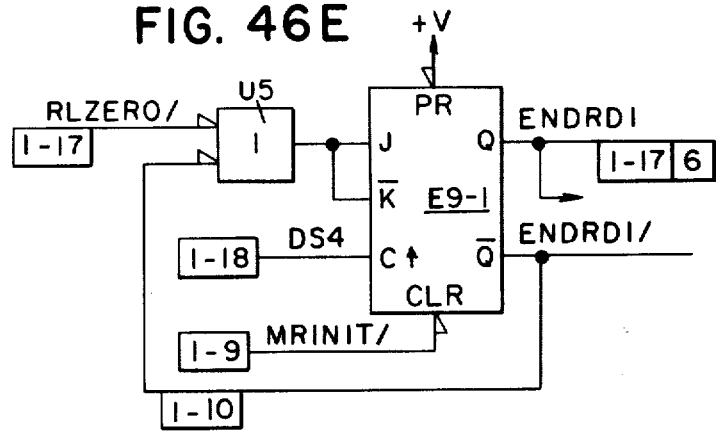

The hit counter 546 (FIG. 42A) is comprised of conventional counters L7 and R9 shown in FIG. 46C which receive the hit count pulses (HITCNT) and output them via conventional tri-state drivers M7, N7, and P7 (such as IC #74367 which are manufactured by T.I.) to the main bus lines MBØ-MB15. A clear hit count signal (CLRHC) is used to clear the counters L7 and R7. FIGS. 46D and 46E show some conventional logic circuitry (including flip flops E9-1 and E9 and gate U5 which receive the inputs shown and produce the various outputs shown. Some additional logic circuitry including gates U6 and U9 is shown in FIG. 46A along with the inputs thereto. The following List #21 contains the inputs and outputs (and their descriptions) associated with the portion of loop control module 328 shown in FIGS. 46A, 46B, 46C, 46D, and 46E.

LIST #21

| | Description |
|---|---|
| Inputs | |
| RL/ | (Relation Length Load) |
| TRNOT/ | (Transfer Out Pulse) |
| DSB | (Data Strobe Buffered) It is the DS signal from the PFP 304. |
| HITCNT | (Hit Count Pulse) It is used to count qualified tuples. |
| CLRHC | (Clear Hit Count) Clears Counter 546. |
| ENACNT/ | (Enable Reading of hit Counter #546) |
| MBØ-19 | (Main Bus) |
| DS9/ | (Data Strobe #9) |
| DS2 | (Data Strobe #2) |
| MRINIT | (Master Reset Initialize) |
| Outputs | |
| RLZERO/ | (Relational Length Equals Zero) |
| MBØ-15 | (Hit count outputted on main bus) |
| ENDRD1 | (End of Read During Read Blank) i.e. last byte of a tuple. |
| ENDRD2 | This is a delayed ENDRD1 |
| ENDRD1/ | Complement of ENDRD1. |
| ENDRD2/ | Complement of ENDRD2. |

Figure 47A:
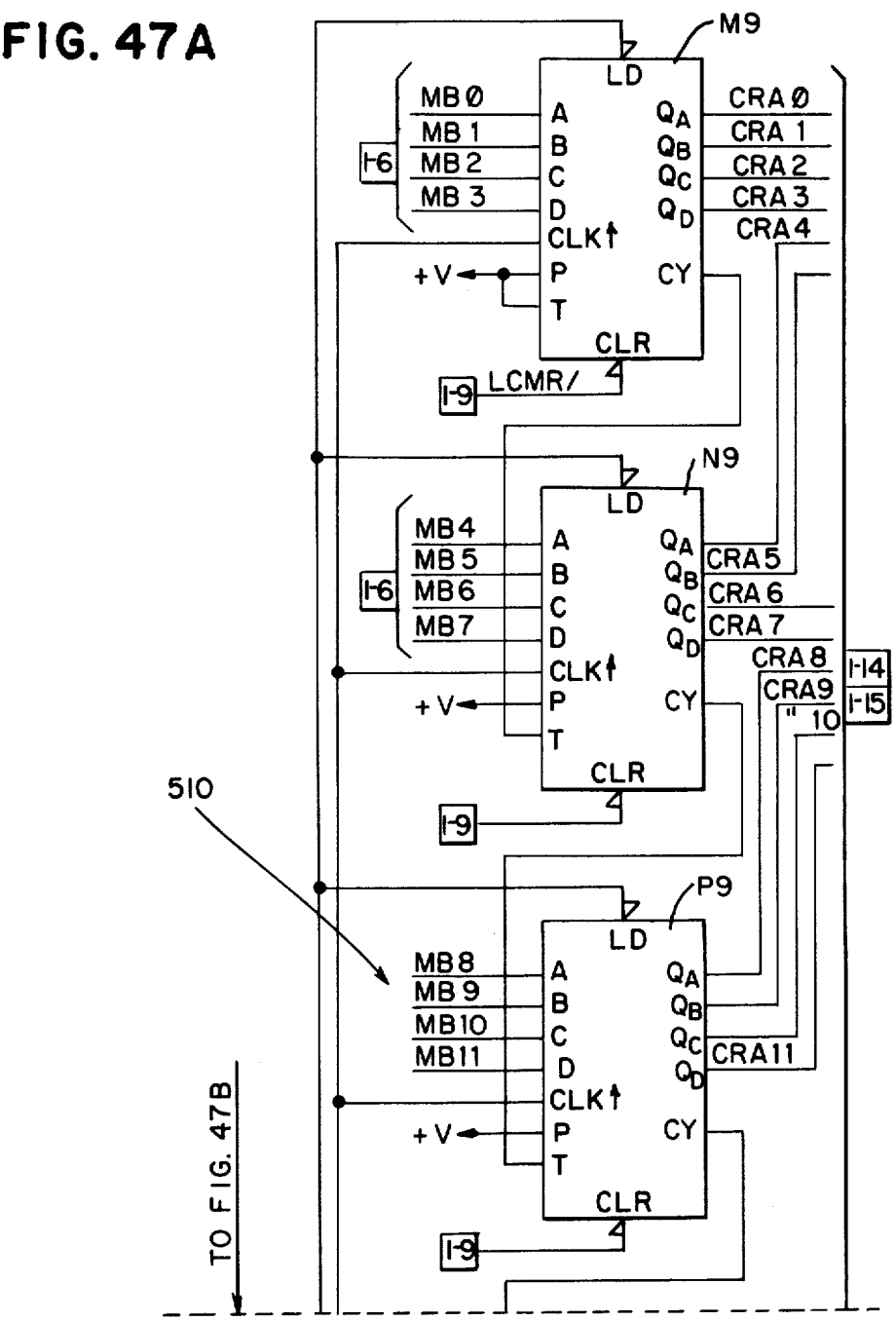
FIGS. 47A, 47B, and 47C show more details of a portion of the loop control module shown in FIG. 42A.
Figure 47B:
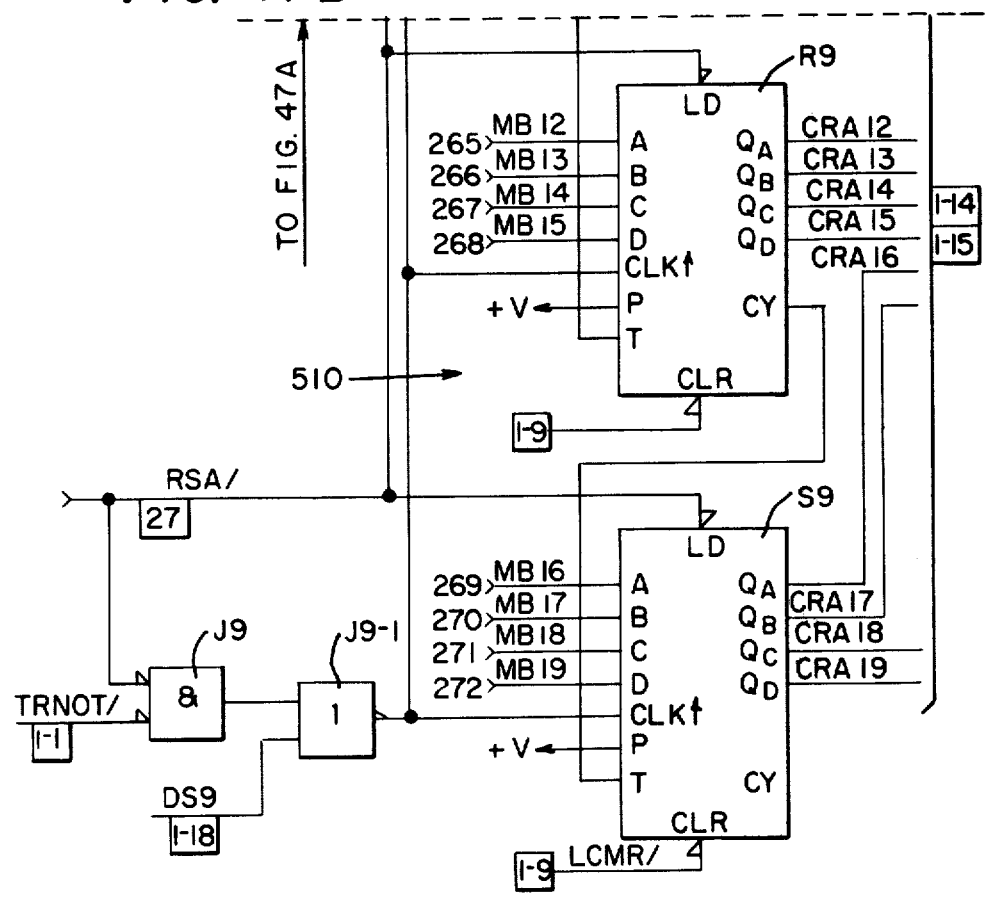
Figure 47C:
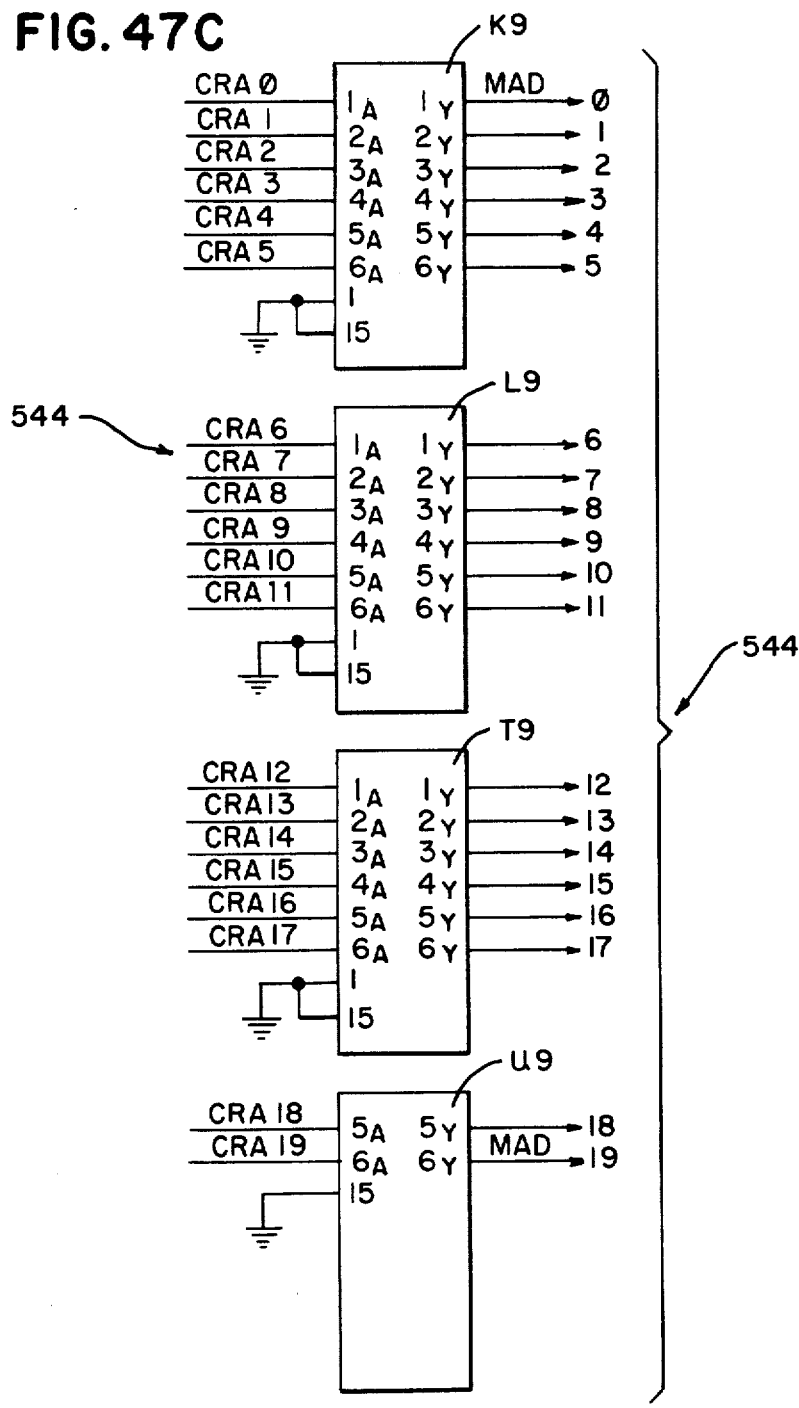

The relation address counter 510 shown in FIG. 42A is comprised of conventional counters M9, N9, P9, (FIG. 47A) and R9 and S9 shown in FIG. 47B. The inputs to the counter 510 are the main bus lines MBØ-MB19, and the outputs therefrom comprise the current read address on lines CRAØ-CRA19 which are fed into the address buffer 544 (FIG. 42A). The address buffer 544 is comprised of tri-state drivers (shown as blocks K9, L9, T9, and U9 in FIG. 47C) such as IC #74367 previously mentioned and the buffer 544 provides the output to the storage array 310 via the bus lines MADØ/ through 19/ shown in FIG. 47C. The logic gates J9 and J9-1 (FIG. 47B) are used to process the signals shown. The inputs and outputs along with their descriptions not already mentioned with regard to FIGS. 47A, 47B, and 47C are shown in the following List #22.

LIST #22

| Inputs | Description |
|---|---|
| RSA/ | Load relation counter 510 with start address |
| TRNOT/ | Transfer out pulse from PFP 304 |
| LCMR/ | (Loop Control Master Reset) It resets the loop control module 328. |

LIST #22-continued

| Inputs | Description |
|---|---|
| DS9 | (Data Strobe #9) |

Figure 44A:
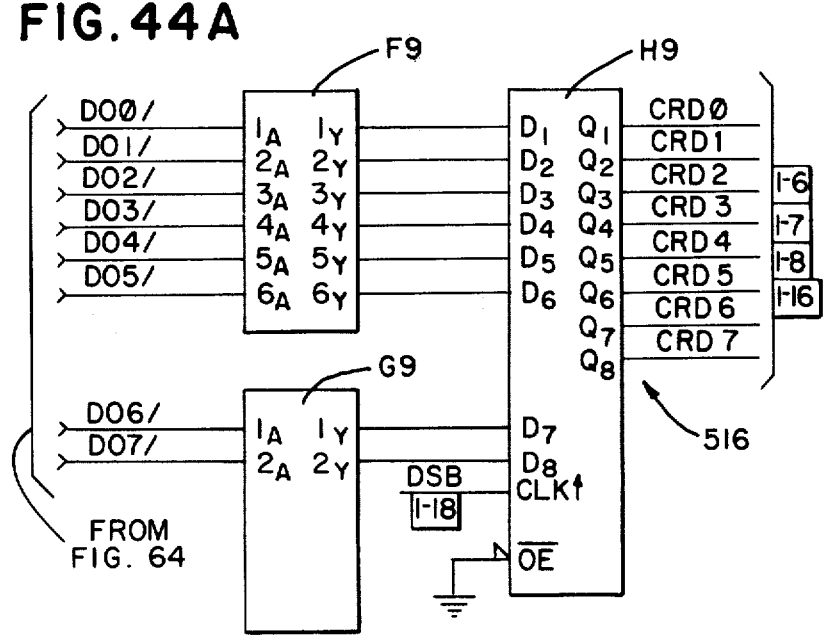
FIGS. 44A and 44B show more details of a portion of the loop control module shown in FIG. 42A.
Figure 44B:
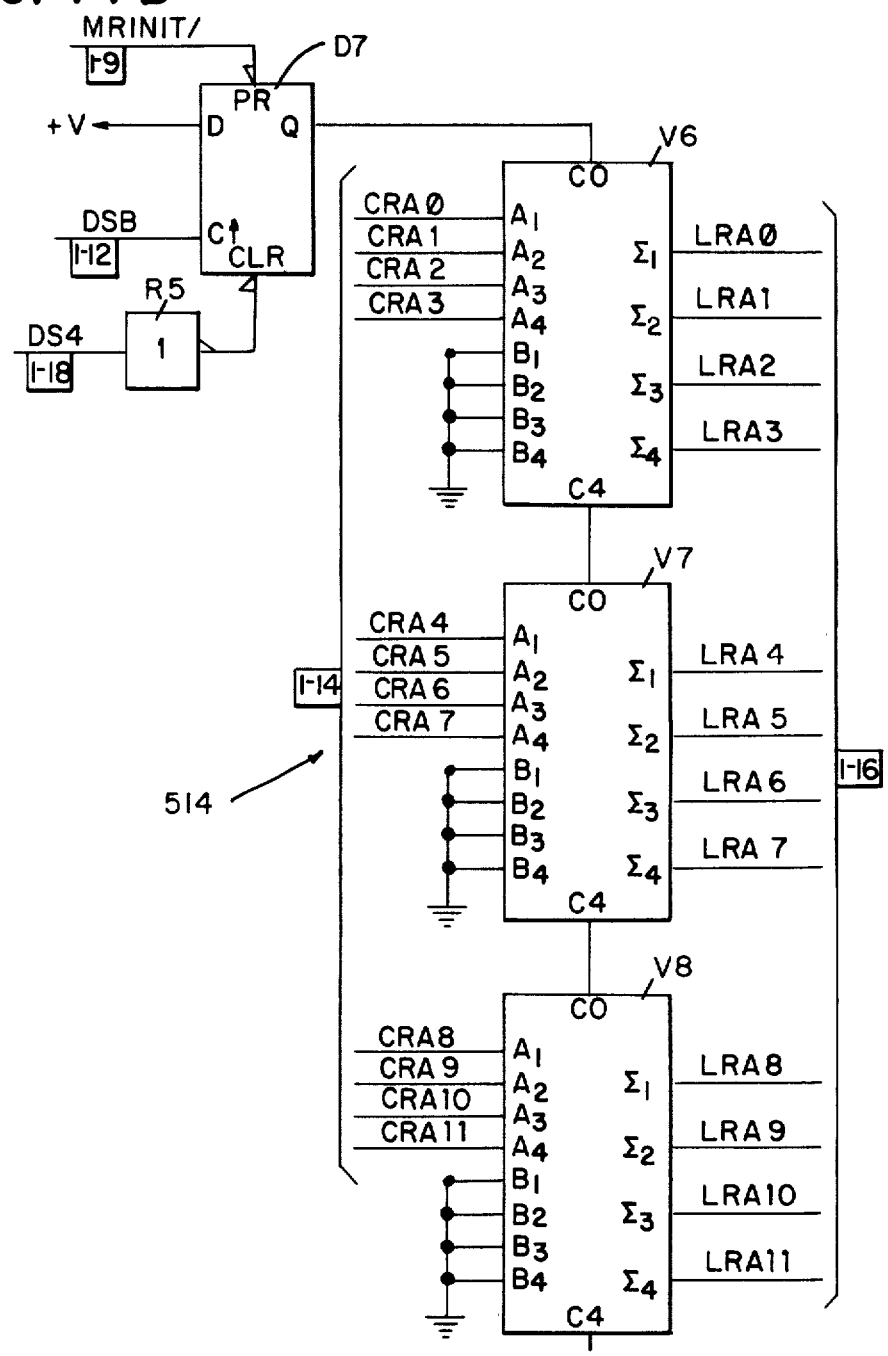

The adder 514 (FIG. 42A) is shown in more detail in FIG. 44B, and is comprised of conventional binary adders V6, V7, and V8 such as ICs #74LS283 which are manufactured by T.I. The D-type flip-flop D7 and the inverter R5 are used to handle the inputs shown. The inputs and outputs (along with their descriptions) for the circuits shown in FIGS. 44A and 44B are shown in the following List #22-A.

LIST #22-A

| | Description |
|---|---|
| Inputs | |
| DOØ-7/ | Data from storage array 310 |
| DSB | (Data Strobe Buffered) From PFP 304. |
| DS4 | (Data Strobe #4) |
| CRAØ-11 | Current Read Address |
| MRINIT/ | (Master Reset Initialize) See List #23 |
| Outputs | |
| CRDØ-7 | Current read data from latch 516 |
| LRAØ-11 | (Loop Ram Address) Address from adder 514 to loop buffer 490 |

Figure 48:
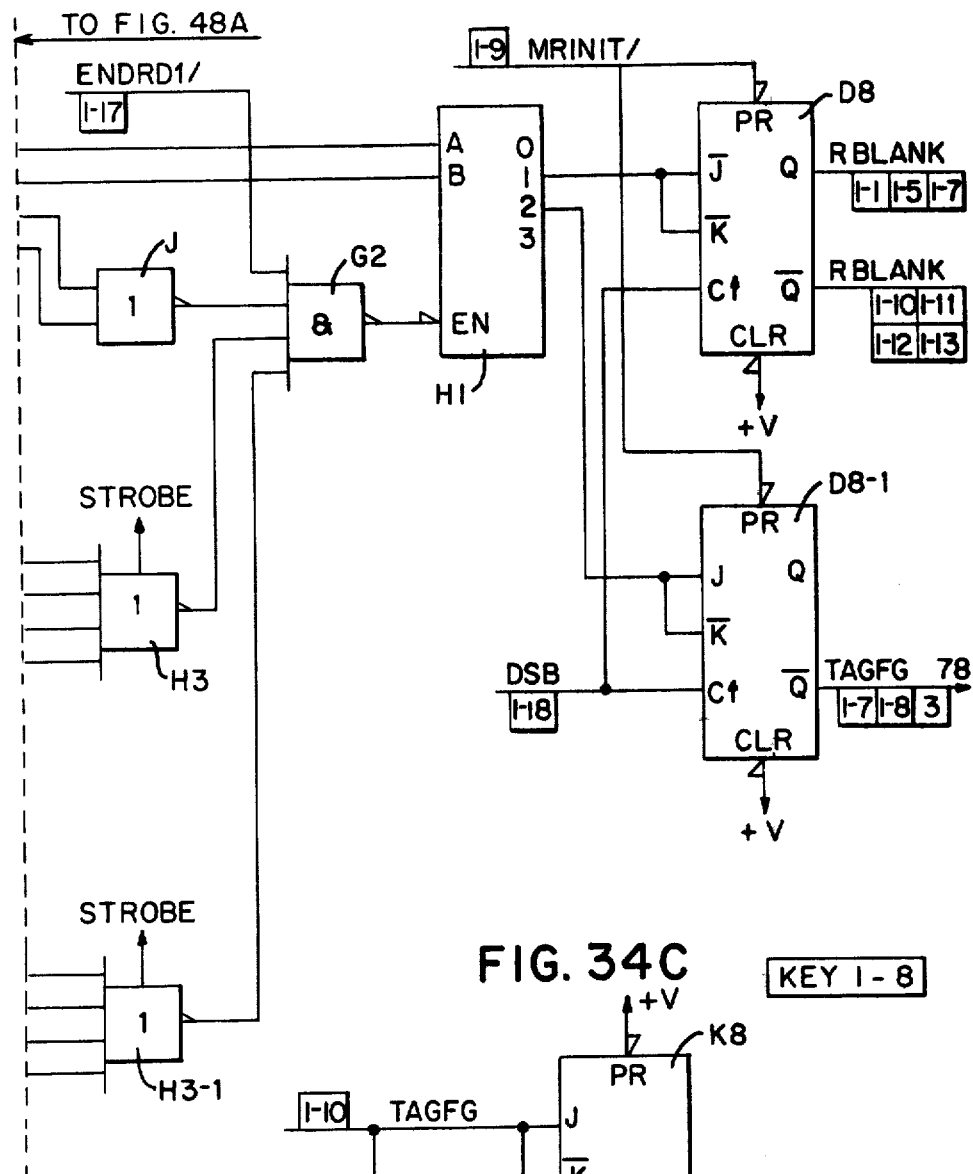
FIGS. 48A and 48B show more details of a portion of the loop control circuit shown in FIG. 42B.
Figure 48A:
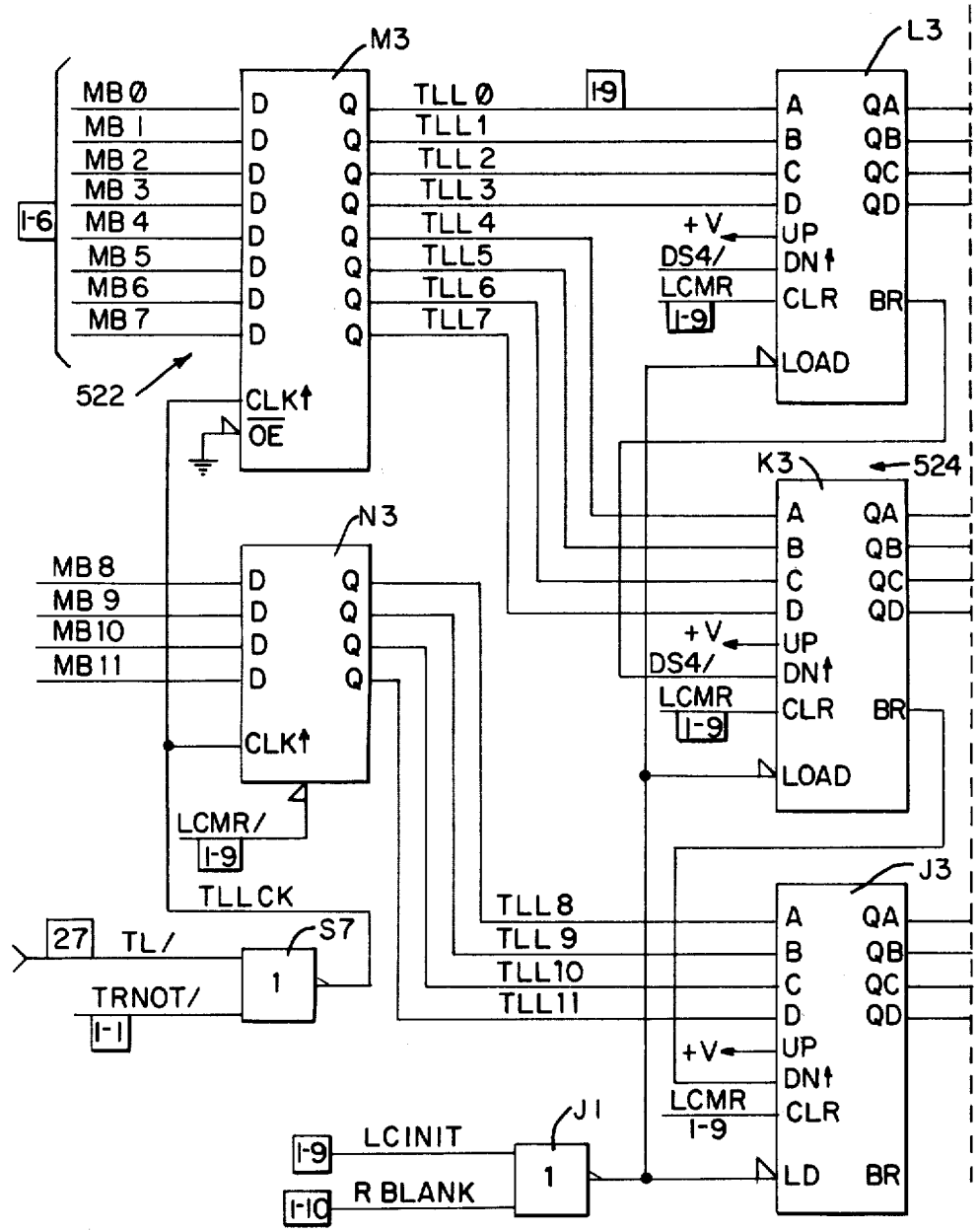

The tuple length register 522 (FIG. 42B) is comprised of conventional registers M3, N3 (shown in FIG. 48A) having the main bus lines MBØ-11 as inputs thereto and tuple length lines TLLØ-11 as outputs therefrom. The TLLØ-11 lines are fed into the tuple read counter 524 (FIG. 42B) which is comprised of the counters L3 K3, and J3 shown in FIG. 48A, and these counters are conventional such as IC #74LS193 which are manufactured by T.I. Certain logic circuitry including the gates S7, J1 (FIG. 48A), H3, H3-1, J, G2, multiplexer H1, and flip flops D8 and D8-1 are connected as shown in FIG. 48B to produce the outputs shown. The gates J and H3 (FIG. 48B) are conventional NOR gates with strobe such as IC #7425 which are manufactured by T.I. The inputs and outputs (along with their descriptions) included in FIGS. 48A and 48B are shown in the following List #23.

LIST #23

| Inputs | Description |
|---|---|
| MBØ-11 | Main bus lines |
| TL/ | Load tuple length into tuple register 522 |
| TRNOT/ | Transfer out pulse from PFP 304. |
| LCMR/ | Loop Control Master Reset |
| DS4/ | (Data Strobe #4) |
| LCMR | Complement of LCMR/ |
| DSB | (Data Strobe Buffered) |
| ENDRD1/ | (End Read) See List #21 |
| LCINIT | (Loop Control Initialize) |
| MRINIT/ | (Master Reset Initialize) for loop control module 328. |
| TLLØ-11 | Tuple length lines |
| RBLANK/ | Blank byte read time |
| TAGFG | Tag byte read time |
| RBLANK | Complement of RBLANK/ |

Figure 49A:
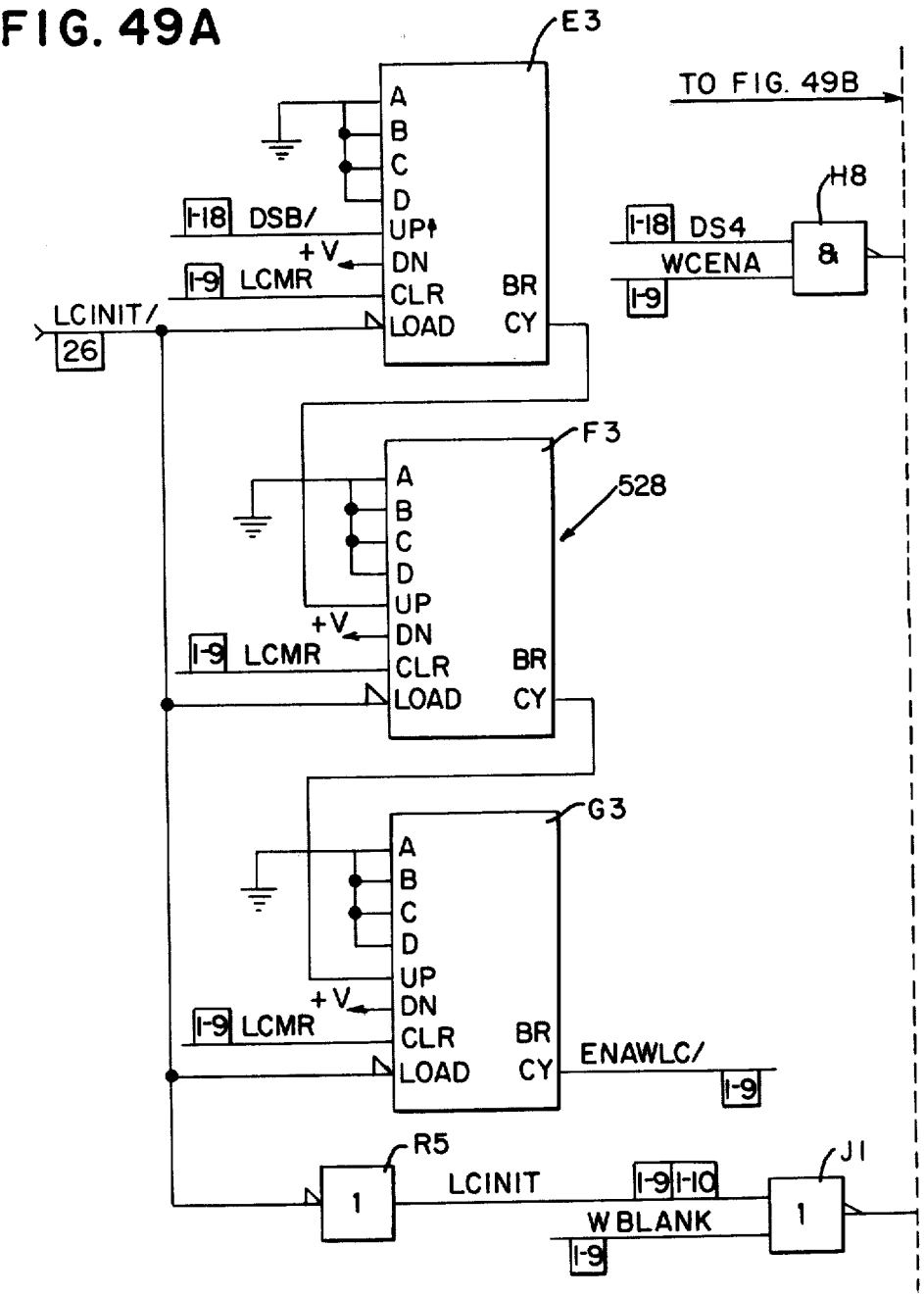
Figure 49C:
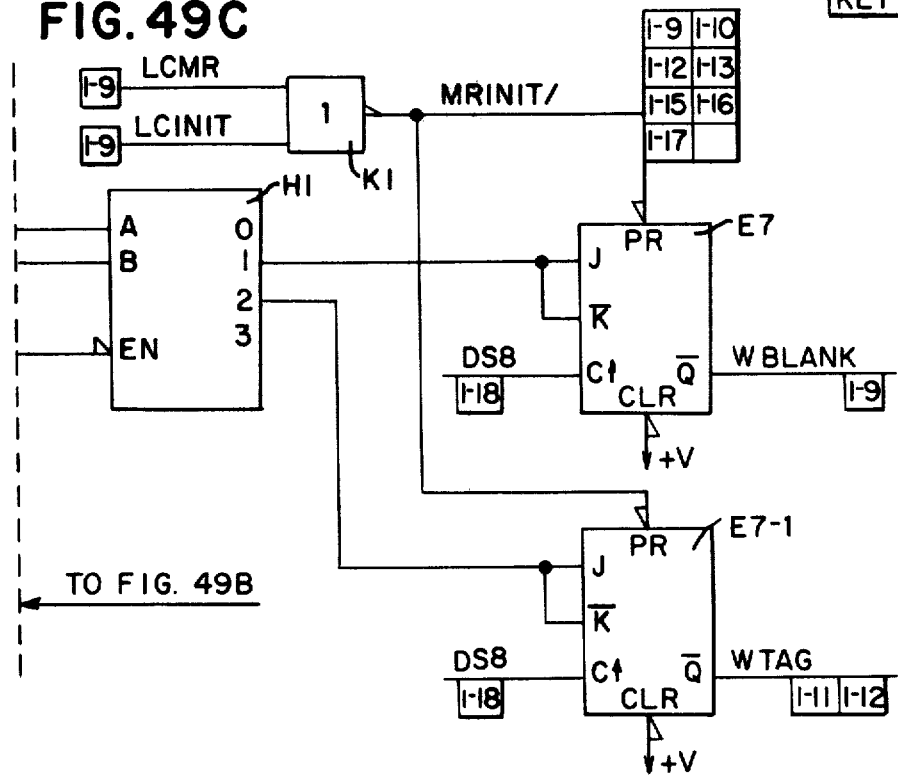

The initial write delay block 528 (FIG. 42B) is comprised of counter units E3, F3, and G3 shown in FIG. 49A; these counters are conventional counters such as IC #74LS193 which are manufactured by T.I. and which are wired as shown to produce a delay to the tuple write counter 526 (FIG. 42B). The tuple write counter 526 is comprised of the counters L2, K2, and J2 shown in FIG. 49B; these counters are also conventional counters such as IC #74LS193. The tuple write counter 526 defines the tuple boundaries during a write operation. The logic circuitry including the inverter R5 and gates J1 and H8 (FIG. 49A), gates J1-1, H2, H2-1 and H7 (FIG. 49B), and multiplexer H1, gate K1, and the flip flops E7 and E7-1 shown in FIG. 49C is utilized to produce the various outputs shown from the inputs thereto. The multiplexer H1 is conventional such as IC #74LS139 which is manufactured by T.I.

Figure 49E:
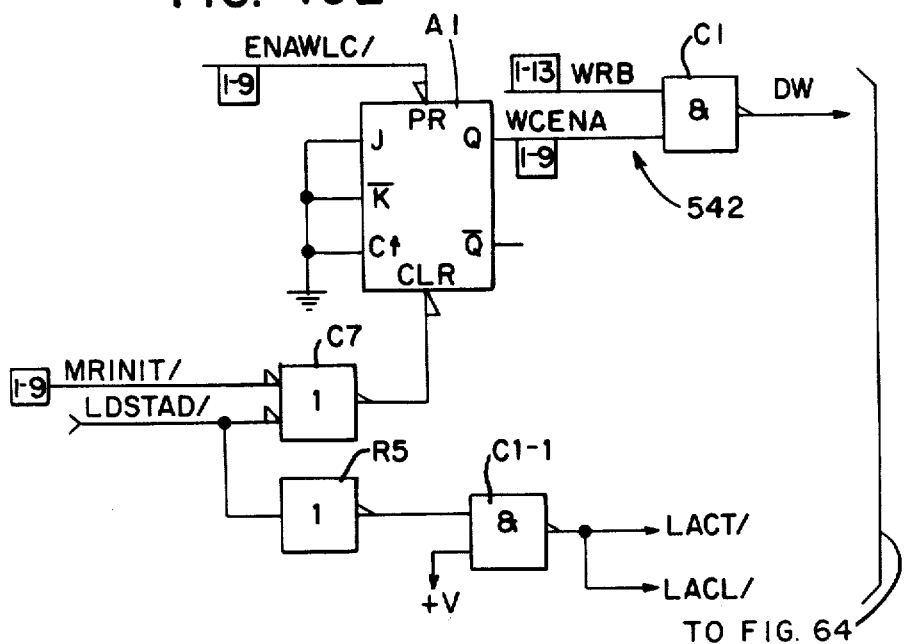

The write enable latch 542 (FIG. 42B) is comprised of the logic circuitry which includes the inverter R5, flip flop A1 and gates C7, C1, and C1-1 which circuitry functions as a latch and which circuitry is interconnected as shown in FIG. 49E. Gate C7 (FIG. 49E) functions as an AND gate with negative logic polarity indicators shown on the inputs and the output of the gate. The loop control master reset signal (LCMR) and its complement are derived from the master reset signal (MR) via the inverters G9 and G9-1 as shown in FIG. 49D. The various inputs and outputs (and their descriptions) shown in FIGS. 49A, 49B, 49C, 49D, and 49E are included in the following List #24.

LIST #24

| | Description |
|---|---|
| Inputs | |
| LCINIT/ | Resets initial loop wait for delay 528 |
| DSB/ | (Data Strobe Buffered) |
| MR/ | Master Reset |
| DS4 | (Data Strobe #4) |
| WRB | Latched output associated with RAM 530 |
| LDSTAD/ | Load start address |
| TLL∅-11 | Tuple length lines |
| Outputs | |
| DW/ | Write enable to storage array 310 |
| LACT/ | Load desired storage array (310) address |
| LACL/ | Load Address compare latch |
| WTAG | Tag is now being written into storage array 310 |
| LCMR | Loop Control Master Reset |
| LCMR/ | Complement of above |
| MRINIT | Reset or initialize |
| LCINIT | Initialize Loop Control Module 328. |
| ENAWLC/ | Enable Write Latch 542 |
| WBLANK | Write the blank byte (associated with the tags) to the storage array 310. |
| WCENA | An Enable to decrement the tuple length counter. |

Figure 50A:
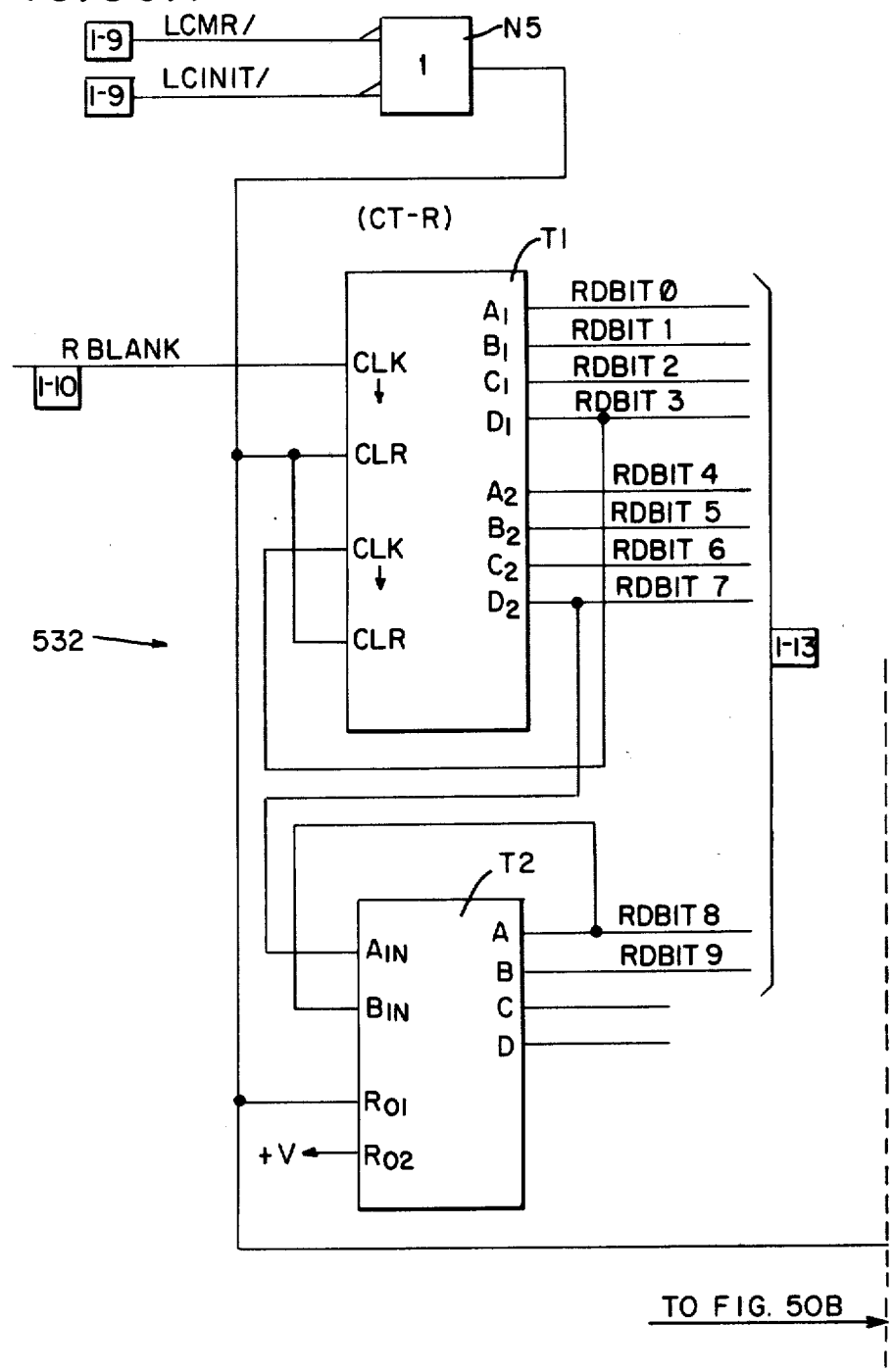
FIGS. 50A and 50B show additional details of a portion of the loop control circuit shown in FIG. 42B.
Figure 50B:
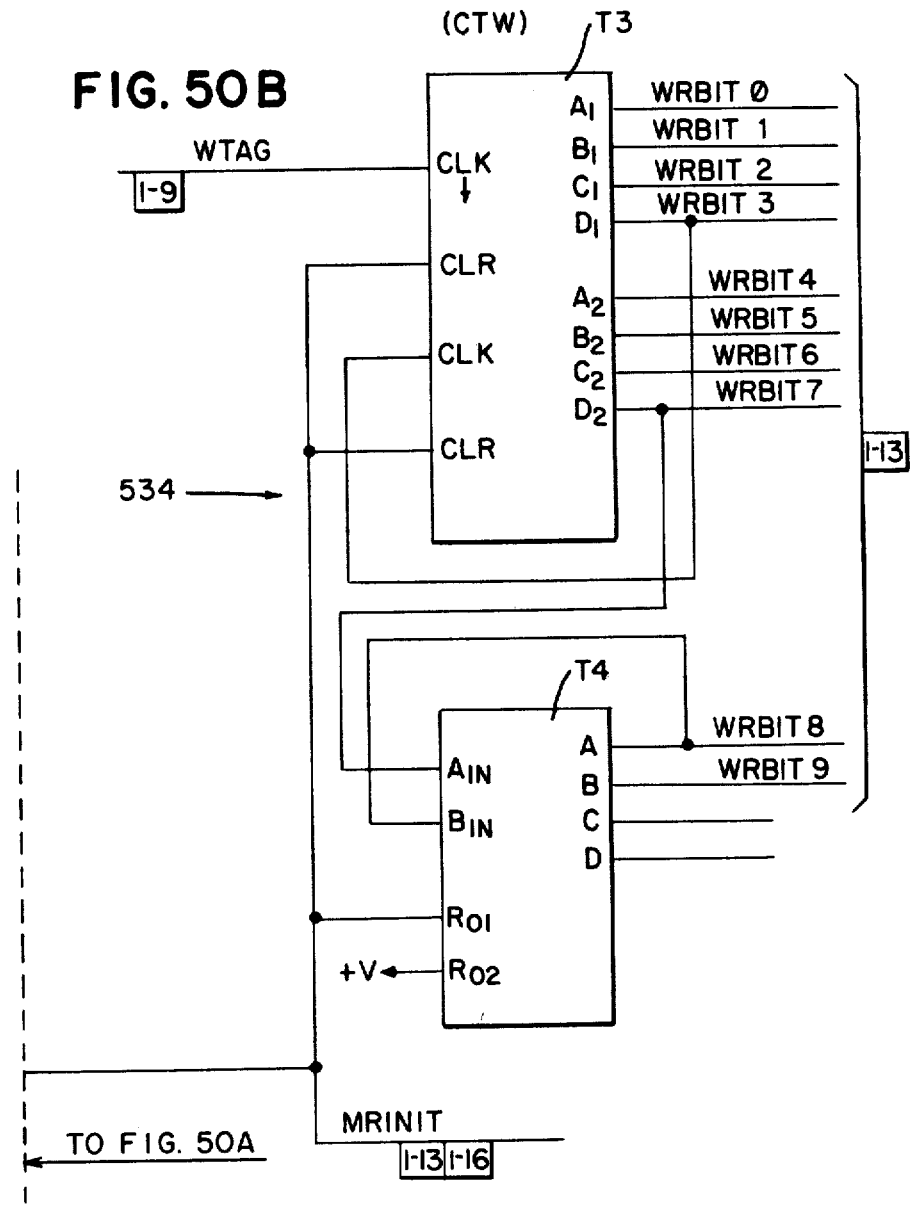

The count of tuples read counter 532 (FIG. 42B) is comprised of the counters T1 and T2 shown in FIG. 50A, and similarly, the count of tuples written counter 534 (FIG. 42B) is comprised of the counters T3 and T4 shown in FIG. 50B. The counters T1 and T3, are conventional counters such as IC #74LS393 which are manufactured by T.I., and the counters T2 and T4 are conventional counters such as IC #74S93 which are also manufactured by T.I. The inputs and outputs (along with their descriptions) for the counters 532 and 534 and the NAND gate N5 (FIG. 50A) are shown in the following List #25.

LIST #25

| Inputs | Description |
|---|---|
| RBLANK | Counter 532 counts when the blank byte or the last byte of the tuple is read. |
| WTAG | Counter 534 counts when the tag byte is written to the storage array 310. |
| LCMR/ | (Loop Control Master Reset) |
| LCINIT/ | (Loop Control Initialize) |
| WRBIT∅-9 | Address of decision write point in decision RAM 536 |
| RDBIT∅-9 | Address of decision read point in decision RAM 536 |
| MRINIT | Master Reset Initialize. |

Figure 51A:
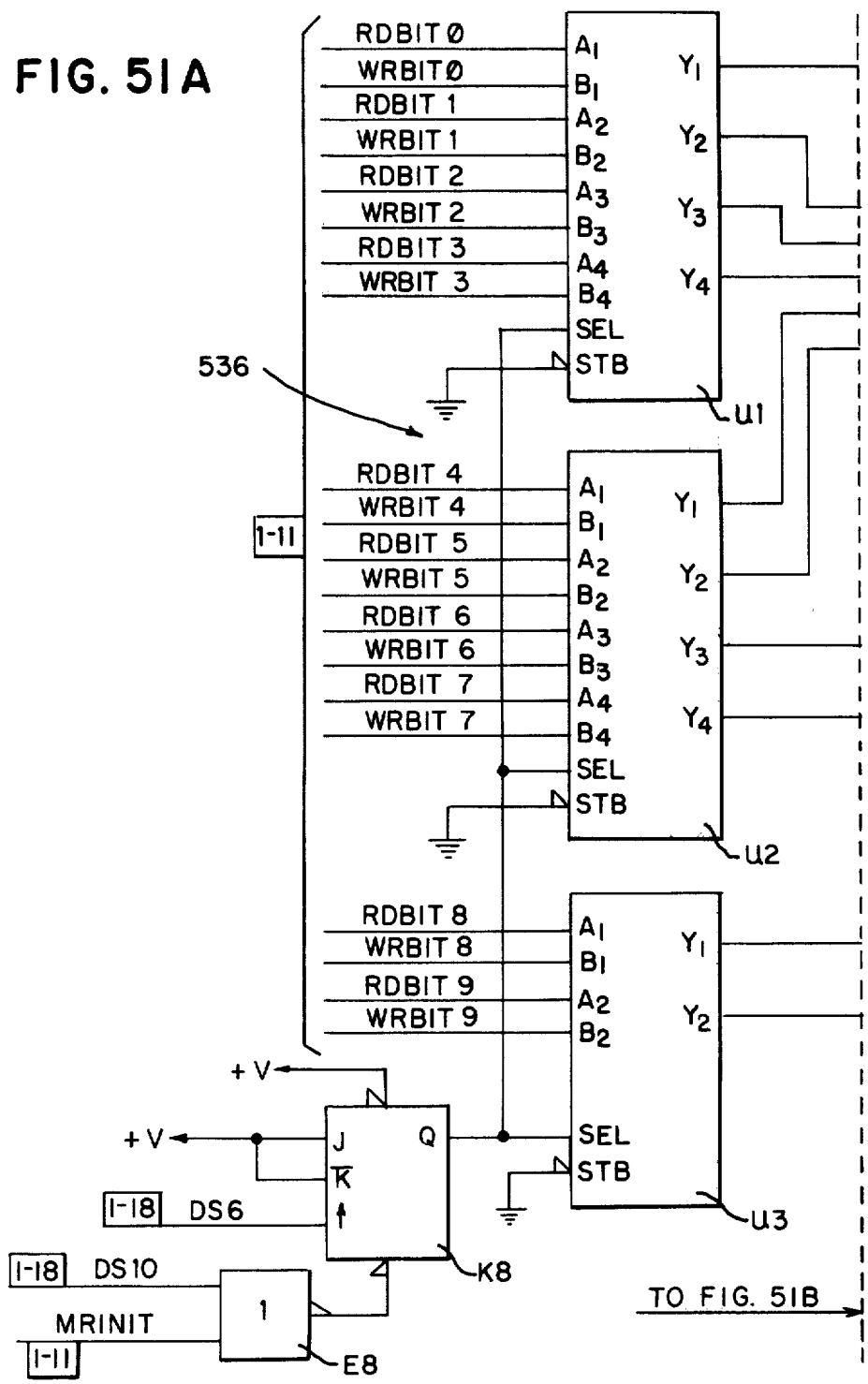
FIGS. 51A and 51B show additional details of the tuple decision RAM address select and the write decision RAM shown in FIG. 42B.
Figure 51B:
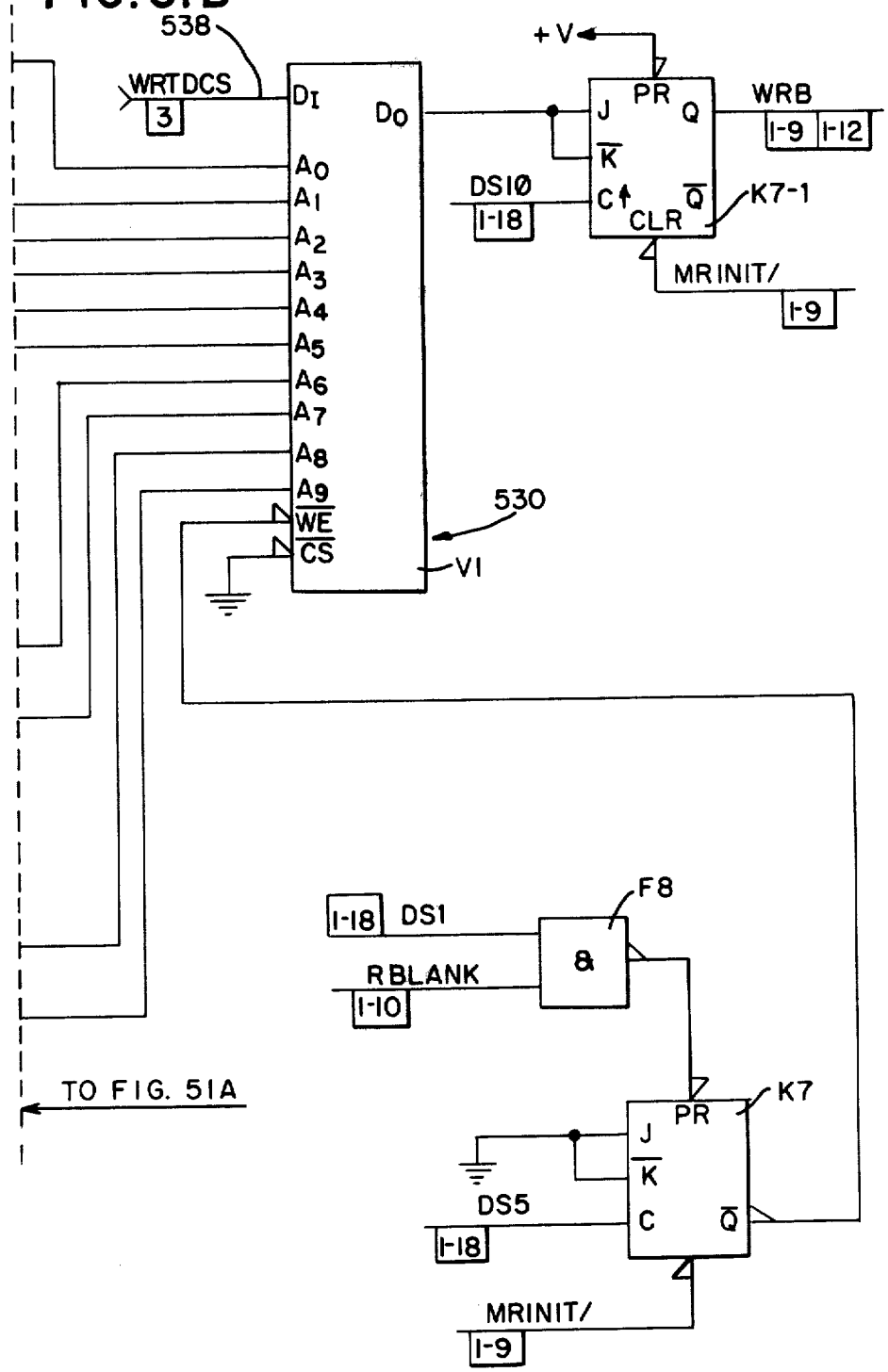

The tuple decision RAM address select block 536 and the write decision RAM 530 (FIG. 42B) are shown in more detail in FIGS. 51A and 51B. The select block 536 is comprised of the two-line to one-line multiplexers U1, U2 and U3 shown in FIG. 51A, which multiplexers are conventional such as IC #74LS157 which are manufactured by T.I. The multiplexers U1, U2, and U3 receive data from the counters 532 and 534 (FIG. 42B) and provide the developed address to the write decision RAM 530 which is also marked V1 in FIG. 51B. The logic gate E8 and the flip flop K8 (FIG. 51A) are used to develop the select signal for the select block 536. The gate F8 and the flip flop K7 (FIG. 51B) are used for the purpose of writing the decision into the decision RAM 530 at the correct time. The flip-flop K7-1 (FIG. 51B) is used for the purpose of storing the output of the RAM 530. The WRTDCS signal passing over line 538 is used as the input to the RAM 530. The WRB output from the flip flop K7 (FIG. 51B) provides the write signal to write data into the storage array 310. The inputs and outputs (and their descriptions) associated with FIGS. 51A and 51B are shown in the following List #26.

LIST #26

| | Description |
|---|---|
| Inputs | |
| RDBIT∅-9 | Address of insert decision |
| WRBIT∅-9 | Address of read decision |
| WRTDCS | Write decision to be stored |
| DS1 | (Data Strobe #1) |
| DS5 | (Data Strobe #5) |
| DS6 | (Data Strobe #6) |
| DS1∅ | (Data Strobe #10) |
| MRINIT/ | Master Reset Initialize |
| MRINIT | Complement of above |
| RBLANK | (Read Blank) See List #4 |
| Outputs | |
| WRB | Write byte into array 310 now. |

Figure 52A:
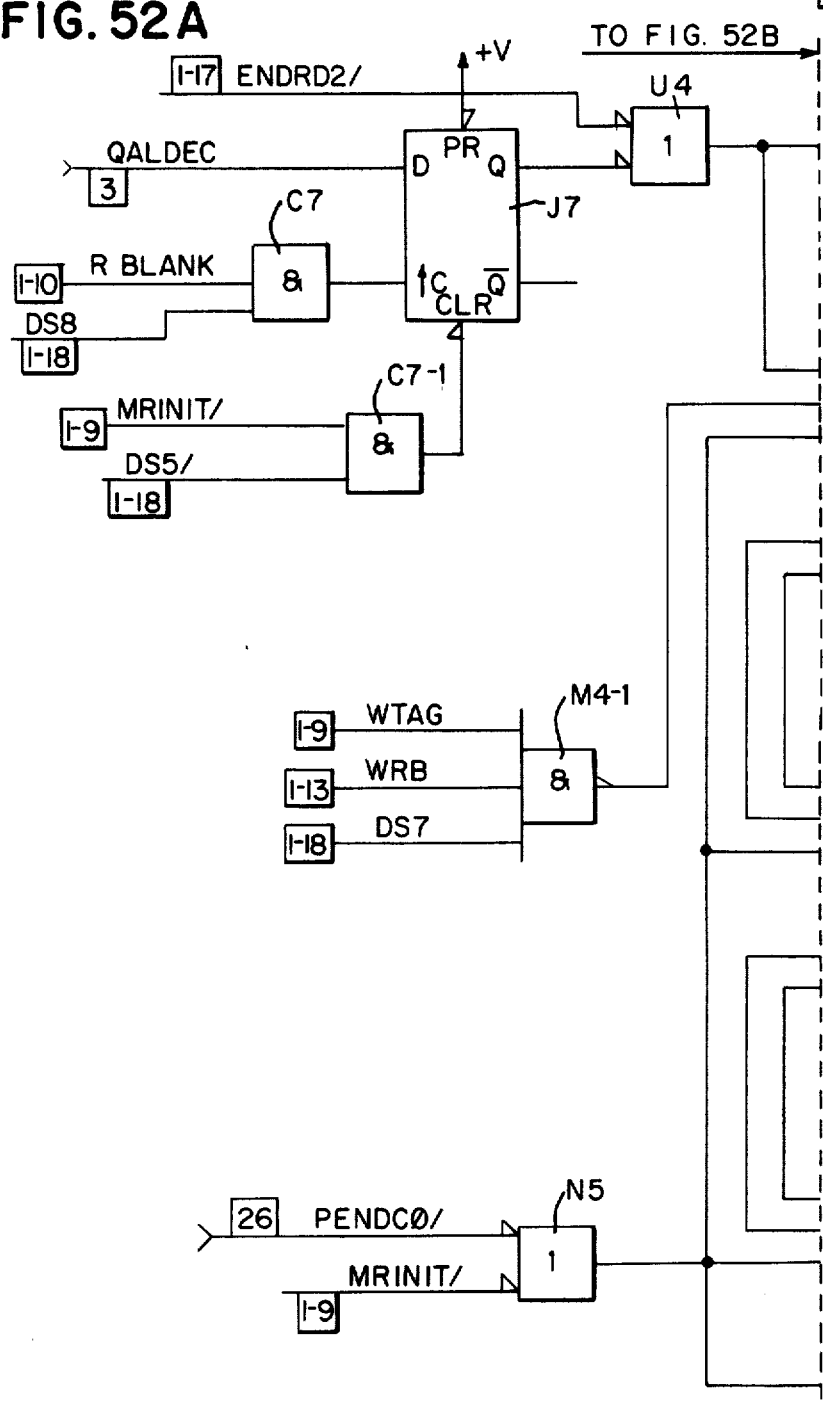
FIGS. 52A and 52B show additional details of the count of pending tuples written counter shown in FIGS. 42B.
Figure 52B:
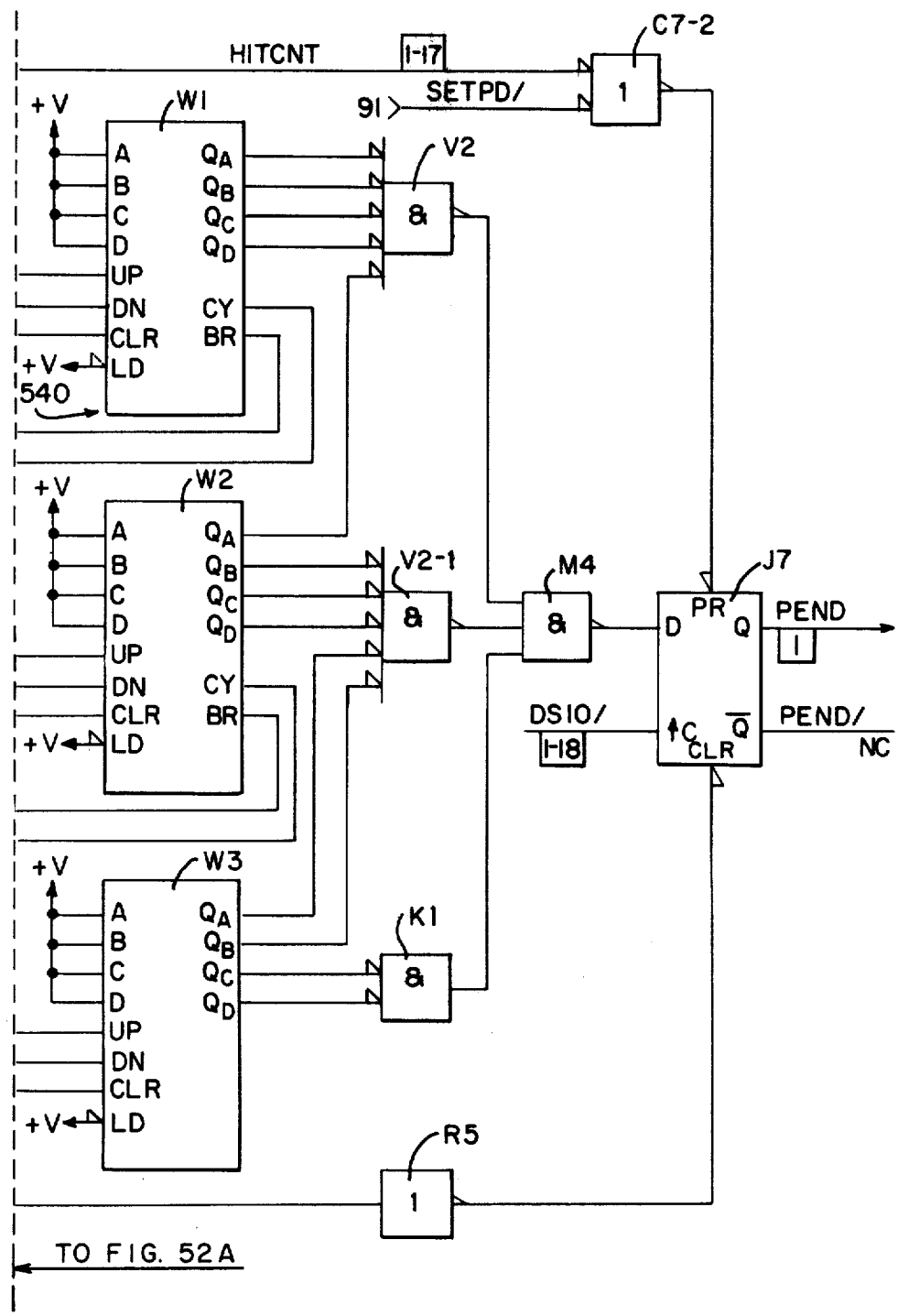

The count of pending tuples to be written counter 540 (FIG. 42B) is comprised of the counters W1, W2, and W3 shown in FIG. 52B, which counters are conventional such as IC #74LS193 which are manufactured by T.I. The gates V2, V2-1 K1, and M4 in FIG. 52B process the outputs from the counter 540 to produce an output from gate M4 (FIG. 52B) when the counter 540 reaches zero (to produce a low level at the Q output of flip flip J7), otherwise a high-level signal at the Q output of the flip flop J7 indicates that there are still tuples to be written. The logic gates C7, C7-1, U4, and the flip flop J7 (FIG. 52A) are used to enable the counter 540 to count up, and the gate M4-1 (FIG. 52A) is used to enable the counter 540 to count down. The output of the gate N5 (FIG. 52A) is used to clear the counter 540. The output of gate N5 (FIG. 52A) is fed through inverter R5 (FIG. 52B) to clear the flip flop J7. The various inputs and outputs, and their descriptions associated with FIGS. 52A and 52B are shown in the following List #27.

LIST #27

| | Description |
|---|---|
| Inputs | |
| MRINIT | (Master Reset Initialize) |
| DS5/ | (Data Strobe #5) |
| DS3 | (Data Strobe #3) |
| DS7 | (Data Strobe #7) |
| DS8/ | (Data Strobe #8) |
| DS10/ | (Data Strobe #10) |
| QALDEC | (Qualified Decision) Tuple was qualified. |
| WRB | Write byte into array 310 now. |
| WTAG | Write tag into array 310 now. |
| PENDC0/ | Set pending count to zero in counter 540 |
| ENDRD2/ | End of read of a domain out of the read/write module 326. |
| RBLANK | (Read Blank) See List #4 |
| SETPD/ | (Set Pending) Means there is data pending in the loop buffer which needs to be rewritten |
| Outputs | |
| PEND | A write is still pending |
| PEND/ | A write is not pending |
| HITCNT | Pulse for hit count total |

Figure 53B:
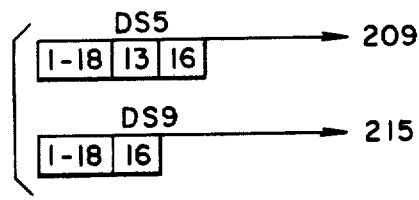
FIGS. 53A and 53B show circuitry for developing certain delay signal lines associated with the loop control module shown in FIGS. 42A and 42B.
Figure 53A:
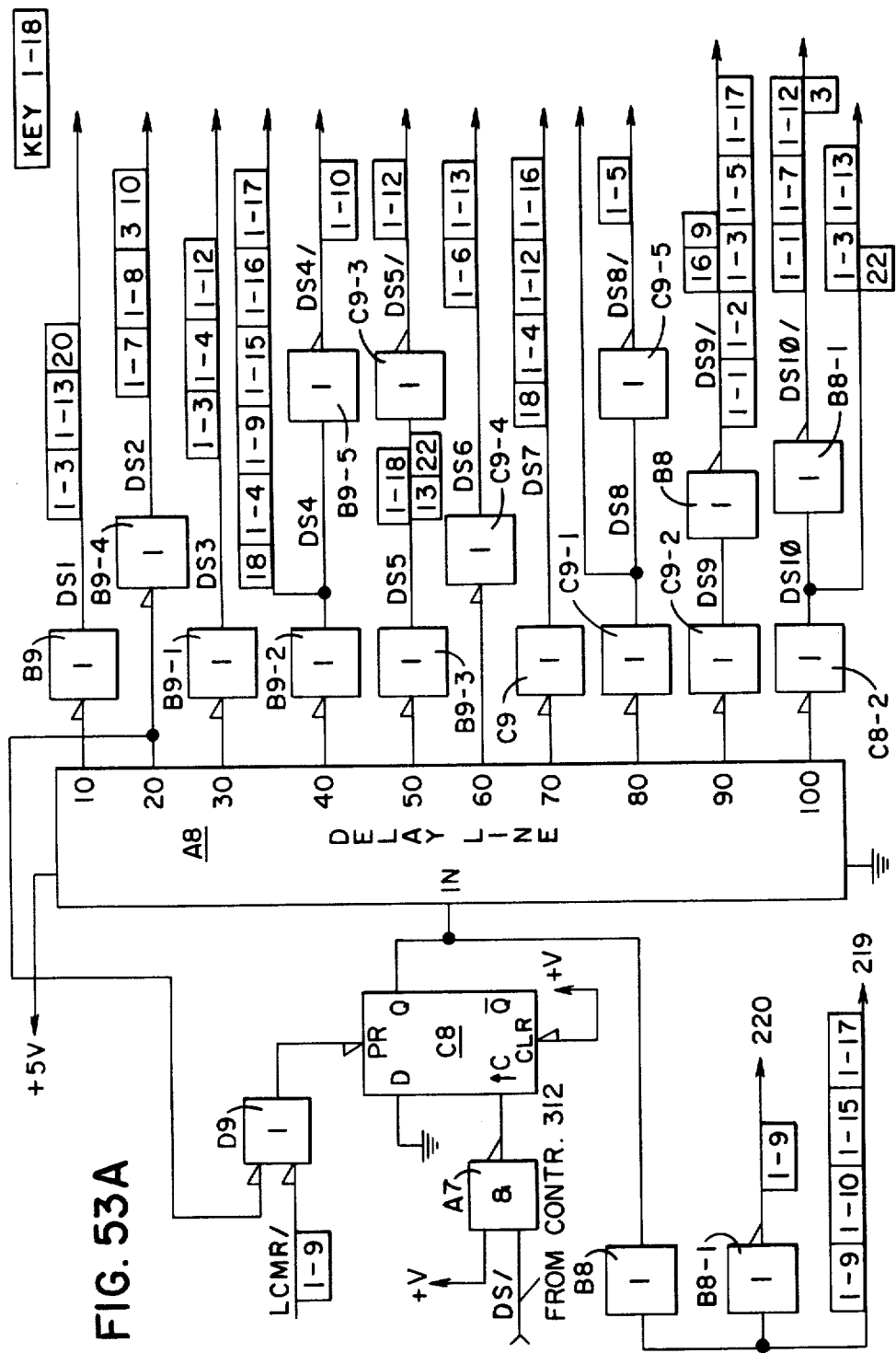

FIGS. 53A and 53B show certain circuitry for developing certain control signals associated with the loop control module 328. The circuitry includes the gates A7, D9, flip flop C8, inverters, B8, and B8-1 and delay unit A8. The delay unit A8 is a conventional delay unit. A signal like DS1, for example, is delayed by 10 nanoseconds (as shown by the 10 within the block A8) after the output from flip flop C8. A plurality of inverters B9, B9-1, B9-2, B9-3, B9-4, B9-5, C9, C9-1, C9-2, C9-3, C9-4, C9-5, C8-2, B8, and B8-1 is used to get the various outputs and their complements shown. The various inputs and outputs (and their descriptions) shown in FIGS. 53A and 53B are included in the following List #28. FIG. 53B is shown on the sheet containing FIG. 46B.

LIST #28

| | Description |
|---|---|
| Inputs | |
| LCMR/ | Loop Control Master Reset |
| DS/ | Data Strobe from PFP 304; it generates all the outputs listed below. |
| Outputs | |
| DS1 | (Data Strobe #1) |
| DS2 | (Data Strobe #2) |
| DS3 | (Data Strobe #3) |
| DS4 | (Data Strobe #4) |
| DS4/ | (Complement of above) |
| DS5 | (Data Strobe #5) |
| DS5/ | (Complement of above) |
| DS6 | (Data Strobe #6) |
| DS7 | (Data Strobe #7) |
| DS8 | (Data Strobe #8) |
| DS8/ | (Complement of above) |
| DS9 | (Data Strobe #9) |
| DS9/ | (Complement of above) |
| DS10 | (Data Strobe #10) |
| DS10/ | (Complement of above) |
| DSB | (Data Strobe Buffered) |
| DSB/ | (Complement of above) |

Figure 54:
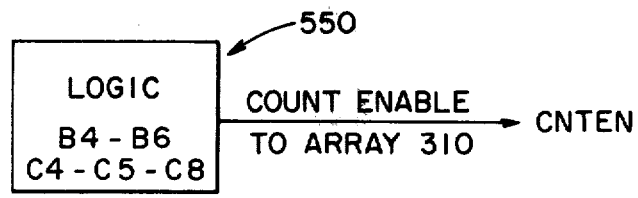
FIGS. 54, 55, and 56 show various logic sections associated with the control logic shown in FIG. 3.
Figure 55:
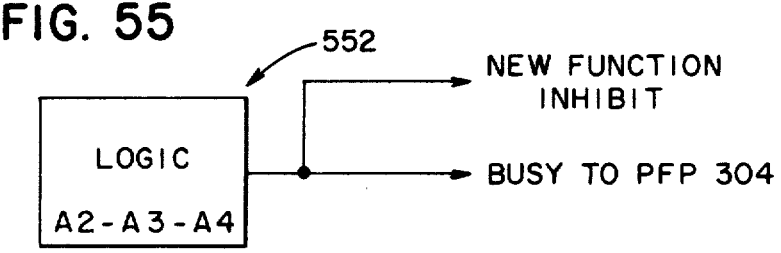
Figure 56:
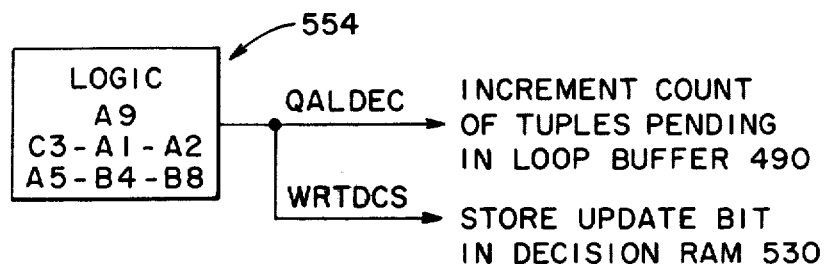

Each ADC, such as 306 (FIG. 3), has control logic designated generally as 548 associated therewith. The control logic 548 is divided generally into three logic sections 550, 552 and 554 shown in FIGS. 54, 55, and 56, respectively.

The general function of the control logic section 550 (FIG. 54) is to generate the count enable to array signal (CNTEN); this signal is generated if:
 (1) The execute function is issued;
 (2) The count function is issued;
 (3) The start of data insert after an acknowledge; or
 (4) The Read operation is continued after at least one group of domains is transferred from the ADC (306) to the PFP 304.

The general function of the control logic section 552 (FIG. 55) is to:
 (1) Set a Busy signal to the PFP 304 if an Execute function is issued; and
 (2) Reset the Busy signal if:
  A. All the modifications have been updated in the storage array 310 and any of the following occur:
   1. Master Reset is on;
   2. Cancel line is true or at a high level while the ADC (306) is not acknowledged;
   3. End of Insert;
   4. End of return hit Count operation;
   5. Entire relation has been scanned, and if a Read transfer was in progress, it is finished.

The general function of the control logic section 554 (FIG. 56) is to produce the QALDC signal which is used to increment the count of tuples pending in the loop buffer 490 (FIG. 42A) and to store the update bit in the write decision RAM 530 (FIG. 42B) of the loop control module 328. An update or a qualified hit occurs during any of the following functions:
 (a) Insert,
 (b) Replace,
 (c) Read, and
 (d) Mark.

A qualified hit means that the tag field and any domain under examination match the data request.

Figure 57B:
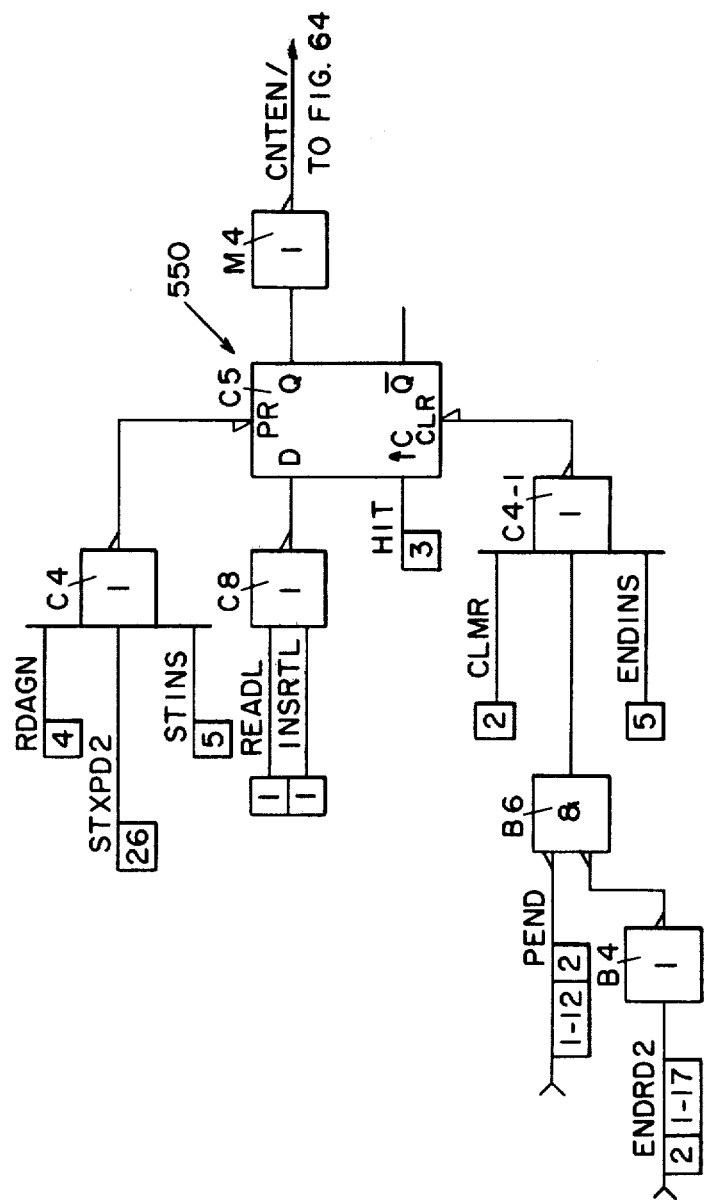

The logic section 550 (FIG. 54) is shown in more detail in FIGS. 57A, 57B and 57C. The latch B5 (FIG. 57A) is a conventional latch such as IC #74LS273 which is manufactured by T.I., and is used for storing or latching the functions such as Insert, Read, Mark, etc. which are initially set up by the PFP 304 (FIG. 5). The particular function which is being executed by the ADC 306 remains in the latch B5 until a new function is loaded therein by the PFP 304. As an example, an insert function (INSRT/) from the PFP 304 passes through an inverter (D5) and through the latch B5 to become the latched version of the insert function or (INSRTL). The conventional gates B4, B6, C4, C4-1, C8, M4 and flip flop C5 shown in FIG. 57B are utilized to produce the count enable signal CNTEN/ to the storage array 310 as previously described in relation to FIG. 54. The CNTEN/ signal is set whenever reading or writing is to be done with regard to the array 310 and it is not set when either of these functions is not done. Either of the latched Replace or Insert signals will produce a Write Mode (WRITEM) signal via the OR gate B8 shown in FIG. 57C. The various inputs and outputs (and their descriptions) associated with FIGS. 57A, 57B, and 57C are shown in the following List #29.

LIST #29

| | Description |
|---|---|
| Inputs | |
| RDAGN | Start Read again |

LIST #29-continued

| | Description |
|---|---|
| STXPD2 | Start execute signal, delayed |
| STINS | Start Insert |
| READ/ | It is a decoded function command for Read. |
| INSRT/ | It is a decoded function command for Insert. |
| Hit | Indicates a qualified tuple has been found. |
| CLMR | Clear Master Reset |
| ENDINS | (End Insert) Indicates the end of an Insert operation. |
| PEND | A write to the storage array 310 is still pending |
| ENDRD2 | See List #27 |
| MR/ | Master Reset |
| LFINIT | (Leading Function Initialize) It clocks new function code in latch B5. |
| Outputs | |
| CNTEN/ | (Count Enable) To storage array 310. |
| WRITEM | (Write Mode) Into storage array 310. |
| INSRTL | Insert (latched) |
| REPLAL | Replace (latched) |
| MINL | Minimum (latched) |
| MAXL | Maximum (latched) |
| READL | Read (latched) |
| MARKL | Mark (latched) |
| COUNTL | Count (latched) |

Figure 58A:
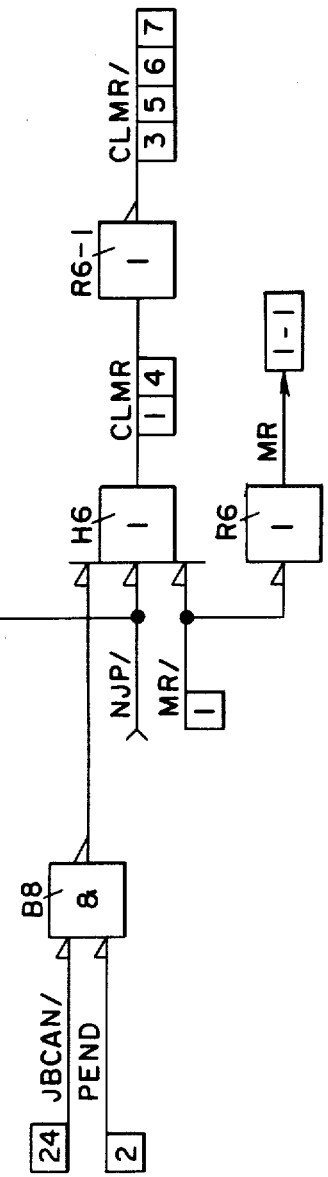
FIGS. 58A and 58B show more details of the logic shown in FIG. 55.
Figure 58B:
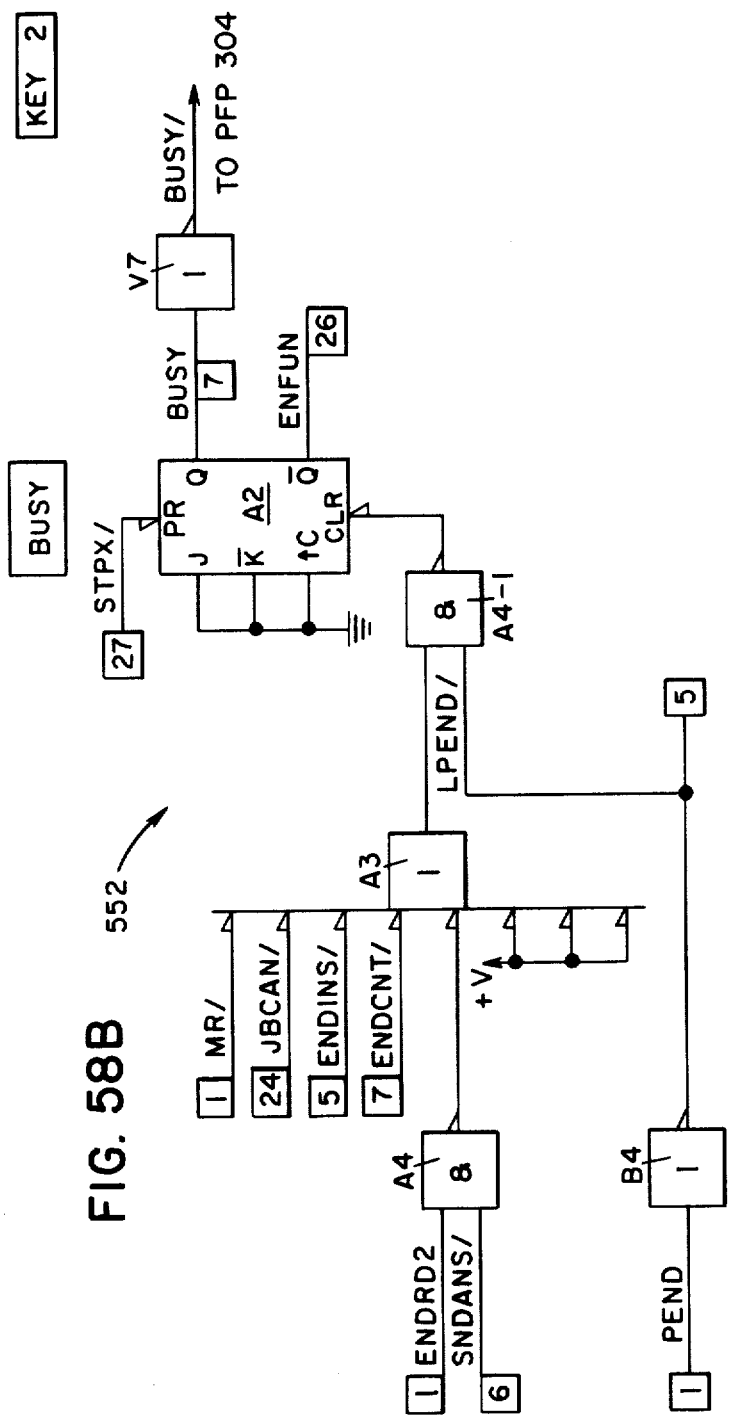

The logic section 552 (FIG. 55) is shown in more detail in FIGS. 58A and 58B. The gates A4, B4, A3, A4-1, flip flop A2 and the inverter V7 shown in FIG. 58B are conventionally utilized to produce the BUSY/ signal shown. The gates B8, H6, and inverters R6 and R6-1 shown in FIG. 58A are utilized to produce a clear master reset (CLMR/) signal and the master reset (MR) which generally clear some of the internal logic in the ADC 306. The various inputs and outputs (and their descriptions) associated with the circuitry shown in FIGS. 58A and 58B are included in the following List #30.

LIST #30

| | Description |
|---|---|
| Inputs | |
| JBCAN/ | (Cancel Job) From PFP 304 |
| PEND | (Pending) It means that there is pending or modified data in the loop control buffer 490 |
| NJP | (New Job Pulse) See List #10. |
| MR/ | Master Reset |
| STXP/ | Start execute pulse |
| ENDINS/ | End of Insert |
| ENDCNT/ | End of Count |
| ENDRD2 | End of relation read |
| SNDANS | Send answer |
| Outputs | |
| CLMR | Clear Master Reset |
| CLMR/ | Complement of above |
| ENFUN | Enable Function |
| BUSY/ | Busy |
| BUSY | Complement of above |
| PEND/ | (Complement of Pending) See List #30 Inputs |
| MR | Master Reset |

Figure 59:
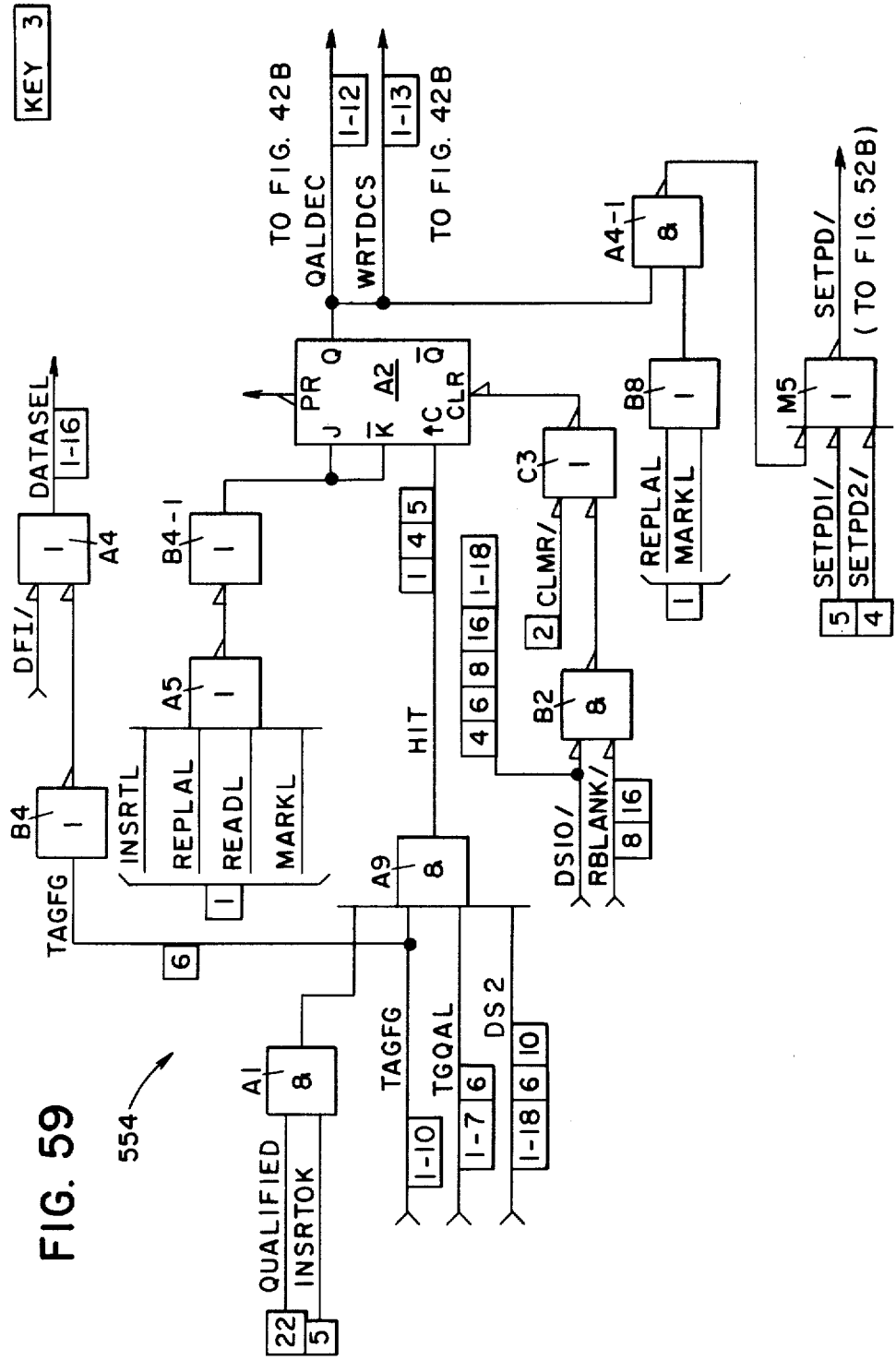
FIG. 59 shows additional details of the logic shown in FIG. 56.

The logic section 554 (FIG. 56) is shown in more detail in FIG. 59. The various input signals are fed into the logic circuitry shown in FIG. 59, which circuitry includes the various gates A1, A9, B4, A4, B2, A5, C3, B4-1, B8, M5, A4-1, and flip flop A2 which are interconnected as shown. The flip flop A2 is set or produces a high level on the Q output thereof (which becomes a qualified signal or QALDEC) when the various input conditions shown therein determine whether or not a tuple is qualified. The QALDEC signal goes to the count of pending tuples to be written counter 540 (FIG. 42B) and the WRTDCS signal goes to the write decision RAM 530 (FIG. 42B). Because a qualified tuple means that changes may possibly be made in that tuple, the tuple is stored in the loop buffer 490 (FIGS. 43 and 45A) and a latch J7 (FIG. 52B) is set from the SETPD signal from FIG. 59. A description of the various inputs and outputs shown in FIG. 59 are shown in the following List #31.

LIST #31

| | Description |
|---|---|
| Inputs | |
| DF1 | Data to be inserted in storage array 310 |
| TAGFG | (Tag Flag) It means that the current byte being read is the tagged byte of the tuple |
| Qualified | Domain is qualified |
| INSRTOK | Insert is OK |
| TGQAL | Tag is qualified |
| DS2 | (Data Strobe #2) |
| DS10/ | (Data Strobe #10) |
| INSRTL | A latched Insert command |
| REPLAL | A latched Replace command |
| READL | A latched Read command |
| MARKL | A latched Mark command |
| RBLANK/ | (Complement of Read Blank) See List #4 |
| CLMR/ | Clear Master Reset |
| SETPD1/ | Set pending |
| SETPD2/ | Set pending |
| Outputs | |
| DATASEL | (Data Select) |
| HIT | It indicates that a qualified tuple has been read and that the tag byte is presently being read and that it qualified. |
| QALDEC | Qualified decision |
| SETPD/ | Set pending |

Figure 60A:
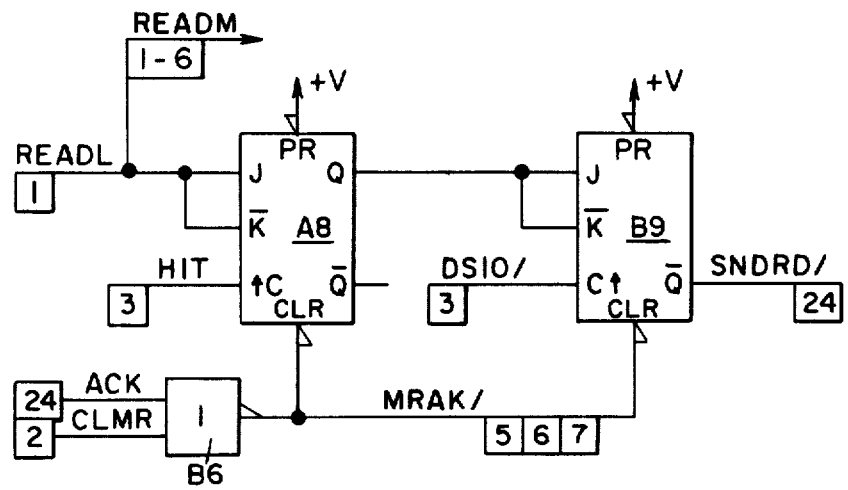
FIGS. 60A and 60B show additional details of a portion of the control logic shown in FIG. 3.
Figure 60B:
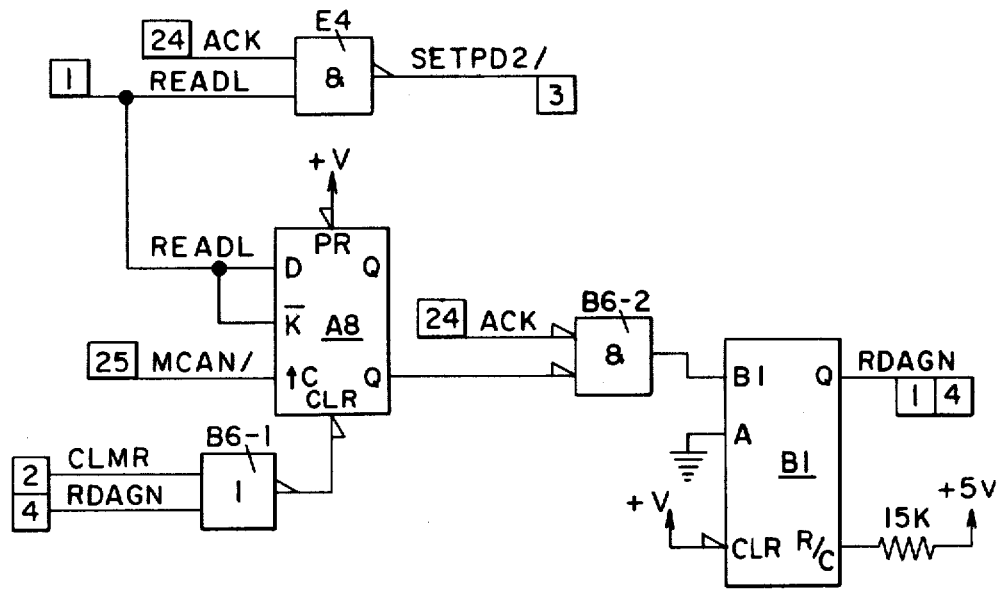

FIGS. 60A and 60B show additional details of a portion of the control logic 548 shown in FIG. 3. Whenever a Read function is performed, that fact is remembered by the flip flops A8 and B9 (FIG. 60A), and these flip flops control the sending of data or answers back to the PFP 304 via the "send read data term" (SNDRD/) shown in FIG. 60A. whenever the ADC 306 is ready to transfer data to the PFP 304, it waits for the PFP 304 to acknowledge that it is ready to accept the data. After the data transfer to the PFP 304, the signal RDAGN restarts the ADCs (306) to look for another qualified tuple. This RDAGN signal from flip flop B1 (FIG. 60B) is fed to the gate C4 (FIG. 57B) and is also fed into one input of the gate B6-1, also shown in FIG. 60B. In effect, the ADC 306 will not continue with its reading operation until the ACK signal drops to the low level and the MCAN/ signal fed into flip flop A8 (FIG. 60B) rises to a high level. The various gates B6 and the flip flops A8 and B9 shown in FIG. 60A and the various gates E4, B6-1, and B6-2 and the flip flop A8, and the monostable multivibrator B1 (IC #74123 which is manufactured by T.I.) shown in FIG. 60B are connected as shown to produce the various inputs and outputs shown in the following List #32.

LIST #32

| | Description |
|---|---|
| Inputs | |
| READL | Signifies a latched Read operation |
| HIT | See List #31 |
| ACK | Acknowledge from the PFP 304 |
| CLMR | Clear Master Reset |
| MCAN/ | (Mode Cancel) It signifies the end of a data transfer |
| DS10/ | (Data Strobe #10) |
| Outputs | |
| SNDRD/ | Send data read |
| SETPD2/ | Set Pending #2 |
| RDAGN | Read Again |
| READM | Read Mode |
| MRAK/ | Master Reset or Acknowledge. |

Figure 61:
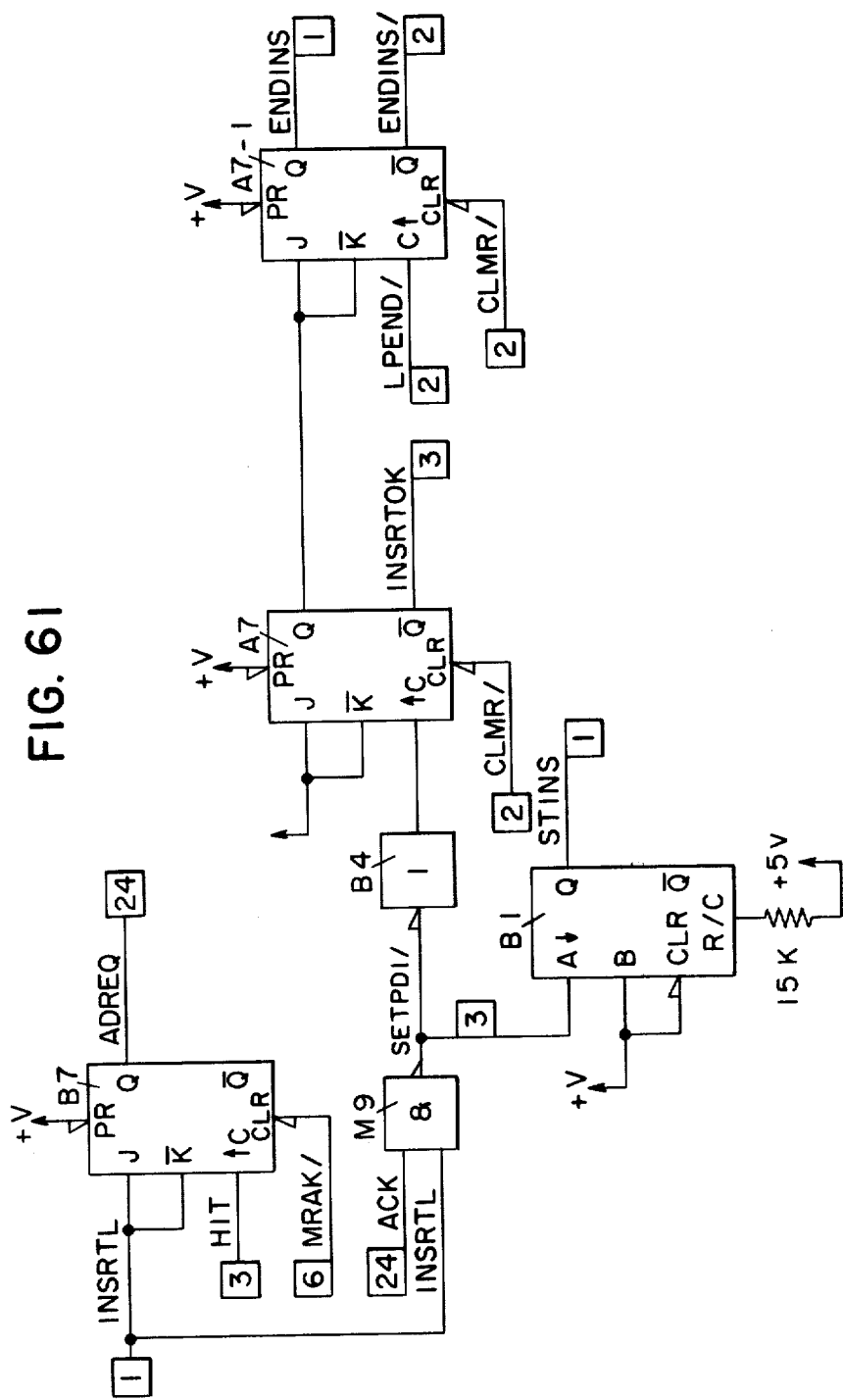
FIG. 61 shows additional details of a portion of the control logic shown in FIG. 3.

FIG. 61 shows additional details of a portion of the control logic 548 shown in FIG. 3. The gate M9, the inverter B4 and the flip flops B7, A7, and A7-1, and the multivibrator B1 (IC #74123 already described) shown in FIG. 61 are connected as shown to receive the various inputs and to produce the various outputs shown therein. Basically, the circuitry shown in FIG. 61 relates to the Insert command. Essentially, the ADC 306 looks for a qualified space in the storage array 310 in which to insert the new data, and when a qualified space is found, the Q output of flip flop B7 is set to produce the additional request (ADREQ) signal. The ADREQ signal is forwarded to the PFP 304. If the PFP 304 wants the data put into the storage array 310, it sends back an acknowledge signal (ACK) to gate M9 which causes the data to be put into an empty or qualified tuple in the storage array 310. The descriptions of the various input and output signals shown in FIG. 61 are included in List #33.

LIST #33

| | Description |
|---|---|
| Inputs | |
| INSRTL | Latched Insert command |
| HIT | See List #31 |
| ACK | Acknowledge from PFP 304 |
| CLMR/ | Clear Master Reset |
| PEND/ | Pending |
| Outputs | |
| ADREQ | Additional request |
| SETPD1/ | Set Pending #1 |
| STINS | Start Insert |
| INSERTOK | Insert is OK |
| ENDINS | End insert |
| ENDINS/ | Complement of above |

Figure 62A:
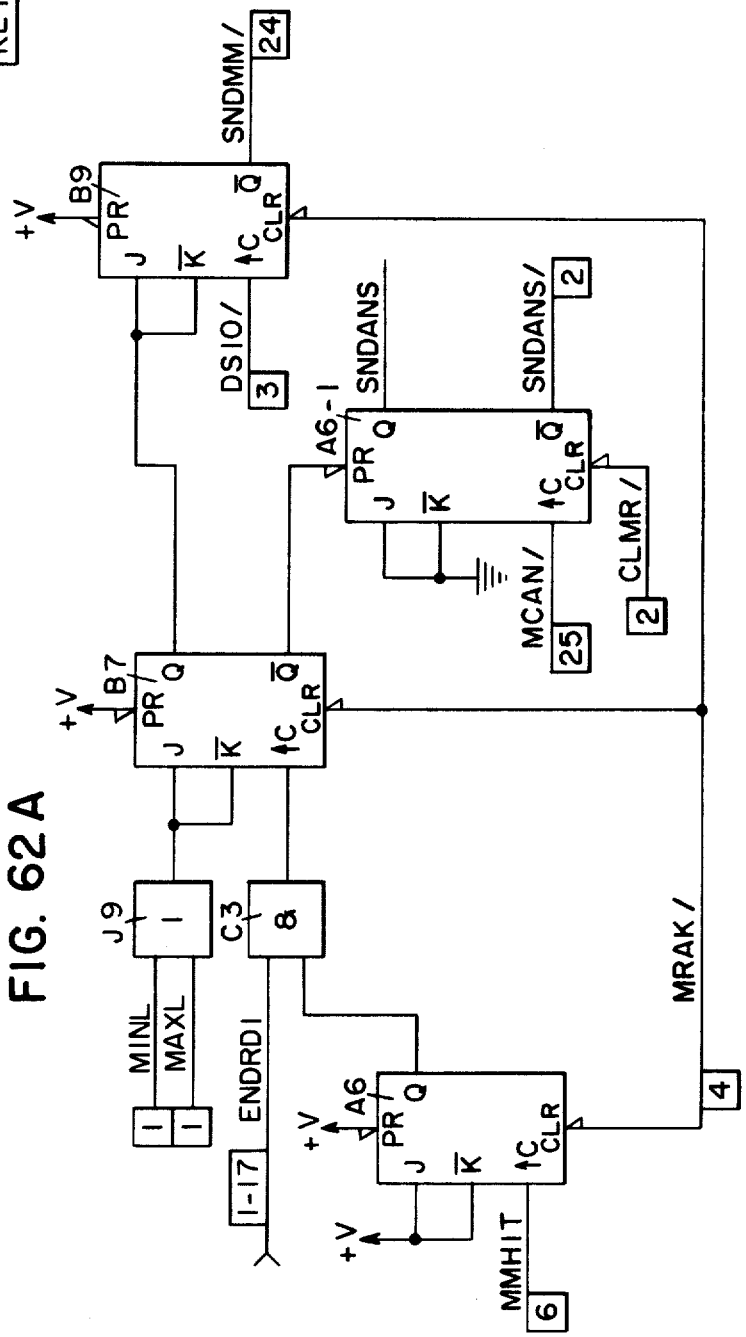
FIGS. 62A and 62B show additional details of a portion of the control logic shown in FIG. 3 as it relates to the min/max module shown in FIG. 3.
Figure 62B:
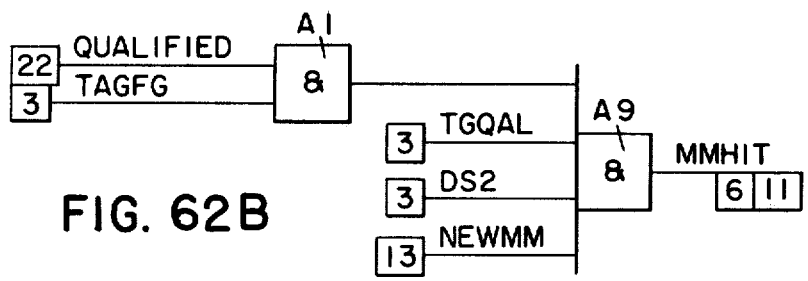

FIGS. 62A and 62B show additional details of a portion of the control logic 548 (FIG. 3) as it relates to the min/max module 320. In FIG. 62B there are shown the AND gates A1 and A9 which are used to produce the min/max hit (MMHIT) previously discussed. The conventional flip flops A6, B7, A6-1, and B9 and the gates J9 and C3 (FIG. 62A) are connected as shown to receive the inputs shown and produce the outputs shown. When a new min/max has been found, the send min/max signal (SNDMM/) from the Q̄ output of flip flop B9 goes true and this value is utilized by the data interchange module 336 (shown in FIG. 3 and to be later described herein) to indicate this fact to the PFP 304. When the PFP 304 acknowledges that it wants the new min/max data sent, the "send answer" pulse (SNDANS) from the Q output of flip flop A6-1 goes true or changes to a high level. A description of the inputs and outputs shown in FIG. 62 are shown in the following List #34.

LIST #34

| | Description |
|---|---|
| Inputs | |
| MINL | Latched Minimum function |
| MAXL | Latched Maximum function |
| QUALIFIED | Indicates tuple being read is qualified |
| TAGFG | (Tag Flag) It indicates that the current byte being read is the tagged byte. |
| TGQAL | (Tag Qualified) It indicates that the current tag qualified a matches the set up requirements. |
| DS2 | (Data Strobe #2) |
| NEWMM | New min/max found |
| CLMR/ | Clear Master Reset |
| MCAN/ | (Mode cancel) It signifies the end of a data transfer. |
| ENDRD1 | End Read #1 |
| Outputs | |
| MMHIT | Min Max hit |
| SNDMM/ | Send Min Max |
| SNDANS | Send answer |
| SNDANS/ | Complement of above. |

Figure 63:
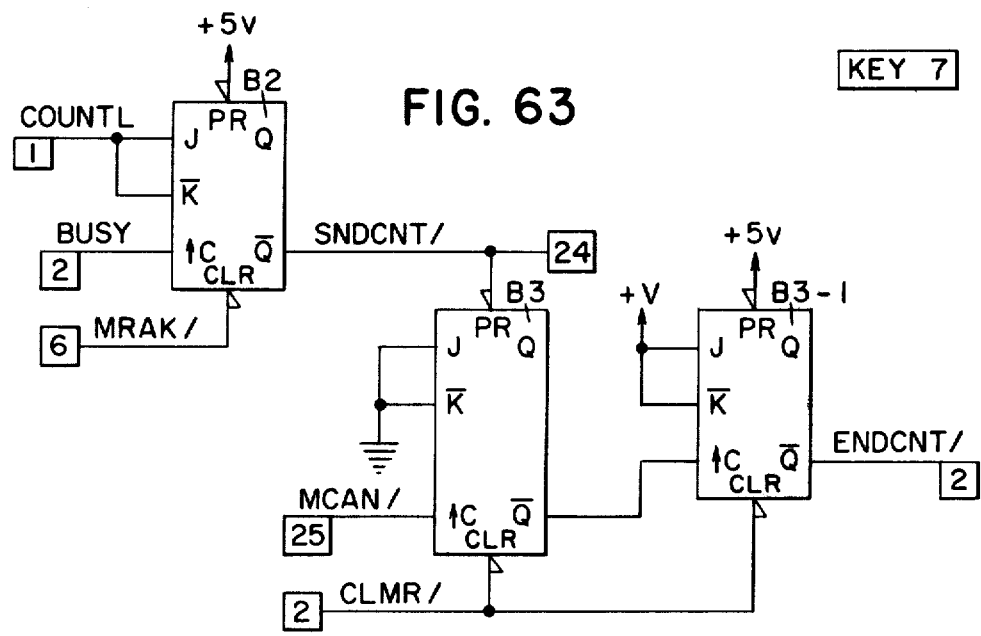
FIG. 63 shows additional details of a portion of the control logic shown in FIG. 3.

FIG. 63 shows a portion of the control logic 548 (FIG. 3) as it relates to sending a count of qualified tuples to the PFP 304. The circuitry in FIG. 63 includes the flip flops B2, B3, and B3-1 which are connected together to receive the inputs shown and to produce the outputs shown. When a count of qualified tuples is requested by the PFP 304, the Q̄ output of flip flop B2 changes to a low level to produce the send count signal (SNDCNT/). After the count is delivered, the Q̄ output of flip flop B3-1 falls to a low level to produce the end of count signal (ENDCNT/). A description of the inputs and outputs to FIG. 63 is shown in List #35.

LIST #35

| | Description |
|---|---|
| Inputs | |
| COUNTL | Latched Count function |
| CLMR | Clear Master Reset |
| ACK | Acknowledge from PFP 304 |
| CLMR/ | Complement of CLMR |
| MCAN/ | Load cancel |
| BUSY | Busy |
| Outputs | |
| SNDCNT/ | Send count |
| ENDCNT/ | End count |

Figure 15A:
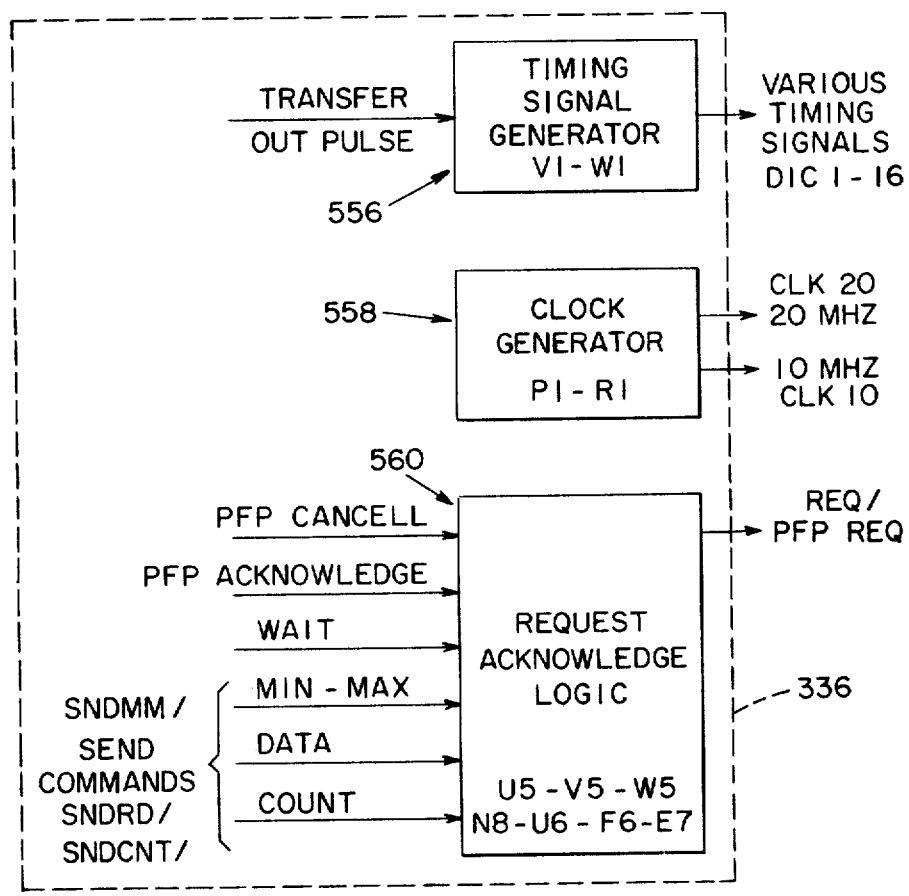
FIGS. 15A, 15B and 15C show additional details of a portion of the data interchange module shown in FIG. 3.

FIG. 15A shows a portion of the data interchange module 336 (FIG. 3) and includes a timing signal generator 556, a clock generator 558, and request acknowledge logic 560.

The timing signal generator 556 (FIG. 15A) utilizes a transfer out pulse TRNOUT/ from the PFP 304 to generate various timing signals associated with the ADC 306.

The clock generator 558 (FIG. 15A) is a conventional generator which produces 10 MHz and 20 MHz square waves to clock the logic associated with the ADC 306.

The request acknowledge logic 560 (FIG. 15A) is used for issuing a request signal (REQ/) to the PFP 304. In general, there are a number of conditions for which a request is generated by the ADC 306 to the PFP 304. For example, if upon searching data in the storage array 310, a min or max value were found, a send min/max signal (SNDMM) coming from the control logic 548 (FIG. 3) would be used to initiate a request of the PFP 304, and in response thereto, the PFP 304 may issue a cancel, acknowledge or wait signal as shown in FIG. 15A.

Figure 15B:
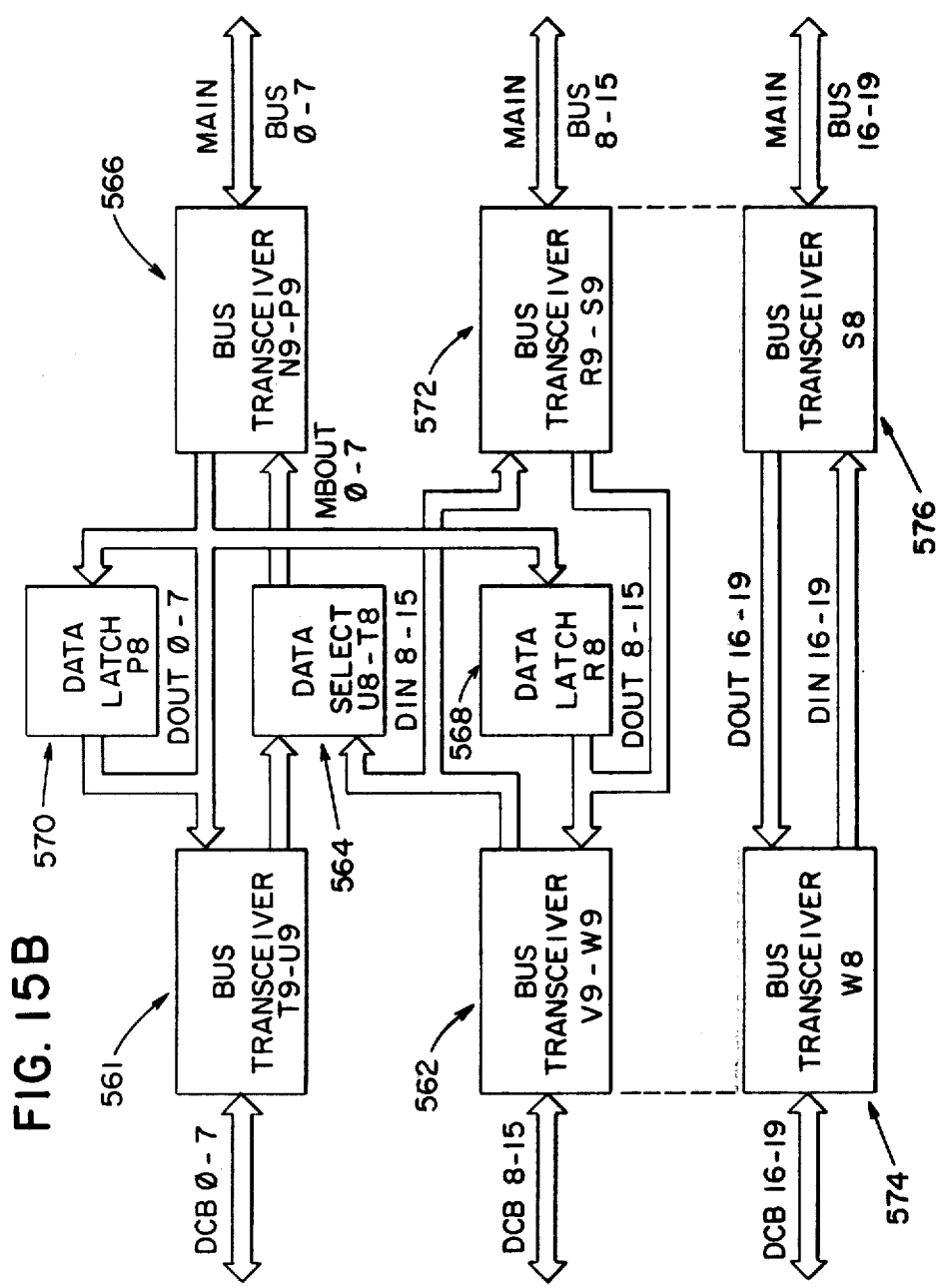

FIG. 15B shows a data path included in the data interchange module 336 (FIG. 3). Basically, the data path is 16 or 20 bits wide; however, there are certain registers within the ADC 306 which are only 8 bits wide; consequently, some data "compression and expansion" (with respect to time) is necessary. By "compression" it is meant that a 16 bit word, for example, is converted into two 8 bit bytes, with one 8 bit byte following the other, and for "expansion", the converse is meant. For example, if a 16 bit word were coming in over the lines DCB∅-7 and DCB8-15, the data on lines DCB∅-7 would pass through the bus transceiver 561 and the data on lines DCB8-15 (MSD) would pass through the bus transceiver 562 to the data select module 564. The data select module 564 then selects the most significant byte ie. from DCB8-15 (in bus transceiver 562) and transfers that to the bus transceiver 566 and thereafter, it is placed on the main bus (marked ∅-7) at time T₁ and thereafter the least significant byte from bus transceiver 561 passes through the bus transceiver 566 at time T₂ and is placed on the main bus (marked ∅-7). When data is to be "expanded", the first 8 bit byte of data (which is the most significant byte) passes through the bus transceiver 566 (from the main bus ∅-7) and is forwarded to the data latch 568, and the second or least significant 8 bit byte passes through the bus transceiver 566 to the data latch 570. At this time a 16 bit word is assembled in the data latches 568 and 570, and, consequently, a 16 bit word may be outputted, via the bus transceivers 562 and 561, respectively, to the DCB8-15 and DCB∅-7 data lines. There is some logic (to be later described herein) associated with the data select module 564 to indicate how the data path is to be effected or controlled.

When a 16 bit word is to be transferred from the main bus MB∅-7 and MB8-15 in FIG. 15B to the DCB∅-7 and DCB8-15 lines, the most significant 8 bit byte passes through the bus transceiver 572 to the bus transceiver 562, and similarly, the least significant 8 bit byte passes through the bus transceiver 566 to the bus transceiver 561.

When a 20 bit wide word is to be transferred from the DCB∅-19 lines to the MB∅-19 lines in FIG. 15B, and vice versa, the first 16 bits are handled as previously explained, and the final 4 bits from lines DCB16-19 pass through the bus transceiver 574 and go directly through the bus transceiver 576 to the main bus lines 16-19.

Figure 15C:
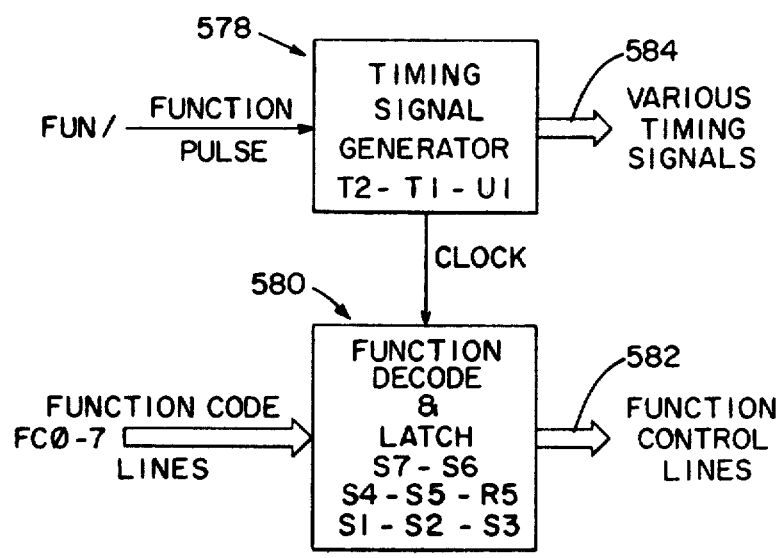

The timing signal generator 578 and the function decode and latch module 580 shown in FIG. 15C are also part of the data interchange module 336 shown in FIG. 3. In general, when the PFP 304 wishes an ADC, such as ADC 306 to perform a certain function, the (FUN/) signal is fed into the timing signal generator 578 and the specific function code is placed on the FC∅-7 lines leading into the function decode and latch module 580 where that particular function code is latched; the FUN/ signal is used to latch the particular function code in the module 580. Having the particular function code latched in the module 580 enables the ADC 306 to handle the various data transfers which are associated with that particular function. The function controls lines 582 are utilized to control the movement of data, as for example, from certain registers within the ADC 306.

The timing signals shown by line 584 are utilized to control certain logic as will be described hereinafter.

Figure 23A:
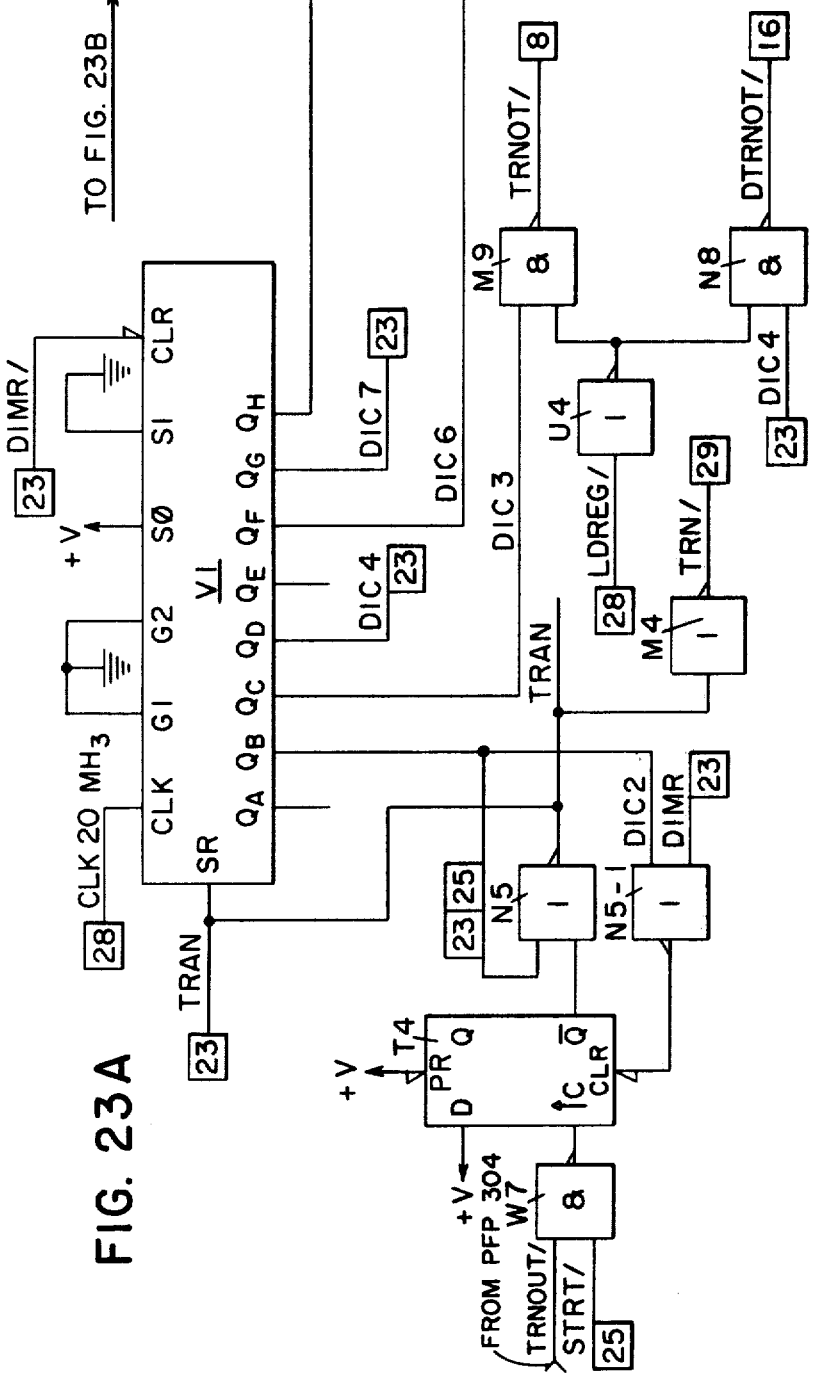
Figure 23B:
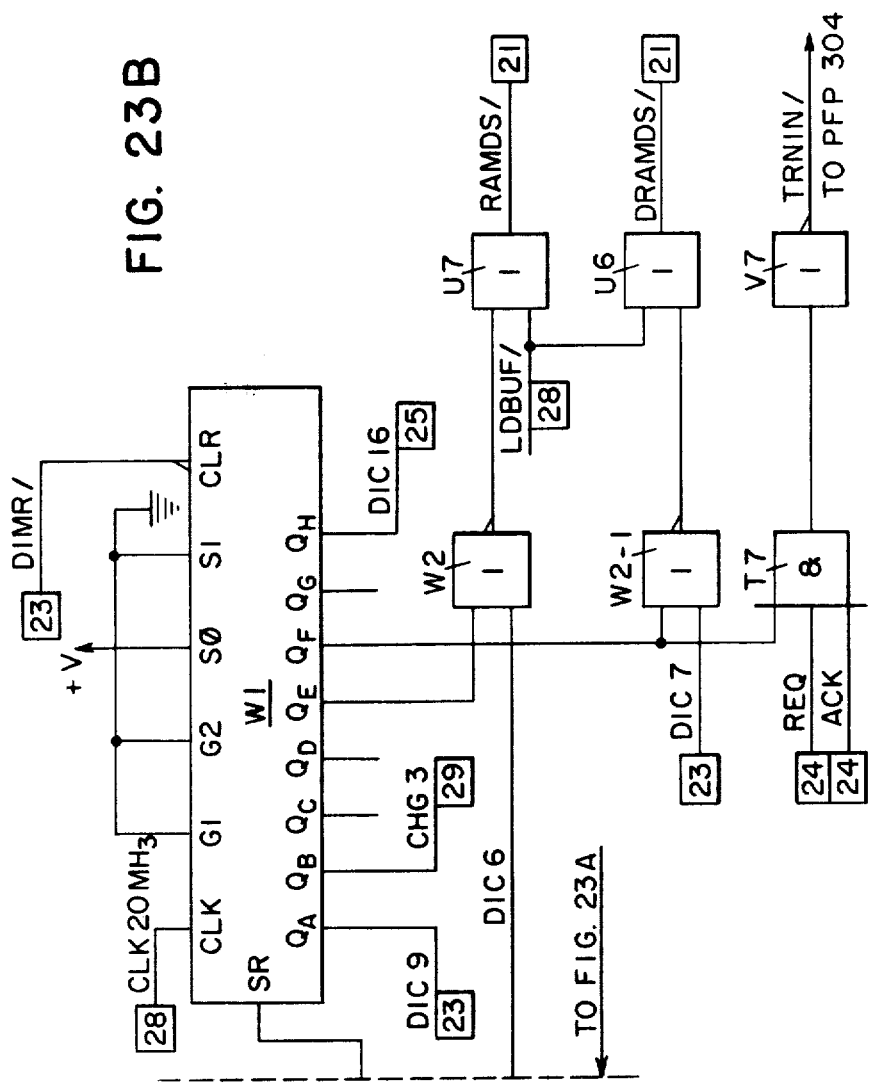

The timing signal generator 556 (FIG. 15A) is shown in more detail in FIGS. 23A and 23B. The transfer out pulse (TRAN) coming from the PFP 304 is fed into conventional shift registers V1 and W1 (FIGS. 23A and 23B) which are conventionally used to develop the data interchange clocks such as DIC2, 3, 4, 5, 6, 9, 13, and DIC 16. A 20 MHz clock coming from the clock generator 558 is fed into each of the shift registers V1 and W1. The various logic gates W7, N5, N5-1, M4, U4, U4-1, N8 and M9 shown in FIG. 23A are wired as shown to receive the various inputs shown and produce the associated outputs. Similarly, the various gates W2, W2-1, T7, U7, U6, and V7 and the shift register W1 shown in FIG. 23B are wired as shown to receive the various inputs shown and produce the various outputs shown.

Figure 23C:
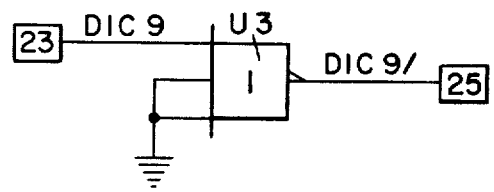
Figure 23D:
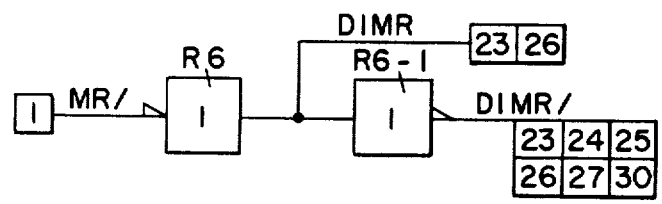
Figure 23E:
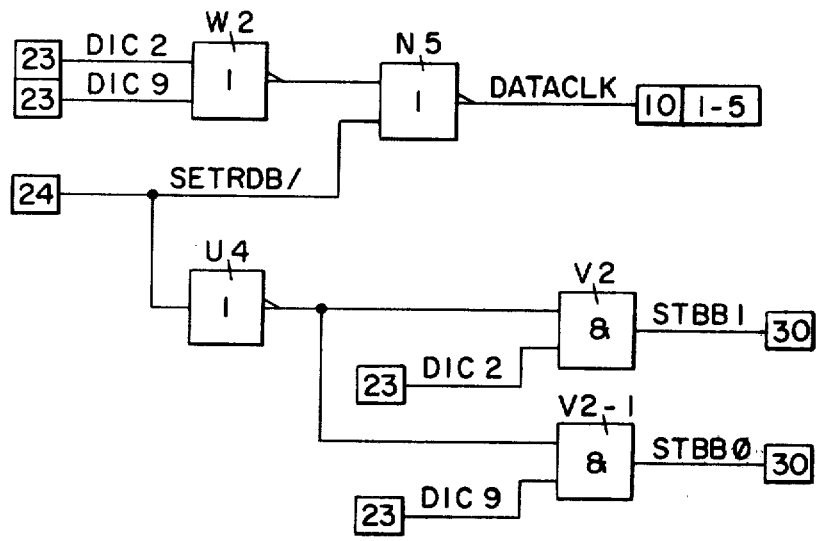

The gate U3 shown in FIG. 23C, the gates R6 and R6-1 in FIG. 23D, and the gates W2, U4, N5, V2, and V2-1 shown in FIG. 23E are connected as shown to produce the various outputs shown from their associated inputs shown.

Figure 23F:
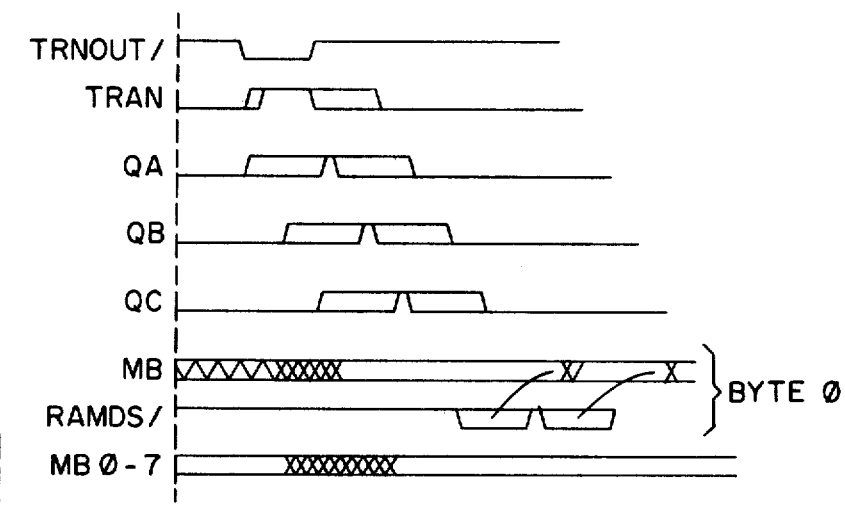

FIG. 23F shows various timing diagrams associated with the data interchange module 336.

The descriptions of the inputs and outputs shown in FIGS. 23A, 23B and 23C are shown in the following List #36.

| LIST #36 | |
|---|---|
| | Description |
| Inputs | |
| MR/ | Master Reset |
| CLK20 | 20MHz clock |
| TRNOUT/ | Transfer out pulse from PFP 304 |
| STRT/ | Start pulse |
| LDREG/ | Load register mode |
| REQ | Request for DCB lines |
| ACK | Acknowledge from PFP 304 |
| LDBUF/ | Load buffer 490 |
| SETRDB/ | Set Read buffer either in read/write module 326 or min/max module 320. |
| Outputs | |
| DIC2-16 | Data interchange clocks |
| TRN/ | Transfer Select the MSB of the word for loading into the RAM 564 |
| TRNOT/ | Load register clock |
| RAMDS/ | RAM load data clock |
| TRNIN/ | Transfer data in (to ADC 306) clock |
| DATACLK | Read RAM data clock |
| STBB∅ | Latch byte ∅ (LSB) |
| STBB1 | Latch byte 1 (MSB) |
| DTRNOT/ | Delayed (TRNOT/) signal |
| DIMR | Data Interchange Master Reset |
| DIMR/ | Complement of above |
| CHGB | Change Byte |
| DRAMDS/ | Delayed Ram Data Strobe |
| QA | Output from Register W1 |
| QB | Output from Register V1 |
| QC | Output from Register V1 |

Figure 24B:
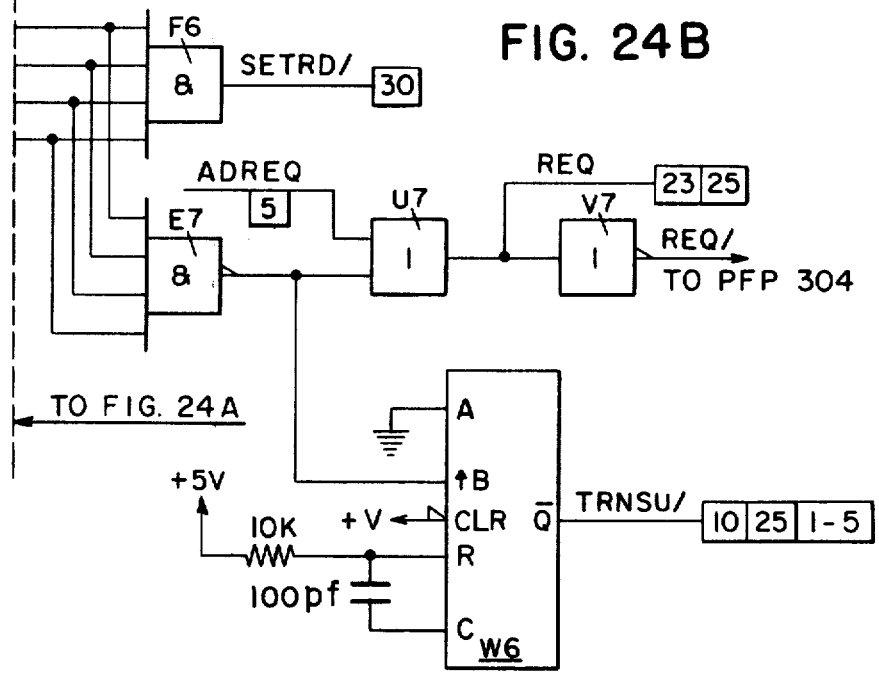
Figure 24A:
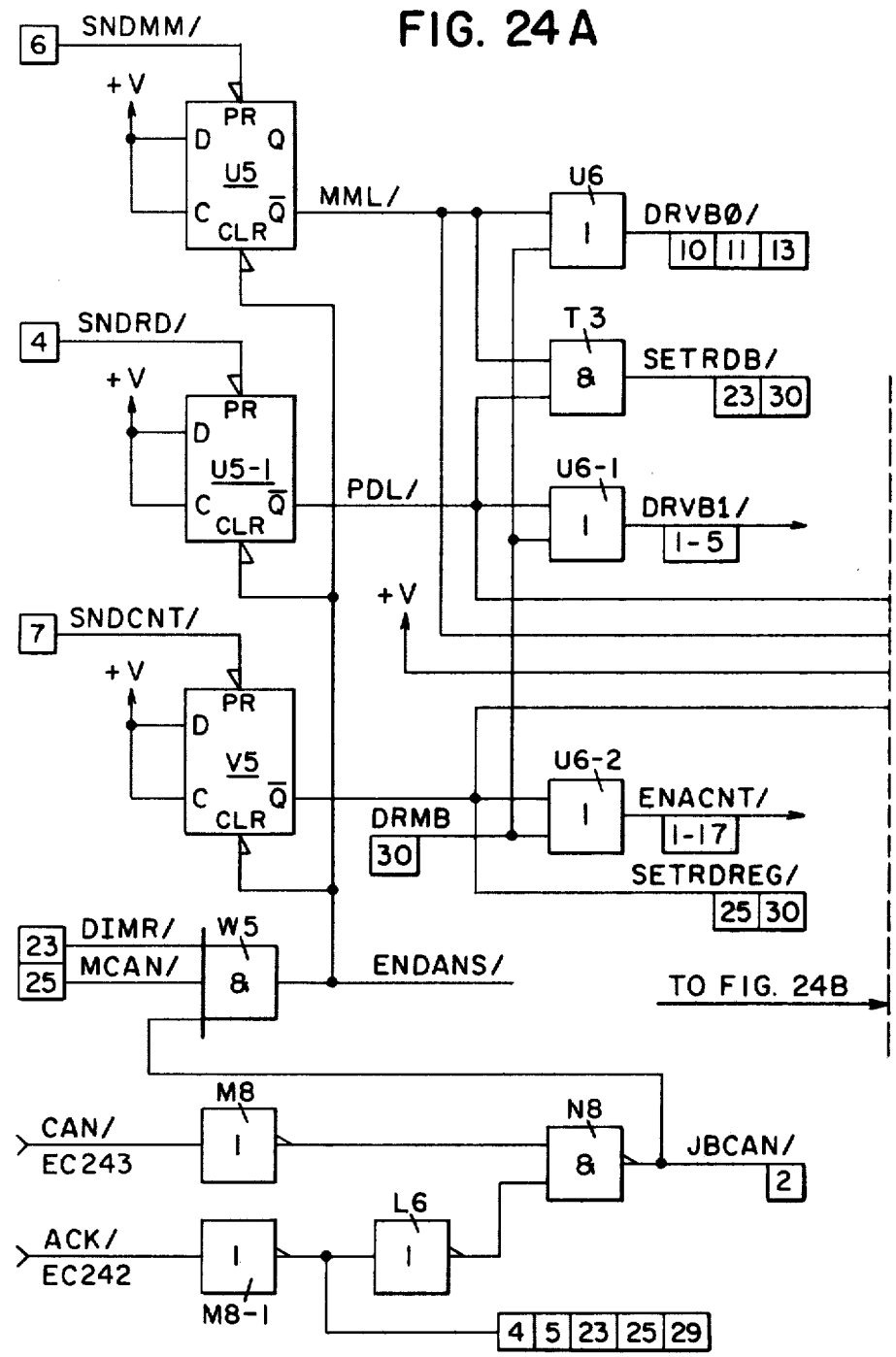

FIGS. 24A and 24B taken together show some additional details of the request acknowledge logic 560 (FIG. 15A). The logic 560 includes the conventional flip flops U5, U5-1, and V5 (FIG. 24A) which latch the SNDMM/ signal, the SNDRD/ signal, and the SNDCNT/ signal, respectively. The SNDMM/ signal comes from the portion of the control logic 548 shown in FIG. 62A indicating that a new min/max has been found for sending to the PFP 304. The SNDRD/ signal also comes from the portion of the control logic 548 shown in FIG. 60A indicating that a read operation has been completed and the data is ready for sending to the PFP 304. The SNDCNT/ signal comes from the portion of the control logic 548 shown in FIG. 63 indicating that a count of "hit items" is ready to be transferred to the PFP 304. The cancel signal (CAN/) from the PFP 304 is fed through inverter M8 to gate N8 (FIG. 24A) and the acknowledge signal (ACK/) also coming from the PFP 304 is fed through the inverters M8-1 and L6 to the gate N8 whose output becomes the job cancel (JBCAN/) mentioned earlier herein. The output of this gate N8 (FIG. 24A) is also fed into the clear inputs of the D-type flip flops U5, U5-1, and V5 (FIG. 24A); the outputs of these flip flops are fed into the gates U6, T3, U6-1, and U6-2 to produce the various signals shown. The remaining logic circuitry including the gates F6, E7, U7, (FIG. 24B) the inverter V7 and the multivibrator W6, such as IC #74123 already mentioned, are connected as shown to produce the various outputs shown. The Q output from multivibrator W6 (FIG. 24B) is the TRNSU/ signal whose function it is to set up the ADCs like 306 for a data transfer to the PFP 304. The description of the various inputs and outputs shown in FIGS. 24A and 24B are shown in List #37.

| | LIST #37 |
|---|---|
| Inputs | Description |
| DIMR/ | Data Interchange Master Reset |
| CAN/ | Cancel function from PFP 304 |
| ACK/ | Acknowledge from PFP 304 to use DCB0-20 data lines |
| MDCAN/ | Mode cancel pulse |
| SNDMM/ | Read min/max up to PFP 304 |
| SNDRD/ | Read data up to PFP 304 |
| SNDCNT | Read count of hits up to PFP 304 |
| SNDST/ | Read status |
| ADREQ | Additional request. |
| ACK | Acknowledge use of DCB0-20 data lines |
| DRVB0/ | Drive main bus to enable min/max to be read |
| DRVB1/ | Drive main bus to enable data read to be transferred to PFP 304 |
| ENACNT/ | Drive main bus to enable count to be transferred to PFP 304 |
| SETRDB/ | Read buffer RAM in the read/write module 326 or the min/max module 320. |
| SETRDREG | Read register (specific register) |
| SETRD/ | Set read operation (general) |
| REQ, REQ/ | Request use of ADC 306 by PFP 304 |
| TRNSU/ | Transfer set up pulse |
| JBCAN/ | Job cancel from PFP 304 |
| ENDANS/ | End of Answer |

Figure 25A:
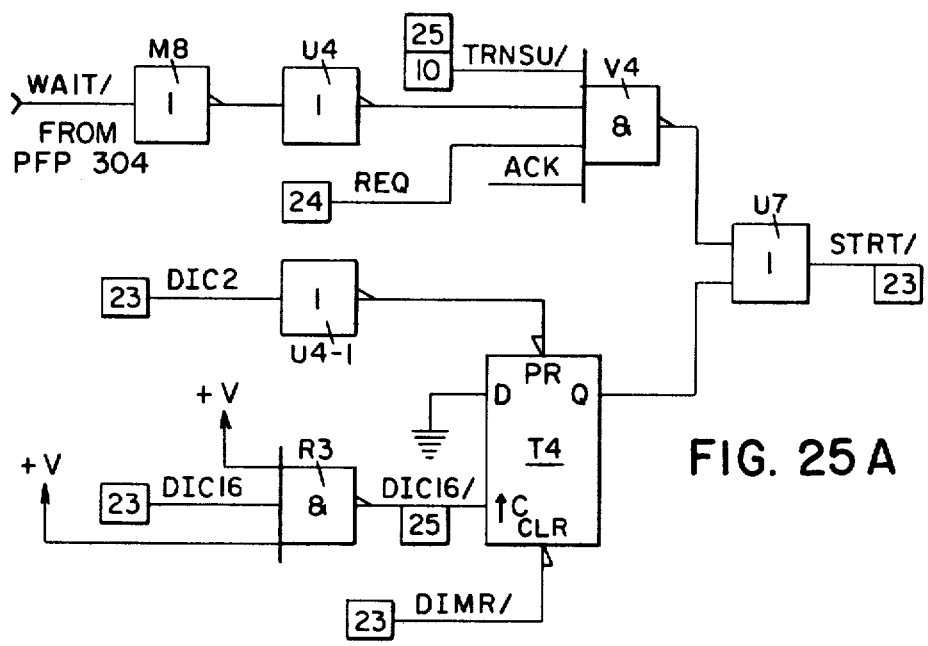

FIG. 24A shows a portion of the request acknowledge logic 560 shown in FIG. 15A. Generally, the logic shown in FIG. 25A is used to start a new cycle when the PFP 304 is not ready to receive data from the ADC 306. The wait signal (WAIT/) coming from the PFP 304 is utilized to make sure that data is not sent to the PFP 304 unless it is ready to receive it. The inverters M8, U4, U4-1, and the gates R3, V4, U7, and the flip flop T4 are interconnected as shown in FIG. 25A to prevent the transfer or start signal (STRT/) from occurring at gate U7 unless the WAIT/ signal is not active, and the request (REQ) and acknowledge (ACK) signals are active. When the PFP 304 is not ready to receive the data, a pulse train which passes through the shift registers V1 and W1 in FIGS. 23A and 23B is utilized to develop another DIC2 pulse, for example, to the inverter U4-1 in FIG. 25A to present cycled times to the circuitry shown in FIG. 25A to provide a "wait" or delay until the PFP 304 is ready to receive the data.

Figure 25B:
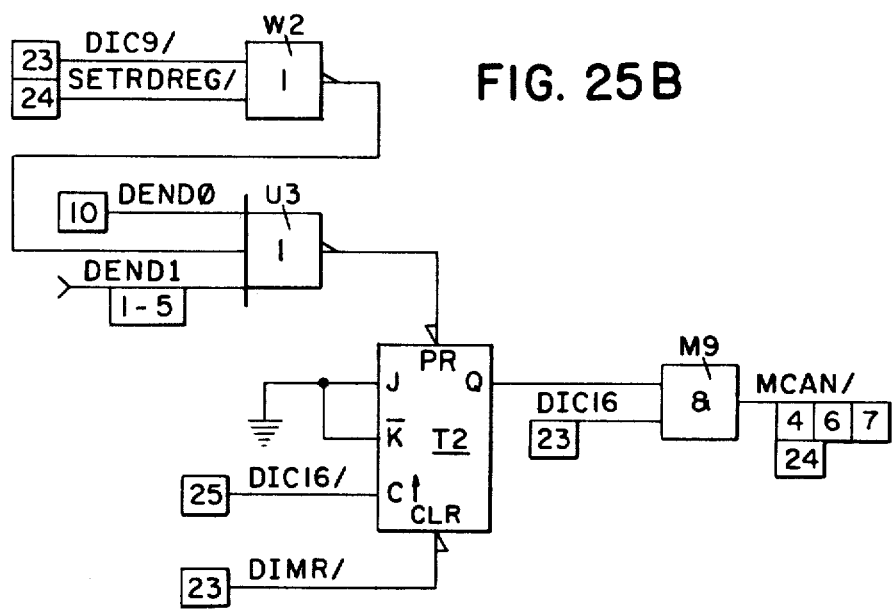

The circuitry shown in FIG. 25B including the gates W2, U3, M9 and the flip flop T2 relates to cancelling a data transfer when the end of a data field is reached. If, for example, a hit count is transferred from the ADC 306 to the PFP 304, the output from the gate M9 (MCAN/) goes true after the transfer is made. After the MCAN/ signal goes true, the BUSY signal may change state to indicate that the ADC 306 can accept another function, or it may continue with the current function being performed. Descriptions of the inputs and outputs for the circuitry shown in FIGS. 25A and 25B are shown in List #38.

| | LIST #38 |
|---|---|
| | Description |
| Inputs | |
| DIMR/ | Interchange Master Reset |
| WAIT/ | Wait from PFP 304 |
| TRNSU/ | Set up for transfer to PFP 304 |
| REQ | Request for DCB0-19 data lines |
| ACK | Acknowledge from PFP 304 to use DCB0-19 lines |
| DIC16 | Data interchange clock |
| DIC9/ | Data interchange clock |
| SETRDREG/ | Set Read register |
| DEND0 | End of data (LSB) from min/max module 326 |
| DEND1 | End of data (MSB) from read/write module 326 |
| DIC2 | Data interchange clock |
| Outputs | |
| STRT/ | Start DIC pulse |
| MCAN/ | Mode cancel |

Figure 26A:
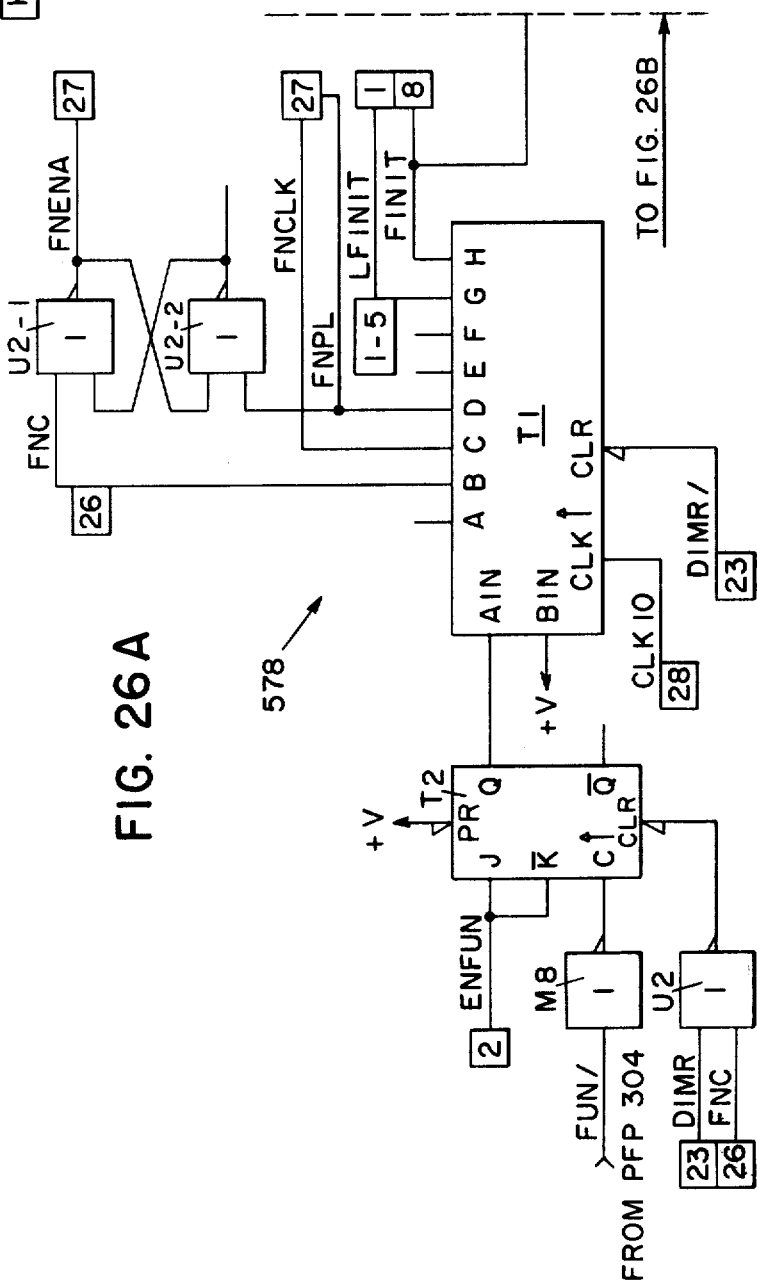
Figure 26B:
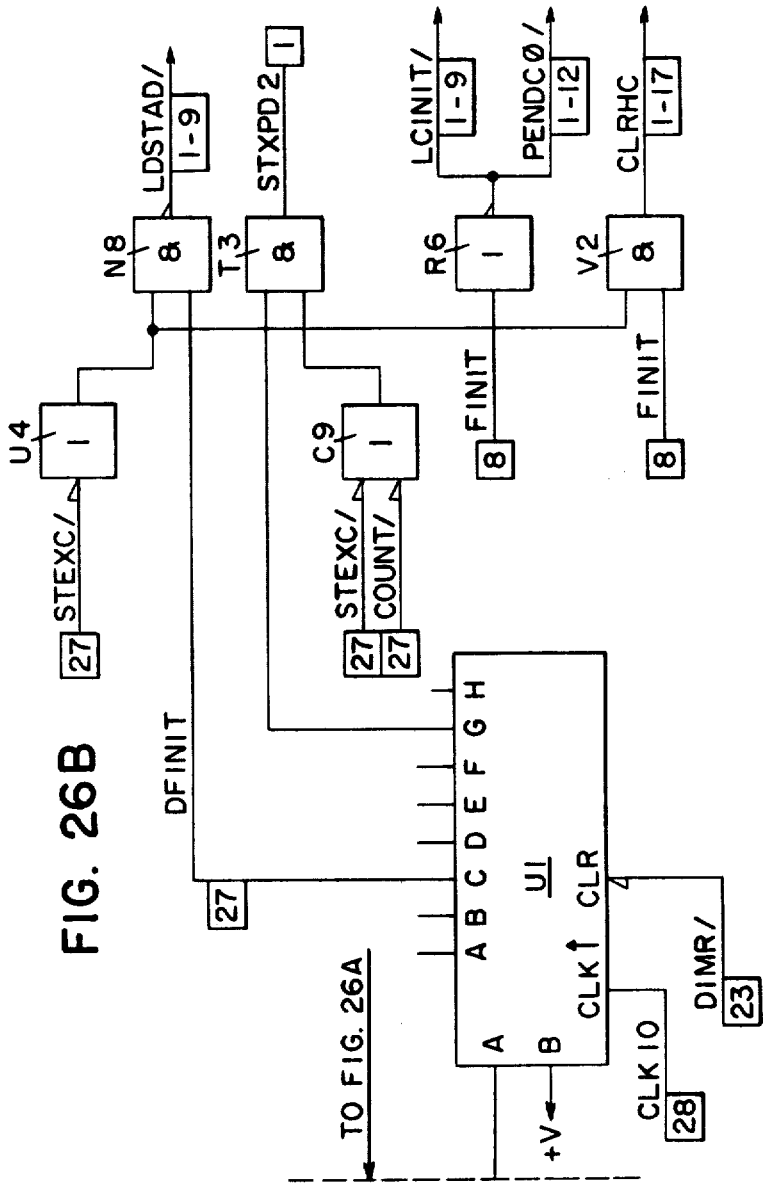

FIGS. 26A and 26B taken together show additional details of the timing signal generator 578 shown in FIG. 15C. The geerator 578 includes the inverters M8, U4, and R6, the gates U2, U2-1, and U2-2, C9, N8, T3, and V2, and the shift registers T1 and U1 which are interconnected as shown in FIGS. 26A and 26B respectively. The function pulse (FUN/) coming from the PFP 304 is used to set the D-type flip flop T2 which causes the Q output thereof to start a pulse train through the shift registers T1 and U1 to produce the various signals shown. The various outputs shown are used to generate timing signals associated with the logic circuitry included in the ADC 306. The clock (CLK10) coming from the clock generator 558 (FIG. 15A) is used to shift the pulse (at a 10 MHz rate) from the flip flop T2 through the shift registers T1 and U1 (FIGS. 26A and 26B). In other words, the outputs shown in FIGS. 26A and 26B result from the function code (FUN/) being issued. Descriptions of the inputs and outputs for FIGS. 26A and 26B are shown in List #39. A relationship between the function code FUN/ and various signals is shown in the timing diagrams in FIG. 26C.

| | LIST #39 |
|---|---|
| | Description |
| Inputs | |
| FUN/ | Function code from PFP 304 |
| CLK 10 | 10MHZ clock |
| DIMR/ | Data Interchange Master Reset |

LIST #39

| | Description |
|---|---|
| DIMR | Complement of above |
| ENFUN | Enable function pulse |
| STEXC/ | Start Execute |
| COUNT/ | Decoded Count function |
| Outputs | |
| FNENA | Function Decode Enable |
| FNCLK | Clock New Function Code |
| FNC | Function Clock |
| FNPL | Function pulse |
| FINIT | Function Initialize |
| LDSTAD/ | Load starting relation address. This pulse occurs when the Start Execute pulse is given. |
| STXPD2 | (Delayed Start Execution pulse) This pulse sets Count Enable on |
| LCINIT/ | Loop control initialize |
| CLRHC | Clear Hit Count |
| PEND0/ | Set pending count to zero |
| DFINIT | Delayed Function Initialize |

Figure 27A:
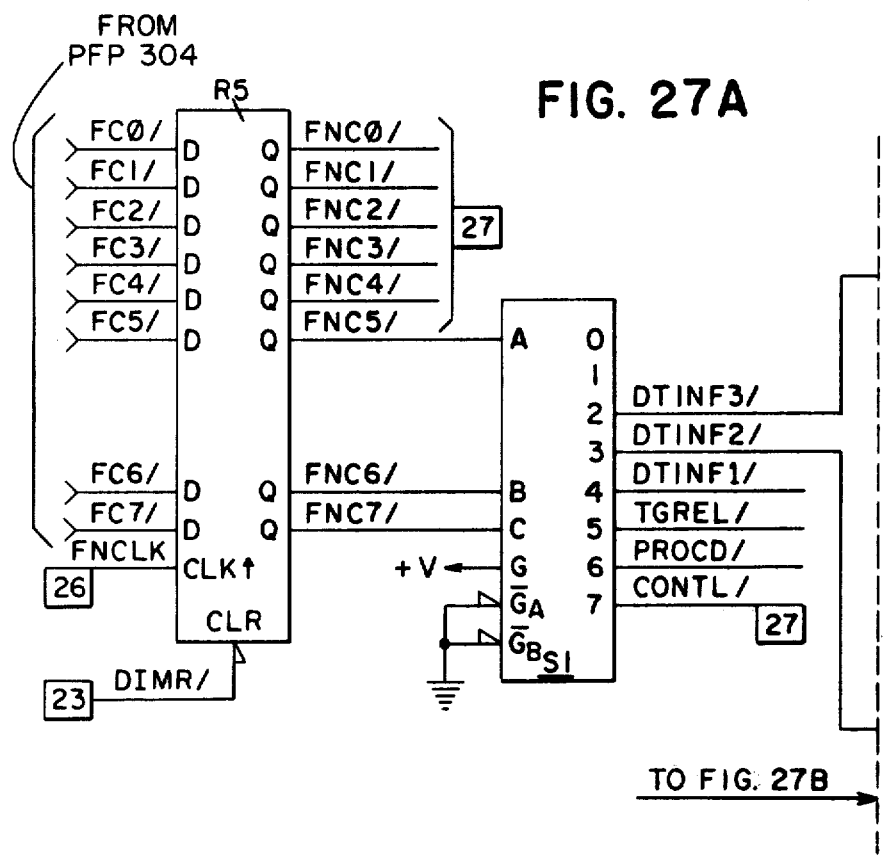
Figure 27B:
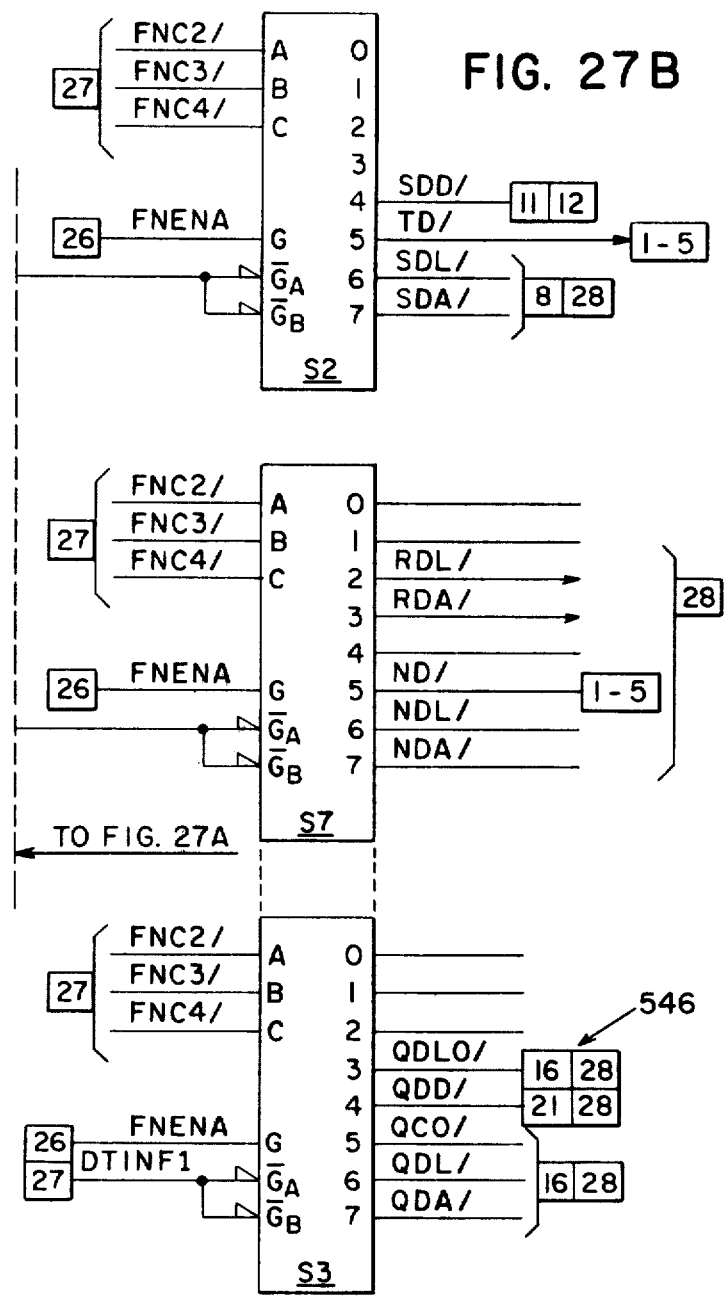

The function decode and latch 580 (FIG. 15C) is shown in more detail in FIGS. 27A, 27B, and 27C. The circuitry shown in FIGS. 27A and 27B includes, a latch R5 (such as 74LS273 which is manufactured by T.I.), and multiplexers or decoders S1, S2, and S7 (such as 74LS138 which are manufactured by T.I.) which are connected as shown. The latch R5 (FIG. 27A) stores the particular function code which has been sent out from the PFP 304 over the data lines FC0-7 which are also shown in FIG. 5. The decoder S3 shown in FIG. 27B and the decoders S6 (FIG. 27C), the decoder S5 and the decoder S4 are all identical to the decoders S1 and S2, for example. The general function of the decoders S1, S2, S7, S3, S6, S5, and S4 mentioned in this paragraph is to take the function codes which are latched in latch R5 (FIG. 27A) and decode them so as to produce the associated control signals to enable the ADCs such as ADC 306 to perform in accordance with the function codes dictated by the PFP 304. For example, the decoders S2, S7, and S3 (FIG. 27B) perform the decoding associated with the handling of the domain and tuple information. A particular code related to domain information (as for example a code listed under OPCODE HEX in Table 7 listed earlier herein) is decoded by the decoder S3 to produce the various outputs (QDLO/), (QDD/), (QCO/), (QDL/), and (QDA/) shown. As previously discussed herein, the small table 546 (FIG. 27B) provides an indication to that portion of the circuitry in which these outputs are utilized. The (QDLO) output relates to the qualifier domain logical operator; the (QDD/) output relates to qualified domain data; the (QCO/) output relates to the qualifier condition operator; the (QDL/) output relates to the qualified domain length; and the (QDA/) relates to the qualified domain address; these outputs and their associated operational codes may be seen in Table 7 listed earlier herein. For example, the (QDA/) signal is used in gate J7 in FIG. 16B. The (QDA/) output from decoder S3 (FIG. 27B) is also used to generate the load register signal (LDREG/) shown in FIG. 28A.

The decoder S6 shown in FIG. 27C relates to tag and relation information. For example, an OPCODE (in hex form) of 58 (from Table 6 listed earlier herein) placed on the input to the latch R5 (FIG. 27A) will produce a tuple length output (TL/) from the decoder S6 (FIG. 27C); this (TL/) output is fed into the gate T5 in FIG. 28A to produce the load register pulse (LDREG/) shown as the output of gate U2 (FIG. 28A). The decoded outputs of the decoders S1, (FIG. 27A) and S2, S7, S3, (FIG. 27B) and S4, S5 and S6 (FIG. 27C) are voltage levels which stay that way to enable the associated data transfers or functions. In other words, the PFP 304 sends out the function codes over the EC0-7 lines to the latch R5 (FIG. 27A) which are decoded by the circuitry mentioned in this paragraph to produce the various pulses to the ADCs like 306, for example, to get them started processing. The inverter L6 (FIG. 27C) and the gates U4 and W4-1 receive the inputs shown to produce the NJP/ and STXP/ signals shown. Descriptions of the various inputs and outputs for the circuitry shown in FIGS. 27A, 27B, and 27C are found in List #40.

LIST #40

| | Description |
|---|---|
| Inputs | |
| FC0-7 | Function code lines #0-7 from PFP 304 |
| FNCLK | Clock new function code |
| DIMR/ | Data Interchange Master Reset |
| FNENA | Function level enable |
| FNPL | Pulse control line |
| DFINIT | Delayed Function Initialize |
| Outputs | |
| SDD/ | Sort Domain Data |
| TD/ | Tuple Data |
| SDA/ | Sort Domain Address Offset |
| RDL/ | Read/Write Domain Length |
| RDA/ | Read/Write Domain Offset |
| ND/ | New Data |
| NDL/ | New Data Length |
| NDA/ | New Data Offset Address |
| QDLO/ | Qualified Domain Logical Operator |
| QDD/ | Qualified Domain Data |
| QDL/ | Qualified Domain Blank |
| QDA/ | Qualified Domain Address |
| TL/ | Tuple Length |
| RL/ | Relation Length |
| RSA/ | Relation Start Address |
| XTGQAL/ | Tag Qualify |
| TGREP/ | Tag Replacement Field |
| INSRTL/ | Insert (Latched) |
| REPLA/ | Replace |
| MIN/ | Minimum |
| MAX/ | Maximum |
| READ/ | Read |
| MARK/ | Mark |
| COUNT/ | Count |
| CLRST/ | Clear status |
| NJP/ | New job pulse |
| STXP/ | Start Execute |

FIGS. 28A and 28C include the logic gates T6, T5, T7 and U2 which utilize the function control lines to control the data path through the data interchange module 336 (FIG. 3). The load register (LDREG/) signal from gate U2 will be used to load a register if any one of the inputs to the gates T5 and T6 is true. The load buffer RAM (LDBUF/) signal (FIG. 28C) is obtained when all the inputs to the AND gate T7 are true.

FIG. 28B shows a conventional 20 MHZ oscillator P1 which is used in connection with the flip flop R1 and inverter U4 to conventionally produce the 20 MHZ clock (CLK20) and the 10 MHZ clock (CLK10) shown.

Figure 29A:
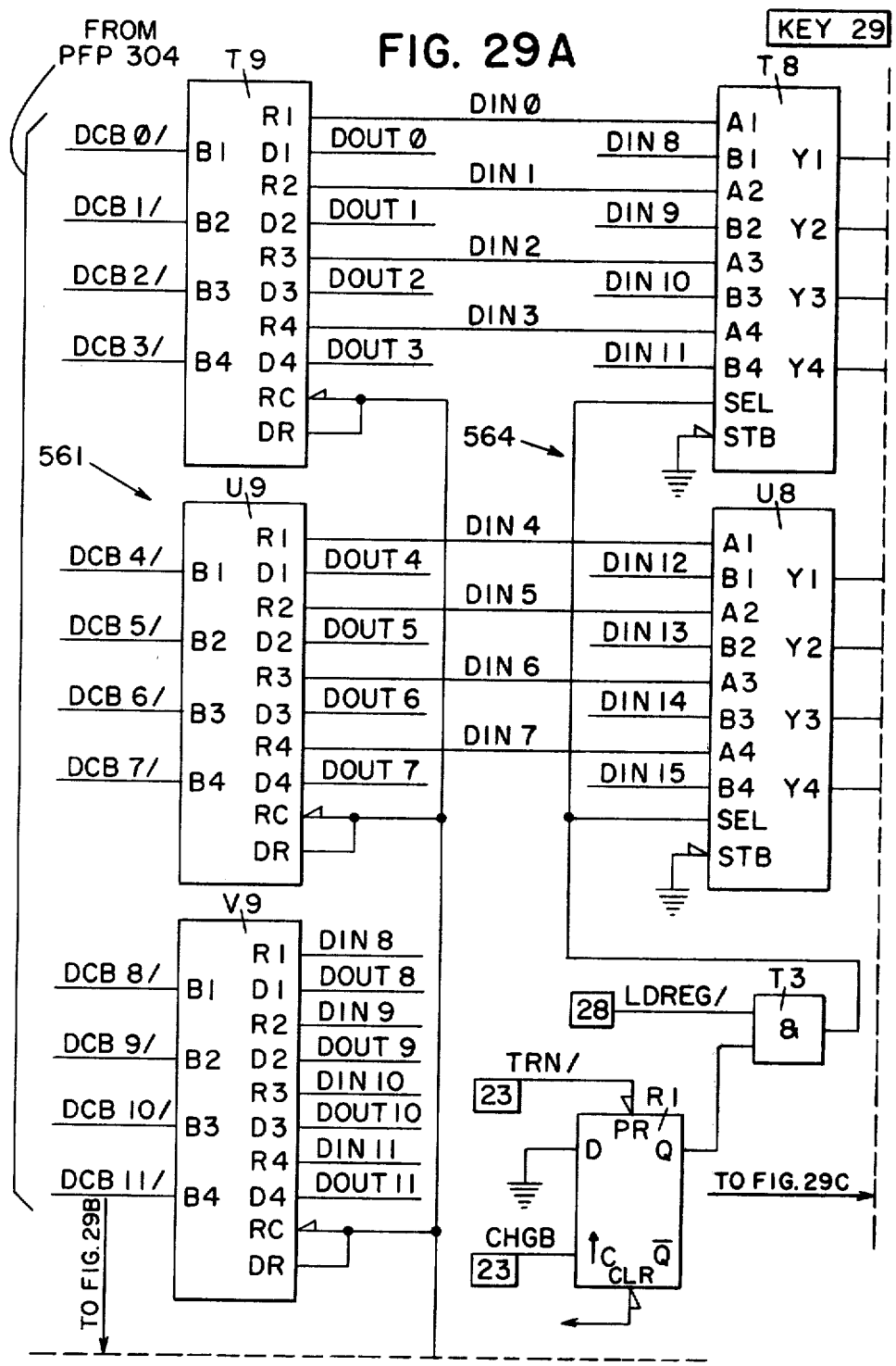
Figure 29B:
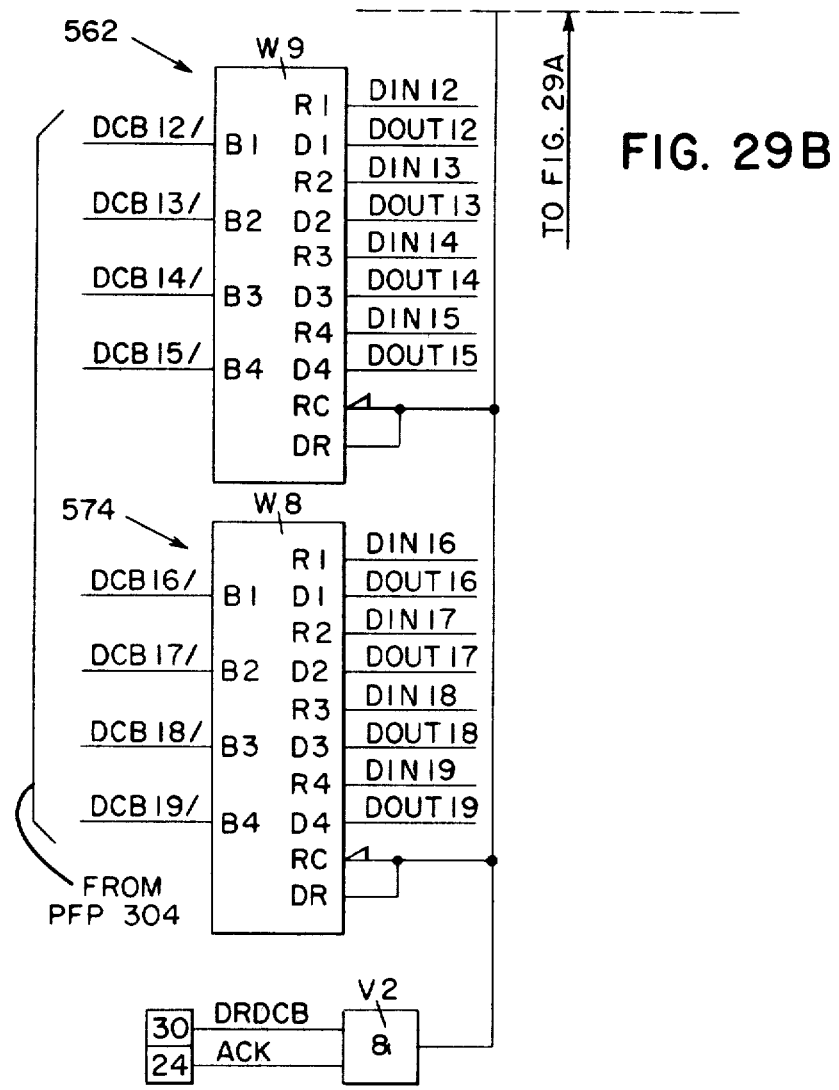
Figure 29C:
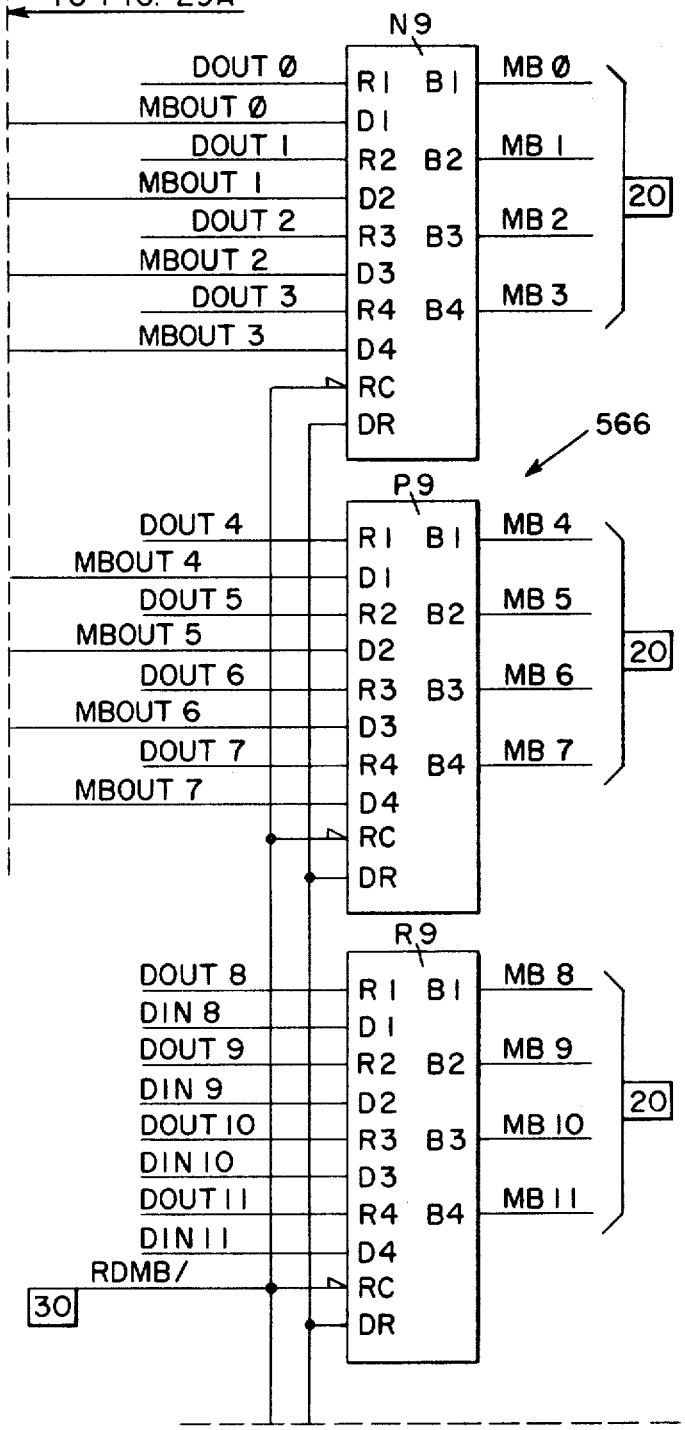
Figure 29D:
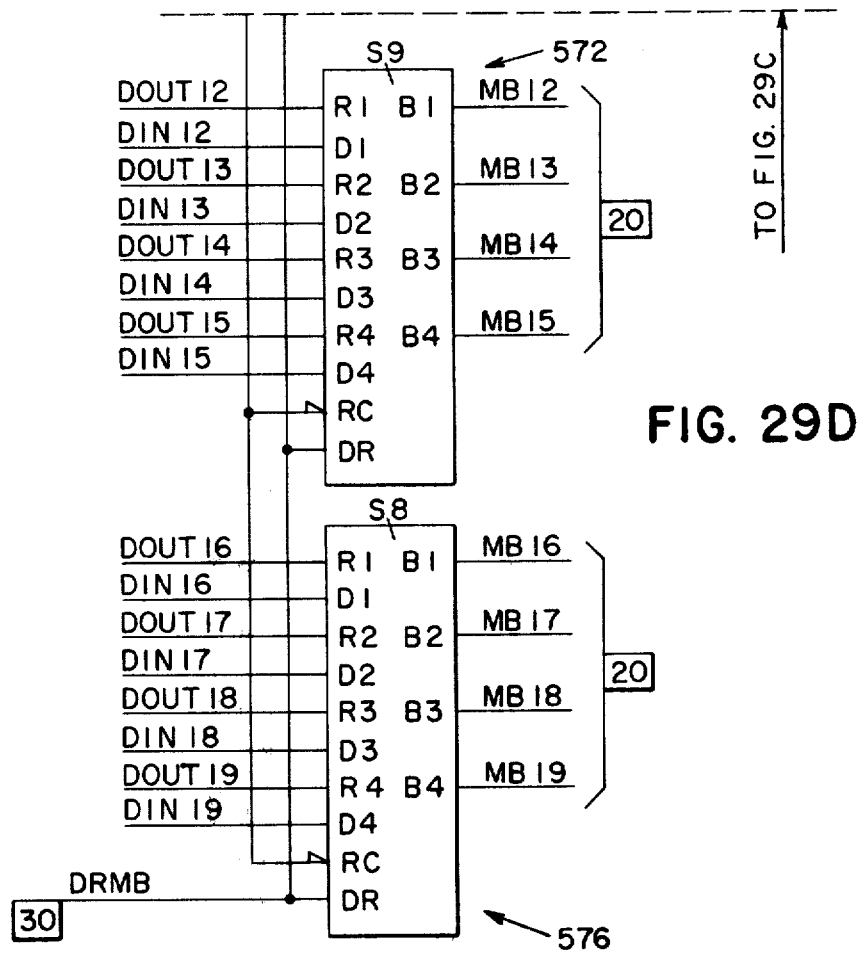

The portion of the data exchange module 336 shown in FIG. 15B is shown in more detail in FIGS. 29A, 19B, 29C, and 29D. Because the data path shown in FIGS. 29A-29D follows the data path outlined in FIG. 15B, the data path need not be described any further other than to identify certain components used and certain inputs and outputs utilized. The bus transceiver 561 (FIG. 15B) is comprised of the transceivers T9 and U9 (shown in FIG. 29A) which are conventional such as IC #8T26, manufactured by Signetics. The data select 564 (FIG. 15B) is comprised of the decoders T8 and U8 (FIG. 29A) which are conventional decoders such as #74LS157 which are manufactured by T.I. The bus transceiver 562 (FIG. 15B) is comprised of the transceiver V9 (FIG. 29A) and the transceiver W9 (FIG. 29B). The bus transceiver 574 (FIG. 15B) is comprised of the transceiver W8 (FIG. 29B). The bus transceiver 566 (FIG. 15B) is comprised of the transceivers N9 and P9 (FIG. 29C), and the bus transceiver 572 (FIG. 15B) is comprised of the transceiver R9 (FIG. 29C) and the transceiver S9 (FIG. 29D). The bus transceiver 576 (FIG. 15B) is comprised of the transceiver S8 (FIG. 29D). A drive signal (DRDCB) and an acknowledge signal (ACK) fed into the AND gate V2 (FIG. 29B) cause the transceivers T9, U9, V9, and W9 to drive the data on the associated data lines; a drive signal (DRMB), connected to the transceivers N9, P9, R9, S9, and S8, is utilized for the same purpose. The flip flop R1 and the AND gate T3 (FIG. 29A) receive the various signals shown (CHGB), (TRN/), and (LDREG/) to provide selection signals to the data select decoders T8 and U8 shown therein. The data latches 570 and 568 (FIG. 15B) are comprised of conventional latches P8 and R8, respectively, as shown in FIG. 30C. A description of each of the inputs and outputs for FIGS. 29A-29D is shown in List #41.

| LIST #41 | |
|---|---|
| | Description |
| Inputs | |
| DCBØ-19 | Data lines |
| DRDCB | Drive for DCBØ-19 lines |
| ACK | Acknowledge for DCBØ-19 lines |
| RDMB/ | Read main bus MBØ-19 |
| LDREG/ | Load register mode |
| TRN/ | Select most significant byte |
| CHGB | Select least significant byte |
| DRMB | Drive MBØ-19 lines |
| DOUTØ-15 | Data Output Lines |
| Outputs | |
| DCBØ-19 | Data lines |
| MBØ-19 | Main bus lines |
| DOUTØ-7) | Data Output Lines |

Figure 30A:
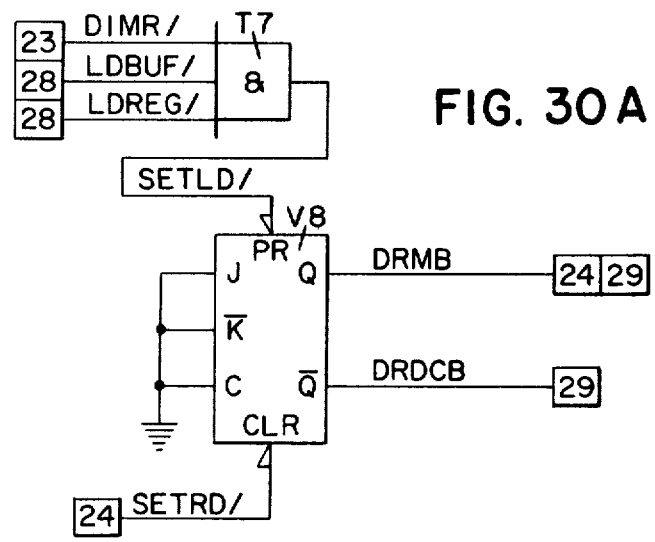
Figure 30B:
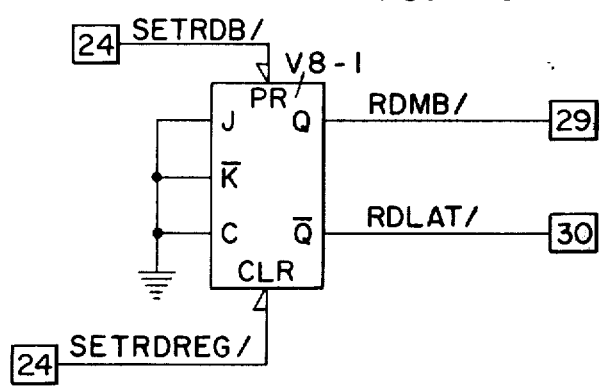
Figure 30C:
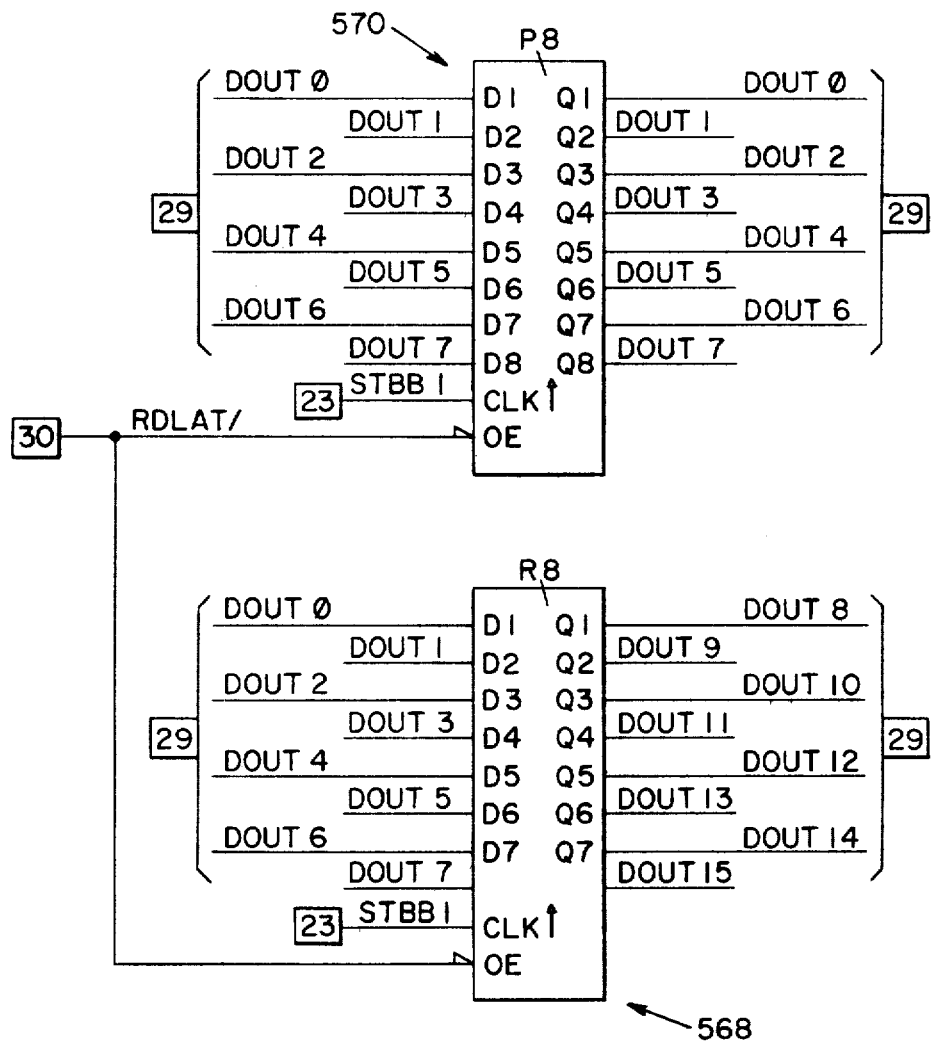

FIG. 30A shows a portion of the data interchange module 336 (FIG. 3) and includes the AND gate T7 and the flip flops V8 and V8-1 which are interconnected to receive the various inputs shown and to generate the various outputs shown. The flip flops V8 (FIG. 30A) and V8-1 shown in FIG. 30B essentially control the direction in which the data is going to flow ie., either from the main bus (MBØ-19) to the DCBØ-19 or vice versa as shown in FIG. 15B. For example, the drive main bus signal (DRMB) from the Q output of flip flop V8 (FIG. 30A) causes data to be transferred from the main bus to the DCBØ-19 lines. The Q̄ output from flip flop V8-1 is used to condition the latches 570 and 568 (FIG. 30C) to be read when expanding data (going from eight bits to 16 bits) from the main bus to the DCBØ-15 lines. Descriptions of the inputs and outputs shown in FIGS. 30A, 30B, and 30C are shown in List #42.

| LIST #42 | |
|---|---|
| | Description |
| Inputs | |
| LDBUF/ | Load buffer |
| LDREG/ | Load register |
| SETRD | Set Read |
| SETRDB | Set Read Bus |
| SETRDREG/ | Set Read Register |
| DIMR/ | Data Interchange Master Reset |
| DOUTØ-7 | Data Output Lines to DCB bus or PFP 304 |
| STBBØ | Data Strobe (for Byte #0) |
| STBB1 | Data Strobe (for Byte #1) |
| Outputs | |
| DRMB | Drive main bus (MB) |
| DRDCB | Drive DCB bus |
| RDMB/ | Read main bus (MB) |

Figure 64:
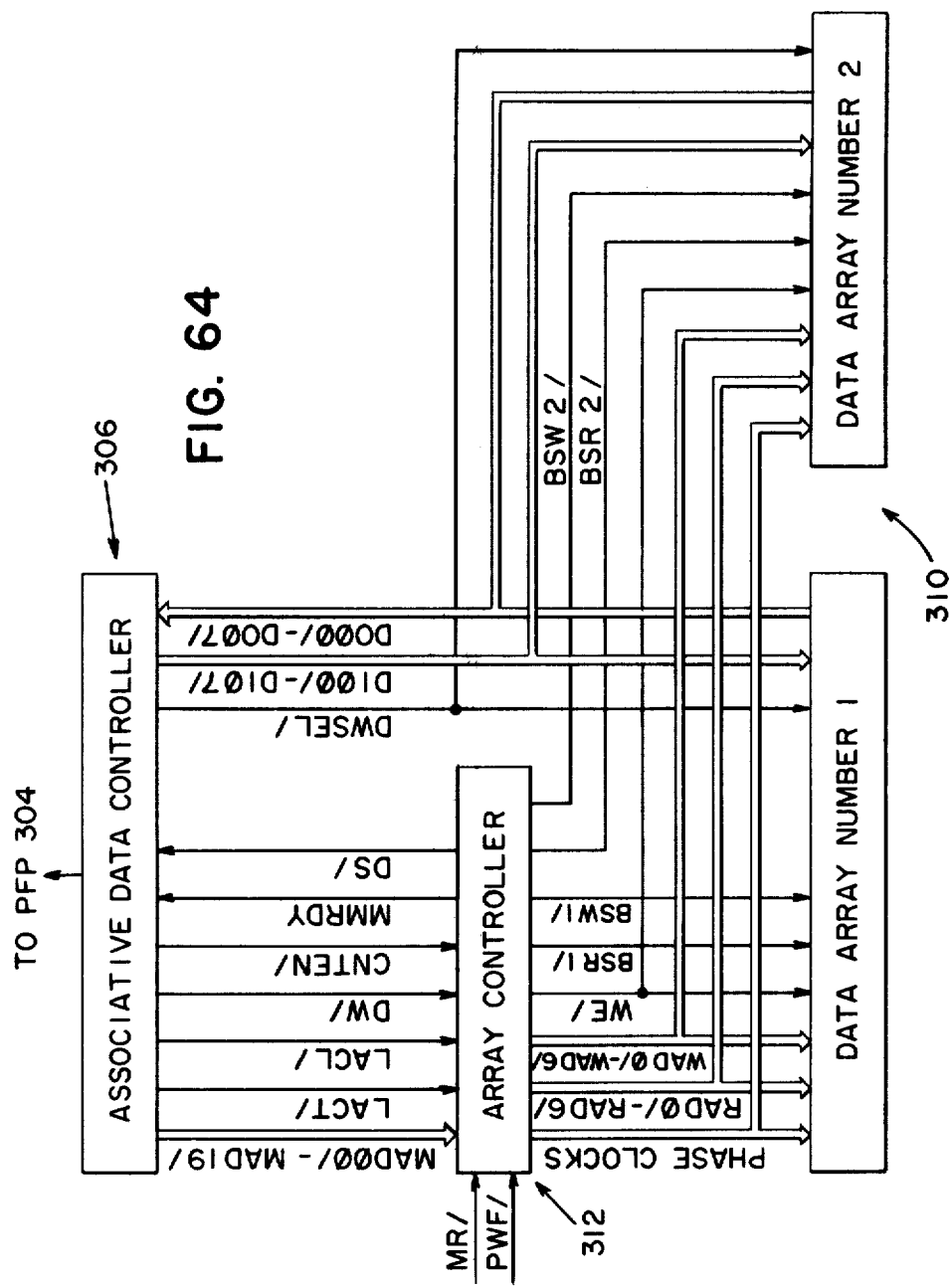
FIG. 64 is a general schematic diagram showing the interfacing between an associative data controller and the storage array shown in FIG. 1.

FIG. 64 is a general block diagram showing how an ADC like 306 is interfaced with is associated storage array 310, via its associated array controller 312. Generally, the storage array 310 is organized as a group of cells in which each cell contains one byte of information and has one parity bit associated therewith. The cells are organized into 128 loops of 4096 cells for a total storage capability of 512K bytes in the embodiment described. Within a loop, the cells are accessed serially at a 2 MHZ rate. Two eight bit paths are provided into the storage array 310; there is one path for reading data and a second path for writing data. Data can be simultaneously read from and written into the storage array 310 at the 2 MHZ rate; however, the address from which data is read precedes the address into which data is written by 4096 bytes or 4K as it is generally referred to. It should be recalled that 4096 bytes of data were stored in the loop buffer 490 (FIG. 43) to enable the simultaneous reading and writing mentioned.

The array controller 312 (FIG. 64) contains the necessary clock generation circuits for the CCDs comprising the storage array 310 and for the address control logic associated therewith. The CCDs are of the volatile memory type which must be continually shifted to retain the data therein. During an initialization procedure for the system 300, data is loaded into the storage arrays (like 310) from permanent storage devices such as magnetic tapes, discs, etc. Each storage array 310 is divided into a data array No. 1 and a data array No. 2 as shown.

With regard to FIG. 64, the address lines to the storage array 310 are the MADØØ/-MAD19/ lines, data read from the array 310 passes out of the array to the ADC 306 over the DOØØ/-DOØ7/ lines, and the data written into the array passes over the DIØØ/-DIØ7). The MADØØ/-MAD19/ lines are the address lines; they represent the byte address received from the ADC's (like 306) for the associated array controller (like 312) to fetch. Actually, it is the "read" address which is passed from the ADC 306 to the array controller, and the "write" address is always an implied address which is derived from the read address; ie., the write address is always 4096 bytes less than the read address because of the 4K loop buffer 490 (FIG. 43) mentioned earlier herein. The lower 12 bits of the address lines (MADØØ/ through MAD11/) are used to select a particular address in a CCD loop mentioned, and the upper 8 bits of the address lines (MAD12/ through MAD19/) are decoded to select a particular chip on a bank of 8

Figure 66A:
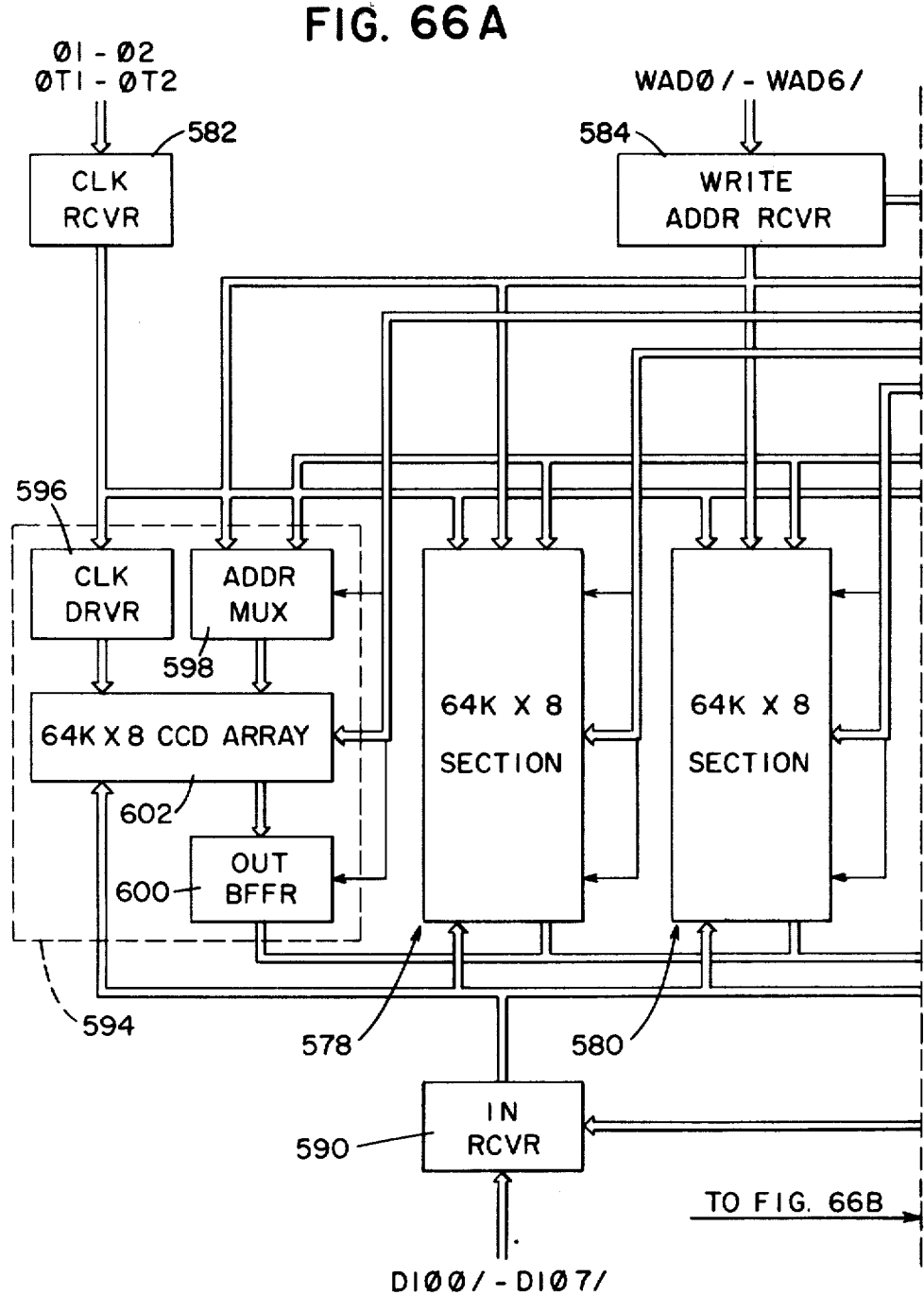
FIGS. 66A, 66B, and 66C taken together comprise a block diagram showing more details of a storage array shown in FIG. 64.
Figure 66B:
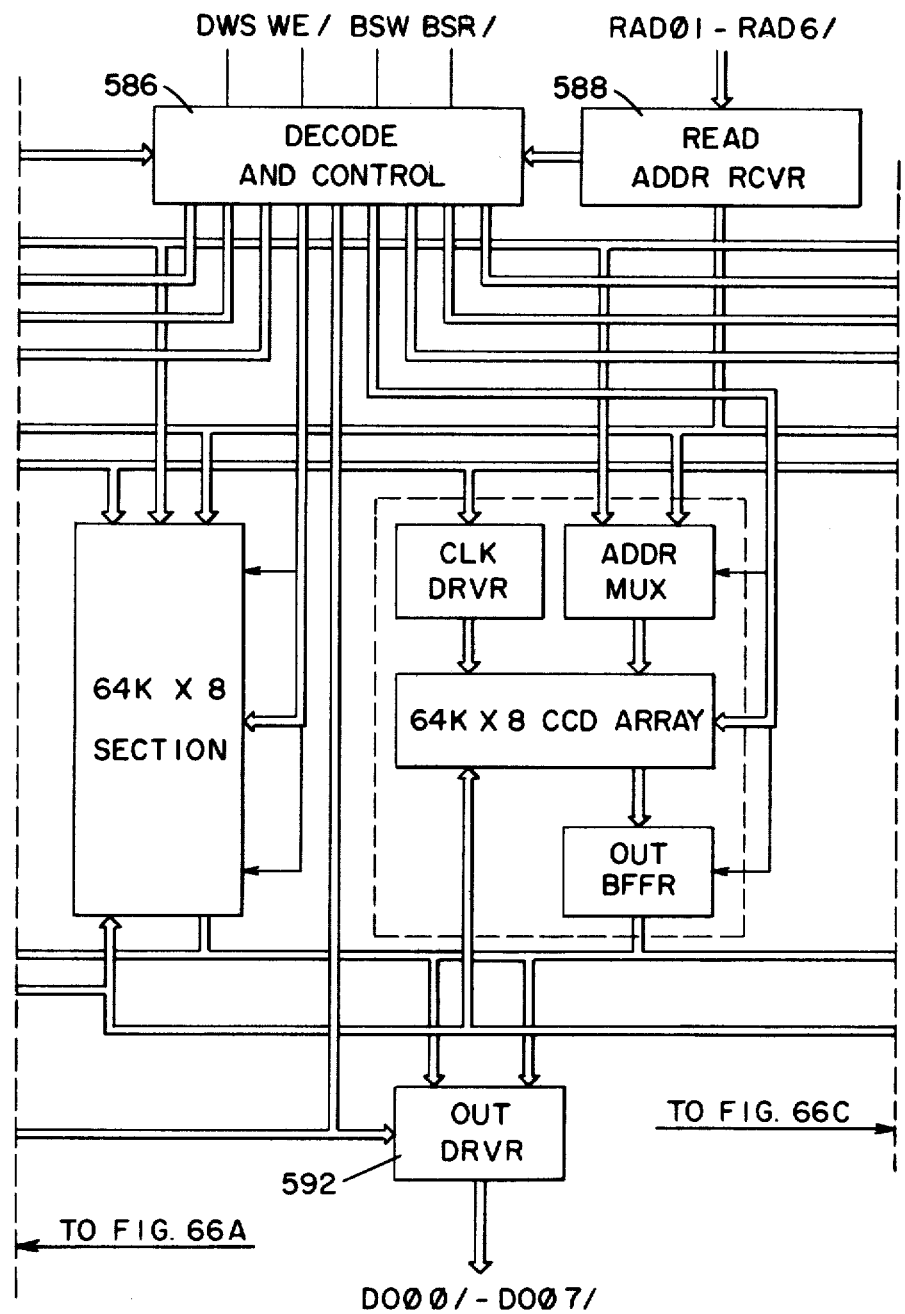
Figure 66C:
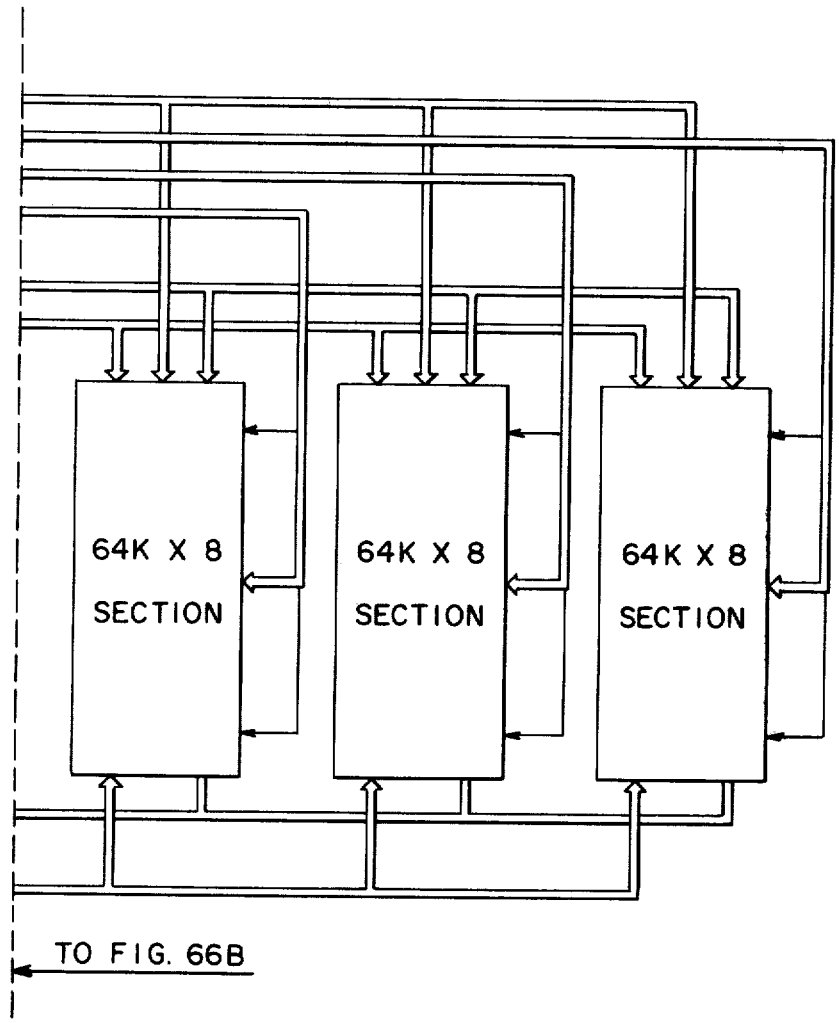

CCDs, with one such bank being shown in FIGS. 66A, 66B and 66C.

Figure 65A:
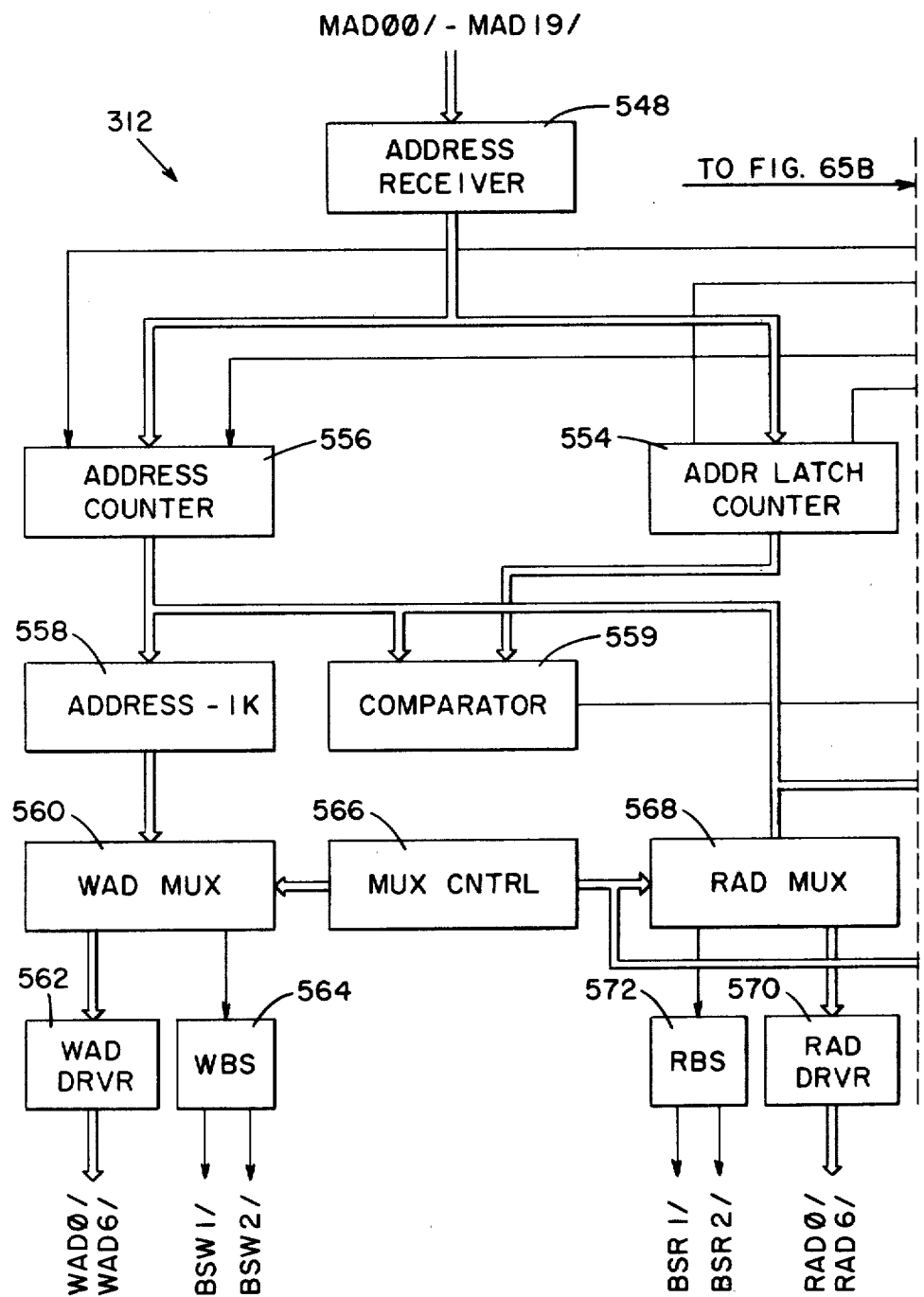
FIGS. 65A and 65B taken together comprise a block diagram showing more details of the array controller shown in FIG. 64.
Figure 65B:
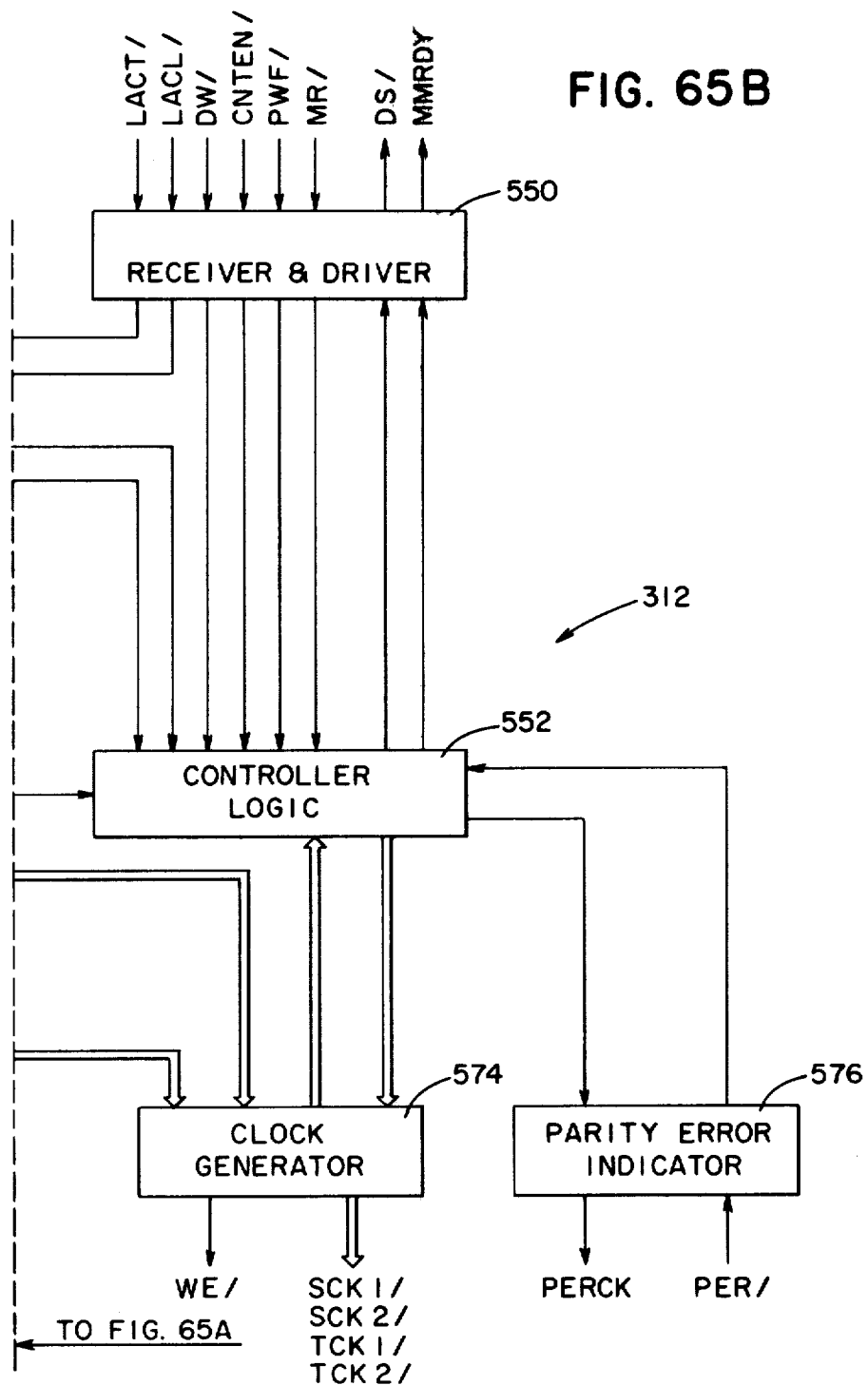

The array controller 312 (FIG. 64) is shown in more detail in FIGS. 65A and 65B. The controller 312 includes an address receiver 548 which receives the MAD00/-MAD19/ lines, a receiver and driver 550, and controller logic 552. The array controller 312 also includes an address latch counter 556 which is incremented continuously from the time power is turned on in the system 300. The counter 556 counts from 0 to FFF (in hex designation) to assign an address for the 4K loop mentioned earlier herein, and the starting location of address 0 is arbitrarily assigned at power on time. The counter 556 is incremented at the same rate as data is shifted in the circular loop of the CCDs; therefore, they stay in synchronization. The address latch counter 554 (FIG. 65A) loads therein the 8 most significant bits (MAD11/ to MAD19/) of the match address coming from the ADC 306 upon the occurrence of the load address counter signal LACT/. The output from the address counter 556 is fed into the subtraction logic 558 which takes the address from counter 556 and subtracts 1K or 1000 (hex) therefrom to provide the write address to the write address driver-multiplexer 560, which write address is 4096 bytes fewer than the read address to provide for the 4K loop mentioned. The upper 8 bits are divided as follows: the lower seven bits from the multiplexer 560 go to a write address driver 562 and the eighth bit goes to a write select board 564 which selects data array #1 or data array #2 of the storage array 310. A multiplexer control 566 is used to select either the write address multiplexer 560 or a read address multiplexer 568 which has associated therewith a read address driver 570 and a read board select 572. The array controller 312 also has a clock generator 574 and a parity error indicator 576. A description of the various inputs, outputs and control signals associated with the array controller 312 shown in FIGS. 65A and 65B is included in List #43.

| LIST #43 | |
|---|---|
| | Description |
| Inputs | |
| MAD00/-MAD19/ | Match address; this address is received from the ADC 306 |
| LACT/ | Load address counter; this signal is received from the ADC 306 and loads the upper 8 bits of the address counter 556 with the upper 8 bits of the match address |
| LACL/ | Load address compare latch; this signal is received from the ADC 306 and latches all the match address bits MAD00/-MAD19/ into a register |
| DW/ | Data write; this signal is received from the ADC 306 and indicates that the storage array 310 will be written into |
| DR/ | Data Read; (Same as above except for reading) |
| CNTEN/ | Count enable; this signal is received |

| LIST #43 -continued | |
|---|---|
| | Description |
| | from the ADC 306 and enables the address counter 556 |
| PWF/ | Power Failure |
| MR/ | Master reset; signal received from the system 300 to reset all latches, counters, and flip flops |
| PER/ | Parity error indicator from storage array 310 |
| DS/ | Data strobe; a pulse transmitted to the ADC 306 for latching in data received from the storage array 310 and for synchronizing the ADC and the array controller 312 |
| MMRDY | Storage Array 310 ready |
| WAD0/-WAD6/ | Write address; this address selects the loop address and the particular 64K × 8 section, such as section 578 or 580 (FIG. 66A). The upper four bits of this address select the loop address and the lower three bits select the particular chip or section like 578, 580 |
| BSW1/ | Board select write; selects data array #1 of the storage array 310 |
| BSW2/ | Same as above except for data array #2 |
| BSR1/ | Same as BSW1/, except for reading |
| BSR2/ | Same as BSW2/, except for reading |
| RAD0/-RAD6/ | Same as WAD0-WAD6/ except for reading |
| WE/ | Write enable; this signal comes from the clock generator 574 and it enables a section such as 578, 580 so that data may be written therein |
| SCK1/-SCK2/ | Serial clocks for the CCD chips in the storage array 310 |
| TCK1/-TCK2/ | Transfer clocks for the CCD chips in the storage array 310 |

FIGS. 66A, 66B, and 66C taken together show a data array such as array #1 which is part of the storage array 310 as shown in FIG. 64. The data array shown in FIGS. 66A-C is substantially conventional and includes a clock receiver 582, a write address receiver 584, a decode and control 586, a read address receiver 588, an in receiver 590 and an out receiver 592. Each one of the sections like 578, 580 (FIG. 66A) has the elements shown in the dashed rectangle for section 594. The section 594 (FIG. 66A) includes a clock driver 596, an address multiplexer 598, an out buffer 600, and a 64K × 8 CCD array 602. The array 602 is arranged in 16 loops of 4K bytes each, and the upper 4 bits from the write address receiver (584 in FIG. 66A), i.e., WAD3/-WAD6/, are used to select the particular one of the 16 loops in the array 602 (FIG. 66A) and the WAØ/-WA2/ lines are used to select a particular section like 578, 580 also shown in FIG. 66A. All of the outputs (shown in List #43) from the array controller 312 become inputs to the storage array 310 with the exception of the DS/ and MMRDY signals shown in this list. The data out lines DOØ/ through DO7/ coming from the out receiver 592 (FIG. 66B) are routed to the associated ADC like 306; receiver 592 is a part of the data array #1 (FIG. 64).

Figure 68:
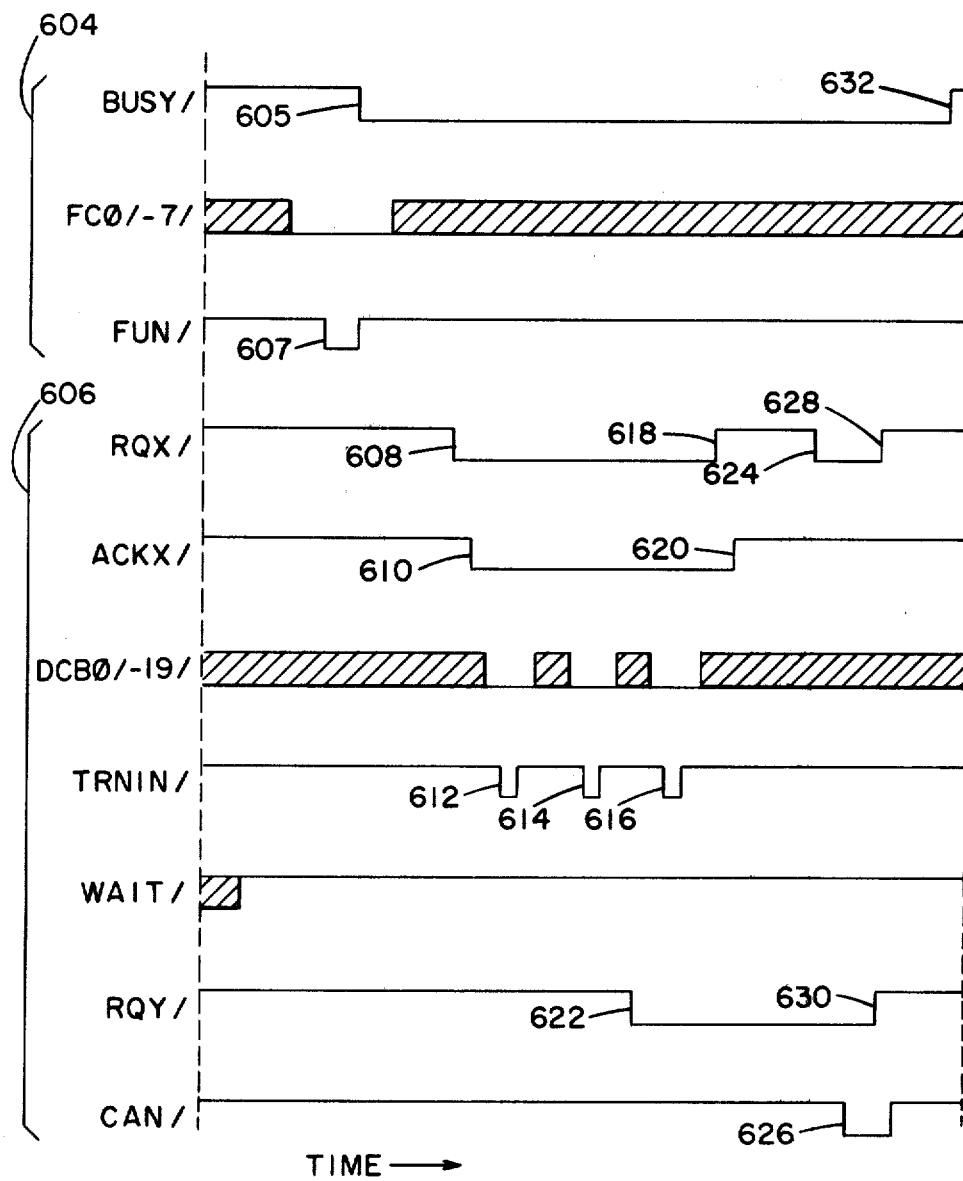
FIG. 68 shows a group of timing diagrams associated with the transferrence of control functions and data between the PFP and the ADCs.

FIG. 68 shows a group of timing diagrams associated with the transfer of control functions and data between the PFP 304 and the ADC's like 306 and 308 as shown in FIG. 5. FIG. 68 along with FIGS. 69-73 have the associated signals listed on the left side (as for example the BUSY/ signal in FIG. 68) and each is plotted with respect to time. In the embodiment described via FIGS. 68-73, a low level for a signal is considered to be active or true, and a high level for a signal is considered to be inactive or false.

With regard to FIG. 68, the BUSY/ signal, the data lines FCØ/-7/, and the function signal FUN/ shown in bracket 604 represent control functions being handled between the PFP 304 (FIG. 5) and the ADC's 306 and 308, for example, with no data being transferred therebetween. For example, as soon as a function code (FUN/) is sent to each of the ADCs like 306, each of the ADCs will send a busy signal back to the PFP 304 by having the BUSY/ line (FIG. 68) drop to a low level, as at point 605, indicating to the PFP 304 that the function code was received by the ADCs. The particular function code is placed on the FCØ/-7/ data lines (also shown as bus 358 in FIG. 5) and transferred to the ADCs like 306 via the FUN/ pulse as at point 607.

The timing diagrams included in the bracket 606 in FIG. 68 are utilized when data is to be transferred between the PFP 304 and the ADCs like 306 for such functions as READ, MIN, and MAX as earlier explained herein. For example, during a READ operation, the timing diagrams shown in bracket 604 are also utilized in addition to those enclosed in bracket 606.

In a READ function, the appropriate function code would be placed on the FCØ/-7/ data lines and the function pulse FUN/ would become active. The various ADCs such as 306 and 308 would perform the READ operation until one of them wished to send data to the PFP 304. In this instance, an ADC such as 306 polls the PFP 304 by having the line RQX/ change to an active level as at point 608 in FIG. 68. The RQX/ line stands for any ADC and if the ADC 306 were responding, the RQØ/ line in FIG. 5 would drop to the low level as shown at point 608 in FIG. 68. The PFP 304 would then respond thereto by having the acknowledge line (ACKX/) change to an active level as at point 610. The ACKK/ line is analogous to the ACKØ/ line in FIG. 5 in the example being discussed. The ACKØ/ signal changing to the active level means that the PFP 304 is ready to receive data from the ADC 306 for a READ operation in the example being described. In this regard, the data to be transferred to the PFP 304 consists of three words, with the first word being placed on the data lines DCBØ/-19/ and being pulsed to the PFP 304 by the first transfer in (TRNIN/) pulse issued by the ADC 306 as shown at point 612 in FIG. 68. The second word is placed on the data lines DCBØ/-19/ and is also transferred to the PFP 304 via the TRNIN/ pulse shown at point 614. The third word is subsequently, similarly placed on the data lines DCBØ/-19/ and is transferred to the PFP 304 via the TRNIN/ pulse shown at point 616. After the three words are transferred to the PFP 304 as just described, the ADC (like 306) relinquishes its control of the PFP 304 by having its associated request line like RQØ/ in FIG. 5 change to a high level or inactive state as shown by a point such as 618 in FIG. 68. The PFP 304 responds to this release of the request line by having the ackowledge line (ACKØ in FIG. 5) change to a high level or inactive state as shown by point 620 in FIG. 68. FIG. 68 also shows (via the request line RQY/) that a second ADC such as 308 may be attempting to gain access to the PFP 304; this is shown by the RQY/ signal becoming active at point 622. However, because the ACKX/ line (for ADC 306) was still active at this time, there was no acknowledge signal (ACKY/) for ADC 308 shown.

FIG. 68 also shows that after the first ADC 306 had relinguished access to the PFP 304 by the request line RQX/ changing to a high level at point 618, the associated ADC wanted access to the PFP 304 a second time as shown at point 624 in the RQX/ line. Notice at this time, a second ADC as shown at the request line RQY/ had a prior request for access to the PFP 304 and would have had prior access; however, because a cancel function (CAN/) has been initiated by the PFP 304 at point 626, both the requests RQX/ and RQY/ would not be acknowledged and they would return to the inactive states at points 628 and 630, respectively. Thereafter, the BUSY/ signal would change to the inactive state at point 632 to free the ADCs to perform another function. The second request for access to the PFP 304 occurring at 624 in FIG. 68 could very possibly occur for a READ operation; however, for a MIN or MAX operation, only one response from each ADC like 306 or 308 would be logically possible. The wait (WAIT/) function is shown as inactive in FIG. 68; however, it will be discussed more accurately with regard to FIG. 73 to be described later herein.

Figure 69:
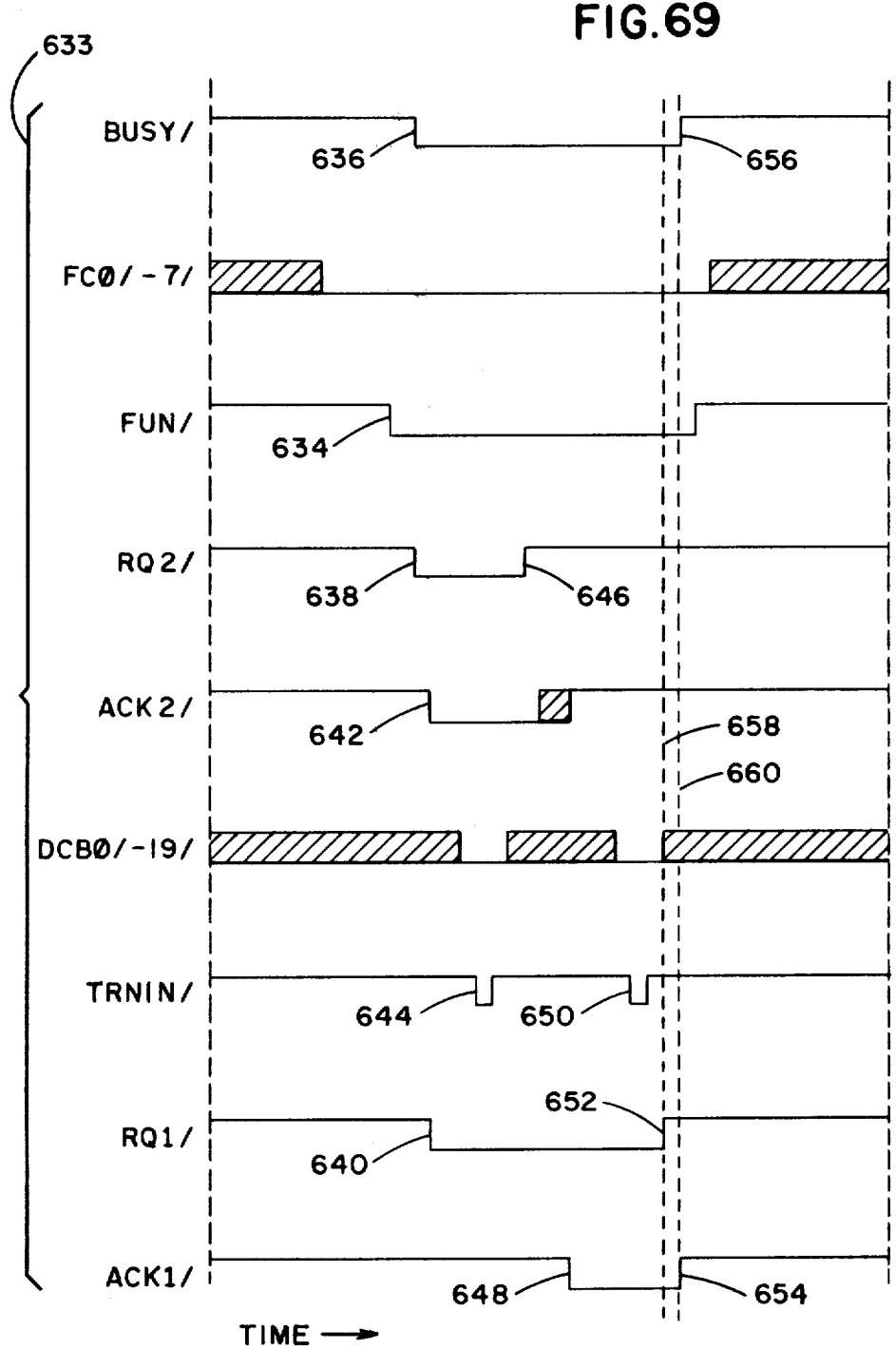
FIG. 69 shows a group of timing diagrams associated with the PFP and the ADCs for a COUNT function.

FIG. 69 contains a group of timing diagrams (enclosed in a bracket 633) which depict a situation in which a count function, for example, is initiated and two ADCs respond thereto. As previously stated, a function code is placed on the FCØ/-7/ lines by the PFP 304 and is transferred to the ADCs at point 634 of the function line (FUN/) and thereafter the BUSY/ line goes active at point 636. Thereafter, two ADCs respond via the request lines RW2/ and RQ1/ at points 638 and 640, respectively. The PFP 304 resolves this dual request by awarding priority to one of the ADCs as previously explained, and in the example shown, the ADC represented by the request line RQ2/ is selected for a response to the PFP 304 by the ackowledge line ACK2/ changing to an active level at point 642. The count from the ADC, such as 306 or 308, etc., associated with the request line RW2/ is then placed on the data lines DBCØ/-19/ and the transfer in (TRNIN/) pulse is changed to an active level at point 644 to transfer the data to the PFP 304. The ADC associated with the request line RQ2/ then relinquishes control of the PFP 304 by having the request line RQ2/ change to the inactive state at point 646. Thereafter, the standing request for the ADC associated with line RQ1/ is acknowledged at point 648 in this line. Then, the associated data is placed on the DBCØ/-19/ lines and transferred to the PFP 304 via the transfer in pulse (TRNIN/) becoming active at point 650. Thereafter, the RQ1/ line becomes inactive at point 652, the ACK1/ line becomes inactive at point 654 and the BUSY/ line becomes inactive at point 656, following the general pattern previously explained. The dashed lines 658 and 660 are present only to facilitate alignment of some of the points such as 652 and 654 in FIG. 69. The BUSY/ line is driven by the ADCs and provides a way of letting the PFP 304 know that all the ADCs are finished with the particular function being executed when the BUSY/ line goes to a high level.

Figure 70:
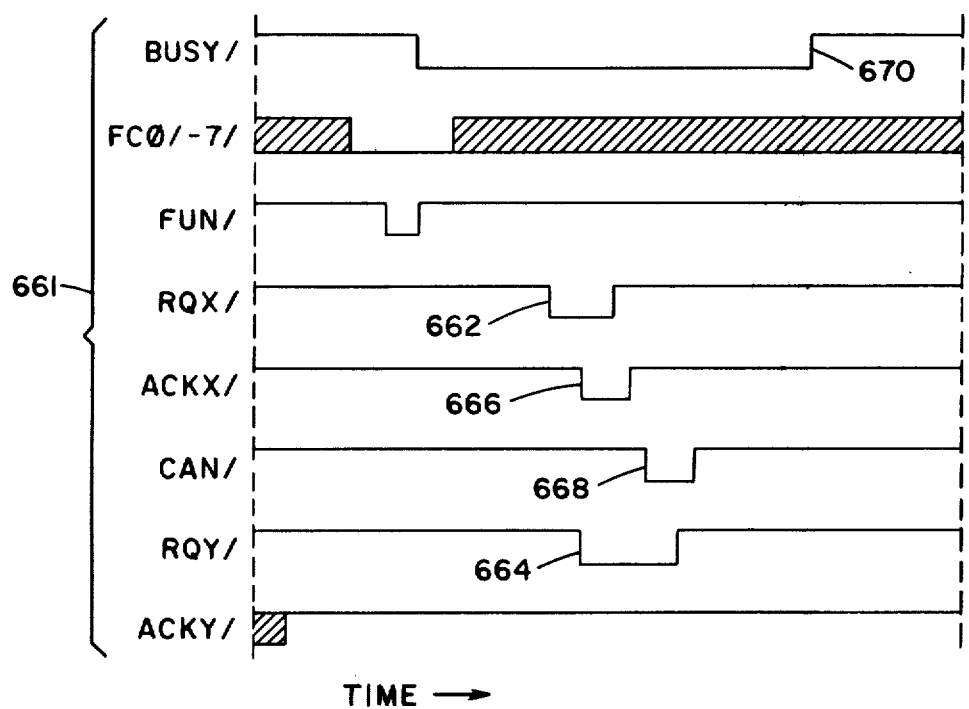
FIG. 70 shows a group of timing diagrams associated with the PFP and the ADCs for an INSERT function.

FIG. 70 shows a group of timing diagrams (enclosed in a bracket 661) associated with the PFP 304 and the ADC's like 306 and 308 for an INSERT function. The various signals shown in FIG. 70 have already been discussed and the general pattern of operation is similar to that already discussed with relation to FIGS. 68 and 69. The importance of FIG. 70 is that it shows that for an INSERT function or operation, more than one ADC may respond to the function as storage space for data is undoubtedly available in more than one storage array like 310 or 316. This is shown by the request lines RQX/ and RQY/ becoming active at points 662 and 664, respectively; however, only the ADC associated with the request line RQX/ is acknowledged at point 666. By the acknowledgement at point 666, the PFP 304 knows that the ADC associated with the request line RQX/ has found a space within the storage array (like 310 or 316) to place the data to be inserted and consequently, the cancel function (CAN/) can be initiated at point 668 to prevent the other ADCs like the one associated with the request line RQY/ from being acknowledged. Thereafter, the data is placed in the appropriate storage array associated with the ADC which is acknowledged, as at point 666, and after the data is inserted in the storage array, the BUSY/ signal becomes inactive at point 670. Because of the parallel searching done by the ADCs like 306, 308, etc., an empty tuple in a storage array 310, or 316 can be readily found, and thereafter only a short time is required to write the data into the selected storage array.

Figure 71:
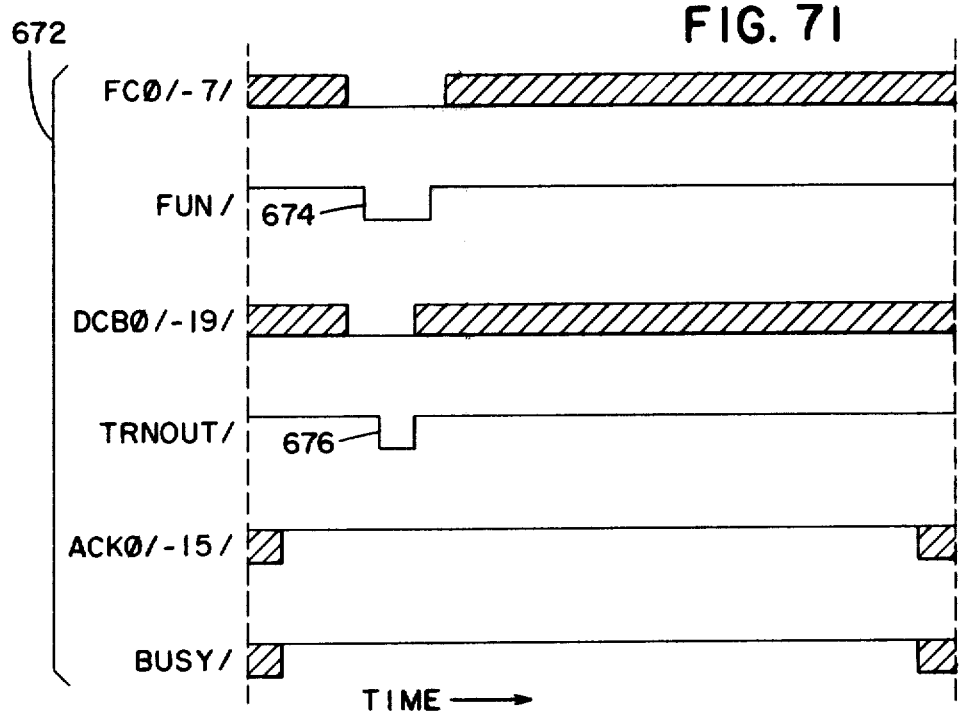
FIG. 71 shows a group of timing diagrams associated with the PFP and the ADCs for a TAG function.

FIG. 71 shows a group of timing diagrams which are included in a bracket 672 and which are associated with the PFP 304 and the ADCs like 306 and 308 for a Tag function. The various signals shown in FIG. 71 have already been discussed and the general pattern of operation is similar to that already discussed in relation to FIGS. 68-70. Basically, FIG. 71 shows how data is transferred from the PFP 304 for a Tag function. For example, the operational code 44 (in hex) from Table 5 listed earlier herein is placed on the FC∅/-7/ lines and thereafter the function pulse (FUN/) goes active at point 674 to transfer the operational code to all the ADCs like 306. The new tag information in this example has the Data Field Format shown earlier herein (just prior to Table 5), and this format is placed on the DCB∅/-19/ lines and is transferred out to all the ADCs by the transfer out pulse (TRNOUT/) going active at point 676 in FIG. 71. At this instant, the PFP 304 drives the FC∅/-7/, FUN/, DCB∅-19/, and TRNOUT/ lines to transfer all the data mentioned to the ADCs like 306. At this time, the ackowledge (ACK∅/-15/) lines and the busy line (BUSY/) are inactive.

Figure 72:
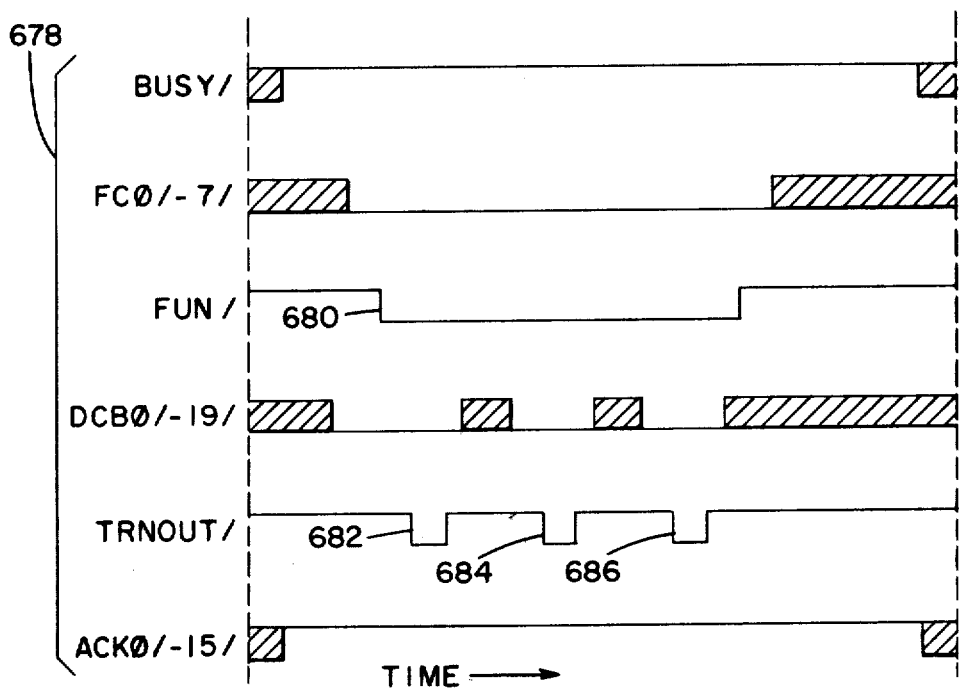
FIG. 72 shows a group of timing diagrams associated with the PFP and the ADCs for a multiple data transfer function.

FIG. 72 shows a group of timing signals which are included in a bracket 678 and which are associated with the PFP 304 and the ADCs like 306 for multiple data transfers to these ADCs. The various signals shown in FIG. 72 has already been discussed and the general pattern of operation is similar to that already discussed in relation to FIGS. 68-71. Basically, FIG. 72 shows the process of sending multiple words of information or data from the PFP 304 to all the ADCs like 306. In this regard, the particular function code for multiple data transfers is placed on the FC∅/-7/ lines and the function (FUN/) pulse is made active at point 680 as previously described. Some of the function codes associated with multiple data transfers are the 6C, 80, and A8 codes which are written in Hex form and which are listed in Table 7. The first "word" of the particular data to be transferred is placed on the DCB∅/-19/ lines and the transfer out pulse (TRNOUT/) goes active for the first time at point 682. Thereafter, the second word of the data is placed on the DCB∅/-19/ lines and the transfer out pulse goes active for the second time at point 684. Similarly, the third word of data is placed on the DCB∅/-19/ lines and the transfer out pulse goes active for the third time at point 686. At this time the BUSY/ line and the acknowledge lines ACK∅/-15/ are inactive as data is being transferred to the ADCs like 306 and 308. The various signals such as TRNOUT/, CAN/, and FUN/ coming from the PFP 304 are shown as blocks 688, 690, and 692 in FIG. 6B. The status request signal (STSRQ/) coming from the PFP 304 (via latch 694) in FIG. 6B is used by the PFP 304 to request status information from the ADCs such as 306 as previously described.

Figure 73:
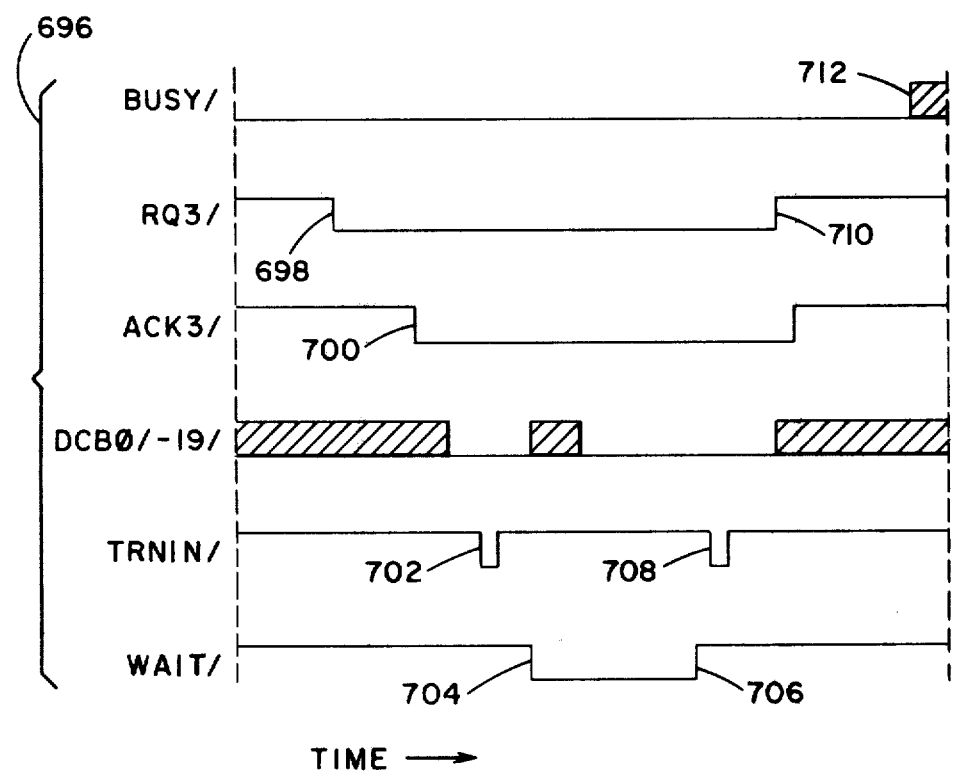
FIG. 73 shows a group of timing diagrams associated with the PFP and the ADCs for a READ operation.

FIG. 73 shows a group of timing signals which are included in a bracket 696 and which are associated with the PFP 304 and the ADCs like 306 for a Read operation. The various signals shown in FIG. 73 have already been discussed and the general pattern of operation is similar to that already discussed in relation to FIGS. 68-72. When an ADC such as 306 or 308 wishes to forward data to the PFP 304 as a result of a Read operation, its associated request line, such as RQ3/, goes active as at point 698 in FIG. 73. Thereafter, the PFP 304 acknowledges this request by having the associated acknowledge line (ACK3/) become active as at point 700. The busy line (BUSY/) may also be active at this time due to other ADCs being involved in the Read operation. After the ackowledge line ACK3/ becomes active, the data which was read is placed on the DCB∅/-19/ data lines and the transfer in pulse (TRNIN/) becomes active at point 702 to transfer the first byte of information read to the PFP 304. Thereafter, the PFP 304 will cause the wait line (WAIT/) to go active at point 704; this prevents the ADCs from sending data to the PFP 304 before the PFP 304 is ready to receive the data. Basically, the storage arrays like 310 and 316 in FIG. 1 operate at faster speeds than do the ROM and RAM units associated with the PFP 304 and the access control unit 302 shown in FIG. 5; consequently, the wait line prevents the ADC's like 306 from transferring data to the PFP 304 before it is ready to receive it. After the wait signal becomes inactive as at point 706 in FIG. 73, the second byte of data is placed on the DCB∅/-19/ lines and the transfer in line goes active a second time at point 708 to transfer the second byte of data read to the PFP 304. Assuming this is the last of the data read to be transferred to the PFP 304, the associated request line RQ3/ goes inactive at point 710 and thereafter, the busy line goes inactive at point 712.

The following List #44 contains a correlation of the various Key numbers included on some of the sheets of the drawing and their associated figure numbers.

Figure 9B:
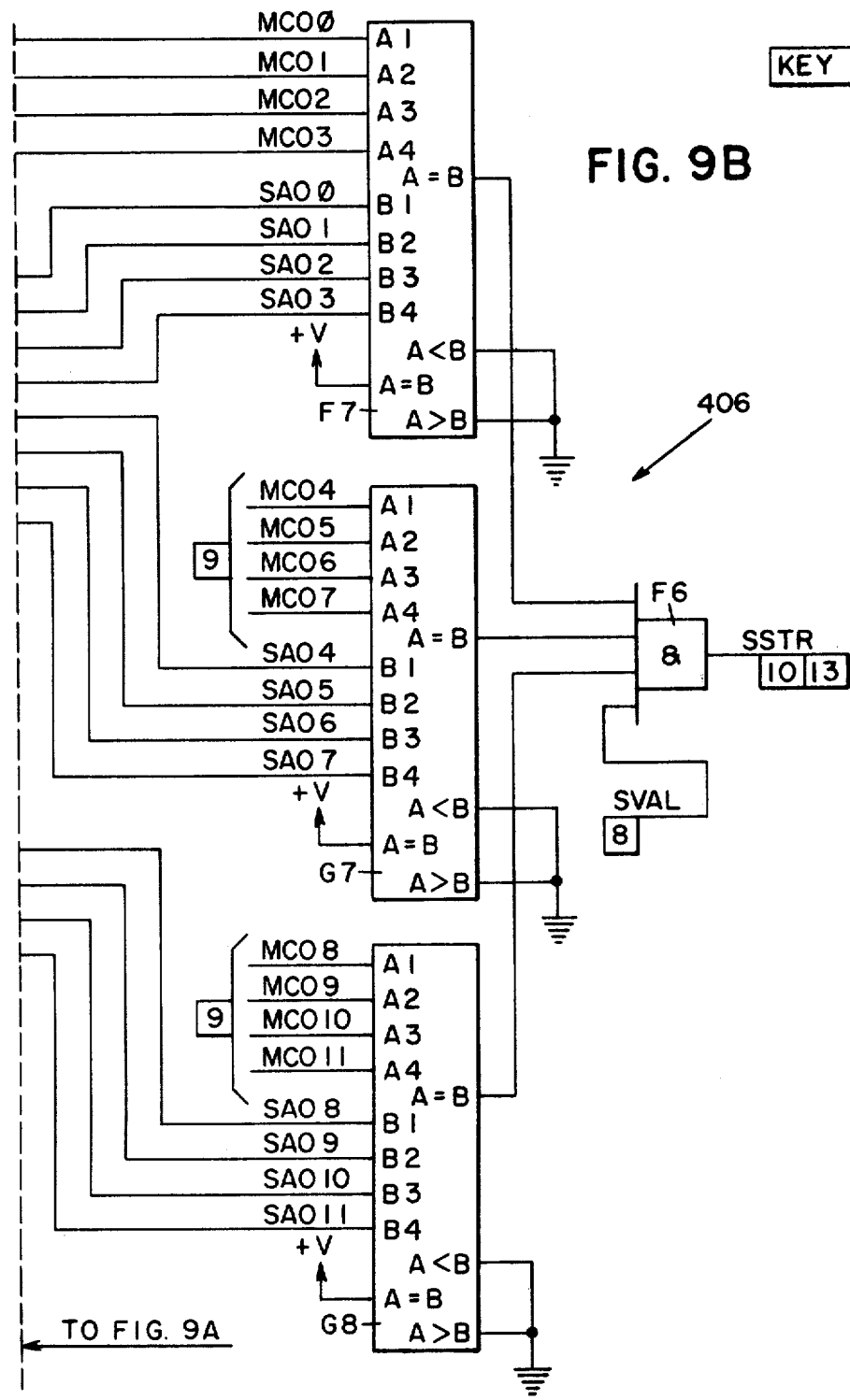
Figure 10B:
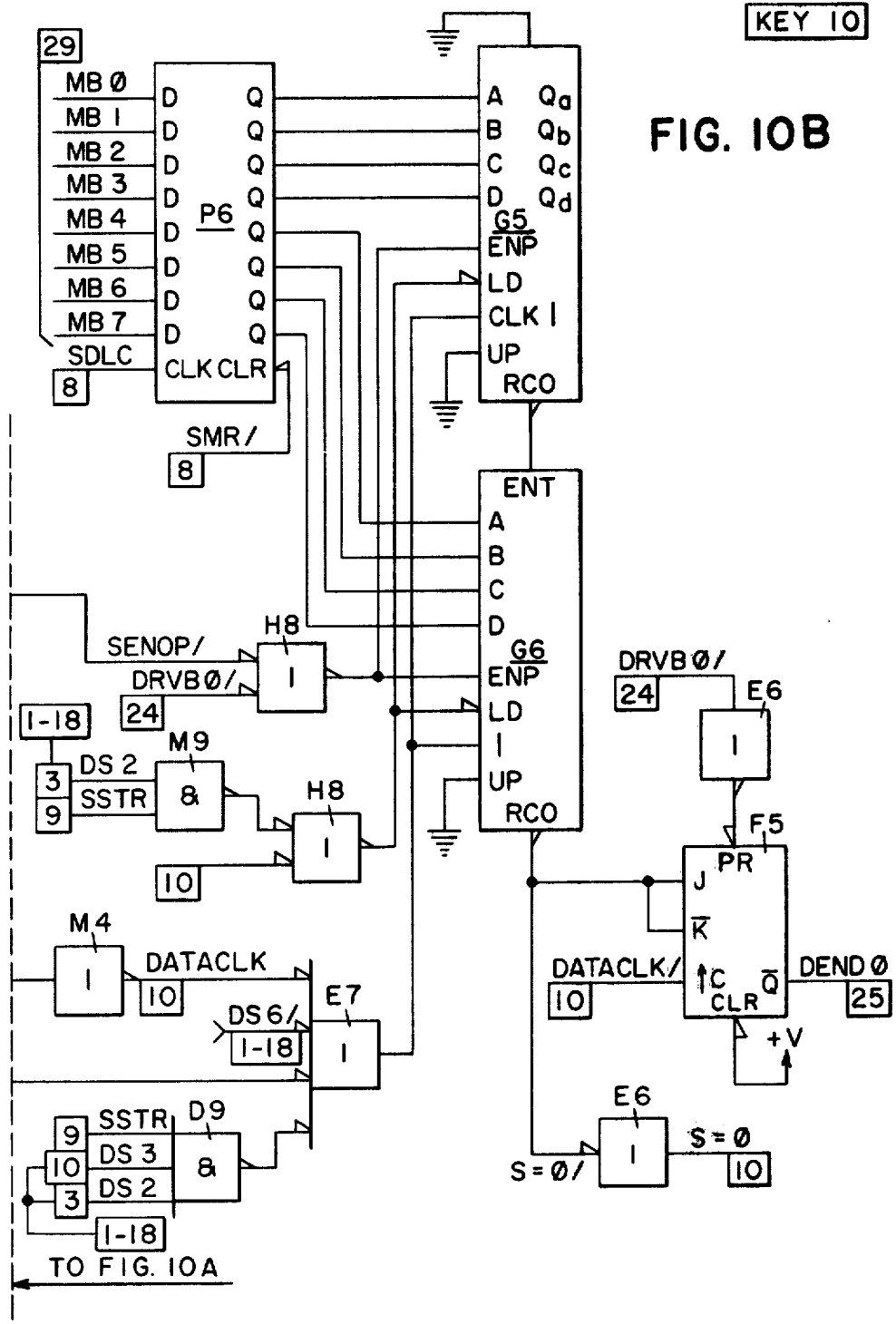
Figure 13A:
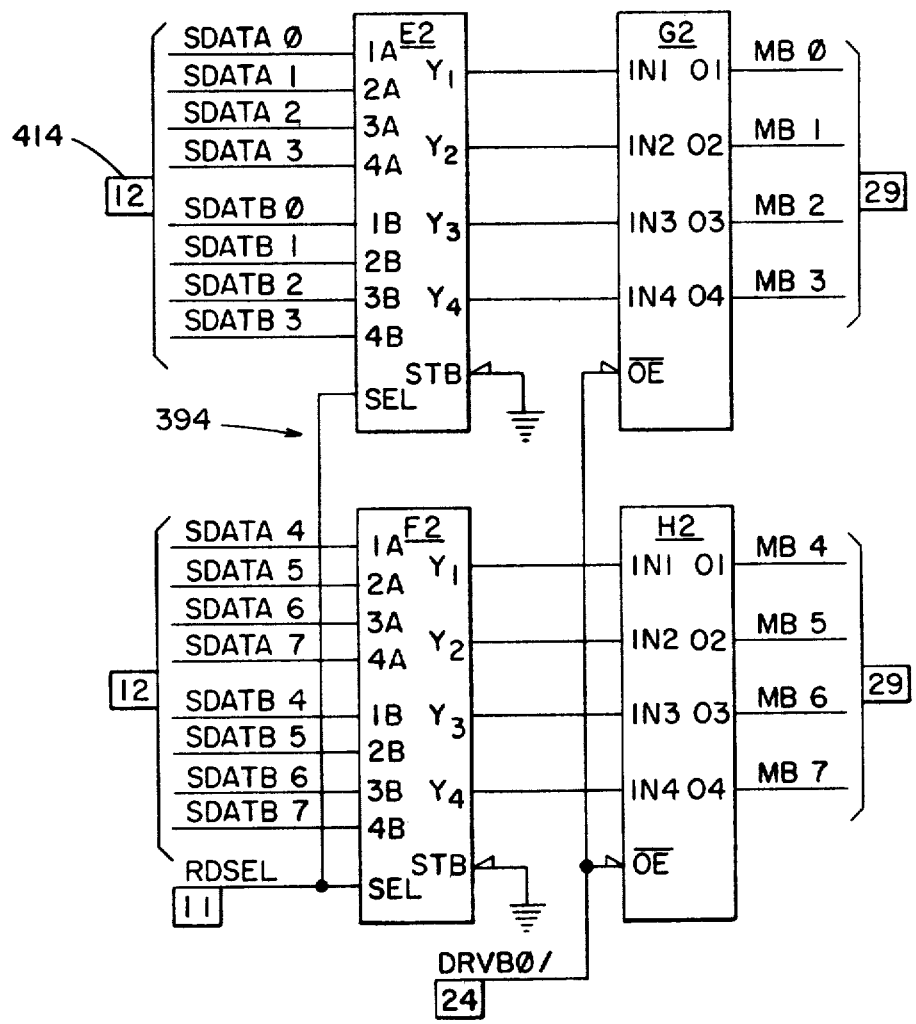
Figure 13C:
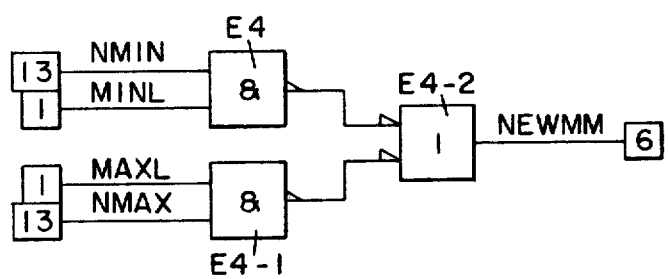
Figure 13B:
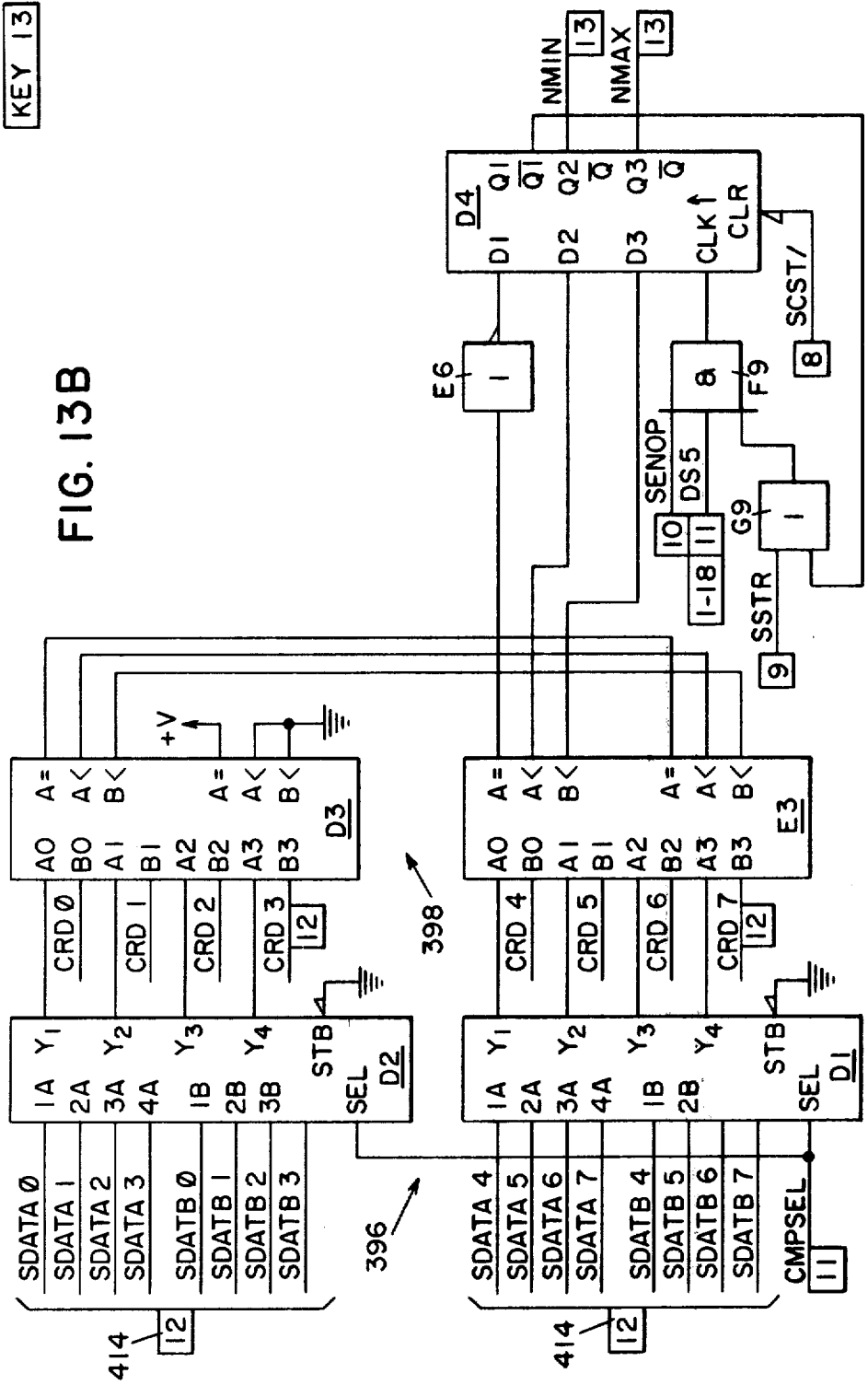
Figure 26C:
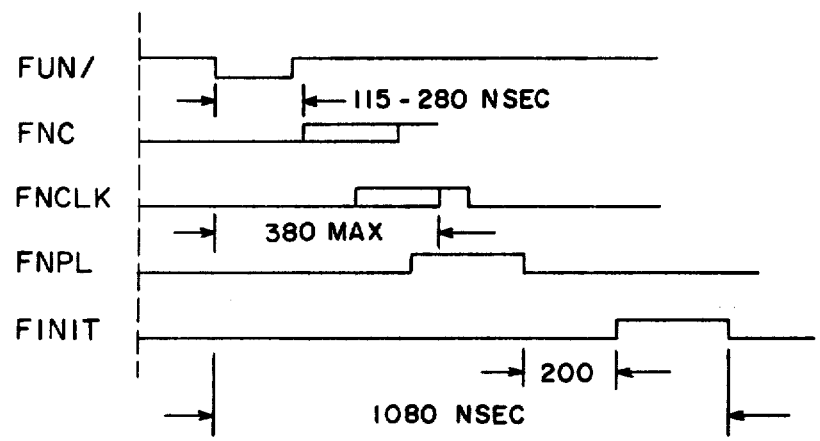
Figure 36C:
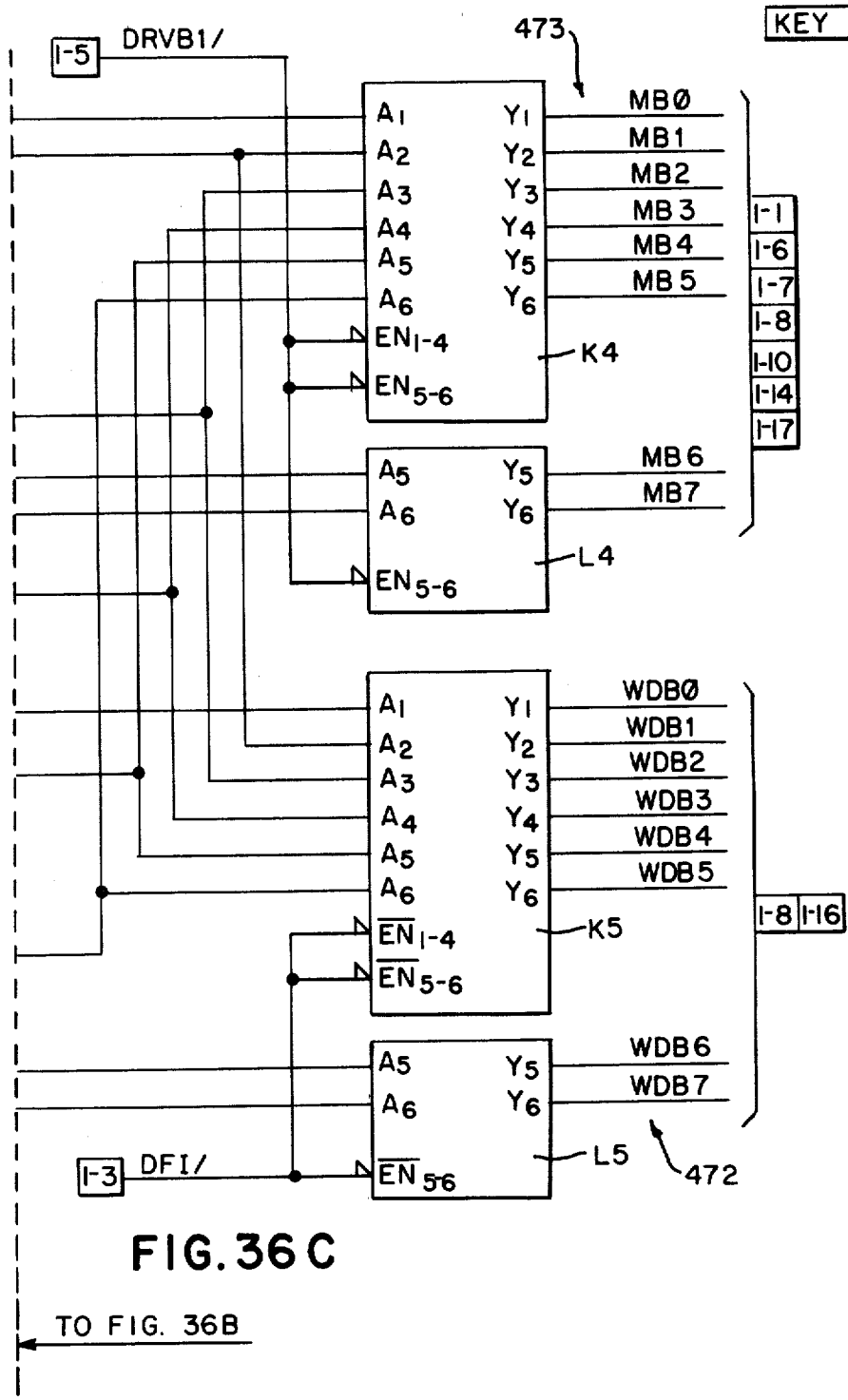

| LIST #44 | |
| --- | --- |
| Key | FIGS. |
| 1 | FIGS. 57A, 57B, and 57C |
| 2 | FIGS. 58A and 58B |
| 3 | FIG. 59 |
| 4 | FIGS. 60A and 60B |
| 5 | FIG. 61 |
| 6 | FIGS. 62A and 62B |
| 7 | FIG. 63 |
| 8 | FIGS. 8A and 8B |
| 9 | FIGS. 9A and 9B |
| 10 | FIGS. 10A and 10B |
| 11 | FIGS. 11A, 11B and 11C |
| 12 | FIGS. 12A and 12B |
| 13 | FIGS. 13A, 13B, and 13C |
| 14 (NONE) | |
| 15 (NONE) | |
| 16 | FIGS. 16A, 16B, 16C, and 16D |
| 17 | FIGS. 17A, 17B, 17C, 17D, and 17E |
| 18 | FIGS. 18A, 18B, 18C, and 18D |
| 19 | FIGS. 19A and 19B |
| 20 | FIGS. 20A, 20B, and 20C |
| 21 | FIGS. 21A and 21B |
| 22 | FIGS. 22A, 22B, and 22C |
| 23 | FIGS. 23A, 23B, 23C, 23D, 23E, and 23F |
| 24 | FIGS. 24A and 24B |
| 25 | FIGS. 25A and 25B |
| 26 | FIGS. 26A, 26B, and 26C |
| 27 | FIGS. 27A, 27B and 27C |
| 28 | FIGS. 28A, 28B and 28C |
| 29 | FIGS. 29A, 29B, 29C, and 29D |
| 30 | FIGS. 30A, 30B, and 30C |
| 1-1 | FIGS. 38A, 38B, 38C, 38D, and 38E |
| 1-2 | FIGS. 39A, 39B, and 39C |
| 1-3 | FIGS. 40A, 40B, 40C, and 40D |
| 1-4 | FIGS. 41A, 41B, and 41C |
| 1-5 | FIGS. 37A, 37B, and 37C |
| 1-6 | FIGS. 36A, 36B, and 36C |
| 1-7 | FIGS. 33A, 33B, and 33C |
| 1-8 | FIGS. 34A, 34B, and 34C |
| 1-9 | FIGS. 49A, 49B, 49C, 49D, and 49E |
| 1-10 | FIGS. 48A and 48B |
| 1-11 | FIGS. 50A and 50B |
| 1-12 | FIGS. 52A and 52B |
| 1-13 | FIGS. 51A and 51B |
| 1-14 | FIGS. 47A, 47B, and 47C |
| 1-15 | FIGS. 44A and 44B |
| 1-16 | FIGS. 45A and 45B |
| 1-17 | FIGS. 46A, 46B, 46C, 46D, and 46E |
| 1-18 | FIGS. 53A and 53B |

We claim:

1. An associative memory system, comprising:
storing means having at least first and second units for storing data therein, wherein a first predetermined number of bytes of data are obtained serially from said first unit followed by a second predetermined number of bytes of data obtained serially from said second unit to provide a stream of bytes of data;
first means and second means for simultaneously receiving at least a portion of said stream of said bytes of data as they are read serially from said storing means;
said first means also including a loop buffer for receiving and storing serially at least a portion of said stream of bytes of data from said storing means;
said second means also having means for performing at least one operation on at least a portion of said stream of said bytes of data as they are obtained serially from said storing means; and
said first means also having means for writing bytes of data from said loop buffer into said storing means simultaneously as said bytes of data are read therefrom whereby a write address for writing a said byte of data into said storing means is obtained by subtracting a third predetermined number from a current address of a byte of data being read from said storing means.

2. The system as claimed in claim 1 in which said first, second, and third predetermined numbers are equal to K in which K is a whole number.

3. An associative memory system, comprising:
storing means having at least first and second units for storing data therein, wherein K bytes of data are obtained serially from said first unit followed by K bytes of data obtained serially from said second unit, wherein K is a whole number;
first means and second means for simultaneously receiving said bytes of data as they are read serially from said storing means;
said first means also including a loop buffer for receiving and storing serially K bytes of data from said storing means;
said second means also having means for performing at least one operation on said bytes of data as they are obtained serially from said storing means; and
said first means also having means for writing bytes of data from said loop buffer into said storing means simultaneously as said bytes of data are read therefrom whereby a write address for writing a said byte of data into said storing means is obtained by subtracting K from a current address of a byte of data being read from said storing means.

4. An associative memory system, comprising:
storing means having at least first and second units for storing data therein, wherein K bytes of data are obtained serially from said first unit followed by K bytes of data obtained serially from said second unit, wherein K is a whole number;
first means and second means for simultaneously receiving said bytes of data as they are read serially from said storing means;
said first means also including a loop buffer for receiving and storing serially K bytes of data from said storing means;
said second means also having means for performing at least one operation on said bytes of data as they are obtained serially from said storing means; and
said first means also having means for writing bytes of data from said loop buffer into said storing means simultaneously as said bytes of data are read therefrom whereby a write address for writing a said byte of data into said storing means is obtained by subtracting K from a current address of a byte of data being read from said storing means;
said second means also having means for controlling the transfer of said bytes of data from said first means to said storing means and
said means for controlling being operatively coupled to said first means and said storing means.

5. The system as claimed in claim 4 in which said storing means is organized as an associative memory having tuples and domains therein in which each said domain is comprised of at least one of said bytes of data and in which each said tuple is comprised of at least one said domain;
each said first and second means having means for finding at least one said domain specified by a utilizing means which is operatively coupled to said system to use said system whereby said utilizing means supplies an argument which is equal to the domain or domains to be found.

6. A data handling system comprising:

means for providing user access to said system;

processor means for receiving user requests from said providing means and also generating a plurality of instructions in accordance with said user requests;

means for storing data, and at least one associative data controller (ADC) which is operatively coupled to said processor means and said storing means to enable said ADC to receive said data from said storing means and also to perform at least one operation with regard to said data in accordance with said instructions;

said storing means having at least first and second units for storing bytes of data therein wherein K bytes of data are obtained serially from said first unit followed by K bytes of data obtained serially from said second unit, and wherein K is a whole number;

said ADC comprising first means and second means for simultaneously receiving said bytes of data as they are obtained serially from said storing means;

said first means also including a loop buffer for receiving and storing serially K bytes of data from said storing means;

said second means also having means for performing at least one operation on said bytes of data as they are obtained serially from said storing means; and said first means also having means for writing bytes of data from said loop buffer into said storing means whereby a write address for writing a byte of data into said storing means is obtained by subtracting K from a current address of a byte of data being read from said storing means.

7. The system as claimed in claim 6 in which said storing means is organized into said first and second units which are identical units and which are followed successively by additional said identical units including an n-1 said identical unit and an n said identical unit wherein n is the total number of said identical units in said storing means, and whereby K bytes of data are obtained serially from a first loop in each of said first, second, additional, n-1 and n said identical units and thereafter K bytes of data are obtained serially from a second loop in each of the first, second additional, n-1 and n said identical units.

8. The system as claimed in claim 7 in which said storing means is organized as an associative memory having tuples and domains therein in which each said domain is comprised of at least one of said bytes of data and in which each said tuple is comprised of at least one said domain;

said second means having qualifying means for selecting bytes of data from said storing means, said qualifying means having a capability of selecting bytes of data based upon a predetermined number of said domains within a said tuple.

9. The system as claimed in claim 8 in which said qualifying means has comparison operators associated therewith for selecting bytes of data from said storing means based upon predetermined criteria.

10. The system as claimed in claim 8 in which said qualifying means has comparison operators associated therewith for selecting bytes of data from said storing means based upon: equal to, greater than, and less than criteria and their complements.

11. The system as claimed in claim 10 in which said qualifying means has means enabling said comparison operators to operate independently on predetermined said domains within a said tuple.

12. The system as claimed in claim 11 in which said qualifying means has a logical operator means for enabling an ANDing function to be effected with regard to said comparison operators.

13. The system as claimed in claim 11 in which said qualifying means has a logical operator means for enabling an ORing function to be effected with regard to said comparison operators.

14. The system as claimed in claim 7 in which said storing means includes charge coupled devices.

15. The system as claimed in claim 6 further comprising a plurality of ADCs with each ADC of said plurality being identical to said first named ADC;

said storing means comprising said at least first and second units for each said ADC;

each said ADC of said plurality being operatively coupled to its associated said first and second units and to said processor means to enable said ADCs to operate in parallel on said storing means in accordance with said instructions.

16. The system as claimed in claim 15 in which said processor means also includes means for controlling a flow of said bytes of data from each of said ADC's to said providing means.

17. A data handling system comprising:

an access control unit for providing user access to said system;

a function processor for receiving user requests from said access control unit and also for generating a plurality of instructions in accordance with said user requests;

means for storing data; and a plurality of associative data controllers (ADCs) which are operatively coupled to said function processor and said storing means to enable said ADCs to operate in parallel on said storing means in accordance with said instructions;

said storing means including a storage array for each said ADC;

each said storage array being organized as an associative memory having tuples and domains therein in which each domain is comprised of at least one byte of data and in which each said tuple is comprised of at least one said domain;

each said ADC comprising:

a min/max module;

a qualify module;

a tag module;

a read/write module;

a loop control module;

a first bus for simultaneously and serially presenting bytes of data from the associated said storage array to each of said min/max, qualify, tag read/write, and loop control modules;

a data interchange unit including control logic for coupling the associated said ADC with said function processor;

said qualify module having means for selecting bytes of data from the associated storage array based upon a predetermined number of said domains to identify qualified data;

said read/write module having means for selectively reading said qualified data and forwarding it via the associated said data interchange unit to said function processor, and also having means for selectively writing said qualified data into the associated said storage array via the associated said loop control module;

said min/max module having buffer means for storing a most recent minimum or maximum from the associated said storage array which is used as criteria with regard to selecting the minimum or maximum, respectively, from the associated said storage array;

said loop control module having a loop buffer for receiving and storing a predetermined number of bytes of data from the associated said storage array, and also for receiving bytes of data from the associated said rear/write module for bytes of data which are to be written into the associated said storage array; and said tag module having means for marking selected tuples within the associated said storage array.

18. The system as claimed in claim 17 in which said min/max, qualify, read/write, and loop control modules for an ADC each have means for finding a particular domain coming from the associated said storage array and specified by a said instruction.

19. The system as claimed in claim 17 in which each said storage array has at least first and second units for storing bytes of data therein wherein K bytes of data are obtained serially from said first unit followed by K bytes of data obtained serially from said second unit, wherein K is a whole number;

said loop buffer having a capacity for storing K bytes of data from the associated said storage array whereby a write address for writing a byte of data into the associated said storage array is obtained by subtracting K from a current address of a byte of data being read from the associated said storage array to provide for sinultaneous reading from and writing into said storage array.

20. The system as claimed in claim 17 in which said qualify module has comparison operators associated therewith for selecting bytes of data from the associated said storage array based upon predetermined criteria.

21. The system as claimed in claim 17 in which said qualify module has comparison operators associated therewith for selecting bytes of data from the associated said storage array based upon equal to, greater than, less than, criteria and their complements.

22. The system as claimed in claim 21 in which each said qualify module has means enabling said comparison operators to operate independently on associated predetermined said domains within a said tuple.

23. The system as claimed in claim 22 in which each said qualify module has a logical operator means for enabling an ANDing function to be effected with regard to said comparison operators.

24. The system as claimed in claim 22 in which each said qualify module has a logical operator means for enabling an ORing function to be effected with regard to said comparison operators.

25. The system as claimed in claim 19 in which each said storage array includes charge coupled devices.

26. The system as claimed in claim 18 in which each said loop control module includes a decision RAM for recording therein a signal indicating whether or not a particular tuple from the associated said storage array is to be written back into the associated said storage array and in which each said read/write module has means for storing bytes of data for a predetermined number of domains to be written into the associated said tuple in the associated said storage array whereby bytes of data for said predetermined number of domains are incorporated into said loop buffer for all said tuples coming from the associated said storage array; however, only when said signal in said decision RAM indicates that said particular tuple is to be written into the associated said storage array will said particular tuple with said predetermined number of domains incorporated into it be written in the associated said storage array.

27. The system as claimed in claim 17 in which said function processor also includes means for controlling a flow of said qualified data from each of said ADCs to said access control unit.

28. The system as claimed in claim 17 in which said storing means further comprises an array controller for each of said storage arrays for controlling the flow of data between each said storage array and its associated said ADC.

29. The system as claimed in claim 18 in which said buffer means in the associated said min/max module includes first and second buffers whereby an argument representing a minimum function from said function processor is fed into said first buffer and the bytes of data from the associated said storage array are fed into said second buffer;

each said min/max module also including means for comparing the contents of said first buffer with the contents of said second buffer until a new minimum (if any) is found in said second buffer, whereupon, the contents of said second buffer becomes the argument and the bytes of data from the associated storage array are fed into said first buffer until a second new minimum (if any) is found in said first buffer.

30. The system as claimed in claim 17 in which each said storage array is organized to provide at least one tag byte of data for each said tuple to enable said marking selected tuples;

said tag module also having qualifying means for examining specific data bits within said tag byte of data, and also having means for examining the nature of said specific data bits for use in ascertaining said qualified data.

31. A method of handling data comprising the steps of:
(a) storing bytes of data in at least first and second storing units in a storage array, wherein K bytes of data are obtained serially from said first unit followed by K bytes of data obtained serially from said second unit, wherein K is a whole number;
(b) simultaneously receiving said bytes of data in first and second circuits as they are read from said storage array; said first circuit including a loop buffer for storing serially K bytes of data from said storage array;
(c) performing at least one operation on said bytes of data as they are received serially by said second circuit; and
(d) writing bytes of data into said storage array via said loop buffer whereby a write address for writing a byte of data into said storage array is obtained by subtracting K from a current address of a byte of data being simultaneously read from said storage array.

* * * * *